United States Patent
Tatsumi et al.

(10) Patent No.: US 6,678,468 B2
(45) Date of Patent: Jan. 13, 2004

(54) VIDEO AND AUDIO CODING METHOD, CODING APPARATUS, AND CODING PROGRAM RECORDING MEDIUM

(75) Inventors: Hidenori Tatsumi, Higashihiroshimashi (JP); Koichi Horiuchi, Hirakatashi (JP); Takao Matsumoto, Izumishi (JP); Aki Yoneda, Neyagawashi (JP); Eiji Kawahara, Hiroshimashi (JP); Yoshitaka Arase, Ootakeshi (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/984,393

(22) Filed: Oct. 30, 2001

(65) Prior Publication Data

US 2002/0071662 A1 Jun. 13, 2002

Related U.S. Application Data

(62) Division of application No. 08/951,067, filed on Oct. 15, 1997, now Pat. No. 6,353,703.

(30) Foreign Application Priority Data

| Oct. 15, 1996 | (JP) | 8-272746 |
| Oct. 25, 1996 | (JP) | 8-284353 |
| Nov. 26, 1996 | (JP) | 8-314563 |
| Feb. 26, 1997 | (JP) | 9-042051 |

(51) Int. Cl.[7] .............................................. H04N 5/91
(52) U.S. Cl. ..................................... 386/111; 386/112
(58) Field of Search .......................... 386/46, 96, 98, 386/104, 105, 111, 112, 125, 126; 348/423.1, 462; 370/473; 375/240.25

(56) References Cited

U.S. PATENT DOCUMENTS

| 5,325,124 A | * | 6/1994 | Keith | 375/240.25 |
| 5,414,469 A |   | 5/1995 | Gonzales et al. | 348/408 |
| 5,481,543 A | * | 1/1996 | Veltman | 370/473 |
| 5,488,695 A |   | 1/1996 | Cutter | 395/290 |
| 5,511,054 A | * | 4/1996 | Oishi et al. | |
| 5,568,274 A |   | 10/1996 | Fujinami et al. | 386/107 |
| 5,832,124 A |   | 11/1998 | Sato et al. | 382/238 |

FOREIGN PATENT DOCUMENTS

| CN | 87103561 A | 1/1988 | H04N/1/41 |
| CN | 1072051 A | 5/1993 | H04N/7/12 |

(List continued on next page.)

OTHER PUBLICATIONS

"A Multi-Standard Video Codec Architecture for the ISA/VL Bus"; D.J. Fairfield; Proceedings of the International Conference on Signal Processing Applications and Technology; vol. 2, Oct. 18, 1994; pp. 1173–1178, XP000602802; p. 1173; right-hand column, line 8–line 26; p. 1178, left-hand column, line 32–right-hand column, line 1; Figure 5.

(List continued on next page.)

Primary Examiner—Huy Nguyen
(74) Attorney, Agent, or Firm—Parkhurst & Wendel, L.L.P.

(57) ABSTRACT

A method of coding video comprises the steps of: coding one or a plurality of still picture information of pro-video information consisting of the plurality of still picture information in which video is digitized according to coding parameters; and deciding one or more coding parameters based on one or more of resolution of the pro-video information, frame rate required for reproducing coded data resulting from coding, processing performance indicating processing capability of the coding apparatus which performs the video coding step, and one or a plurality of coding parameters which affects amount of processing of coding in the video coding step.

4 Claims, 66 Drawing Sheets

FOREIGN PATENT DOCUMENTS

| | | | | |
|---|---|---|---|---|
| CN | 1108462 A | 9/1995 | ............ | H04N/7/24 |
| EP | 0 591 944 A2 | 4/1994 | | |
| GB | 2 189 106 A | 10/1987 | ............ | H04N/1/41 |
| JP | 7-84595 | 3/1995 | | |
| JP | 2587591 | 12/1996 | | |
| WO | WO 92/007359 | 4/1992 | | |
| WO | WO 94/07237 | 3/1994 | | |
| WO | WO 95/30309 | 11/1995 | | |
| WO | WO 96/13123 | 5/1996 | ............ | H04N/5/76 |
| WO | WO 96/19078 | 6/1996 | | |

OTHER PUBLICATIONS

"Desktop Video (1) Multimedia Anwendungen im Videobereich"; H. Zander; Fernseh– Und Kino–Technik, Jun. 1, 1994, pp. 303–310, XP000457151; p. 309, left–hand column, line 1–line 16.

"Real–Time MPEG–Audio Coding and Decoding on a DSP Chip"; C.D. Murphy et al.; IEEE Transactions on Consumer Electronics; vol. 43, No. 1; Feb. 1997, pp. 40–47, XP000703855 *paragraph IV.A; figures 2, 5–7*.

"Transforming the PC into a TV, Radio, VCR and Video Editing Studio"; R. Willner; WESCON '95 Conference Record; Nov. 7, 1995, pp. 743–748, XP000586646 *p. 744, line 6–line 11*.

"A Tutorial on MPEG/Audio Compression"; D. Pan; IEEE Multimedia, vol. 2, No. 2, 1995; pp. 60–74; XP000525989 *p. 61, right–hand column, line 1–line 13* *figures 1, 2*.

* cited by examiner

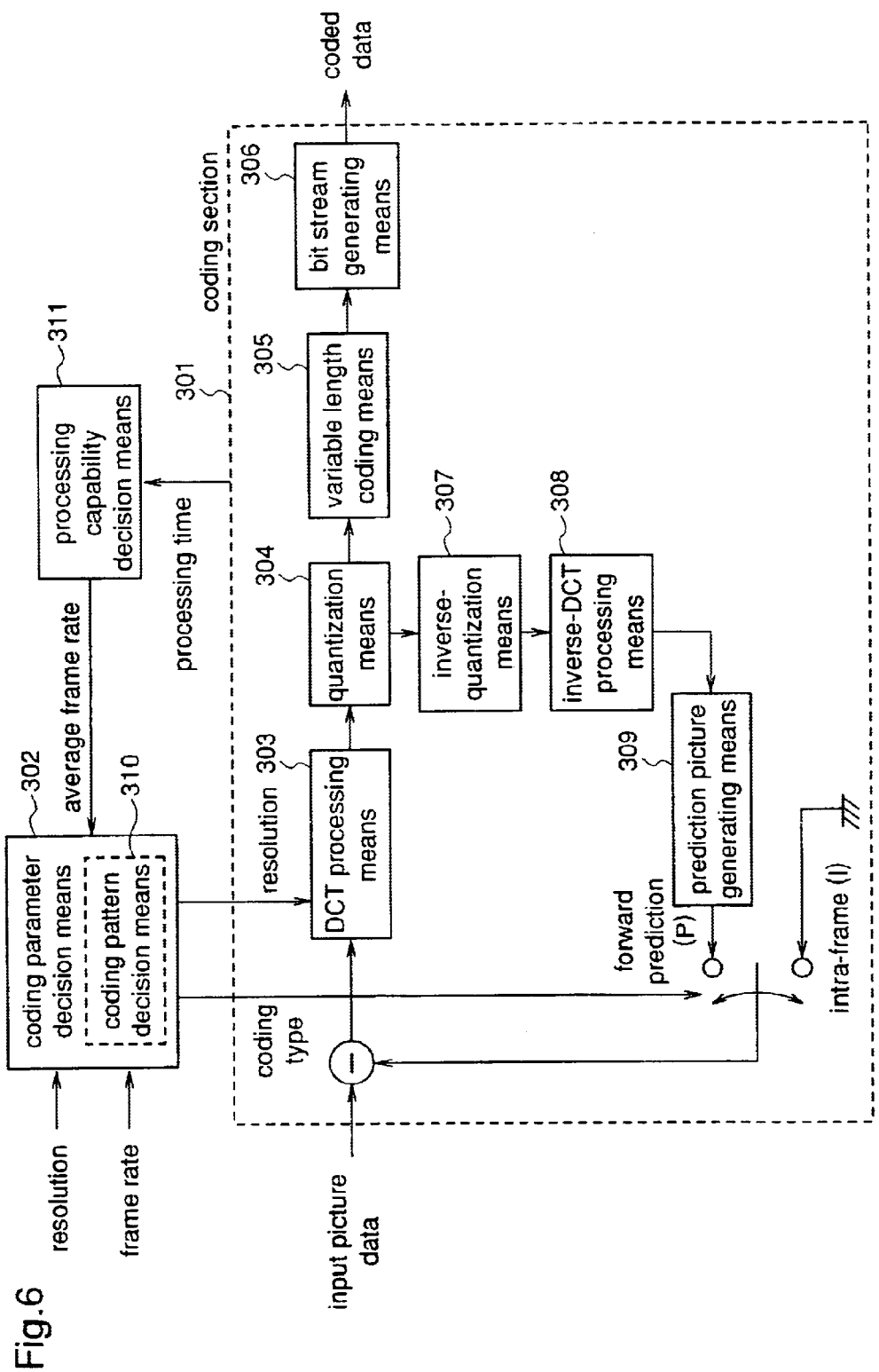

Fig.7 (a) state transition diagram

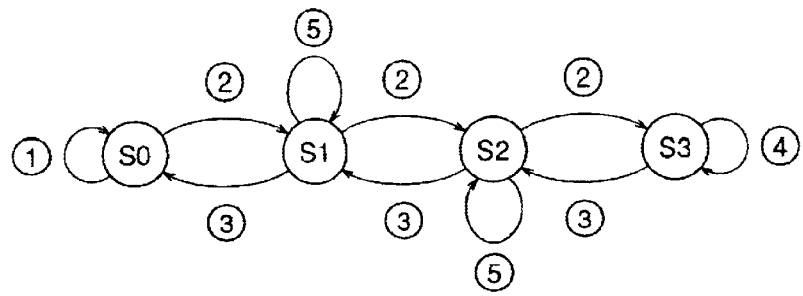

Fig.7 (b) state transition condition

| transition condition ① | except ② | |
|---|---|---|
| transition condition ② | specified frame rate < | frame rate posted by processing capability decision means |
| transition condition ③ | specified frame rate > | frame rate posted by processing capability decision means |
| transition condition ④ | except ③ | |
| transition condition ⑤ | specified frame rate = | frame rate posted by processing capability decision means |

Fig.9 (a) state transition diagram

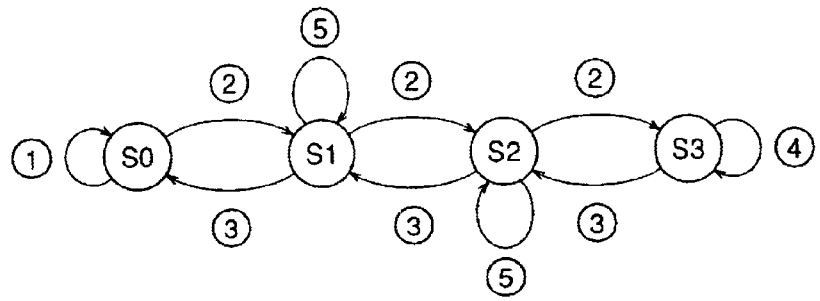

Fig.9 (b) state transition condition

| transition condition ① | except ② |
|---|---|
| transition condition ② | difference value posted by processing capability decision means is negative |
| transition condition ③ | difference value posted by processing capability decision means is positive |
| transition condition ④ | except ③ |
| transition condition ⑤ | difference value posted by processing capability decision means is 0 | audio data

A
sampling period
fs
(normal one)

B
reproducible at
sampling period
fs

C
sampling period
fs/n
(not reproducible at
sampling period fs)

VIDEO AND AUDIO CODING METHOD, CODING APPARATUS, AND CODING PROGRAM RECORDING MEDIUM

This is a Division of application Ser. No. 08/951,067 filed Oct. 15, 1997 U.S. Pat. No. 6,353,703.

FIELD OF THE INVENTION

The present invention relates to a video and audio coding method, a coding apparatus, and a coding program recording medium and, more particularly to a coding method, a coding apparatus and a coding program recording medium in which video, audio, or video and audio are captured and coded under software control using a general purpose computer resource.

BACKGROUND OF THE INVENTION

Techniques for digitizing video or audio as analog data to obtain digital video data or audio data have been widespread and developed because it is easy to handle recording, transmission, editing, and reproduction of digital data. An advantage of digitization is that data can be compressed with ease and compressive coding is very important especially for recording or transmission. For the compressive coding techniques, international standards have been established, among which MPEG (Moving Picture Experts Group) standard is well-known as a general digital standard in which video or audio may be handled.

In addition, with high-speed and low-cost semiconductor devices in computers and VLSI or the like, cheap personal computers which are called multimedia personal computers are on the market. As a result, regeneration of video and audio as compressively coded digital data by conventional addition of decode hardware can be easily realized in the personal computers by a software. Also, delivery of video or audio is performed by an internet and coded data of video and audio according to MPEG is extensively utilized.

As concerns coding to produce coded data of video or audio, software processing is difficult in the personal computer and special hardware must be added thereto. Though it is possible to perform coding by software processing after recording video and audio as files, it takes time several times as long as input time of video and audio to perform conversion, so that it is not appealing to the user.

In order to realize that general personal computer users can capture video including a moving picture or audio to produce coded data, it is desired that a capture board or a sound board is used to capture a moving picture or audio and real-time coding can be performed by a software, which must be developed with progress and spread use of hardware.

A prior art apparatus which performs "A video coding", "B audio coding" and "C video and audio coding" is described hereinafter as an example of a status quo of video, audio or video and audio coding.

A. Prior Art Video Coding Apparatus

Video including a moving picture or a still picture is digitized in real time and captured into a computer to perform coding processing in real time by using an expansion card for personal computer which performs coding the video in real time according to the MPEG as an international standard of moving picture compress ion.

FIG. 58 is a block diagram illustrating a Structure of a video coding apparatus that is realized in a computer including such special hardware. As Shown in Figure, the prior art video coding apparatus comprises a coding section 5001 and a coding parameter decision means 5002, the apparatus inputting video as input picture data and outputting video coded data. The coding section 5001 includes a DCT (discrete cosine transform) processing means 5003, a quantization means 5004, a variable length coding means 5005, a bit stream generating means 5006, an inverse quantization means 5007, an inverse DCT processing means 5008, and a prediction picture generating means 5009.

In the Figure, the coding section 5001 is used for inputting video data comprising a series of still pictures in which video is digitized as input picture data and performing coding processing according to set coding parameters to output coded data. Individual still picture data constituting input picture data is referred to as a frame picture. The coding parameters are given by the coding parameter decision means 5002 mentioned later as indicators of a coding type and resolution.

The coding parameter decision means 5002 is used for deciding a coding type indicating an intra-frame coding or an inter-frame coding and resolution, and outputting the same to the coding section 5001.

In the coding section 5001, the DCT means 5003 is used for performing DCT processing to the input picture data and outputting resulting DCT data. The quantization means 5004 is used for quantizing the DCT data and outputting quantized data. The variable length coding means 5005 is used for performing variable length coding processing to quantized data to produce variable length coded data that is compressively coded. The variable length coded data is input to the bit stream generating means 5006, from which coded data of the video coding apparatus is output as a bit stream which can be transmitted and recorded.

The inverse-quantization means 5007 is used for performing inverse-quantization processing to the quantized data that is output from the quantization means 5004 and outputting inverse-quantized data. The inverse-DCT means 5008 is used for performing inverse-DCT processing to inversely-quantized data and outputting resulting inverse DCT data, which is input to the prediction picture generating means 5009 and output as prediction picture data. In case of coding using prediction picture in accordance with the coding parameters, difference data between the prediction picture data and the input picture data is input, thereby inter-frame coding is performed in the coding section 5001.

An operation of video coding in the video coding apparatus constructed above is described hereinafter.

Prior to coding, the coding parameter decision means 5002 decides coding parameters including a coding type and resolution and outputs the same to the coding section 5001.

Generally, compressive coding includes an intra-frame coding in which a still picture of a frame (corresponding to a screen) is compressed excluding redundancy based on a spatial correlation (intra-frame correlation) thereof, and an inter-frame coding in which still pictures of consecutive frames that are close in time are compressed excluding redundancy based on time correlation (inter-frame correlation).

The prior art video coding apparatus basically performs intra-frame coding. In addition to the intra-frame coding, the apparatus performs inter-frame coding, thereby coded data with high-compression ratio is obtained. However, to perform inter-frame coding, prediction pictures are produced by decoding or motion detection and motion compensation processing, and difference between the prediction picture and a picture to be coded is obtained. These processing causes increased burden on the apparatus. For generation of the prediction picture in inter-frame coding, forward prediction on the basis of previously processed data, backward prediction on the basis of subsequently processed data, and bidirectional prediction in which the forward prediction or backward prediction is performed, one of which is employed. Hereinafter, the intra-frame coding, the forward predictive coding, the bidirectionally predictive coding (including the backward coding) are represented by "I", "P", and "B", respectively.

Resolution of a picture is generally represented by a number of pixels in longitudinal and lateral directions in a screen such as "320×240" or "160×120". High resolution, i.e., many pixels in one screen can provide data of high playback quality of picture. However, targets to be processed is increased, causing increased burden on processing.

To conform to the MPEG standard, it is necessary to input/output or transfer data at a given transfer rate. Coded data must be output with this transfer rate satisfied. In case of processing video, the transfer rate is generally expressed as a frame rate that is represented by a number of frames per/sec.

Therefore, it is desirable to set parameters so that real-time processing is performed to captured video with the frame rate satisfied and simultaneously coded data of high playback quality of picture (high resolution) using as high compression ratio as possible is obtained, allowing for processing capability of the video coding apparatus.

In the prior art video coding apparatus, it is considered that the coding parameters are preset allowing for these factors. The coding parameter decision means 5002 holds this set parameters and outputs the same to the coding section 5001 for coding. With regard to the coding type of the coding parameters, a method of deciding a coding type on the basis of information of input video such as "scene change" is disclosed in "picture coding apparatus (Japanese Patent Application Hei. No. 8-98185)".

A parameter of resolution of coding parameters input to the coding section 5001 is input to the DCT processing means 5003 and used for processing. A parameter of the coding type is used for controlling switching of input to the DCT processing means 5003, between input picture data itself and difference data between the same and prediction picture.

The DCT processing means 5003 performs DCT processing to the input frame picture or the difference data on the basis of resolution that is input from the coding parameter decision means 5002 and outputs resulting DCT data. In the DCT processing, data to be processed is divided into (8×8 pixels) blocks and two-dimensional inverse DCT is performed for each divided block. The quantization means 5004 quantize the DCT data using a give value and outputs quantized data. Quantization is generally performed by division using a value in quantization step (the given value). The variable length coding means 5005 performs variable length coding to the quantized data and outputs variable-length coded data. The variable length coding is performed by allocating a code with the fewest bits to data having the highest frequency in allocation of bits for coding, thereby amount of data is reduced. The bit stream generating means 5006 generates a bit stream from the variable-length coded data that is output from the variable length coding means 5005 and outputs the bit stream as an output of the video coding apparatus.

In case of inter-frame coding, the following operation is performed. The inverse-quantization means 5007 inversely quantizes the quantized data that is output from the quantization means 5004 and outputs Resulting inversely-quantized data. The inverse-DCT processing means 5008 performs two-dimensional inverse DCT processing to the inversely-quantized data for each (8×8 pixels) block that is divided by the DCT processing means 5003 and outputs resulting inverse DCT data. The prediction picture generating means 5009 generates prediction picture on the basis of the inverse DCT data, to be output. The difference data between the input picture data and the prediction picture is input to the DCT processing means 5003.

B. Prior Art Audio Coding Apparatus

An audio coding method according to a subsampling coding method conforming to an MPEGAudio system is employed for coding audio with extensive subband such as human voice, music, natural sound, or various effective sounds.

In multi media personal computers of high performance, it is possible to perform coding in real time to audio that is captured using a sound board which is standard on the computer.

A first audio coding apparatus according to a prior art in which input audio is coded according to the subsampling coding method will be described.

In addition, there is a method of applying psychoacoustic analysis as a method of audio coding conforming to MPEG1Audio.

Generally, in an encoder conforming to MPEG1Audio, priority for allocating bits to each subband is decided after consideration of limit of human hearing ability or masking effect using psychoacoustic model. This is for high-efficiency coding adapted to static and dynamic hearing characteristics of human being, but does not affect a data format according to MPEG1Audio standard, so that it is possible to produce coded data of MPEG1Audio without this. Also, since processing burden of psychoacoustic analysis is large as mentioned later, this processing is dispensed with as illustrated in the first example, thereby significant processing burden on CPU can be reduced. Since psychoacoustic analysis is not applied, playback quality of sound is degraded.

An audio coding in which the psychoacoustic analysis is applied is described as a second example of a prior art audio coding.

B1-Prior Art Audio Coding Apparatus

FIG. 59 is a block diagram illustrating a structure of an audio coding apparatus according to a first example of prior art. As shown in Figure, the audio coding apparatus comprises an audio input unit 2551, an input audio sampling unit 2553, a subsampling unit 2555, a coding bit allocation unit 2556, a quantization unit 2557, a coding unit 2558, and a coded data recording unit 2559.

In Figure, the audio input unit 2551 is used for inputting audio to be coded. Generally, the audio is input from a microphone or as a line input. The input audio sampling unit 2553 is realized in input function and control program and used for sampling the audio that is input from the audio input unit 2551. The subsampling unit 2555 is used for subsampling the sampled data. The coding bit allocation unit 2556 is used for allocating coding bits to each subband that is divided by the subsampling unit 2555. The quantization unit 2557 is used for quantization in accordance with the number of coding bits allocated by the coding bit allocation unit 2556. The coding unit 2558 is used for outputting quantization value that is output from the quantization unit 2557 as coded audio data. The units 2555 to 2558 are realized in CPU in a computer, a main memory, and a program. The coded data recording unit 2559 is realized in a storage device such as a magnetic storage and in a control program of the storage device.

FIG. 60 is a flowchart of the prior art audio coding method. FIG. 61 is a diagram for explaining sampling. FIGS. 62 and 63 are diagrams for explaining subsampling.

Hereinafter, an operation of the first prior art audio coding apparatus with reference to FIGS. 59 to 63 and simultaneously following a flow in FIG. 60.

In FIG. 60, in step 1, the input audio sampling unit 2553 samples input audio signals at a sampling frequency fs to obtain sampled data. As shown in FIG. 61, the input audio is represented by a graph indicating a relation between time and sound pressure. The input audio is sampled every sampling cycle (time ts). As shown in Figure, a reciprocal relation is established between the sampling cycle ts and the sampling frequency fs.

In subsequent steps including step 2 in FIG. 60, operation is chiefly performed in software under control of CPU. In step 2, sampled data is sub-sampled into M frequency bands. FIG. 62 is a diagram illustrating dividing audio data as band input signals into 12 subbands. As shown in Figure, 12 subband signals from subband 0 signals BPF0 to subband 11 signals BPF 11 are produced. FIG. 63 is a diagram illustrating 12 subband signals so sub-sampled. In the Figure, subband signals are different from those in FIG. 61 and sound pressure is represented using not time but frequency.

In case of MPEG audio, layers 1 to 3 are defined. In the layers 1 to 3, playback quality of sound and required hardware performance becomes higher, and hardware scale becomes larger in the order of 1→2→3. In the audio coding which is adapted to the layer 1, the number p of input audio samples to be sub-sampled at a time is p=32. 512 samples including 32 samples as a target are divided into 32 subbands and each subband audio data is output.

M subband signal data resulting from subsampling in step 2 is passed from the subsampling unit 2555 to the quantization unit 2557.

In step 3, the coding bit allocation unit 2556 allocates coding bits to M subband signals. In step 4, the quantization means 2557 quantizes the subband signal data that is passed by the subsampling unit 2555 for each subband in accordance with the number of coding bits allocated by the coding bit allocation unit 2556, to obtain a quantization value. In step 5, the coding unit 2558 performs coding to the quantization value to be output and resulting coded data is recorded by the coded data recording unit 2559.

While audio is being input, steps 1 to 5 are repeated. Audio is continuously input and real-time processing is performed to the same, thereby coded data is output and recorded. On completion of audio input, the coding is completed.

Coded data stored in the storage device is preserved as MPEG regenerative data. Alternatively in place of recording and storage, the coded data may be transmitted over a network and used.

B-2 Prior Art Audio Coding Apparatus

FIG. 64 is a block diagram illustrating a structure of a second prior art audio coding apparatus. As shown in Figure, the second prior art coding apparatus comprises an audio input unit 2651, an input audio sampling unit 2653, a subsampling unit 2655, a quantization unit 2657, a coding unit 2658, a coded data recording unit 2659, an FFT (Fast Fourier Transformation) unit 2660, a psychoacoustic analysis unit 2661, and a coding bit allocation unit 2662. The apparatus has a structure in which the FET unit 2660 and the psychoacoustic analysis unit 2661 are added to the first apparatus.

In Figure, the FET unit 2660 is used for performing FET processing to signals. To the signals that have been processed in the FET unit 2660, the psychoacoustic analysis unit 2661 is used for performing comparison with minimum audible limit and analysis of masking effect. The coding bit allocation unit 2662 is used for performing allocation of coding bits on the basis of analysis of the psychoacoustic analysis unit 2661 so that allocation of coding bits to audible signals is increased. The audio input unit 2651, the input audio sampling unit 2653, the subsampling unit 2655, the quantization unit 2657, the coding unit 2658, and the coded data recording unit 2659 are identical to those of the first apparatus and will not be discussed.

FIG. 65 is a flowchart of MPEG1Audio coding. FIG. 66 is a diagram illustrating minimum audible limit. An operation of the second prior art audio coding apparatus is described with reference to FIGS. 64 to 66.

Steps 1 to 2 in FIG. 65 are performed as in the first example, resulting in M subband signals. Suppose that M=32 subband signals are obtained, for example. As in the first example, the subband signals are passed from the subsampling unit 2655 to the quantization unit 2657.

In step 3, after the FET unit 2660 divides sampled input audio data into L subbands using FET processing, it passes the resulting signals to psychoacoustic analysis unit 2661, which analyzes the L signals. For example, in case of the layer 1 of MPEG audio, 512 sampled data is used. The FET unit 2660 performs subsampling into L=256 subbands. In case of layer 2, 1024 samples are used to output 512 subbands, causing increased processing burden.

The psychoacoustic analysis unit 2661 compares each subband signals with the minimum audible limit indicating inaudible limit level shown in FIG. 66. FIG. 66 shows division of 32 subbands. If the number is increased (256), a graph of the minimum audible limit remains unchanged and subdivision is performed with respect to lateral axis (subband) in the same range shown in FIG. 66.

To subbands which have been decided that they are less than the minimum audible limit by the psychoacoustic analysis unit 2661, bits are not allocated in subsequent steps. Therefore, more bits are allocated to subbands other than them.

As concerns auditory sense of human being, there is known a masking phenomenon that relatively little sound, namely signals of low sound pressure cannot be heard when there is big sound which is close in frequency or in time, namely signals of high sound pressure. The psychoacoustic analysis unit 2661 checks relation between each subband signals and signals which are close to them to detect signals masked (inaudible) due to the masking phenomenon.

To the signals that have been detected herein, bits are not allocated in subsequent steps, so that more bits are allocated to subbands other than them.

In step 5 of flow in FIG. 65, the coding bit allocation unit 2662 performs allocation of coding bits on the basis of the analysis of the psycoacoustic analysis unit 2661. At this time, allocation is performed to M subbands on the basis of analysis of L subbands. Therefore, to the signals which are inaudible or less audible to human being, bits are not allocated, so that more bits are allocated to audible signals.

In subsequent steps including a step 6, as in the first example, steps 1 to 7 are repeated, thereby audio coding is performed upon input of audio.

Thus, more coding bits are allocated to audible sound, thereby in MPEGAudio audio coding which adopts psychoanalysis, coded audio data of high playback of picture can be obtained.

C. Prior Art Video and Audio Coding Apparatus

FIG. 67 schematically shows a prior art video and audio coding apparatus. As shown in Figure, the prior art video and audio coding apparatus comprises a video camera 2701, an audio capture unit 2702, an audio coding unit 2703, a video capture unit 2704, and a video coding unit 2705.

As shown in Figure, coded audio information and coded video information are output from the apparatus and transmitted or recorded as required.

In the same Figure, the video camera 2701 is used for capturing video and audio information and dividing it into analog audio information and analog video information, to be output. The audio capture unit 2702 is used for inputting analog audio information that is output from the video camera 2701 and outputting the same as digital pro-audio information comprising discrete digital data. The audio coding unit 2703 is used for compressively coding the pro-audio information and outputting coded audio information. The video capture unit 2704 is used for inputting analog video information that is output from the video camera 2701 and outputting digital pro-video information comprising discrete digital data and plural pieces of still pictures per unit of time. The video coding unit 2705 is used for inputting pro-video information that is output from the video capture unit 2704 and compressively coding to output coded video information.

An operation of capturing and coding video and audio in real time in the prior art video and audio coding apparatus constructed above is described hereinafter.

The video camera 2701 captures video and audio information and divides it into analog audio information and analog video information, to be output.

The analog audio information is input to the audio capture unit 2702, which performs analog-to-digital conversion to produce digital pro-audio information, which is output to the audio coding unit 2703. The analog video information is input to the video capture unit 2704, which performs analog-to-digital conversion to produce digital pro-video information comprising plural still pictures, which is output to the video coding unit 2705.

The audio coding unit 2703 performs coding to pro-audio information and outputs coded audio information. The video coding unit 2705 performs coding to the pro-video information and outputs coded video information.

While video and audio are being captured, digitization and coding are performed by the audio capture unit 2702, the audio coding unit 2703, the video capture unit 2104, and the video coding unit 2705. On completion of capturing video and audio, digitization and coding are completed.

As shown in the prior art examples A to C, in the video coding apparatus, the audio coding apparatus, and the video and audio coding apparatus according to the prior art, video, audio, or video and audio are captured and coded in real time, and coded video data, coded audio data, or coded video data and coded audio data are output, to be recorded or transmitted.

A. Problem of Prior Art Video Coding

However, to implement the video coding apparatus which can perform real-time processing shown in prior art A in a general purpose computer system such as a personal computer (PC) as the one which executes software for coding, since the software may be executed in hardware with various performance in various environments (peripheral equipment or network environment), the following problems occur.

For example, in case of performing real-time processing to captured input video and coding according to MPEG1 standard in (320×240) resolution as a implementation of the real-time video coding apparatus as application soft which operates on PC, suppose that repetition of "IBBPBB" is selected, the "I", the "P" and "B" representing intra-frame coding and inter-frame coding as coding types, respectively.

If the software processing is performed in relatively high performance, for example, with CPU operating at operating frequency 166 MHz, assume that 6 frame pictures are processed in 6/30 second according to the coding type "IBBPBB" pattern as described above. In this case, video can be coded in real time in 30 frames/sec.

On the other hand, if the software processing is performed in low performance, for example, with CPU operating at operating frequency 100 MHz, the coding cannot be performed in 6/30 second, resulting in coded data with low frame rate. When the frame rate of the coded result is not higher than 30 (frame/sec), motion of video obtained by regenerating the coded result is not obvious, so that preferable coding cannot be achieved.

In case or executing such software processing as one task on a multi operating system, when another application soft such as a word processor is executed as another task or there is an interrupt, the same goes for a hardware environment with relatively high performance.

In addition, the same coding can be smoothly executed in resolution "320×240". However, in resolution "640×400", processing speed is not sufficient, causing a problem due to reduction of the frame rate.

A case in which hardware performance is degraded has been described. On the other hand, in some cases, high-performance hardware is not made the best use of.

For example, when input video is captured and processing is performed in real time in a hardware with CPU operating at a frequency 166 MHz and coding is performed according to MPEG 1 standard in resolution "320×240" on condition that only "I" of a coding type is used, since a frame picture can be processed in 1/30 sec, video can be coded in real time in 30 frames/sec.

If the software processing is performed in relatively high performance, for example, with control device (processor, CPU) operating at operating frequency 200 MHz, the hardware performance is not made use of, for one frame picture processing of the "I" type can be performed in less than 1/30 sec. Use of a high-performance control device causes cost-up. Therefore such video coding apparatus does not provide excellent cost-performance.

In this case, for example, if coding is performed using "P" or "B" type as well as "I" type, coded data with a high compression ratio of the same picture quality can be obtained. Therefore, a device resource is not made use of by using only the "I" type for producing coded data in a low compression ratio.

The same goes for a case in which a computer resource (allocation of CPU time) is exploited for execution on a multi task operating system beyond expectation or coding is performed in resolution "160×120" that is lower than "320×240".

B. Problem of Prior Art Audio Coding

In the prior art audio coding method according to the first example, audio cab be captured and coded in real time by software processing in a multi media personal computer with a sound board.

However, this is realized, provided that a device with performance which is sufficient for real-time coding is used. The device comprises an LSI adaptively designed for a purpose or a processor with high performance is selected. In a control device (processor) with a low performance, data is recorded as a file in the middle of processing and the recorded data is processed, which requires time several times as long as real time.

When the subsampling coding for use in MPEGAudio is executed in CPU as in a software and audio is input and processed in real time, a hardware environment in which the software is executed, that is, capability or incapability is decided depending on CPU performance. For example, real-time coding cannot be performed on a coding level corresponding to CPU performance.

The audio coding apparatus constructed above is designed to input audio and perform real-time coding at a given rate. In case of general-purpose personal computer or the like, CPU processing capability is degraded by effect of another task due to multi task processing or interruption, so that audio coding cannot be performed according to initialization, which is difficult to handle.

As shown in the second example B-2, in the subsampling coding using psychoacoustic analysis, coded data of high playback quality of picture is obtained by performing bit allocation according to human hearing characteristics.

However, division into many subbands and conversion and comparison of divided signals causes considerable burden. The psychoacoustic analysis yields double processing burden. Therefore, use of the psychoacoustic analysis in a standard personal computer makes it difficult to capture audio and perform processing in real time. As a result, high-performance hardware such as a specified processor or board must he added, or coding must be performed Laking time after recording as a file without performing real-time processing.

C. Problem of Prior Art Video and Audio Coding

As should be appreciated from the foregoing, in the prior art video and audio coding apparatus, pro-audio information (digital audio information), and pro-video information (digital video information) are directly input to corresponding coding units, respectively, to be performed coding therein. Therefore, the audio coding unit and the video coding unit each requires capability of processing the pro-audio information and the pro-video information with reliability according to the MPEG standard, for example. For example, when the audio coding unit inputs audio information (1 sample=1 byte) at a sampling frequency 48 KHzit requires reliable capability of coding audio information of 48 Kbyte per/sec. When the video coding unit inputs video information (320×240, one pixel=2 byte, 30 fps), it requires reliable capability of coding video information of 4.6 Mbyte per/sec.

Therefore, in the past, the audio coding unit and the video coding unit operate independently an use specified hardware with which coding is performed with reliability, thereby coding of video and audio is implemented. It is extremely difficult to realize coding of audio and video as a software program which operates on a multi task operating system using a general-use CPU without using a specified hardware.

This is because each coding unit operates as a task and another task uses some operating time of CPU when another software (resident program in which communication processing is performed) also functions as another task on the multi task operating system, when coding is stopped. Therefore, the coding software cannot always process audio or video fully. As a result, it is not necessarily possible to obtain preferable coded result with no trouble such as discontinuity of audio or video.

Further, there is another problem other than "another task" in processing video and audio. Since video coding and audio coding are always processed as separate tasks on the multi task operating system, they affect each other, thereby video becomes nonuniform and still pictures constituting video information change every moment. It is extremely difficult to perform coding (compression) to one part of a series of video and it may take much time to perform coding to the same. In this case, if another software is not operating at all on the operating system, the video coding unit uses considerable CPU time and processing in the audio coding unit is delayed, thereby only coded result with audio discontinuity is obtained.

There is still another problem. In the video and audio coding apparatus comprising a software in execution on a general-purpose computer, as in the case of A or B, there's a possibility that the software is executed on a computer system with various hardware capability. Therefore, apart from the problem that computer capability allocated to coding is reduced for one period irrespective of average capability of coding audio and video, there's a possibility that video and audio cannot be performed at initial value in software design if the hardware does not have sufficient computing capability. In this case, if the computing capability which is consumed in video coding is not reduced quickly so as to conform to the operating system, preferable coded result cannot be obtained, causing audio discontinuity in playback.

Off course, some coded results of video coding may have defects due to effect of audio coding. However, in general, amount of video data is more than that of audio data in a fixed time period and lack of audio data affects playback more significantly rather than that of video data, so that the problem in audio coding is more important. Therefore, audio discontinuity must be avoided.

As shown in A to C, when video, audio or video and audio is are captured and coded in real time by executing a coding software on a general-purpose computer such as a personal computer, the problems are as follows.

(1) Performance of hardware in which the software is executed is important. Preferable coded result cannot be obtained in a low hardware performance and an apparatus resource may not be made use of in a high hardware performance.
(2) When the software is executed on the multi task operating system, another task affects a task being performed by a coding unit. The share of another task in the apparatus resource affects coding virtually as in the case (1) of high/low hardware performance.
(3) In case of processing video and audio, video coding and audio coding affects each other as another task.

SUMMARY OF THE INVENTION

Accordingly, it is an object of the present invention to provide a video coding method wherein video is captured and coded in real time, in which coding parameters including resolution or a coding type are properly set and an apparatus resource is utilized in accordance with a basic capability of a computer that executes the coding method, thereby preferable coded result can be obtained.

It is another object of the present invention to provide an audio coding method wherein audio is captured and coded in real time, in which coding is controlled and the apparatus resource is utilized in accordance with a basic capability of the computer that executes the coding method, thereby preferable coded result can be obtained.

It is still another object of the present invention to provide an audio coding method wherein audio is captured and coded in real time, in which coding is controlled and the apparatus resource is utilized in accordance with capability of the computer at that point of time that executes the coding method, thereby preferable coded result can be obtained.

It is a further object of the present invention to provide an audio coding method wherein audio is captured and coded in real time, in which alternative processing of psychoacoustic analysis is executed and the apparatus resource is utilized in accordance with a basic capability of the computer that executes the coding method, thereby preferable coded result can be obtained.

It is a still further object of the present invention to provide a video and audio coding method wherein video and audio are captured and coded in real time, in which video coding is controlled and the apparatus resource is utilized in accordance with a basic capability of the computer that executes the coding method, thereby preferable coded result with no audio discontinuity can be obtained.

It is a still further object of the present invention to provide a video and audio coding method wherein video and audio are captured and coded in real time, in which video coding is controlled and the apparatus resource is utilized in accordance with capability of the computer at that point of time that executes the coding method, thereby preferable coded result with no audio discontinuity can be obtained.

It is another object of the present invention to provide the video coding apparatus, the audio coding apparatus, and the video and audio coding apparatus which execute the video coding method, the audio coding method, and the video and audio coding method.

It is still another object of the present invention to provide a recording medium which records a video coding program, an audio coding program, and a video and audio coding program in which the video coding method, the audio coding method, and the video and audio coding method can be realized.

The present invention is directed to video, audio or video and audio coding in which processing capability of the coding apparatus which executes the coding is obtained as an indicator value and processing condition of the coding is set or the coding is controlled based on the indicator value.

Other objects and advantages of the invention will become apparent from the detailed description that follows.

The detailed description and specific embodiments described are provided only for illustration, since various additions and modifications within the spirit and scope of the invention will be apparent to those skilled in the art from the detailed description.

According to a fist aspect of the present invention, a method of coding video comprising the steps of: coding one or a plurality of still picture information of pro-video information consisting of the plurality of still picture information in which video is digitized according to coding parameters; and deciding one or more coding parameters based on one Or more of resolution of the pro-video information, frame rate required for reproducing coded data resulting from coding, processing performance indicating processing capability of the coding apparatus which performs the video coding step, and one or a plurality of coding parameters which affects amount of processing of coding in the video coding step.

According to a second aspect of the present invention, the method of coding video of the first aspect further comprising the steps of deciding processing capability of the apparatus which executes the video coding step and outputting a decision result.

According to a third aspect of the present invention, the method of coding video of the first aspect wherein the coding parameters includes one or more of resolution in coding to the pro-video information, a coding type indicating intra-frame coding or predictive coding, and a detection range for detecting motion vector used in the predictive coding.

According to a fourth aspect of the present invention, the method of coding video of the first aspect wherein in the processing capability decision step, decision is performed on the basis of a kind of a control unit included in the video coding apparatus.

According to a fifth aspect of the present invention, the method of coding video of the second aspect wherein in the processing capability decision step, decision is performed on the basis of required time of coding in the coding step.

According to a sixth aspect of the present invention, the method of coding video wherein the processing capability decision step further comprising: a video buffering step in which the input pro-video information is temporarily stored with a series of still picture information constituting the pro-video information sequentially preserved and read in the coding step, thereby the coded still picture information is sequentially abandoned; and a frame rate control step in which preservation of the series of still picture information in the video buffering step is controlled so as to perform at a prescribed frame rate decided on the basis of the given frame rate; the decision being performed on the basis of amount of stored pro-video information temporarily stored in the video buffering step.

According to a seventh aspect of the present invention, an audio coding method wherein audio is coded by subsample coding method, said audio coding method executing the steps of: storing a set frequency fs as a value used for coding processing and a conversion constant n; inputting audio as a coding object; forming sampled audio data using a sampling frequency determined on the basis of the stored set frequency fs; on the assumption that a number of sampled audio data obtained with the set frequency fs as a sampling frequency is m and a number of data determined based on the conversion constant is m', outputting converted audio data which consists of m pieces of audio data and contains m' pieces of sampled audio data; subsampling the converted audio data to obtain M subband signals; allocating coding bits to some of the subband signals which are less than a limit frequency fs/2n obtained from the stored set frequency fs and the conversion constant n; performing quantization according to the allocated coding bits; outputting the quantized data as coded data; and recording the coded data to be output.

According to an eighth aspect of the present invention, the audio coding method of the seventh aspect including: the input audio sampling step wherein m pieces of sampled audio data are formed by subjecting the input audio to sampling processing with the stored set frequency fs as a sampling frequency; and the audio data converting step wherein plural pieces of sampled audio data are extracted from the m pieces of sampled audio data at intervals of (n−1) pieces of data and (n−1) pieces of audio data are inserted between adjacent pieces of the extracted, sampled audio data to form m pieces of converted audio data.

According to a ninth aspect of the present invention, the audio coding method of the eighth aspect including the audio data converting step wherein the converted audio data is formed comprising contiguous groups of n pieces of the extracted, sampled audio data.

According to a tenth aspect of the present invention, the audio coding method of the seventh aspect wherein, in the input audio sampling step, using the sampling frequency fs/n obtained according to the stored set frequency fs and the conversion constant n as a sampling frequency, m/n pieces of sampled audio data are formed by subjecting the input audio to sampling processing, and in the audio data conversion step, (n−1) pieces of audio data are inserted between adjoining pieces of the sampled audio data to convert the sampled audio data into m pieces of converted audio data.

According to an eleventh aspect of the present invention, the audio coding method of the tenth aspect wherein, in the audio data conversation step, the converted audio data comprising contiguous groups of n pieces of sampled audio data is formed based on the m/n pieces of sampled audio data.

According to a twelfth aspect of the present invention, the audio coding method of the seventh aspect further executing the steps of: temporarily storing the sampled audio data in an input buffer; and checking the amount of data within the input buffer to make a comparison between the amount of data and a predetermined value, and based on the result of the comparison, changing the value of the conversion constant n stored in the register; wherein, in the input audio sampling step, the sampled audio data is written into the input buffer, and in the audio data conversion step, sampled audio data is read from the input buffer and subjected to the above-described conversion processing.

According to a 13th aspect of the present invention, the audio coding method of the seventh aspect includes executing the coded data supervising step wherein the amount of the coded data output per unit time in the coding step is checked and compared with a predetermined value, and based on the result of the comparison, the value of the conversion constant n stored in the register is changed.

According to a 14th aspect of the present invention, a method of coding audio in which audio is coded using subsampling coding comprising the steps of: storing a control constant used in the coding; subsampling input audio and outputting sampled data; subsampling sampled data obtained in the sampling step and outputting sub band signal data; allocating coding bits to the sub band signal data obtained in the subsampling step; quantizing the sub band signal data according to the coding bit allocation and outputting quantized value; outputting coded data as a coding step on the basis of the quantized value obtained in the quantizing step; and controlling data processing in the subsampling step, the coding bit allocation step, the quantizing step, and the coding step.

According to a 15th aspect of the present invention, the method of coding audio of the 14th aspect wherein, the control constant storing step includes storing an unit period constant K in an unit period decision constant as the control constant and the coding control step including: on assumption that the number of sampled data to which one subsampling is performed in the subsampling step is p, and time corresponding to p pieces of sampled data is an unit period, for each p pieces of sampled data, deciding whether corresponding unit period is a coding period or not on the basis of the stored unit period decision constant; when it is decided that the unit period is the coding period, performing control so that sampled data in the unit period is output to the subsampling step; and when it is decided that the unit period is not the coding period, performing control so that the stored fixed coded data is output as coded data in the coding step.

According to a 16th aspect of the present invention, the method of coding audio of the 15th aspect wherein in the decision control stop, on assumption that i-th unit period is ti, when i=n×k+1 (k: unit period decision constant, n: arbitrary integer), it is decided that the unit period ti is the coding period.

According to a 17th aspect of the present invention, the method of coding audio of the 14th aspect wherein the control constant storing step includes storing an operation decision constant q in an operation decision constant register as the control constant and, the coding control step includes an operation stopping step in which the operation in the subsampling step is controlled so as to stop in the middle.

According to an 18th aspect of the present invention the method of coding audio of the 17th aspect wherein the operation stopping step includes performing control so that the operation of a basic low-pass filter in the subsampling stop is stopped in the middle at both end step of the filter.

According to a 19th aspect of the present invention, the method of coding audio of the 14th aspect wherein the control constant storing step includes storing a subband selecting constant r in a subband selecting register as the control constant and the coding control step includes a subband reducing step in which the coding bit allocation step and the quantizing step are performed only to data selected on the basis of the stored subband selecting constant r among subband signal data output in the subsampling step.

According to a 20th aspect of the present invention, the method of coding audio of the 19th aspect wherein the subband reducing step includes selecting subband signal data skipping r pieces of subband signal data (r: subband selecting constant) among output M pieces of subband signal data obtained in the subsampling step.

According to a 21th aspect of the present invention, the method of coding audio of the 14th aspect further comprising a processing status supervising step in which status of data processing in audio coding is obtained and a value of the stored control constant is changed according to the obtained status.

According to a 22th aspect of the present invention,the method of coding audio of the 21th aspect wherein the processing status supervising step includes an audio buffering step in which sampled data is temporarily stored in an input buffer and an input supervising step in which amount of data held in the input buffer is compared with a preset value and the control constant is changed on the basis of the comparison result.

According to a 23th aspect of the present invention, the method of coding audio of 21th aspect wherein the processing status supervising step includes a coding supervising step in which amount of the coded data output per unit of time in the coding step is compared with a preset value and the value of control constant is changed on the basis of the comparison result.

According to a 24th aspect of the present invention, an audio coding method in which coding is performed to pro-audio information that is obtained by digitizing audio, using a subsampling coding method, comprising: a step for performing sampling to input audio to output sampled data; a step for performing subsampling to the sampled data to output subband signal data; a step for allocating coding bits to the subband signal data; a step for controlling the bit allocation at the coding bit allocation step by an alternative psychoacoustic analysis control system; a step for quantizing the subband signal data according to the coding bit allocation to output quantized values; and a step for outputting coded data on the basis of the quantized values.

According to a 25th aspect of the present invention,the audio coding method of the 24th aspect, wherein the bit allocation control step comprises a sequential bit allocation step of performing the coding bit allocation to the subband signal data, according to the order of bit allocation that has been previously specified by the alternative psychoacoustic analysis control system.

According to a 26th aspect of the present invention, the audio coding method of the 24th aspect, wherein the bit allocation control step comprises a subband output adaptive bit allocation step of performing the coding bit allocation to the subband signal data, based on the weighting to each subband predetermined using the psychoacoustic analysis alternative control method and output level of each subband signal data.

According to a 27th aspect of the present invention, the audio coding method of the 24th aspect, wherein the bit allocation control step comprises an improved subband output adaptive bit allocation step of performing the coding bit allocation to the subband signal data, according to weight of the subbands that has been previously specified by the alternative psychoacoustic analysis control system, weight corresponding to the bit allocation numbers of the respective subbands, and the output levels of the respective subband signal data.

According to a 28th aspect of the present invention, the audio coding method of the 24th aspect, wherein the bit allocation control step comprises a minimum audible limit comparing step of comparing the subband signal data with the minimum audible limit, and controlling so that no bit allocation is performed to the subbands not reaching the minimum audible limit, and the bit allocation is increased to the other subbands.

According to a 29th aspect of the present invention, a method for coding video and audio information wherein a part or all of coding processes thereof share a common computer resource, comprising the steps of: buffering pro-audio signals temporarily when video and audio information is processed into pro-video signals composed of plural still picture information representing still picture taken per a unit time and pro-audio signals representing audio information; coding said buffered pro-audio signals which are read out, before outputting coded audio information; evaluating the processing performance of said video and audio information coding using a coding-load criterion information indicating how much load of coding video information is; controlling below-described pro-video signal coding based on the results of said processing performance evaluating step; coding pro-video signals composed of still pictures according to said controlling step; and outputting coded video information.

According to a 30th aspect of the present invention, a method for coding video and audio information according to the 29th aspect wherein: the coding load evaluating step includes the steps of obtaining coding-load evaluation information based on the total size of pro-audio signals stacked in said pro-audio signals buffering step and said coding-load criterion information when said pro-video signals composed of plural still picture information are output, comparing said coding-load evaluation information with a predetermined limit of a coding load, outputting said pro-video signals into said pro-video signals coding step when said coding-load evaluation information reaches said limit of a coding load or abandoning said pro-video signals when said coding-load evaluation information does not reach said limit of a coding load.

According to a 31th aspect of the present invention, a method for coding video and audio information according to the 29th aspect wherein: performed are the steps of, when analog video information is input and video resolution information is output, converting said analog video information to pro-video information composed of plural discrete digital pixel signals and comprising plural still picture information with resolution according to the video resolution information, and outputting said pro-video information to be processed in the video coding step, the coding load evaluation step including obtaining a coding-load evaluation information based on the total size of pro-sudio signals stacked in said pro-audio signal buffering step and a coding load criterion information indicating how much load of coding video information including obtaining a picture resolution information indicating the resolution of pictures for coding video information and outputting said picture resolution information, and the video coding step including coding said pro-video signals according to said picture resolution when taking said picture resolution information and outputting coded video information.

According to a 32th aspect of the present invention, a method for coding video and audio information according to the 29th aspect wherein: said processing performance evaluating step just outputs a coding-load evaluation information into said pro-video signal coding step in which codes said pro-video signals to as much extent as a size calculated using said coding-load evaluation information and outputs coded video information.

According to a 33th aspect of the present invention, a method for coding video and audio information according to the 29th aspect wherein: the steps of reading out pro-audio signals stacked in said pro-audio signal buffering step, calculating the total size of said pro-audio signals which is output as a processed audio signal size, coding said pro-audio signals and outputting coded audio information, are in place of said pro-audio signal buffering step and said buffered pro-audio signal coding step; and the steps of obtaining a pro-audio signal input size based on an elapsed time and the size of said pro-audio signals input per a unit time, obtaining a predictive audio signal buffer size which is a difference between said pro-audio signal input size and said processed audio signal size and obtaining said coding-load evaluation information using said predictive audio signal buffer size, are in place of said processing performance evaluating step and said pro-video signal coding controlling step.

According to a 34th aspect of the present invention, a method for coding video and audio information according to the 29th aspect wherein: the steps of obtaining a pro-audio signal input size based on an elapsed time and the size of said pro-audio signal input per a unit time when said pro-video signals are input, obtaining a processed audio signal size based on the total size of coded audio information output by said buffered pro-audio signal coding step, obtaining a predictive audio signal buffer size which is a difference between said pro-audio signal input size and said processed audio signal size and obtaining said coding-load evaluation information using said predictive audio signal buffer size.

According to a 35th aspect of the present invention, the method for coding video and audio information of the 29th aspect wherein, variations of the decision result in the coding load evaluating step are supervised and the coding load criterion information is set in accordance with the variations.

According to a 36th aspect of the present invention, a video coding apparatus for coding video comprising: a video coding means for coding one or a plurality of still picture information of pro-video information consisting of plural still picture information in which video is digitized; a coding parameter decision means for deciding coding parameters which decides amount of processing of the coding means on the basis of a given frame rate on assumption that one or more resolution is a coding parameter and one or more coding types of coding types including intra-frame coding, forward-predictive coding, backward-predictive coding, and bidirectional-predictive coding are another coding parameters.

According to a 37th aspect of the present invention, an audio coding apparatus for coding audio using subsampling coding comprising: a register for storing set frequency fs and conversion constant n used in coding; an audio input means for inputting audio to be coded; an input audio sampling means for producing sampled audio data using sampling frequency decided on the basis of the stored set frequency fs; an audio data conversion means for outputting converted audio data, on assumption that the number of sampled audio data obtained using the set frequency fs as sampling frequency is m and the number determined on the basis of the conversion constant n is m', the converted audio data consisting of m pieces of audio data including m' pieces of sampled audio data, and said audio coding apparatus comprising: a subsampling means for obtaining M subband signals by subsampling the converted audio data; a coding bit allocation means for allocating coding bits only to subband signals with a frequency that is not higher a limited frequency among the subband signals on assumption that frequency fs/2n obtained from the stored set frequency fs and conversion constant n is limited frequency; a quantization means for performing quantization on the basis of the allocated coding bits; a coding means for outputting the quantized data as coded data; and a coded data recording means for recording the output coded data.

According to a 38th aspect of the present invention, an audio coding apparatus for coding audio using subsampling coding comprising: a control constant storing means for storing a control constant used in the coding; a sampling means for sampling input audio and outputting sampled data; a subsampling means for subsampling to sampled data obtained by the sampling means and outputting subband signal data; a coding bit allocation means for allocating coding bits to subband signal data obtained by the subsampling means; a quantization means for quantizing the subband signal data according to allocation of the coding bits and outputting quantized value; a coding means for outputting coded data on the basis of quantized value obtained by the quantization means; and a coding control means for controlling data processing in the subsampling means, the coding bit allocation means the quantization means, and the coding means.

According to a 39th aspect of the present invention, an audio coding apparatus for coding audio using subsampling coding comprising: a sampling means for sampling input audio and outputting sampled data; a subsampling means for subsampling to sampled data obtained by the sampling means and outputting subband signal data; a coding bit allocation means for allocating coding bits to subband signal data obtained by the subsampling means; a bit allocation control means for controlling allocation in the coding bit allocation means using psychoacoustic analysis alternative control method; a quantization means for quantizing the subband signal data according to allocation of the coding bits and outputting quantized value; and a coding means for outputting coded data on the basis of quantized value obtained by the quantization means.

According to a 40th aspect of the present invention, a video and audio coding apparatus which codes video and audio using a common computer resource in a part of processing or in entire processing, said apparatus comprising: an audio buffering means for temporarily storing pro-audio information on input of video and audio information consisting of pro-video information consisting of a plurality of still picture information representing still picture per unit of time and pro-audio information representing audio; an audio coding means for reading pro-audio information stored in the audio buffering means, coding the read pro-audio information, and outputting coded audio information; a coding load evaluation means for deciding processing capability of the video and audio coding apparatus using coding load criterion information representing degree of load and controlling output of the pro-video information to a video coding means; and a video coding means for coding still picture information and outputting coded video information according to control of the coding load evaluation means upon input of still picture information constituting the pro-video information.

According to a 41th aspect of the present invention, a recording medium for recording a video coding program which codes video, said recording medium is used for recording a coding program which executes a step of coding one or a plurality of still picture information of pro-video information consisting of the plurality of still picture information in which video is digitized according to coding parameters; and a step of deciding coding parameters which decides amount of processing of the coding means on the basis of a given frame rate on assumption that one or more resolution is a coding parameter and one or more coding types of coding types including intra-frame coding, forward-predictive coding, backward-predictive coding, and bidirectional-predictive coding are another coding parameters.

According to a 43th aspect of the present invention, a recording medium for recording an audio coding program which codes audio using subsampling method, said recording medium is used for recording a coding program which executes a storing step for storing set frequency fs and conversion constant n used in coding; an audio input step for inputting audio to be coded; an input audio sampling step for producing sampled audio data using sampling frequency decided on the basis of the stored set frequency fs; an audio data conversion step for outputting converted audio data, on assumption that the number of sampled audio data obtained using the set frequency fs as sampling frequency is m and the number determined on the basis of the conversion constant n is m', the converted audio data consisting of m pieces of audio data including m' pieces of sampled audio data, and said audio coding apparatus comprising: a subsampling step for obtaining M subband signals by subsampling the converted audio data; a coding bit allocation step for allocating coding bits only to subband signals with a frequency that is not higher a limited frequency among the subband signals on assumption that frequency fs/2n obtained from the stored set frequency fs and conversion constant n is limited frequency; a quantizing step for performing quantization on the basis of the allocated coding bits; a coding step for outputting the quantized data as coded data; and a coded data recording step for recording the output coded data.

According to a 43th aspect of the present invention, a recording medium for recording an audio coding program which codes audio using subsampling method, said recording medium is used for recording a coding program which executes a step for storing a control constant used in the coding; a step for sampling input audio and outputting sampled data; a step for subsampling sampled data obtained in the sampling step and outputting subband signal data; a step for allocating coding bits to the subband signal data obtained in the subsampling step; a step for quantizing the subband signal data according to the coding bit allocation and outputting quantized value; a step for outputting coded data as a coding step on the basis of the quantized value obtained in the quantizing step; and a a step for controlling data processing in the subsampling step, the coding bit allocation step, the quantizing step, and the coding step.

According to a 44th aspect of the present invention, a recording medium for recording an audio coding program which codes audio using subsampling method, said recording medium is used for recording a coding program which executes a sampling step for sampling input audio and outputting sampled data; a subsampling step for subsampling to sampled data obtained in the sampling step and outputting subband signal data; a coding bit allocation step for allocating coding bits to subband signal data obtained in the subsampling step; a bit allocation control means for controlling allocation in the coding bit allocation step using psychoacoustic analysis alternative control method; a quantizing step for quantizing the subband signal data according to allocation of the coding bits and outputting quantized value; and a coding step for outputting coded data on the basis of quantized value obtained in the quantization step.

According to a 45th aspect of the present invention, a recording medium for recording a video and audio coding program which executes coding of video and audio using a common computer resource in a part of processing or in entire processing, said recording medium is used for recording a coding program which executes an audio buffering step for temporarily storing pro-audio information upon input of video and audio information consisting of pro-video information consisting of a plurality of still picture information representing still picture per unit of time and pro-audio information representing audio; an audio coding step for reading pro-audio information stored in the audio buffering means, coding the read pro-audio information, and outputting coded audio information; a coding load evaluation step for deciding processing capability of the video and audio coding apparatus using coding load criterion information representing degree of load and controlling output of the pro-video information to a video coding means; and a video coding step for coding still picture information and outputting coded video information according to control of the coding load evaluation means upon input of still picture information constituting the pro-video information.

DESCRIPTION OF THE DRAWINGS

FIG. 6 is a block diagram illustrating a structure of a video coding apparatus according to an embodiment 3 of the present invention.

FIGS. 7(a) and (b) are state transition diagrams illustrating a state transition in a coding pattern decision means of the video coding apparatus according to the embodiment 3.

FIGS. 9(a) and 9(b) are state transition diagrams representing a state transition in the coding pattern decision means of the video coding apparatus according to the embodiment 4.

DETAILED DESCRIPTION OF THE PREFERRED EMBODIMENTS

Embodiment 1

In a video coding method according to a first embodiment of the present invention, a parameter is decided among plural coding parameters and the other parameters are decided based on a set frame rate and the decided parameter.

Figure 1:
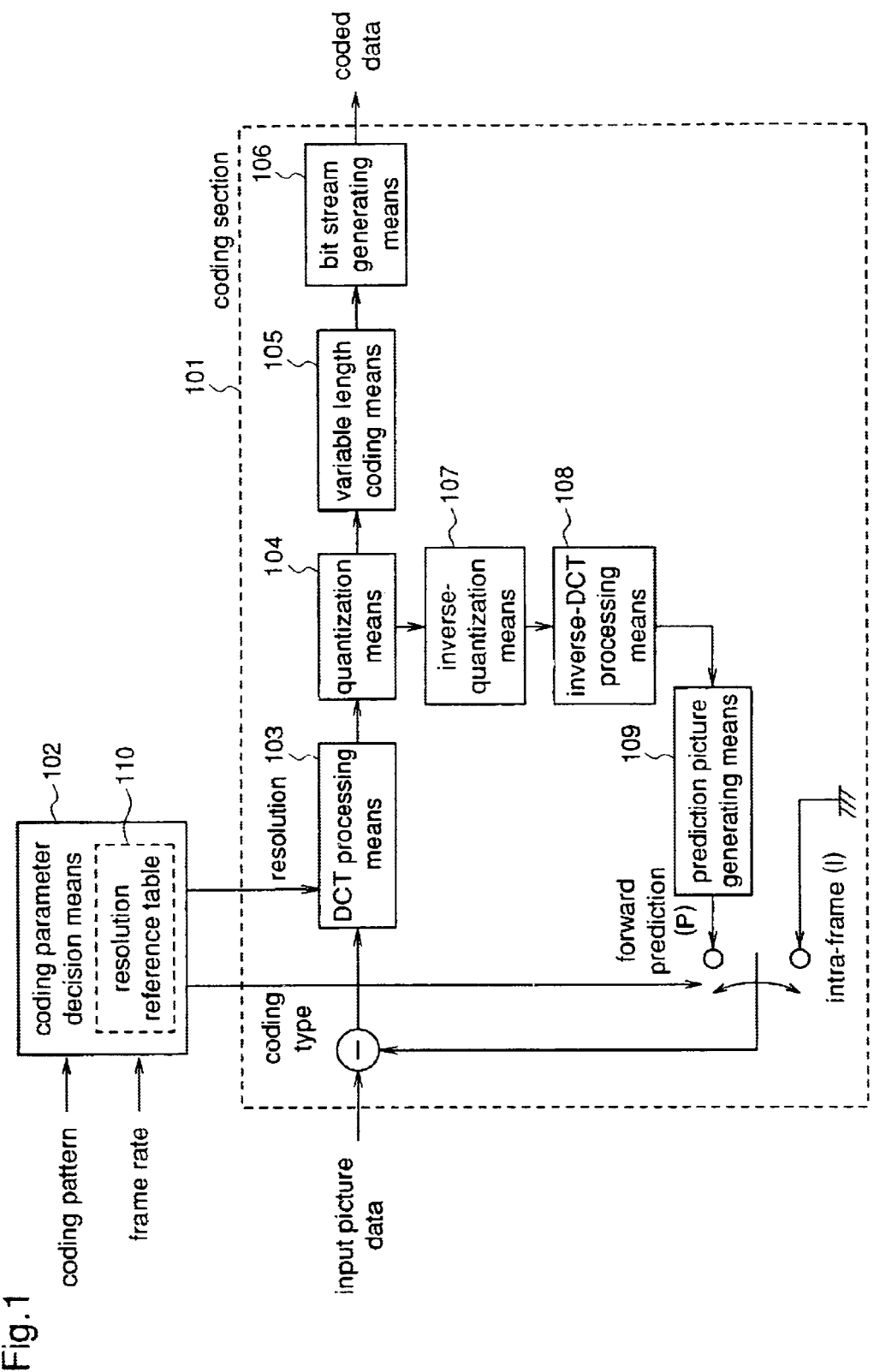
FIG. 1 is a block diagram illustrating a structure of a video coding apparatus according to an embodiment 1 of the present invention.

FIG. 1 is a block diagram illustrating a structure of a video coding apparatus according to a first embodiment of the present invention. As shown in FIG. 1, the video coding apparatus according to the first embodiment comprises a coding section 1 and a coding parameter decision means 102. The coding section 101 includes a DCT processing means 103, a quantization means 104, avariable length coding means 105, a bit stream generating means 106, an inverse-quantization means 107, an inverse DCT processing means 108, and a predictive video generation means 109. The coding parameter decision means 102 includes a resolution reference table 110. The coding section 101 includes a DCT processing means 103, a quantization means 104, a variable length coding means 105, a bit stream generating means 106, an inverse-quantization means 107, an inverse DCT processing means 108, and a predictive video generation means 109. The coding parameter decision means 102 includes a resolution reference table 110.

The coding section 101 is used for inputting video data in which video is digitized and which comprises a series of still pictures as input picture data and for performing coding according to the set coding parameters to output coded data. Individual still picture data constituting input picture data is referred to as a frame picture. The coding parameters are given by the coding parameter decision unit 102 mentioned later and comprises a parameter indicating a coding type and a parameter indicating a resolution. The parameter indicating a coding type indicates an intra frame coding or forward predictive coding. The coding section 101 is used for performing the intra frame coding or forward predictive coding according to the parameters. The parameter indicating a resolution is input to the DCT processing means 103 and coding is performed in the resolution.

In the coding section 101, the DCT means 103 is used for performing DCT processing to the input picture data and outputting resulting DCT data. The quantization means 104 is used for quantizing the DCT data and outputting quantized data. The variable length coding means 105 is used for performing variable length coding to the quantized data to produce variable length coded data that has been compressively coded. The variable length coded data is input to a bit stream generating means 106, from which coded data is output as a bit stream which can be transmitted and recorded.

The inverse-quantization means 107 is used for performing inverse-quantization processing to the quantized data that is output from the quantization means 104 and outputting the inverse-quantization data. The inverse-DCT means 108 is used for performing inverse-DCT processing to the inverse-quantization data and outputting resulting inverse-DCT data, which is input to the prediction picture generating means 109 and then output as prediction picture data. When inter-frame coding using prediction picture is performed according to coding parameters, difference data between the prediction picture data and input picture data is input to the DCT processing means 103 and forward predictive coding is performed in the coding section 101.

In the video coding apparatus according to the first embodiment, the coding parameter decision means 102 is used for deciding resolution using a resolution reference table 110 included therein on the basis of a specified frame rate and coding pattern and for outputting the coding parameters including the parameter indicating the decided resolution to the coding section 101.

The video coding apparatus according to the first embodiment is realized by executing a video coding program under control of a central processing unit (CPU) in a personal computer (PC) and in execution of coding, the following five conditions occur.

(1) Coding time of intra-frame coding and forward predictive coding is proportional to resolution of a frame picture to be processed.
(2) Processing time of executing forward predictive coding is 6 times as long as that of executing intra-frame coding.
(3) When the CPU of the PC which realizes this apparatus operates at operating frequency 100 MHz and frame picture of (320×240) resolution is coded using the intra-frame coding, processing is performed in 1/24 second.
(4) Processing capability of this apparatus is proportional to operating frequency of the CPU in this apparatus. That is, processing time of coding is proportional to reciprocal of the operating frequency.
(5) The processing capability of the apparatus is proportional to operating frequency of CPU on the apparatus. That is, processing time of coding is proportional to reciprocal to the operating frequency.

Suppose that the operating frequency of the CPU is 100 MHz, the frame rate specified at the beginning of coding is 24 frame/sec, and a coding pattern as combination of coding types comprises PATTERN 1 "II" including only I and PATTERN 2 "IP" repeating "I", and "P" every 2 frames. (Intra-frame coding and forward predictive coding are represented by "I" and "P", respectively).

Figure 2:
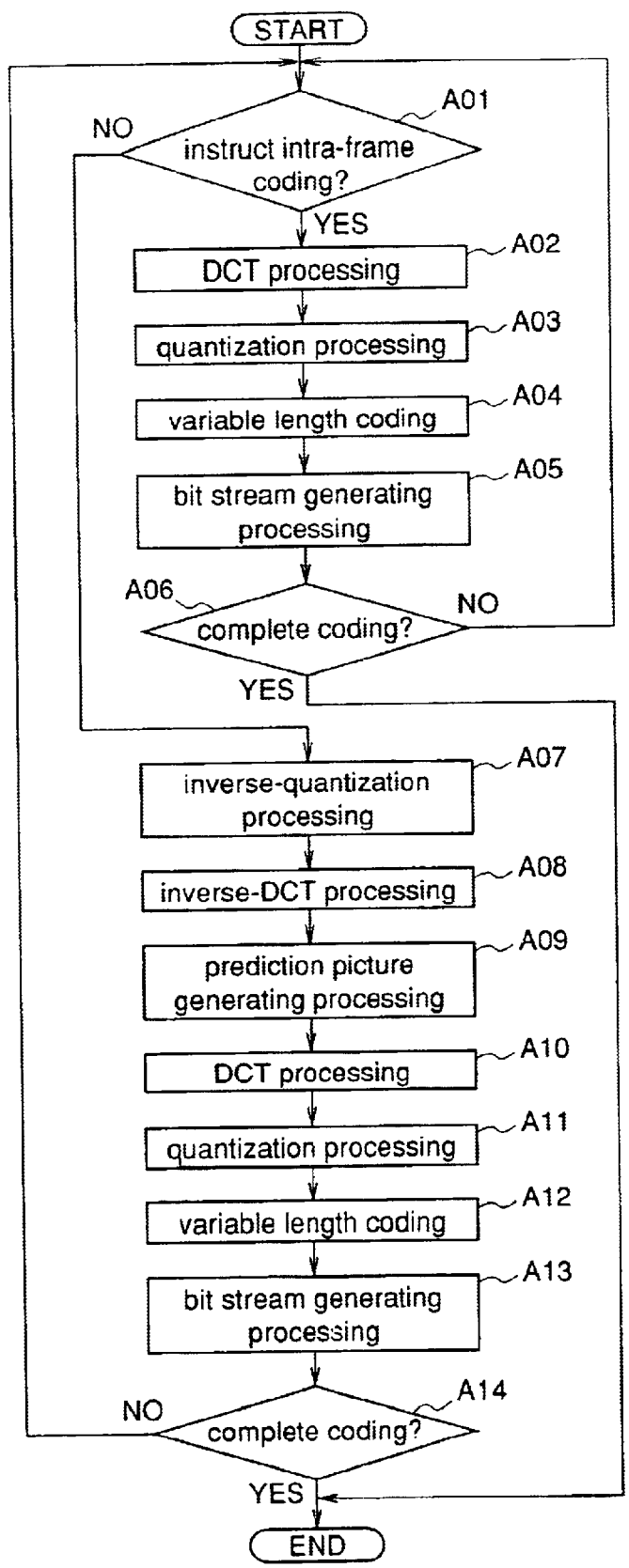
FIG. 2 is a flowchart illustrating a processing procedure in a coding section of the video coding apparatus according to the embodiment 1.

An operation of the video coding apparatus according to the first embodiment constructed above is described hereinafter. Video to be coded is digitized and input to the coding section 101 of the coding apparatus as a series of frame pictures. FIG. 2 is a flowchart illustrating an operation of the coding section 101. An operation of the coding section 101 is described with reference FIG. 2.

Assume that the coding parameter decision means 102 instructs the coding section 101 to perform intra-frame coding to an initial frame picture at the beginning of coding.

In step A01, decision on a coding parameter that is input from the coding parameter decision means 102 is performed. When it is decided that intra-frame coding is instructed, (A) processing in subsequent steps including step A02 is carried out and, when forward predictive coding is instructed, (B) processing in subsequent steps including step A07 is carried out.

A case (A) is described. In step A02, the DCT processing means 103 divides the input frame picture into (8×8 pixels) blocks on the basis of resolution from the coding parameter decision means 102, performs two-dimensional DCT for each divided block an outputs resulting DCT data.

In step A03, the quantization means 104 performs quantization to the DCT data using a predetermined value and outputs quantized data. In step A04, the variable length coding means 105 performs variable length coding to the quantized data and outputs variable length coded data.

In step A05, the bit stream generating means 106 generates a bit stream (coded result) using the variable length coded data which is output from the variable length coding means 105 and the resolution and the coding type which are output from the coding parameter decision means 102, and outputs the bit stream as an output of the video coding apparatus.

In step A06, it is decided whether coding is completed or not. When it is decided that coding is completed, processing terminates and, when it is decided that it is not, processing is returned to the step A01 and the same processing is repeated.

A case (B) is described. In step A07, the inverse-quantization means 107 inversely quantizes the quantized data that has been output to a previous frame picture and outputs inversely-quantized data. In step A08, the inverse DCT processing means 108 performs two-dimensional inverse DCT processing to the inversely-quantized data for each block (8×8 pixels) divided by the DCT processing means 103 and outputs resulting inverse DCT data. In step A09, the prediction picture generating means 109 generates prediction picture on the basis of the inverse DCT data and outputs the same.

Instep A10, the DCT processing means 103 divides the input frame picture and the prediction picture that is output from the prediction picture generating means 109 into (8×8 pixels) blocks, respectively, on the basis of respective resolution, and subtracts the prediction picture data from the input frame picture data to obtain difference data for each divided block. The DCT processing means 103 performs two-dimensional DCT processing to the difference data in each divided block and outputs resulting DCT data.

Subsequent steps A11 to A14 are identical to steps A03 to A06.

Figure 3:
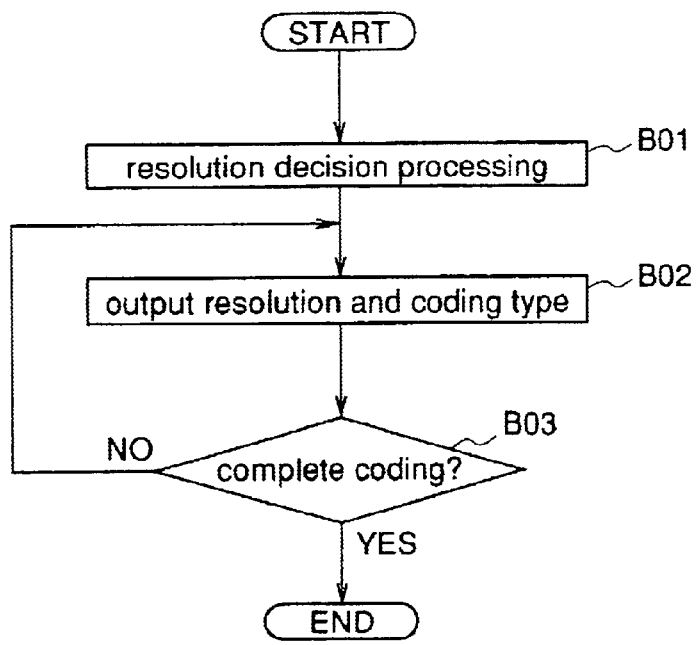
FIG. 3 is a flowchart illustrating a processing procedure in a coding parameter decision means of the video coding apparatus according to the embodiment 1.

Thus, in the coding section 101, it is decided in decision step A01 that steps A02 to A06 or steps A07 to A14 is performed to each input frame picture In steps A02 to A06, intra-frame coding is performed. In steps A07 to A14, forward predictive coding is performed on the basis of the prediction picture using the coded result of the previous frame picture. Switching between them is performed according to input coding parameters in the decision step A01. (TABLE 1) shows a resolution reference table 110 included in the coding parameter decision means 102. FIG. 3 is a flowchart illustrating an operation of the coding parameter decision means 102. An operation of the coding parameter decision means 102 which decides coding parameters and outputs the same to the coding section 101 is described with reference to TABLE 1 and following a flow in FIG. 3.

TABLE 1

| input | | output |
|---|---|---|
| frame rate | coding pattern | resolution |
| 24 | II | 320 × 240 |
| 24 | IP | 160 × 120 |

The resolution reference table 110 in TABLE 1 is created prior to coding. The table is created on the basis of empirical knowledge or using a result of experimental coding or simulation, allowing for conditions mentioned later. In TABLE 1, "input" is represented by set frame rates and specified parameters and "output" is represented by parameters decided in response to input. As shown in the TABLE 1, in this embodiment 1, resolution is decided in accordance with the frame rates and the coding patterns. The frame rate is "24 (frame/sec)" and the coding pattern includes PATTERN 1 "II" and PATTERN 2 "IP", the PATTERN 1 "II" indicating that intra-frame coding (I) is performed to every frame picture and PATTERN 2 "IP" indicating that intra-frame coding (I) and forward predictive coding (P) is repeated every two frames.

The reference table is created allowing for the following conditions. First, the forward prediction coding has more processing than that of the intra-frame coding, since processing of the inverse-quantization means 107, the inverse-DCT processing means 108, and the prediction picture generating means 109 are added thereto. Second, coding the input picture in higher resolution requires more processing than that of coding it in low resolution.

The resolution reference table 110 is created so that coding is carried out using as high resolution as possible, allowing for these conditions and simultaneously realizing the specified frame rate.

In step B01 in FIG. 3, the coding parameter decision means 102 decides resolution of the frame picture in coding and coding pattern (II or IP) based on the specified frame rate 24 frames/sec referring to the resolution reference table 110.

In step B02, the coding parameter decision means 102 outputs the resolution and the coding type (I or P) for the frame picture to be processed, which are decided in step 301 to the coding section 101 so that the specified coding pattern is realized.

Thereafter, in step B03, it is decided that coding is completed or not. When it is decided that coding is completed, processing terminates, while it is decided that it is not, processing is returned to step B02 and the coding parameter is output to the coding section 101 again In this way, coding is carried out by the coding section 101 and the coding parameter decision means 102. TABLE 2 shows a result coded in the video coding apparatus according to the first embodiment.

TABLE 2

| input | | output | coded result |
|---|---|---|---|
| frame rate | coding pattern | resolution | frame rate |
| 24 | II | 320 × 240 | 24 |
| 24 | IP | 160 × 120 | 27.4 |

TABLE 2 shows resolution (decided parameter) decided by the coding apparatus according to the first embodiment 1 and a frame rate (coded result) obtained using the parameter. As a value of coded result in TABLE 2, based on the fact that processing is performed in 24 frames/sec when resolution is "320×240" and the coding pattern is "II", another frame rate is computed. The frame rate in resolution 160×120 in the coding pattern IP is computed to be 27.428 frames/sec, since coding of 2 frame pictures is performed in (1/24+6/24)*4= 0.073 second based on the fact that P processing requires six times as long time as I processing and ¼ resolution, processing is performed in ¼ time.

For comparison, an operation of coding using the prior art video coding apparatus in terms of (TABLE 3).

TABLE 3

| coding condition | | coded result |
|---|---|---|
| coding pattern | resolution | frame rate |
| II | 640 × 480 | 6 |
| II | 320 × 240 | 24 |
| II | 160 × 120 | 96 |
| IP | 640 × 480 | 1.7 |
| IP | 320 × 240 | 6.9 |
| IP | 160 × 120 | 27.4 |

In TABLE 3, computation is performed as in TABLE 2. Based on the fact that processing is performed in 24 frames/sec in resolution 320×240, another frame rate is computed.

In the prior art video coding apparatus, a coding type (pattern) or resolution has been decided, without allowing for the frame rate as the coded result. Therefore, in some cases, it is difficult to set the frame rate to be close to a desired one and setting of an undesired value is only selected. On the other hand, in the video coding apparatus according to the first embodiment, resolution is decided in accordance with the specified coding type (pattern) allowing for the frame rate as the coded result, thereby as shown in contrast between TABLE 2 and TABLE 3, the frame rate which is close to the specified frame rate is realized and simultaneously coding is carried out in higher resolution.

As should be appreciated from the forgoing description, in accordance with the video coding apparatus according to the first embodiment, the apparatus comprises the coding section 101 and the coding parameter decision means 102 including the resolution reference table. The coding parameter decision means 102 decides resolution according to the specified frame rate and coding type and outputs the coding parameters to the coding section 101, which performs coding according to the coding parameters. As a result, it is possible to carry out coding in higher resolution, realizing requirements.

In the video coding apparatus according to the first embodiment, resolution is decided according to the specified coding pattern. Alternatively, the same reference table may be used to decide coding pattern (type) according to the specified resolution. Coded result with a higher compression ratio can be achieved using the desired frame rate and coding pattern.

Embodiment 2

In the video coding method according to a second embodiment of the present invention, coding parameters are decided on the basis of a set frame rate in accordance with processing capability of the coding apparatus. The processing capability is decided on the basis of operating frequency of a control device (CPU).

Figure 4:
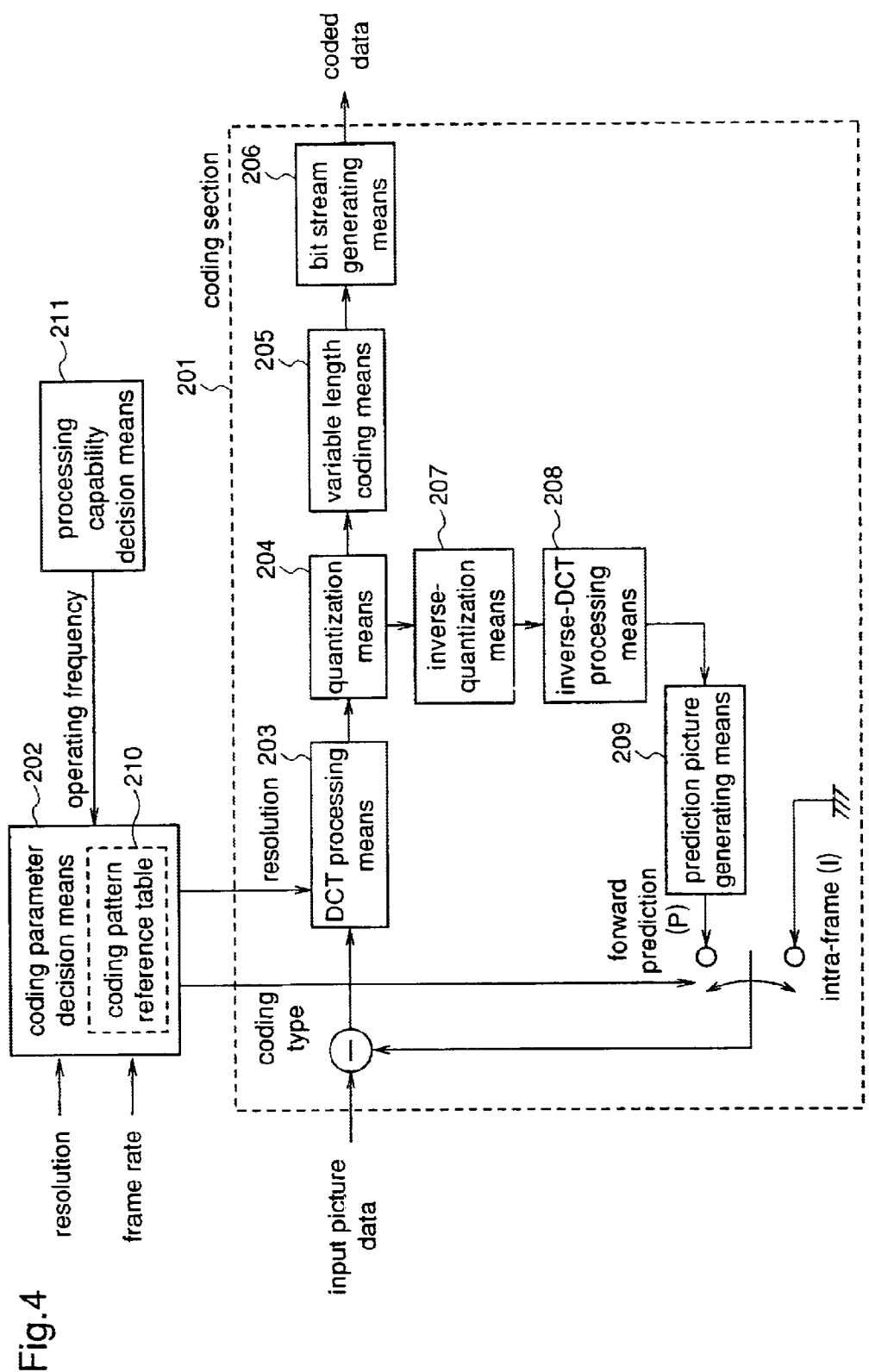
FIG. 4 is a block diagram illustrating a structure of a video coding apparatus according to an embodiment 2 of the present invention.

FIG. 4 is a block diagram illustrating a structure of the video coding apparatus according to the second embodiment of the present invention. As shown in Figure, the video coding apparatus according to the second embodiment comprises a coding section 201, a coding parameter decision means 202, and a processing capability decision means 211, the coding section 201 including a DCT processing means 203, a quantization means 204, a variable length coding means 205, a bit stream generating,means 206, an inverse-quantization means 207, an inverse-DCT processing means 208, and a prediction picture generating means 209 and the coding parameter decision means 202 including a coding pattern reference table 210.

The coding section 201 is identical to the coding section 101 of the video coding apparatus according to the first embodiment. The coding section 201 performs coding to the input frame picture in specified resolution and the specified coding type (intra-frame coding (I)) or forward predictive coding (P)) in accordance with coding parameters which are input from the coding parameter decision means 102.

The coding parameter decision means 202 is used for deciding coding parameters according to a decision result of the processing capability decision means 211 and outputting the coding parameters to the coding section 201. The processing capability decision means 211 is used for deciding coding processing capability of the coding apparatus and outputting the decision result to the coding parameter decision means 202. In this second embodiment, the processing capability decision means 211 is used for outputting "CPU operating frequency" indicating processing capability of the coding apparatus. The coding parameter decision means 202 is used for deciding coding patterns based on the specified frame rate, resolution and the operating frequency as the decision result and posting the coding type to the coding section 201 according to the coding pattern. To decide the coding pattern, the coding parameter decision means 202 uses the coding pattern reference table 210.

Suppose that in the video coding apparatus according to the second embodiment, a coding program is executed in PC and conditions (1) to (5) occur as in the first embodiment.

Also, suppose that the operating frequency of CPU, the frame rate specified at the beginning of coding, and resolution of the input frame picture are 100 MHz or 166 MHz, 24 frames/sec, and 320×240 or 160×120.

An operation of the video coding apparatus constructed above according to the second embodiment is described. Input picture data is input for each frame picture and coded by the coding section 201. The operation of the coding section 201 is identical to that of the coding section 101 shown in the first embodiment.

The processing capability decision means 211 detects the operating frequency of CPU on PC in which the coding apparatus is realized to decide processing capability of the apparatus and posts the decision result to the coding parameter decision means 202. To the coding parameter decision means 202, the decision result indicating 100 MHz or 166 MHz is input. The coding parameter decision means 202 decides coding parameters using the decision result.

Figure 5:
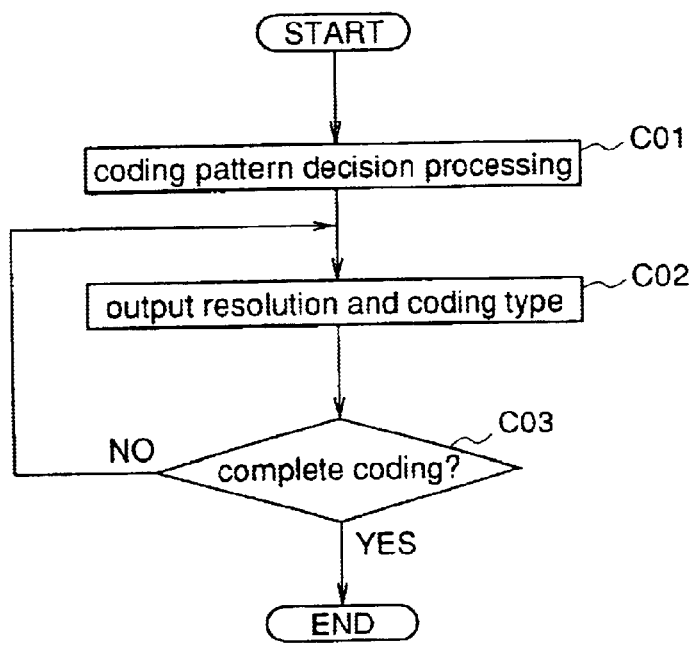
FIG. 5 is a flowchart illustrating a processing procedure in the parameter decision means of the video coding apparatus according to the embodiment 2.

(TABLE 4) shows the coding pattern reference table 210 included in the coding parameter decision means 202. FIG. 5 is a flowchart illustrating an operation of the coding parameter decision means 202. An operation of the coding parameter decision means 202 is described with reference to TABLE 4 and following flow in FIG. 5.

TABLE 4

| input | | | output |
|---|---|---|---|
| frame rate | operating frequency | resolution | coding pattern |
| 24 | 166 | 320 × 240 | IIIIIP |
| 24 | 166 | 160 × 120 | IPPPPP |
| 24 | 100 | 320 × 240 | IIIIII |
| 24 | 100 | 160 × 120 | IPIPIP |

As in the resolution reference table 110 included in the coding parameter decision means 101 in the first embodiment, the coding pattern reference table 210 in TABLE 4 is created prior to coding allowing for conditions mentioned later.

Relation between "input" and "output" in TABLE 4 is the same as in TABLE 1. Coding patterns are decided in accordance with set frame rate and resolution, and the operating frequency as the decision result. A coding pattern "IIIIII" indicates that intra-frame coding (I) is performed to every frame picture. A coding pattern "IPIPIP" indicates that intra-frame coding (I) and forward predictive coding (P) are repeated every two frames. A coding pattern "IIIIIP" indicates that intra-frame coding is performed 5 times and then forward predictive coding is performed once every six frames. A coding pattern "IPPPPP" indicates that intra-frame coding is performed once and then forward predictive coding is performed 5 times every six frames.

As in the resolution reference table setting in the first embodiment, the reference table is created allowing for the following conditions.

First, the forward prediction coding has more processing than that of the intra-frame coding but the former is performed in higher compression ratio than the latter. Second, coding the input picture in high resolution requires more processing than that of coding it in low resolution. Third, the higher the operating frequency of CPU is, the higher the processing capability thereof is and the shorter time it takes to perform coding.

The coding pattern reference table 110 is created so that coding is carried out using as high compression ratio as possible realizing the specified frame rate, allowing for these conditions.

Upon input of the decision result from the processing capability decision means 211, the coding parameter decision means 202 operates following flow in FIG. 5. Instep C01, the coding parameter decision means 202 decides coding pattern for use in execution of coding, referring to the coding pattern reference table 210, on the basis of the specified frame rate (24 frames/sec), resolution (320×240 or 160×120) and the operating frequency (100 MHz or 166 MHz) of the CPU from the processing capability decision means 211.

In step C02, the coding parameter decision means 202 outputs the coding parameters to the coding section 201. The coding parameter decision means 202 outputs the coding type (I or P) so that the coding pattern in decision step C01) is realized and the specified resolution to the coding section 201. In step C03, it is decided that coding is completed or not. When it is decided that the coding is completed, processing terminates. Otherwise, processing is returned to step C02 and the coding parameter is output to the coding section 201 again.

Thus, coding is carried out by the coding section 201, the coding parameter decision means 202, and the processing capability decision means 211. TABLE 5 shows coded result in the video coding apparatus according to the second embodiment.

TABLE 5

| coding condition | | processing capability decision | decision parameter | coded result | |
| --- | --- | --- | --- | --- | --- |
| frame rate | resolution | operating frequency | coding pattern | frame rate | amount of coded data |
| 24 | 320 × 240 | 166 | IIIIP | 21.7 | 0.086 |
| 24 | 160 × 120 | 166 | IPPPPP | 30.8 | 0.031 |
| 24 | 320 × 240 | 100 | IIIII | 24.0 | 0.100 |
| 24 | 160 × 120 | 100 | IPIPIP | 27.4 | 0.058 |

In TABLE 5, specified coding conditions, decision result of processing capability and coding parameters as decision parameters are the same as in TABLE 4, and in each case, frame rate and amount of coded data as coded result are represented therein.

The amount of coded data is represented by amount of coded data corresponding to a frame picture in the coded data, assuming that amount of data of an input frame picture is 1. The less the coded data is, the higher the compression ratio is.

In TABLE 5, as in TABLE 2 of the first embodiment, the frame rate of the coded result is computed as follows. Based on the fact that processing is performed in 24 frames/sec when the operating frequency of the CPU, the coding pattern, and resolution are 100 MHz, "IIIII", and 320×240, respectively, another frame rate is computed. For example, since P processing requires six times as long time as I processing and coding is performed in 100/166 time compared with the case of 100 MHz when the operating frequency of CPU is 166 MHz, for coding of 6 frame pictures, (5/24+6/24)×(100/166)=0.276 second is computed, thereby the frame rate in the coding pattern "IIIIIP" and in resolution 320×240 is computed to be 21. 731 frames/sec. Similarly, amount of coded data in the frame picture is computed based on the fact that 1/10 data and 1/60 data are obtained in I coding and P coding, respectively. For example, in case of "IIIIIP" coding, amount of coded data of one frame picture is 0.086, since amount of coded data of 6 frame pictures is (5/10+1/60)=0.517.

For comparison, TABLE 6 shows coded result of coding using the prior art video coding apparatus.

Similarly in TABLE 6, based on the fact that processing is performed in 24 frames/sec when the operating frequency of the CPU, the coding pattern, and resolution are 100 MHz, "IIIII", and 320×240, respectively, another frame rate is computed. Amount of coded data in the frame picture is computed based on the fact that 1/10 data and 1/60 data are obtained in I coding and P coding, respectively.

TABLE 6

| coding condition | | processing capability decision | coded result | |
| --- | --- | --- | --- | --- |
| resolution | coding pattern | operating frequency | frame rate | amount of coded data |
| 320 × 240 | IIIII | 166 | 39.8 | 0.100 |
| 320 × 240 | IPIPIP | 166 | 21.7 | 0.086 |
| 320 × 240 | IIIIIP | 166 | 11.4 | 0.058 |
| 320 × 240 | IPPPPP | 166 | 7.1 | 0.031 |
| 160 × 120 | IIIII | 166 | 159.4 | 0.100 |
| 160 × 120 | IIIIIP | 166 | 86.9 | 0.086 |
| 160 × 120 | IPIPIP | 166 | 45.5 | 0.058 |
| 160 × 120 | IPPPPP | 166 | 30.9 | 0.031 |
| 320 × 240 | IIIII | 100 | 24.0 | 0.100 |
| 320 × 240 | IIIIIP | 100 | 13.1 | 0.086 |
| 320 × 240 | IPIPIP | 100 | 6.9 | 0.058 |
| 320 × 240 | IPPPPP | 100 | 4.6 | 0.031 |
| 160 × 120 | IIIII | 100 | 96 | 0.100 |
| 160 × 120 | IIIIIP | 100 | 52.4 | 0.086 |
| 160 × 120 | IPIPIP | 100 | 27.4 | 0.058 |
| 160 × 120 | IPPPPP | 100 | 18.6 | 0.031 |

In the prior art video coding apparatus, a coding type (pattern) or resolution has been decided, without allowing for the frame rate as the coded result or variation of hardware capability constituting the coding apparatus. Therefore, in some cases, the frame rate resulting from coding according to this setting becomes an undesired one. On the other hand, in the video coding apparatus according to the second embodiment, the coding type (pattern) is decided in accordance with the specified resolution allowing for the frame rate as the coded result or processing capability of the apparatus, thereby as shown in contrast between TABLE 5 and TABLE 6, the frame rate which is close to the specified frame rate is realized and simultaneously coding is carried out in higher resolution.

An advantage of possibility of handling variations of hardware capability of the coding apparatus is useful in realizing the video coding apparatus by running the video coding program in computers or the like.

As should be appreciated from the forgoing description, in accordance with the video coding apparatus according to the second embodiment, the apparatus comprises the coding section 201, the coding parameter decision means 202 including the coding pattern reference table 210, and the processing capability decision means 211. The coding parameter decision means 202 decides the coding patterns according to the specified frame rate and resolution, and the decision result output from the processing capability decision means 211 and outputs the coding parameters to the coding section 201, which performs coding in accordance with this coding parameters. As a result, it is possible to carry out coding in higher resolution, realizing requirements.

In the video coding apparatus according to the second embodiment, coding pattern is decided according to the specified resolution. Alternatively, the same reference table may be used to decide resolution according to the specified coding pattern (type). Coding is realized in higher resolution using the desired frame rate and coding pattern.

In addition, processing capability is decided on the basis of CPU operating frequency. Alternatively, the processing capability may be decided on the basis of various factors indicating apparatus capability such as ID number, version or manufacturer of CPU or DSP and the like.

Embodiment 3

In a video coding method according to a third embodiment, coding parameters are decided on the basis of the set frame rate in accordance with processing capability of the coding apparatus and processing capability is decided on the basis of required processing time.

FIG. 6 is a block diagram illustrating a video coding apparatus according to a third embodiment of the present invention. As shown in Figure, the video. coding apparatus according to the third embodiment comprises a coding section 301, a coding parameter decision means 302, and a processing capability decision means 311, the coding section 301 including a DCT processing means 303, a quantization means 304, a variable length coding means 305, a bit stream generating means 306, an inverse-quantization means 307, an inverse-DCT processing means 308, and a prediction picture generating means 309 and the coding parameter decision means 302 including a coding pattern decision means 310.

The coding section 301 is identical to the coding section 101 of the video coding apparatus according to the first embodiment. The coding section 301 performs coding to the input frame picture in specified resolution and the specified coding type (intra-frame coding (I)) or forward predictive coding (P)) in accordance with coding parameters which are input from the coding parameter decision means 302.

The coding parameter decision means 302 is used for deciding coding parameters according to a decision result of the processing capability decision means 311 and using the coding pattern decision means 310 and outputting the coding parameters to the coding section 301 The processing capability decision means 311 is used for deciding coding processing capability of the coding apparatus and outputting the decision result to the coding parameter decision means 302. In this embodiment 3, the processing capability decision means 311 is used for outputting an average frame rate in coding as decision result. The coding parameter decision means 302 is used for deciding coding patterns based on the specified frame rate and resolution, and the average frame rate, and outputting the coding type to the coding section 301 according to the coding pattern. To decide the coding pattern, the coding parameter decision means 302 uses the coding pattern decision means 310.

Suppose that in the video coding apparatus according to the third embodiment, a coding program is executed in PC and conditions (1) to (5) occurs as in the first embodiment.

Also, suppose that the operating frequency of CPU on this apparatus, the frame rate specified at the beginning of coding, and resolution of the input frame picture are 100 MHz, 8 frames/sec, and 320×240, respectively.

An operation of the video coding apparatus constructed above according to the third embodiment is described. Input picture data is input for each frame picture and coded by the coding section 301. The operation of the coding section 301 is identical to that of the coding section 101 shown in the first embodiment.

The processing capability decision means 311 for deciding processing capability of the apparatus measures time required for processing all previous frame pictures including 4 frame pictures every 4 frame pictures in the coding section 301, computes the average frame rate of coding before that point of time based on the measured required time and the processing number of frame pictures, and posts the average frame rate to the coding parameter decision means 302. The processing capability decision means posts required frame rate "8 frames/sec" to the coding parameter decision means as initialization of the average frame rate.

The coding parameter decision means 302 decides coding parameters using the posted average frame rate.

An operation of the coding pattern decision means 310 is described hereinafter. The coding pattern decision means 310 assumes several limited states and operates as a finite state machine which transitions between assumed states. FIG. 7(a) is a state transition diagram illustrating transition of state in the coding pattern decision means 310 as the infinite state machine and FIG. 7(b) is a diagram illustrating state transition condition. The coding pattern decision means 310 assumes 4 states (S0 to S3) and in respective states, outputs the coding pattern in TABLE 7.

TABLE 7

| state | coding pattern |
|-------|----------------|
| S0    | IIII           |
| S1    | IIIP           |
| S2    | IPIP           |
| S3    | IPPP           |

In the coding pattern in TABLE 7, "IIII" indicates that intra-frame coding (I) is performed to four frames to he processed, "IIIP" indicates that intra-frame coding (I) is performed to first 3 frame pictures and forward predictive coding (P) is performed to the last one, "IPIP" indicates that intra-frame coding is performed to the first and third frame pictures and forward predictive coding is performed to the second and fourth frame pictures, "IPPP" indicates that intra-frame coding is performed to the first frame picture and forward predictive coding is performed to the remaining ones.

As concerns state transition of the coding pattern decision means 310, state transition is decided every frame pictures. Decision is performed following the condition in FIG. 9(a) using the value of the average frame rate posted by the processing capability decision means 311 prior to the decision and the value of the specified frame rate. In this embodiment 3, suppose that initialization of state assumed by the finite state machine is S1.

In the video coding apparatus according to the third embodiment, at the beginning of coding, initialization "8 frames/sec" is output from the processing capability decision means 311 and the coding pattern decision means 310 outputs "IIIP" as coding pattern as shown in TABLE 7 since initialization is S1. Therefore, the coding parameter decision means 302 outputs the coding parameters to the coding section 301 so as to realize the pattern, so that intra-frame coding is performed to first three frame pictures and forward predictive coding is performed to the last one.

Thereafter, when the average frame rate from the processing capability decision means 311 is lower than the specified frame rate, transition from S1 to S0 occurs shown in FIG. 7(a), thereby the coding pattern in TABLE 7 is changed into "IIII". As a result, only intra-frame coding is performed.

On the other hand, when the average frame rate is higher than the specified frame rate, transition from S1 to S2 occurs, thereby the coding pattern is changed into "IPIP". As a result, forward predictive coding is increased.

Under control described above, when the average frame rate is lower than the specified frame rate, since processing burden on the coding apparatus is assumed to be large, transition from S3 to S0 in FIG. 7(a) increases the ratio of intra-frame coding in which processing burden is small, and when the average frame rate is higher than the specified frame rate, since the coding apparatus is assumed to have reserve capability, transition from S0 to S3 increases ratio of forward predictive coding in which processing burden is large. As a result, coded result with higher compression ratio can be obtained.

In this way, coding is carried out changing coding parameters in accordance with state of coding as processing capability. TABLE 8 shows coded result of performing coding to 28 consecutive frame pictures.

TABLE 8

| frame picture No. | 0→3 | 4→7 | 8→11 | 12→15 | 16→19 | 20→23 | 24→27 |
|---|---|---|---|---|---|---|---|
| specified frame rate | | | | 8 | | | |
| coding pattern | IIIP | IIIP | IPIP | IPPP | IPPP | IPIP | IIIP |
| required time | 0.375 | 0.375 | 0.583 | 0.792 | 0.792 | 0.583 | 0.375 |
| output of 311 | 8 | 10.7 | 10.7 | 9 | 7.5 | 6.9 | 6.9 |
| result (frame rate) | | | | 7.23 | | | |
| result (amount of data) | | | | 0.06 | | | |

In TABLE 8, the specified frame is set "8" in a fixed way. The coding pattern, required time, and output of the processing capability decision means 311 are respectively represented by values of processing every 4 frame pictures (for example, 0th to 3rd frame pictures, 4th to 7th frame pictures). The coding pattern, the required time, and the output of the processing capability 311 indicates a coding pattern for use in coding every 4 frame pictures, time (second) for coding 4 frame pictures in the coding section 301, and an average frame rate obtained using the required time, respectively. Coded results of 28 frame pictures indicate the average frame rate and amount of coded data.

In TABLE 8, from the fact that processing is performed in 24 frames/sec when the operating frequency of CPU, the coding pattern, and the resolution are 100 MHz, "IIII" and "320×240", required time for processing 4 frame pictures and the frame rate as coded result are computed. For example, the required time for processing 4 frame pictures (0th to 3rd) is 1/24×3+6/24×1=0.375 second As the coding result, 15 I frames and 13 P frames are generated, so that time required for coding 1 frame picture is (1/24×15+6/24×13)*28=0.138 sec and the average frame rate is 7.225 frames/sec. Amount of coded result of a frame picture is computed from the fact that 1/10 data is obtained in I coding and 1/60 data is obtained in P coding. As a result, since 15 I frames and 13 P frames are generated as the coded result, amount of coded data of 28 frame pictures is (15/10+13/60)=1.717, resulting in 0.061 as amount of coded data of a frame picture.

(TABLE 9) shows functions of the coding pattern decision means 310 and the coding parameter decision means 302 in the video coding apparatus according to the third embodiment. In TABLE 9, status of the video coding apparatus according to the third embodiment is shown, including outputs of the coding pattern decision means 310 and the coding parameter decision means 301 of each frame picture of 12 frame pictures (0th to 11th) of 28 frame pictures to be processed in TABLE 8.

TABLE 9

| frame picture No. | 0 | 1 | 2 | 3 | 4 | 5 | 6 | 7 | 8 | 9 | 10 | 11 |
|---|---|---|---|---|---|---|---|---|---|---|---|---|
| state of 310 | S1 | | | | S1 | | | | S2 | | | |
| output of 310 | IIIP | | | | IIIP | | | | IPIP | | | |
| output of 302 | I | I | I | P | I | I | I | P | I | P | I | P |
| required time | 0.375 | | | | 0.375 | | | | 0.583 | | | |
| output of 311 | 8.0 | | | | 10.7 | | | | 10.7 | | | |

In TABLE 9, the required time and the output of the processing capability decision means 311 are identical to those in TABLE 8. In accordance with the output of the processing capability decision means 311, the coding pattern decision means 310 transitions between states and outputs the coding pattern according to its state. The coding parameter decision means 302 outputs the coding type of each frame picture according to the output coding pattern as shown in TABLE 9.

Since the coding pattern decision means 310 initially assumes S1, the coding pattern "IIIP" shown in TABLE 7 is output. In response to it, the coding parameter decision means 302 outputs "I", "I", "I", and "P" for the first 4 frame pictures.

To 8th to 11th frame pictures, the coding pattern "IPIP" is output since the coding pattern decision means 301 transitions from S1 to S2. Therefore, the output of the coding parameter decision means 302 is "I", "P", "I", and "P".

Thereafter, as shown in TABLE 8, the processing capability is decided and accordingly the coding pattern are selected and coding is performed in the coding type of the coding pattern.

For comparison, in TABLE 10, coded result of coding 28 frame pictures in predetermined coding pattern using the prior art video coding apparatus is shown.

TABLE 10

(a) coded result in coding pattern IIII

| frame picture No. | 1→28 |
|---|---|
| coding pattern | IIII |
| result (frame rate) | 24 |
| result (amount of data) | 0.1 |

(b) coded result in coding pattern IIIP

| frame picture No. | 1→28 |
|---|---|
| coding pattern | IIIP |
| result (frame rate) | 10.7 |
| result (amount of data) | 0.08 |

(a) coded result in coding pattern IPIP

| frame picture No. | 1→28 |
|---|---|
| coding pattern | IPIP |
| result (frame rate) | 6.9 |
| result (amount of data) | 0.06 |

(a) coded result in coding pattern IPPP

| frame picture No. | 1→28 |
|---|---|
| coding pattern | IPPP |
| result (frame rate) | 5.1 |
| result (amount of data) | 0.04 |

As the coding pattern, 4 patterns shown in TABLE 7 are used and as the coded result, the frame rate of coding and amount of coded data of a frame picture are shown.

Also in TABLE 10, based on the fact that processing is performed in 24 frames/sec when the operating frequency of the CPU, the coding pattern, and resolution are 100 MHz, "IIIII", and 320×240, respectively, another frame rate is computed. Similarly, amount of coded data in the frame picture is computed based on the fact that 1/10 data and 1/60 data are obtained in I coding and P coding, respectively.

In the prior art video coding apparatus, a coding type (pattern) or resolution has been decided, without allowing for the frame rate as the coded result or variation of hardware capability. Therefore, in some cases, it is difficult to set the frame rate to be close to a desired one and setting of an undesired value is only selected. On the other hand, in the video coding apparatus according to the third embodiment, the coding type (pattern) is decided in accordance with the specified resolution allowing for the processing capability of the coding apparatus or the frame rate as the coded result, thereby as shown in contrast between TABLE 9 and TABLE 10, the frame rate which is close to the specified frame rate is realized and simultaneously coding is carried out in higher resolution.

Thus, in accordance with the video coding apparatus according to the third embodiment, the coding parameter decision means 302 decides the coding pattern in accordance with the specified frame rate and resolution, and decision result output from the processing capability decision means 311, outputs the coding parameter to the coding section 301, which performs coding according to the coding parameter. As a result, it is possible to carry out coding in higher resolution, realizing requirements.

In accordance with the video coding apparatus according to the third embodiment, the apparatus comprises the coding section 301, the coding parameter decision means 302 including the coding pattern decision means 310, and the processing capability decision means 311. The coding pattern is decided in accordance with the specified resolution. Alternatively, resolution may be decided in accordance with the specified coding pattern. As a result, it is possible to perform coding in higher resolution in the required frame rate and coding pattern.

In the video coding apparatus according to the first and second embodiments, the coding parameter is decided at the beginning of coding and thereafter coding is performed according to the set coding parameters. In the apparatus according to the third embodiment, the average rate is computed during the coding and the coding parameter is dynamically changed according to state of coding obtained as processing capability of the apparatus. Therefore, the video coding apparatus according to the third embodiment has somewhat more burden, compared with those of the first and second embodiments. However, in case in which coding is performed to captured video in a general purpose computer which executes plural operations concurrently and the status of the computer changes, appropriate coding conditions can be set according to the change.

When it is assumed that no significant change of processing capability of the coding apparatus occurs in the middle of coding, in the video coding apparatus according to the, parameters are set at the beginning of coding and then coding is carried out under the condition as in the first and second embodiments, thereby processing burden on control can be reduced.

Embodiment 4

In the video coding method according to a fourth embodiment, coding parameters are decided on the basis of the specified frame rate in accordance with the processing capability of the coding apparatus and processing capability is decided on the basis of amount of temporarily stored data.

Figure 8:
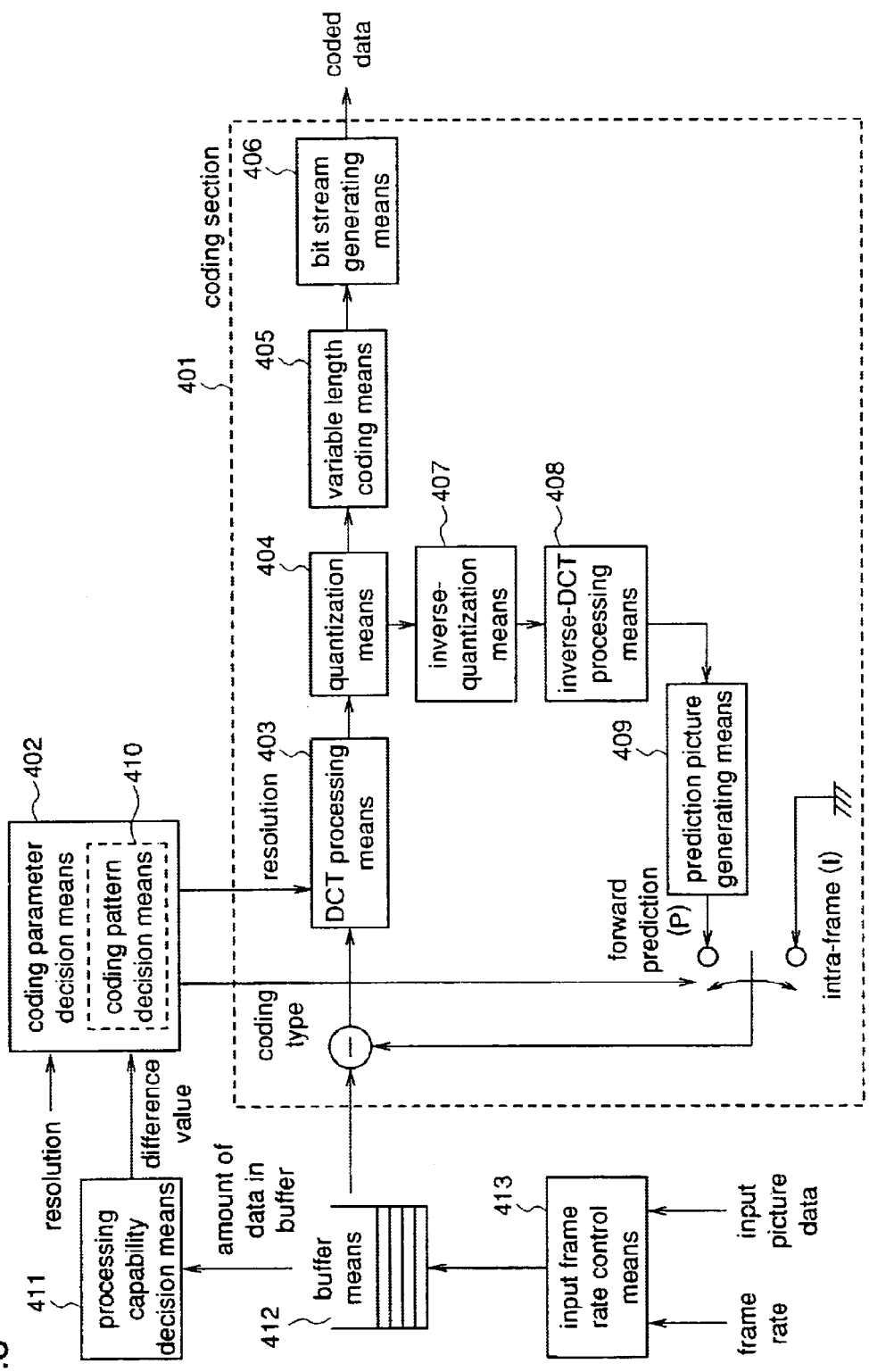
FIG. 8 is a block diagram illustrating a structure of a video coding apparatus according to an embodiment 4 of the present invention.

FIG. 8 is a block diagram illustrating a structure of the video coding apparatus which executes the video coding method according to the fourth embodiment. As shown in Figure, the video coding apparatus of the fourth embodiment comprises a coding section 401, a coding parameter decision means 402, a processing capability decision means 411, a buffer means 412, and an input frame rate control means 413. The coding section 401 includes a DCT processing means 403, a quantization means 404, a variable length coding means 405, a bit stream generating means 406, an inverse-quantization means 407, an inverse DCT processing means 408, and a predictive video generation means 409. The coding parameter decision means 402 includes a coding pattern decision means 410.

The coding section 401 is identical to the coding section 101 of the video coding apparatus according to the first embodiment. The coding section 201 is used for performing coding to the input frame picture in specified resolution and the specified coding type (intra-frame coding (I)) or forward predictive coding (P)) in accordance with coding parameters which are input from the coding parameter decision means 402. In the first to third embodiments, the coding sections 101 to 301 input picture data. In this fourth embodiment, the coding section 401 is used for reading data from the buffer means 412 mentioned later and performing coding.

The coding parameter decision means 402 is used for deciding coding parameters according to a decision result of the processing capability decision means 411 and outputting the coding parameters to the coding section 401. The processing capability decision means 411 is used for deciding coding processing capability of the coding apparatus and outputting the decision result to the coding parameter decision means 402. In this fourth embodiment, the processing capability decision means 411 is used for outputting amount of data temporarily stored in the buffer means 412 as a decision result. The coding parameter decision means 402 is used for deciding coding patterns based on the specified frame rate, resolution and the operating frequency as the decision result and posting the coding type to the coding section 401 according to the coding pattern. The coding parameter decision means 402 uses the coding parameter decision means 410 to decide coding parameters.

The input frame rate control means 413 is used for outputting input picture data as a series of picture data to the buffer means 412 according to he specified frame rate.

The buffer means 412 is used for temporarily storing input picture data, sequentially preserving the input picture data as a series of frame picture data 1 and sequentially abandoning the frame picture read by the coding section 401.

In this fourth embodiment, the processing capability decision means 411 is used for detecting difference between the number of frame pictures preserved in the buffer means at the beginning of coding and the number of frame pictures currently stored therein and outputting the difference to the coding parameter decision means 402.

Suppose that in the video coding apparatus according to the fourth embodiment, a coding program is executed in PC and conditions (1) to (5) occur as in the first embodiment.

Also, suppose that the operating frequency of CPU, the frame rate specified at the beginning of coding, and resolution of the input frame picture are 100 MHz, 8 frames/sec, and 320×240.

An operation of the video coding apparatus according to the fourth embodiment constructed above is described hereinafter. Video to be processed in the video coding apparatus is input as input picture data, which is input to the input frame rate control means 413, which sequentially inputs the input picture data as a series of frame pictures in the specified frame rate to the buffer means 412. In this fourth embodiment, the input frame rate control means 413 performs processing in the 8 frames/sec as the specified frame rate.

The buffer means 412 sequentially preserves frame pictures input from the input frame rate control means 413 and sequentially abandons the frame picture read by the coding section 401. That is, data is temporarily stored on a first-in, first-out (FIFO) basis. Suppose that the coding section 401 starts operation a give time after the input frame rate control means 413 starts operation. This means that the buffer means 412 preserves a prescribed number of frame pictures. This is for avoiding the fact that underflow in the buffer, i.e., shortage of temporarily stored data, prevents smooth processing. At this time, the processing capability decision means 411 detects the number of frame pictures stored in the buffer means 412 and holds the same for comparison.

The coding section 401 reads the temporarily stored frame picture from the buffer means 412 and performs coding to the same. The operation of the coding section 401 is identical to that of the coding section 101 according to the first embodiment.

The processing capability decision means 411 detects the number of frame pictures preserved in the buffer means 412, obtains the difference between the number of frame pictures in the initial state buffer means 412 which are previously detected and preserved, and posts the difference to the coding parameter decision means 402. When the number of preserved frame pictures is larger than the number of frame pictures in initial state, a positive value is posted thereto and when it is not, a negative value is posted thereto, every time the coding section 401 processes 4 frame pictures.

In the coding parameter decision means 402, the difference is input to the coding pattern decision means 410. The coding pattern decision means 410 operates as a finite state machine as in the coding pattern decision means 310 of the third embodiment. FIG. 9(*a*) shows a state transition diagram of the coding pattern decision means 410 and FIG. 9(*b*) shows state transition conditions.

The coding pattern decision means 410 assumes 4 states (S0 to S3) and in respective states, outputs the coding pattern in TABLE 11.

TABLE 11

| state | coding pattern |
|-------|----------------|
| S0    | IIII           |
| S1    | IIIP           |
| S2    | IPIP           |
| S3    | IPPP           |

"IIII", "IIIP", "IPIP" and "IPPP" in TABLE 11 is identical to those in TABLE 7 of the third embodiment. State transition of the coding parameter decision means 410 is decided every time the coding section 401 processes 4 frame pictures. The decision is performed following conditions shown in FIG. 9(*b*) on the basis of the difference immediately before the decision that is posted from the processing capability decision means 411. In this fourth embodiment, assume that initialization of state as the infinite state machine is S1. The coding parameter decision means 402 obtains the coding pattern output from the coding section 401 and outputs the coding type to the coding section 401 for each frame picture so that the obtained coding pattern is realized, every time the coding section 401 processes 4 frame pictures. In addition., the coding parameter decision means outputs the specified resolution to the coding section 401.

In the video coding apparatus, at the beginning of the coding pattern decision means 410 outputs "IIIP" as coding pattern as shown in TABLE 12 since initialization is S1. Therefore, the coding parameter decision means 402 outputs the coding parameters to the coding section 401 so as to realize the pattern, so that intra-frame coding is performed to first three frame pictures and forward predictive coding is performed to the last one.

Thereafter, when the difference from the processing capability decision means 411 has a negative value, transition S1 to S0 occurs as shown in FIG. 9(*a*), thereby the coding pattern in TABLE 12 is changed into "IIII". As a result, only intra-frame coding is performed.

On the other hand, when the difference has a positive value, transition from S1 to S2 in FIG. 9(*a*) occurs, thereby the coding pattern is changed into "IPIP". As a result, forward predictive coding is increased.

Under the control descried above, when the difference output from the processing capability decision means 411 has a positive value, that is, when the number of frame pictures stored in the buffer means 412 is larger than the number of initial frame pictures, since processing burden of the coding apparatus is assumed to be large, transition from S3 to S0 in FIG. 9(*a*) increases the ratio of intra-frame coding in which processing burden is small. On the other hand, when the number of frame pictures stored in the buffer means 412 is smaller than the number of initial frame pictures, since the coding apparatus is assumed to have reserve capability, transition from S0 to S3 in FIG. 9(*a*) increases ratio of forward predictive coding in which processing burden is large As a result, coded result with higher compression ratio can be obtained.

In this way, coding is carried out changing coding parameters in accordance with state of coding as the number of stored frame pictures. TABLE 12 shows coded result of performing coding to 28 consecutive frame pictures.

TABLE 12

| frame picture No. | 0→3 | 4→7 | 8→11 | 12→15 | 16→19 | 20→23 | 24→27 |
|---|---|---|---|---|---|---|---|
| specified frame rate | | | | 8 | | | |
| coding pattern | IIIP | IIIP | IPIP | IPPP | IPPP | IPIP | IIIP |
| required time | 0.375 | 0.375 | 0.583 | 0.792 | 0.792 | 0.583 | 0.375 |
| number of input | 3.0 | 3.0 | 4.7 | 6.3 | 6.3 | 4.7 | 3.0 |
| number of output | 4.0 | 4.0 | 4.0 | 4.0 | 4.0 | 4.0 | 4.0 |
| output of 411 | 0.0 | −1.0 | −2.0 | −1.3 | +1.0 | −3.3 | +4.0 |
| result (frame rate) | | | | 7.23 | | | |
| result (amount of data) | | | | 0.06 | | | |

In TABLE 12, the specified frame rate is set "8" in a fixed way. The coding pattern, required time, the number of inputs, the number of outputs, and output of the processing capability decision means 411 are respectively represented by values of processing every 4 frame pictures (for example, 0th to 3rd frame pictures, 4th to 7th frame pictures). The coding pattern, the required time, the number of inputs, and the number of outputs indicate a coding pattern for use in coding every 4 frame pictures, time (second) for coding 4 frame pictures in the coding section 301, the number of frame pictures input to the buffer means 412, and the number of frame pictures 412 output from the buffer means 412, respectively. Coded results of 28 frame pictures indicate the average frame rate and amount of coded data.

In TABLE 12, time required for processing 4 frame pictures and the frame rate of the coded result are computed, based on the fact that processing is performed in 24 frames/sec when the operating frequency of the CPU, the coding pattern, and resolution are 100 MHz, "IIIIII", and 320×240, respectively.

For example, the required time for processing 4 frame pictures (0th to 3rd) is 1/24×3+6/24×1=0.375 second. As the coding result, 15 I frames and 13 P frames are generated, so that time required for coding 1 frame picture is (1/24×15+6/24×13)*28=0.138 sec and the average frame rate is 7.225 frames/sec. Amount of coded result of a frame picture is computed from the fact that 1/10 data is obtained in I coding and 1/60 data is obtained in P coding. As a result, since 15 I frames and 13 P frames are generated as the coded result, amount of coded data of 28 frame pictures is (15/10+13/60)=1.717, resulting in 0.061 as amount of coded data of a frame picture.

(TABLE 13) shows functions of the coding pattern decision means 410 and the coding parameter decision means 402 in the video coding apparatus according to the third embodiment. In TABLE 13, status of the video coding apparatus according to the fourth embodiment is shown, including outputs of the coding pattern decision means 410 and the coding parameter decision means 402 of each frame picture of 12 frame pictures (0th to 11th) of 28 frame pictures to be processed in TABLE 12.

TABLE 13

| frame picture No. | 0 | 1 | 2 | 3 | 4 | 5 | 6 | 7 | 8 | 9 | 10 | 11 |
|---|---|---|---|---|---|---|---|---|---|---|---|---|
| state of 410 | | S1 | | | | S1 | | | | S2 | | |
| output of 410 | | IIIP | | | | IIIP | | | | IPIP | | |
| output of 402 | I | I | I | P | I | I | I | P | I | P | I | P |
| required time | | 0.375 | | | | 0.375 | | | | 0.583 | | |
| number of input | | 3.0 | | | | 3.0 | | | | 4.7 | | |
| number of output | | 4.0 | | | | 4.0 | | | | 4.0 | | |
| output of 411 | | 0.0 | | | | −1.0 | | | | −2.0 | | |

In TABLE 13, the required time, the number of inputs, the number of outputs, and the output of the processing capability decision means 411 are identical to those of TABLE 12. The coding pattern decision means 410 transitions between states described above and outputs the coding pattern. The coding parameter decision means 302 outputs the coding type for each frame picture according to the output coding pattern.

Since the coding pattern decision means 410 initially assumes S1, the coding pattern "IIIP" shown in TABLE 11 is output. In response to it, the coding parameter decision means 402 outputs "I", "I", "I", and "P" for the first 4 frame pictures.

To 8th to 11th frame pictures, the coding pattern "IPIP" is output since the coding pattern decision means 410 transitions from S1 to S2. Therefore, the output of the coding parameter decision means 402 is "I", "P", "I", and "P".

Thereafter, as shown in TABLE 12, the processing capability is decided and accordingly the coding pattern is selected and coding is performed in the coding type of the coding pattern.

In the prior art video coding apparatus, a coding type (pattern) or resolution has been decided, without allowing for the frame rate as the coded result or variation of hardware capability as shown in TABLE 10 in the third embodiment. Therefore, in some cases, it is difficult to set the frame rate to be close to a desired one and setting of an undesired value is only selected. On the other hand, in the video coding apparatus according to the fourth embodiment, the coding type (pattern) is decided in accordance with the specified resolution allowing for the processing capability of the coding apparatus or the frame rate as the coded result, thereby as shown in contrast between TABLE 13 and TABLE 10, the frame rate which is close to the specified frame rate is realized and simultaneously coding is carried out in higher resolution. In addition, in the third embodiment, time required for processing must be measured. In this fourth embodiment, if it is impossible or difficult to measure processing time, it is possible to decide processing capability of the apparatus as an indicator of amount of temporarily stored data.

Thus, in accordance with the video coding apparatus according to the fourth embodiment, the apparatus comprises the coding section 401, the coding parameter decision means 402 including the coding pattern decision means 410, the processing capability decision means 411, the buffer means 412, and the input frame rate control means 413. The input frame rate control means 413 inputs the input picture data to the buffer means 412 at a give rate, which temporarily stores the input picture data. The processing capability decision means 411 outputs the decision result indicating processing capability of the coding apparatus. The coding parameter decision means 402 decides the coding pattern in accordance with the specified frame rate and resolution, and decision result output from the processing capability decision means 411, outputs the coding parameter to the coding section 401, which performs coding according to the coding parameter. As a result, it is possible to carry out coding in higher resolution, realizing requirements.

In accordance with the video coding apparatus according to the fourth embodiment, the coding pattern is decided in accordance with the specified resolution. Alternatively, resolution may be decided in accordance with the specified coding pattern. As a result, it is possible to perform coding in higher resolution in the required frame rate and coding pattern.

Furthermore, in the apparatus of the fourth embodiment, amount of temporarily stored data is detected during the coding and the coding parameter is dynamically changed according to state of coding obtained as processing capability of the apparatus as in the third embodiment. Therefore, the video coding apparatus according to the fourth embodiment has somewhat more burden, compared with those of the first and second embodiments. However, in case in which coding is performed to captured video in a general purpose computer which executes plural operations concurrently and the status of the computer changes, appropriate coding conditions can be set according to the change.

As in the third embodiment, when it is assumed that no significant change of processing capability of the coding apparatus occurs in the middle of coding, in the video coding apparatus according to the fourth embodiment, parameters are set at the beginning of coding and then coding is carried out under the condition as in the first and second embodiments, thereby processing burden on control can be reduced.

In the first to fourth embodiments, intra-frame coding and forward predictive coding are performed. However, the coding type is not limited to this. For example, backward predictive coding and bidirectionally predictive coding may be employed as different coding types and in addition, they may be employed for the case in which search of motion vector is changed as the same.

The video coding methods shown in the first to fourth embodiments are realized by using a recording medium which records a video coding program which may execute the method and by executing the program in a personal computer or in a work station.

Embodiment 5

An audio coding apparatus according to a fifth embodiment of the present invention can reduce the burden of processing by subjecting sampled audio data to conversion processing.

Figure 10:
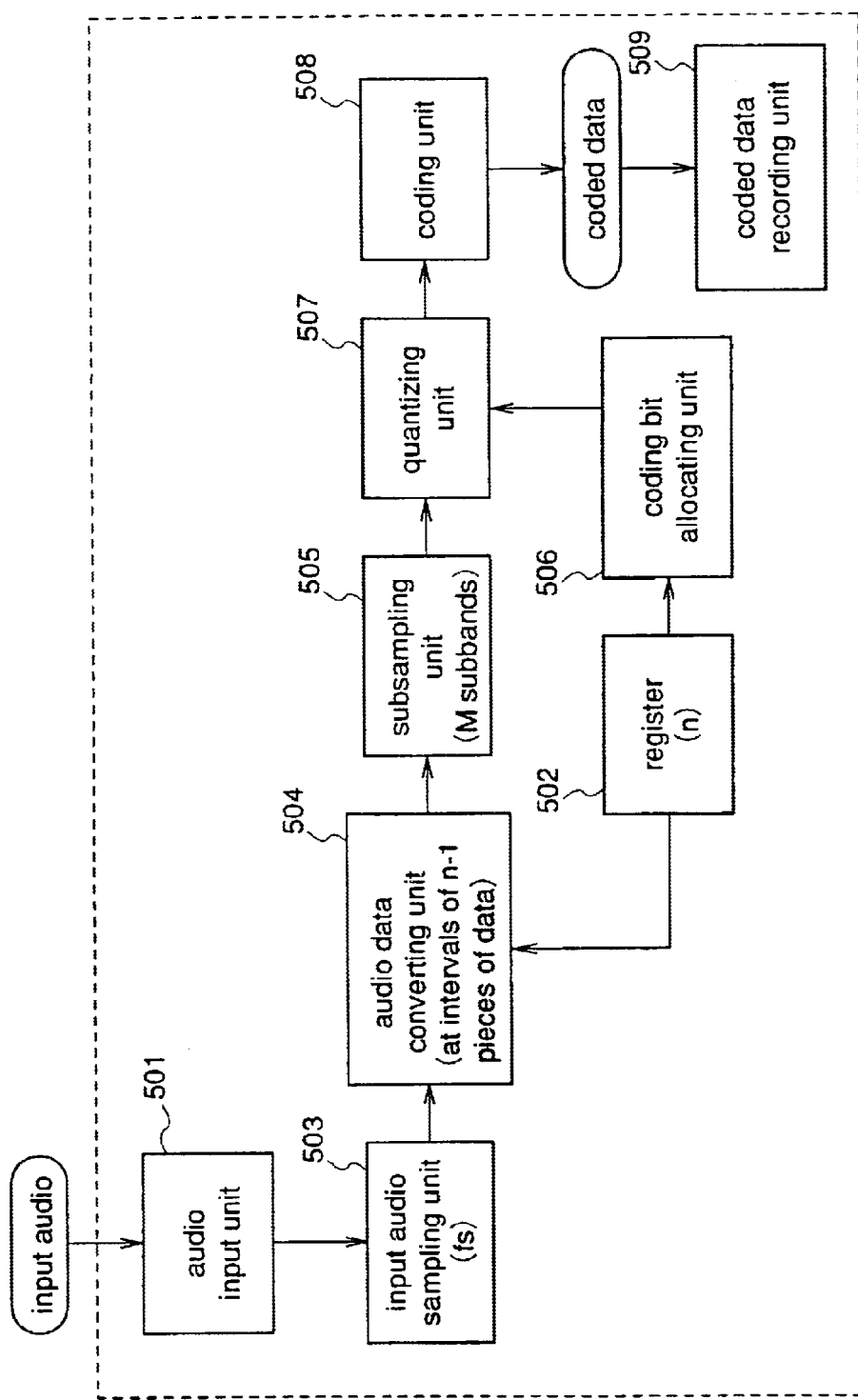
FIG. 10 is a block diagram illustrating a structure of an audio coding apparatus according to an embodiment 5 of the present invention.
Figure 11:
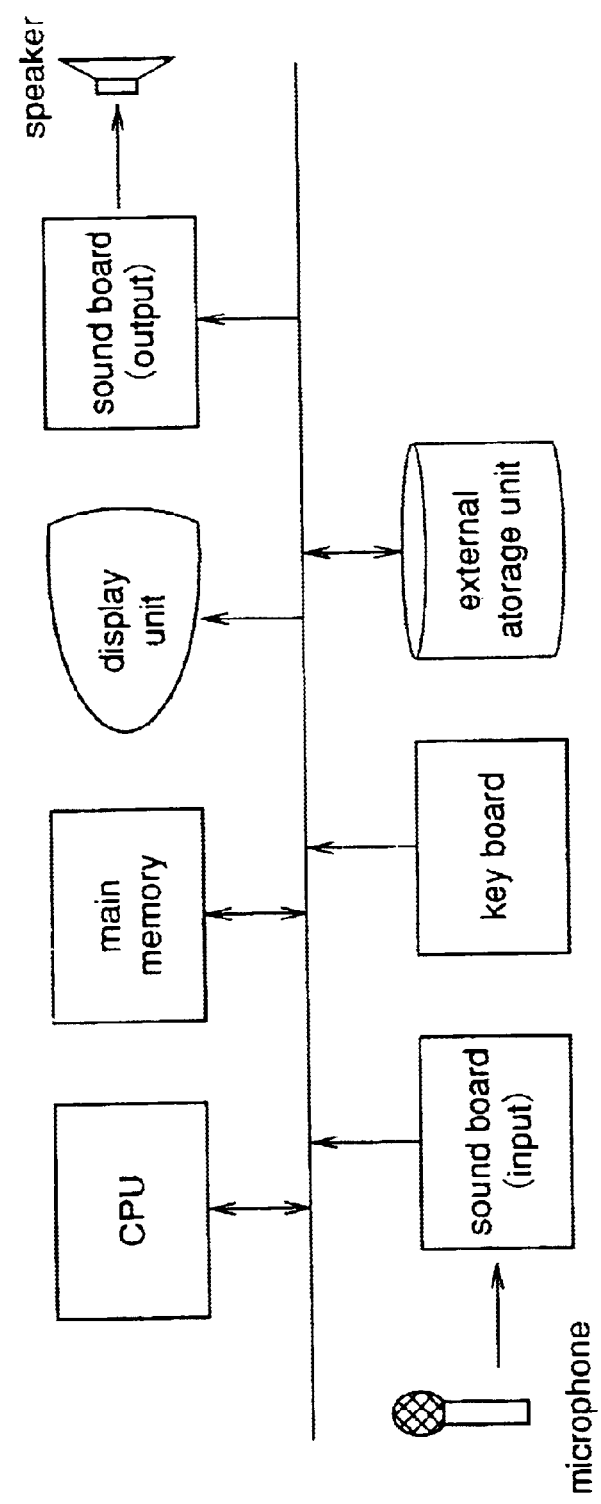
FIG. 11 is a diagram illustrating a hardware structure of the audio coding apparatus according to the embodiment 5.

FIG. 10 is a block diagram illustrating the structure of the audio coding apparatus according to the fifth embodiment of the present invention. FIG. 11 is a diagram illustrating the hardware structure of the coding apparatus of the fifth embodiment. As shown in FIG. 10, this audio coding apparatus comprises: an audio input unit 501; a register 502; an input audio sampling unit 503; an audio data converting unit 504; a subsampling unit 505; a coding bit allocating unit 506; a quantizing unit 507; a coding unit 508; and a coded data recording unit 509.

The audio input unit 501 does input of audio as a coding object. Audio may be input through a microphone as shown in FIG. 11, or through lines. The register 502 is implemented by a main memory or an external storage unit shown in FIG. 11 and stores constants used for coding processing. The input audio sampling unit 503 is implemented by a sound board (input) of FIG. 11 and a control program and performs sampling processing to the audio input through the input unit 501.

The audio data converting unit 504 puts the data which the input audio sampling unit 503 subjected to sampling processing, through conversion processing using the value of the constant stored in the register 502. The subsampling unit 505 subsamples the data converted by the audio data converting unit 504. The coding bit allocating unit 506 allocates coding bits to the subbands formed by the subsampling unit 505. The quantizing unit 507 performs quantizing processing according to the number of the coding bits allocated by the coding bit allocating unit 506. The coding unit 508 outputs the quantized value output from the quantizing unit 507 as coded audio data. The respective units 504 to 508 are implemented by the CPU and main memory of FIG. 11 and a program.

The coded data recording unit 509 is implemented by the external storage unit of FIG. 11 and a control program, and records the coded data output from the coding unit 508 as the result of the audio coding processing by the audio coding apparatus.

In the fifth embodiment, it is assumed that from among three sampling frequencies defined by MPEGAudio: 32 KHz, 44.1 KHz, and 48 KHz, selected as a set frequency is 48 KHz. Further, it is assumed that conversion constant n has a value "2" which is predetermined according to the CPU performance, and the value is stored in the register 502. The value of the conversion constant n may be determined by any of the following methods: a method of assuming a specified CPU in the apparatus and performing the setting based on the coding throughput of the CPU; a method of selecting the value of the constant from among the values obtained by simulation for each CPU, according to CPU selection by user; and a method of performing an operation for evaluating the coding throughput of the CPU before coding processing and performing the setting based on the result.

Figure 12:
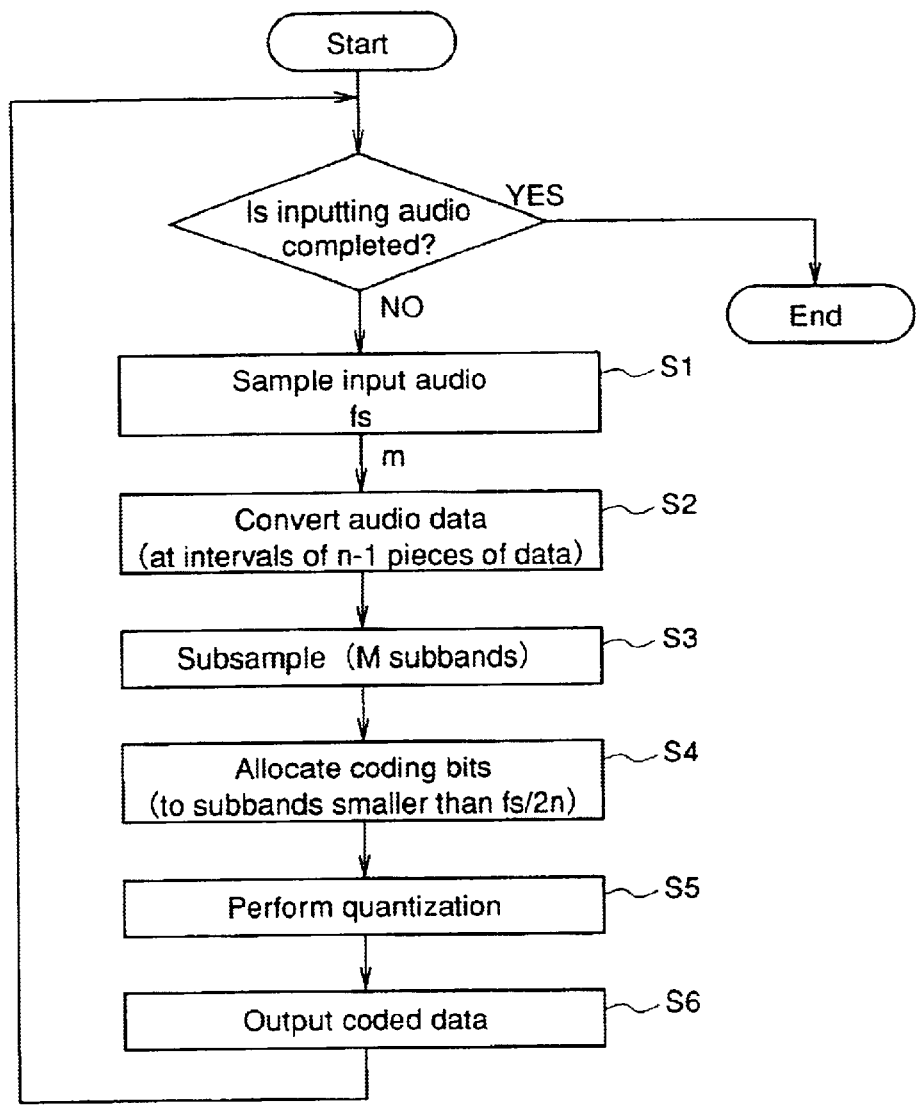
FIG. 12 is a flowchart illustrating a processing procedure of audio coding in the coding apparatus according to the embodiment 5.
Figure 13:
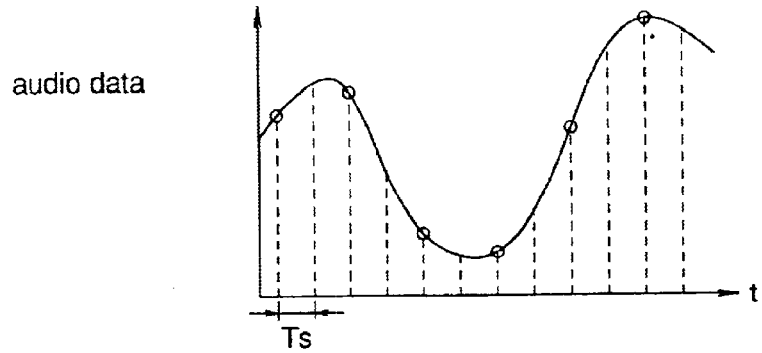
FIGS. 13(a), (b), (c) and (d) are diagrams for explaining sampling processing and audio data conversion processing according to the apparatus according to the embodiment 5.
Figure 13:
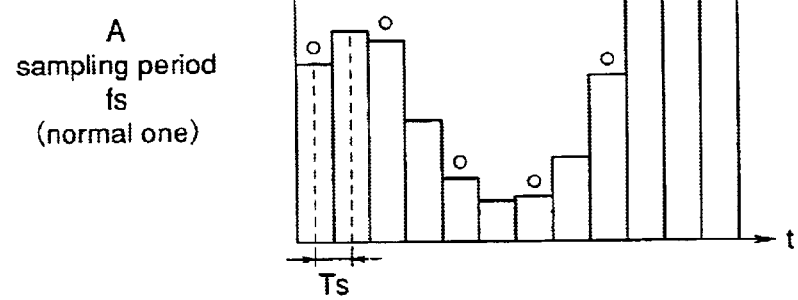
Figure 13:
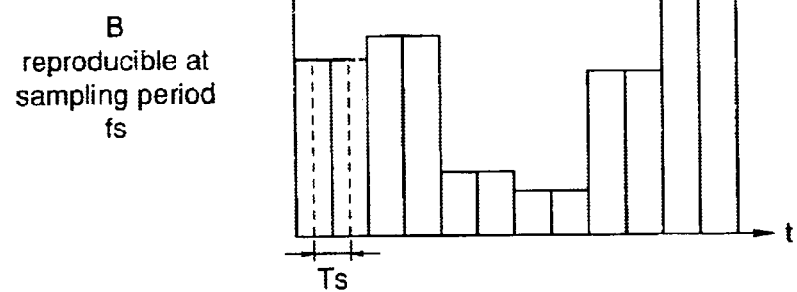
Figure 13:
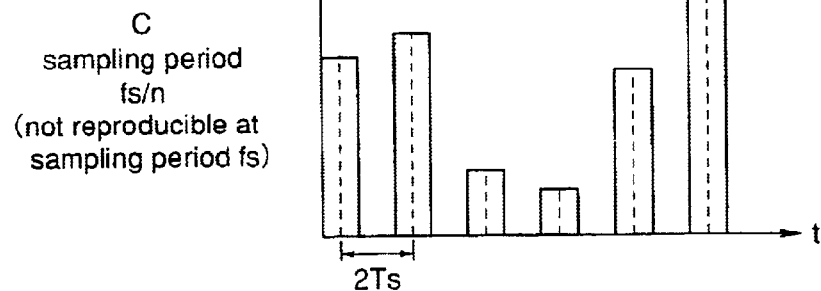

FIG. 12 is a flow chart of the operation of the audio coding by the coding apparatus of the fifth embodiment. FIG. 13 is a diagram for explaining the sampling and subsequent conversion of audio data performed by the coding apparatus of the fifth embodiment. The operations involved in the coding by the audio coding apparatus of the fifth embodiment will be described with reference to the flow chart of FIG. 12, and additional reference to FIGS. 10 and 13.

In step 1 of the flow of FIG. 12, the audio signal input, by the audio input unit 501 is sampled by the input audio sampling unit 503, with a set frequency fs as a sampling frequency. Like the prior art case, this sampling is performed in the manner shown in FIG. 13(a) with a time ts which is a reciprocal of the sampling frequency fs, and m pieces of sampled audio data are output thereby.

In step 2, the audio data converting unit 504 obtains the conversion constant n stored in the register 502 and extracts data from the m pieces of sampled audio data output from the input audio sampling unit 503, at intervals of (n−1) pieces of data, to obtain m/n pieces of sampled audio data in total. In this case, it is assumed that (n−1) is 1 and thus plural pieces of sampled audio data, to which white circles are given in FIG. 13(b) are extracted at intervals of one piece of data. Then, the audio data converting unit 504 forms m pieces of converted audio data in total consisting of contiguous groups of n pieces of extracted data. These pieces of converted audio data, which have a structure shown in FIG. 13(c), are output as m pieces of audio data having a frequency fs.

Here we make a comparison between the above-described conversion of audio data in step 2 and the case wherein pieces of audio data are extracted at intervals of (n−1) pieces of data and directly subjected to the subsequent subsampling coding, and consider it. In this case, m/n pieces of audio data with a sampling frequency fs/n as shown in data C of FIG. 13(d) are formed. However, it is the coded data having the sampling frequency fs/n only which is output as the coded audio data and thus the data with the sampling frequency fs cannot be reproduced. Here, if sampling is performed with a frequency of 48 KHz as defined by MPEGAudio and then audio data extracted at intervals of one piece of data based on the assumption that n=2, that is, m/2 pieces of audio data are subjected to subsampling and coding, what is output is the coded audio data with a sampling frequency fs/2, i e., 24 KHz only, and the coded audio data other than such data cannot be reproduced with any of the three sampling frequencies defined by the MPEGAudio: 32 KHz, 44.1 KHz, and 48 KHz.

In the coding process of the fifth embodiment, therefore, the conversion processing in step 2 forms not only m/n pieces of audio data (data C in FIG. 13(d)) taken at intervals of (n−1) pieces of the audio data, but converted audio data comprising contiguous groups of n pieces of data having a same value. This converted audio data represented as data B in FIG. 13(c) has an actual sampling frequency as large as fs/n, but this data is equal to m pieces of audio data capable of being treated with the sampling frequency fs represented as data A of FIG. 13(b).

Following step 2 which is the above-described conversion process, the subsampling unit 505 subsamples the converted audio data to obtain m frequency bands By the subsampling based on the MPEGAudio, 32 subbands are obtained. This step is performed in the same manner as the first prior art.

In step 4, the coding bit allocating unit 506 obtains the set frequency fs and the conversion constant n from the register 502 and, based on these values, limit frequency fs/2n is calculated which is a minimum frequency allowing reproduction using a generally known sampling constant. Then, each number of allocated coding bits is determined on the assumption that among the m subbands, it is the subbands whose respective frequencies are less than the limit frequency allowing reproduction to which coding bits are allocated and no coding bits are allocated to the subbands whose respective frequencies exceed the limit frequency. The number of allocated coding bits is sent from the coding bit allocating unit 506 to the quantizing unit 507.

In step 5, the quantizing unit 507 quantizes audio data for each subband according to its number of allocated coding bits and in step 6, the coding unit 508 outputs coded audio data based on the quantized value. The output coded audio data is recorded in the coded data recording unit 509. As shown in the flow of FIG. 12, the above-described steps are repeated as long as audio is input as coding object, and coding is completed immediately after the completion of the input of the audio.

As for the effects of the audio coding apparatus according to the fifth embodiment, reduction in throughput in step 3 due to use of the converted audio data obtained in step 2 will be considered with reference to the subsampling method based on MPEGAudio.

In the subsampling method based on MPEGAudio employed here, the following operations are performed for forming 32 subbands.

$$Zi = Ci \times Xi \qquad (i = 0 \sim 511) \qquad (1)$$

$$Yi = \sum_{j=0}^{7} Z64j+i \qquad (i = 0 \sim 63) \qquad (2)$$

$$Si = \sum_{k=0}^{63} Yk\cos((2i+1)(k-6)\pi 64) \quad (i = 0 \sim 31) \qquad (3)$$

wherein Xi is input audio data and Si is audio data after being subjected to subsampling. Further, the coefficient Ci is obtained from a coefficient table on the basis of MPEGAudio in which shows a comparison between sample number and coefficient.

The formulas (1) and (2) are normally operated for m pieces of audio data, but, when the operations are performed for converted audio data comprising contiguous groups of n pieces of sampled audio data obtained by extraction, n pieces of audio data in each group are identical one another and thus the operations for m/n pieces of audio data may be performed to the portion of the converted audio data which comprises contiguous pieces of sampled audio data. Therefore, the amount to be calculated by the formula (1) can be reduced to 1/n, and the amount to be calculated by the formula (2) can be also reduced to 1/n.

Here a description is given of the case in which n=4. In this case, since audio data X0 to X3 are equal to four pieces of data X0, X0=X1=X2=X3 and the formula (1) can be calculated with Ci whose value realizes C0=C1=C2=C3. Thus, the four values Z0, Z1, Z2, and Z3 are obtained by only one calculation and all values of Zi can be obtained with a quarter of the amount to be calculated.

When the formula (1) is calculated with a value which realizes C0=C1=C2 . . . =Cn, one of the values C0 to Cn or the average value of C0 to Cn is employed.

Next, Yi is calculated from the formula (2) including Zi. Yi is obtained by only adding eight values of Zi whose "i" is multiples of 64 and when n is the power of 2, the resulting Yis have same values in groups of n, and the amount to be calculated is reduced to 1/n. When n is not the power of 2, e.g., n=3, Y0 is not equal to Y1 because Z64 added to obtain Y0 and Z65 added to obtain Y1 are not equal, whereby the amount to be calculated by the formula (2) cannot be reduced.

However, the amount to be calculated can be reduced by appropriate setting even when this n is not the power of 2. For example, when n=3, conversion of audio data is performed in step 2 in such a way that X0=X1=X2, X3=X4=X5, . . . X27=X28=X29, and X30=X31, that is, Xi contiguous groups each including same values as many as possible are obtained with "i" ranging from 0 to 31 when forming 32 subbands by subsampling. More specifically, with an assumption that the final two Xs are of equal value, the other Xs are converted into audio data array which consists of contiguous groups of three Xs of equal value and, using the converted audio data, the formulas (1) and (2) for subsampling in step 3 are performed. This can reduce the amount to be calculated to approximately one-third.

As for the formula (3), the amount to be calculated does not change after conversion of audio data.

In allocation of coding bits in step 4, coding bits are allocated to subbands less than limit frequency fs/2n. The reason is that, since in the conversion of audio data in step 2, extracting the audio data sampled with sampling frequency fs, at intervals of (n−1) pieces of audio data, is equal to sampled audio data with sampling frequency fs/n, coding objects are limited to the subbands less than reproducible limit frequency fs/2n because of a fact based on a well-known sampling theorem that the frequency band exceeding the reproducible limit frequency fs/2n cannot be reproduced. Since coding bits are not allocated to the subbands exceeding the limit frequency, the quantization for such bands are not needed and the burden of quantization processing in step 5 is reduced to 1/2n.

Thus, the audio coding apparatus of the fifth embodiment comprises the register 502 and the audio converting unit 504, and the audio data converting unit 504, based on the conversion constant, extracts m/n pieces sampled audio data in total, at intervals of (n−1) pieces of the data, from m pieces of sampled audio data which have been obtained by sampling with a set frequency by the audio sampling unit 503 to obtain m pieces of converted audio data each comprising contiguous groups of n pieces of sampled audio data. Therefore, the amount to be calculated in the subsequent process performed by the subsampling unit 505 can be reduced greatly and even the coded data capable of being reproduced with original set frequency can be obtained unlike the case of reducing audio data by extraction. Further, since the coding bit allocating unit 506 does not allocate coding bits to the subbands which are not reproduced based on the sampling theorem and quantization by the quantizing unit 507 to such subbands is not necessary, the burden of the quantization processing is reduced to 1/2n. Therefore, even in the case that real-time coding processing for audio input is difficult or impossible to perform by the prior art method due to insufficient CPU performance, audio coding processing can be performed in real time by setting the constant to a value which enables to reduce the burden.

Further, although in the fifth embodiment the converted audio data is formed which comprises contiguous sampled audio data, the same effects are available by inserting, between adjacent pieces of sampled audio data, n−1 pieces of appropriate audio data such as the audio data which is the average of adjacent pieces of sampled audio data.

Embodiment 6

An audio coding apparatus according to a sixth embodiment of the present invention can reduce its processing burden by performing conversion to sampled audio data as in the fifth embodiment, but differs from the fifth embodiment in that it is not conversion of audio data but sampling that reduces the amount of data.

Figure 14:
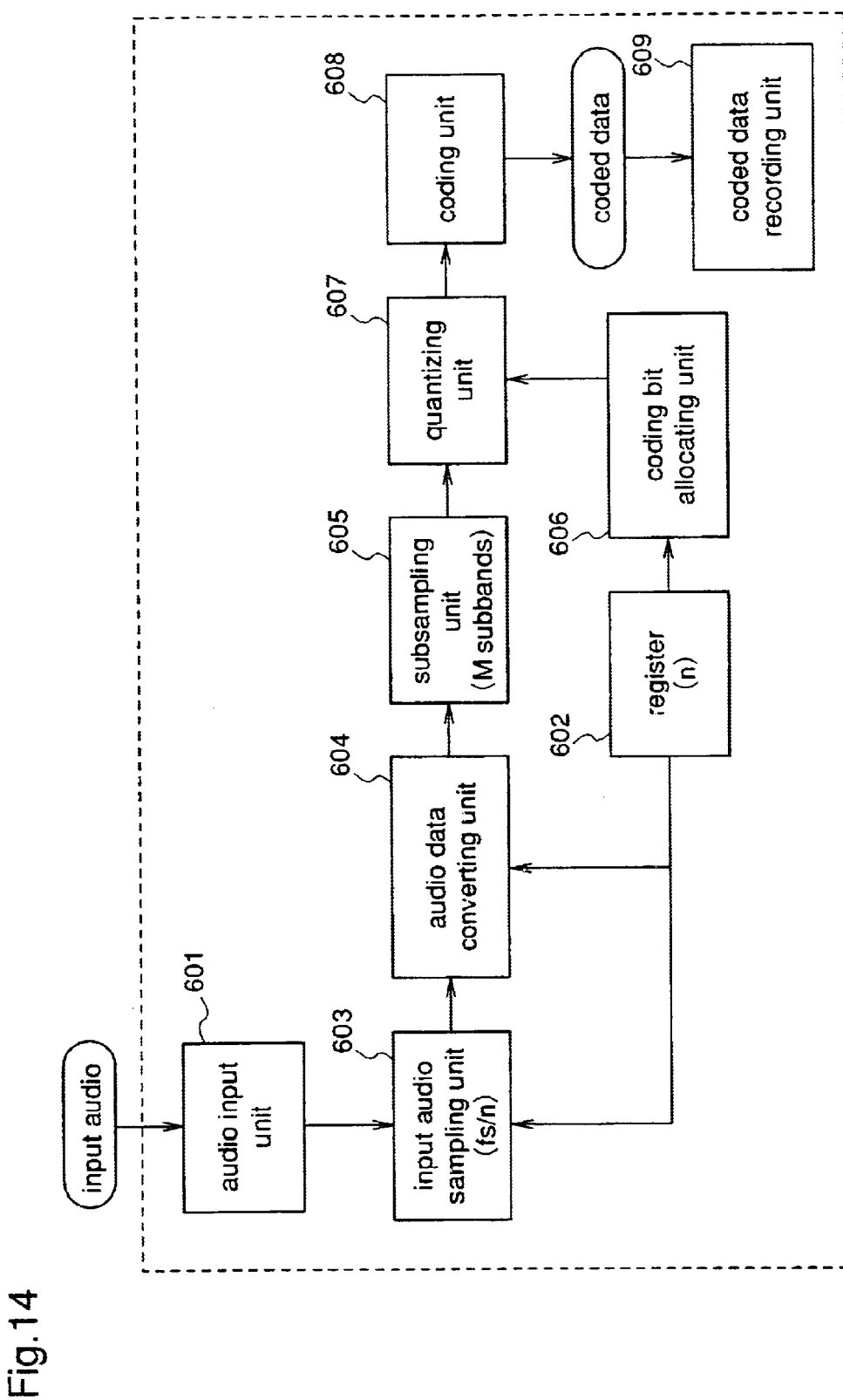
FIG. 14 is a block diagram illustrating a structure of an audio coding apparatus according to an embodiment 6 of the present invention.

FIG. 14 is a block diagram illustrating the structure of the audio coding apparatus according to the sixth embodiment of the present invention. As shown in the figure, the audio coding apparatus comprises: an audio input unit 601; a register 602; an input audio sampling unit 603; an audio data converting unit 604; a subsampling unit 605; a coding bit allocating unit 606; a quantizing unit 607; a coding unit 608; and a coded data recording unit 609. The hardware structure of the coding apparatus of the sixth embodiment is equal to that of the coding apparatus of the fifth embodiment shown in FIG. 11.

Figure 15:
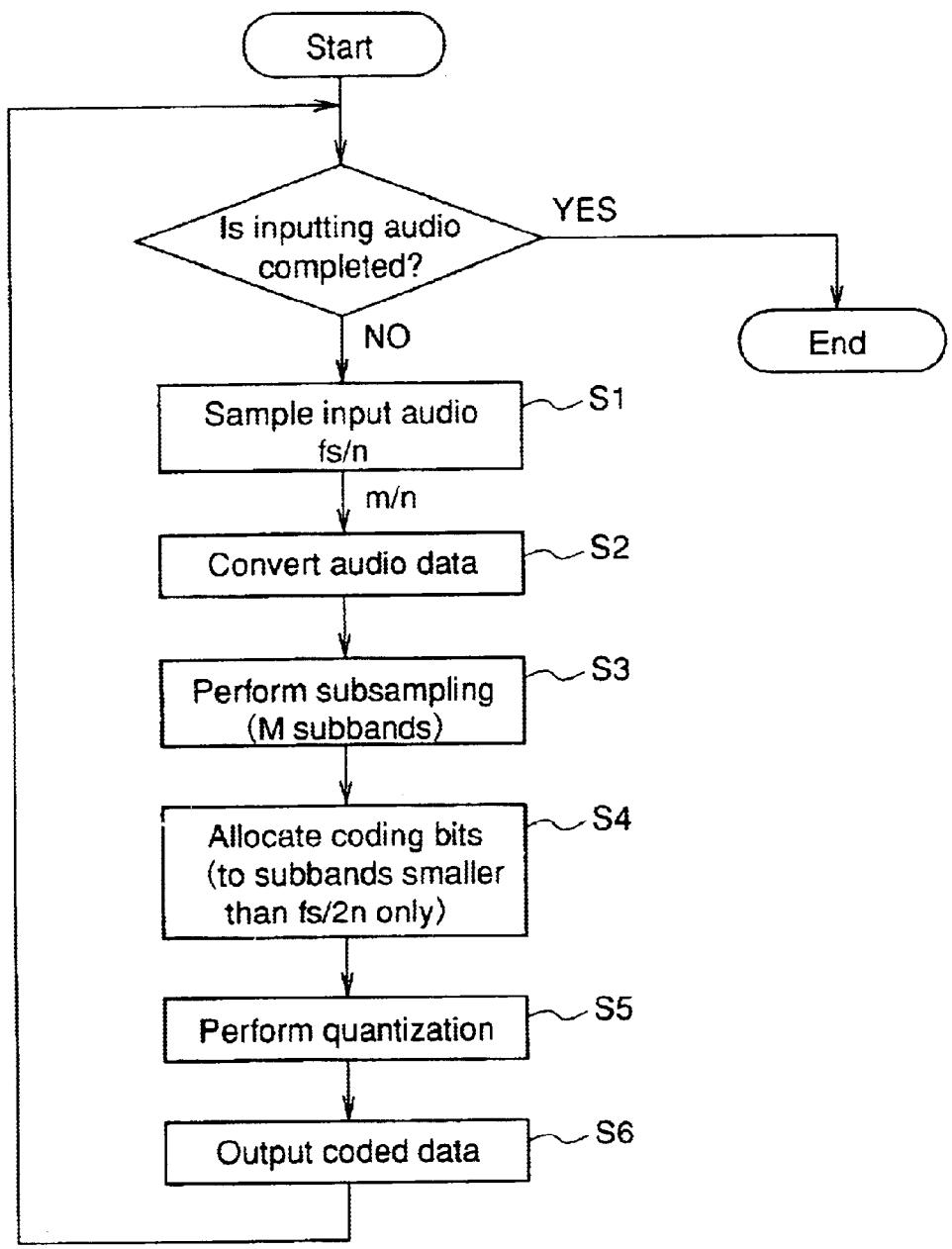
FIG. 15 is a flowchart illustrating a processing procedure of audio coding in the apparatus according to the embodiment 6.

The input audio sampling unit 603, unlike the input audio sampling unit 503 of the first embodiment, does not perform sampling with a set frequency as a sampling frequency. Instead, this apparatus performs sampling with a sampling frequency determined based on a set frequency and a conversion constant obtained from the register 602. The audio data converting unit 604 is different from the audio data converting unit 104 of the first embodiment in that this apparatus does not extract sampled audio data but just insert audio data to form converted audio data. The audio input unit 601, the subsampling unit 605, the coding bit allocating unit 606, the quantizing unit 607, the coding unit 608, and the coded data recording unit 609 are equal to the respective units 501 and 505~509 in the fifth embodiment. FIG. 15 is a flow chart illustrating the operation of audio coding by the coding apparatus of the sixth embodiment. Also for the six embodiment, FIG. 13 is used for explaining sampling and audio data conversion processing. Hereinafter a description is given of the coding operation of the audio coding apparatus according to the sixth embodiment with reference to the flow chart of FIG. 15, and additional reference to FIG. 14. As in the fifth embodiment, it is assumed that the set frequency is 48 KHz which is a value defined by MPEGAudio and the conversion constant n is 2.

In step 1 of the flow of FIG. 15, the input audio sampling unit 603 obtains a set frequency fs and a conversion constant n from the register 602 to decide an executive sampling frequency fs/n. The audio signal input from the audio input unit 601 is sampled with the executive sampling frequency fs/n by the input audio sampling unit 603. As a consequence of this sampling, m/n pieces of sampled audio data like data C of FIG. 13(d) are output.

In step 2, the audio data converting unit 604 obtains a conversion constant n from the register 602 and forms m pieces of converted audio data comprising contiguous groups of n pieces of sampled audio data, on the basis of m/n pieces of sampled audio data output from the input audio sampling unit 603. The converted audio data, which has a structure of data B of FIG. 13(c), is output as m pieces of audio data with the frequency fs.

As already explained in the fifth embodiment, the audio data like the data C of FIG. 13(c) cannot be reproduced with a sampling period fs, but the coded data reproducible with the sampling period fs can be obtained by converting this audio data to form the data B of FIG. 13(c).

The converted audio data obtained in step 2 is equal to the converted audio data obtained in step 2 of the fifth embodiment and thus the following steps 3 to 6 are executed in the same way as steps 3 to 6 of the fifth embodiment. Then, steps 1 to 6 are repeated as long as audio is input and coding is completed immediately after the completion of inputting audio.

The audio coding apparatus of the sixth embodiment can also reduce the calculation operation as described for the apparatus of the fifth embodiment in the subsampling and quantization processes, resulting in real-time coding processing for input audio at a level according to the CPU performance or the like.

As described above, the audio coding apparatus of the sixth embodiment comprises the register 602, the input audio sampling unit 603, and the audio data converting unit 604, and in this apparatus, the input audio sampling unit 603 decides an executive sampling frequency fs/n based on a set frequency fs and a conversion constant n stored in the register 602 and performs sampling processing, and the audio data converting unit 604 inserts audio data into resultant m/n pieces of sampled audio data to obtain converted audio data which comprises m pieces of audio data. This reduces the processing burden of this apparatus as in the fifth embodiment. In addition, since the coding apparatus of the sixth embodiment performs sampling with a sampling frequency fs/n, the buffer memory for temporarily storing input audio data which has been subjected to sampling may be employed having a capacity as large as only one-n th of that in the fifth embodiment, and a soundboard whose maximum sampling frequency is less than fs may be employed, thereby realizing real-time coding processing for input audio by effectively utilizing the relatively small hardware resource of this apparatus.

Although in the sixth embodiment formed is the converted audio data which comprises contiguous pieces of sampled audio data, the same effects may be obtained by inserting (n−1) pieces of appropriate audio data as in the fifth embodiment.

Embodiment 7

An audio data coding apparatus according to a seventh embodiment of the present invention can perform coding according to surrounding situation by changing a conversion constant corresponding to the amount of input data.

Figure 16:
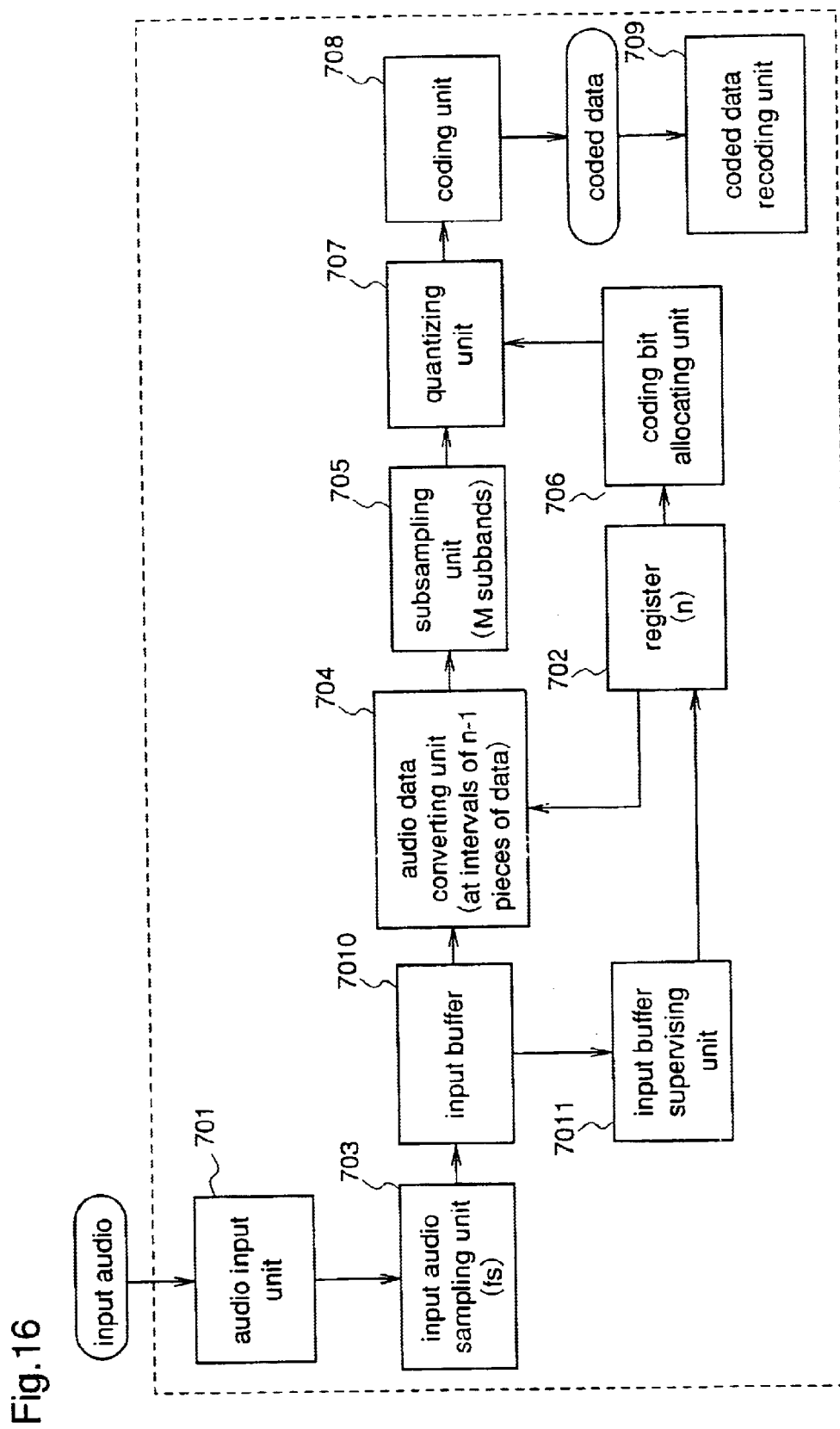
FIG. 16 is a block diagram illustrating a structure of an audio coding apparatus according to an embodiment 7 of the present invention.

FIG. 16 is a block diagram illustrating the structure of the audio coding apparatus according to the seventh embodiment of the present invention. As shown in the figure, this audio coding apparatus comprises: an audio input unit 701; a register 702; an input audio sampling unit 703; an audio data converting unit 704; a subsampling unit 705; a coding bit allocating unit 706; a quantizing unit 707; a coding unit 708; a coded data recording unit 709; an input buffer 7010; and an input buffer supervising unit 7011. This structure is equal to that of the audio coding apparatus of the fifth embodiment to which the input buffer 7010 and the input buffer supervising unit 7011 are added. The hardware structure of the coding apparatus of the seventh embodiment is also equal to that of the coding apparatus of the fifth embodiment shown in FIG. 11.

The input buffer 7010 is implemented primarily by a memory such as a main memory and stores data temporarily. The input buffer supervising unit 7011 is implemented by a CPU, a main memory and a program, and this unit checks the amount of the data held in the input buffer 7010 for temporary storage to make a comparison between the amount of this data and a predetermined value, and then changes a conversion constant n in the register 702 according to the result of the comparison. The register 702 is identical to the register 502 of the fifth embodiment except that the value of the stored conversion constant is changed by the input buffer supervising unit 7011. The input audio sampling unit 703 is identical to the input audio sampling unit 503 of the fifth embodiment except that this unit outputs the sampled audio data to the input buffer 7010. The audio data converting unit 704 is identical to the audio data converting unit 504 of the fifth embodiment except that this unit takes sampled audio data from the input buffer 7010 as processing object. Moreover, the audio input unit 701, the subsampling unit 705, the coding bit allocating unit 706, the quantizing unit 707, the coding unit 708, and the coded data recording unit 709 are identical to the respective units 501 and 505~509 of the fifth embodiment.

Figure 17:
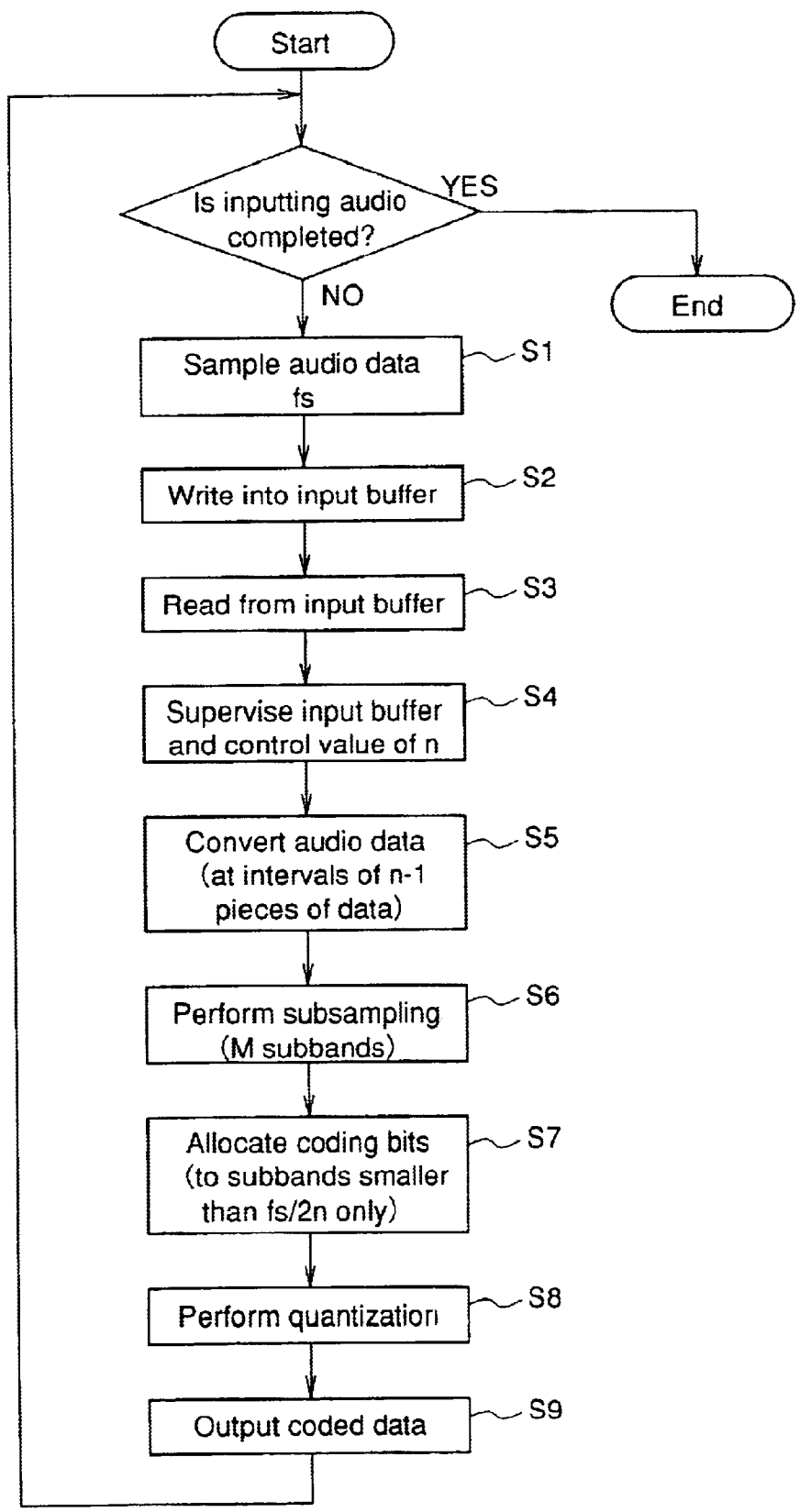
FIG. 17 is a flow chart illustrating a processing procedure of audio coding in the apparatus according to the embodiment 7.

FIG. 17 is a flow chart of the operation of the audio coding by the coding apparatus of the seventh embodiment. Hereinafter a description is given of the coding operation by the coding apparatus of the seventh embodiment with reference to FIG. 17, and additional reference to FIG. 16.

As in the case of the fifth embodiment, it is assumed that a set frequency fs is 48 KHz, which is a frequency defined by MPEGAudio, and a conversion constant n takes an initial value 1 which is predetermined according to the CPU performance and this value is stored in the register 702.

In step 1 of the flow of FIG. 17, the audio signal input from the audio input unit 701 is sampled by the input audio sampling unit 703 as in the fifth embodiment and, in step 2, the sampled audio data is written into the input buffer 7010 and temporarily stored. In step 3, th audio data converting unit 704 reads the temporarily stored, sampled audio data from the input buffer 7010. Subsequent to step 4 which is described later, step 5 of converting audio data to step 9 of outputting coded data are executed in the same way as steps 2 to 6 of the flow of FIG. 12 and thus a description of the operation in steps 5 to 9 will be omitted.

After the execution of step 3, in step 4, the input buffer supervising unit 7011 checks the amount of the data held in the input buffer 7010 to make a comparison between this amount of data and a predetermined value, and, according to the result of the comparison, changes a value of a conversion constant n which is stored in the register 702. Various methods can be used for supervising the input buffer to control the value of the conversion constant n and in this case, the following method is employed.

When the initial setting does not allow coding processing for input audio because of increased burden of CPU, reading for coding processing from the input buffer 7010 is performed at lessened rate although writing to the same buffer is performed at a fixed speed, resulting in increased amount of data.

When the amount of data in the input buffer 7010 exceeds a buffer full level BF which is predetermined, the input buffer supervising unit 7011 judges that the real-time coding processing is impossible at the present setting, and increases the value of the conversion constant n stored in the register 702 so that n=2. The subsequent steps 5~9 of this flow chart are performed in the following way. In step 5, data is sampled at intervals of one piece of data to convert the data into a form which consists of contiguous groups of two pieces of data of a same value, and in step 6, the data of such form is subsampled, whereby a part of the subsampling processing In step 6 can be reduced to one-second. Further, in step 7, coding bits are allocated only to the subbands less than a frequency fs/4 while coding bits are allocated to every subband in the other cases, thereby reducing the quantization processing in step 8. Thus, the input buffer supervising unit 7011 can reduce the burden of the CPU by changing the value of the conversion constant n.

In the repetition of the flow in FIG. 17, when the amount of data in the input buffer 7010 is still above the buffer full level BF in step 4, the input buffer supervising unit 7011 changes the conversion constant n in the register 2 so that n=3. Thereby, in step 5, the data is sampled at interval of two pieces of data such that the data comprises contiguous groups of three pieces of data of same value, whereby the part of the subsampling processing in step 6 is reduced to one-thirds, and at the allocation of coding bits to the respective subbands in step 7, it is the subbands less than the frequency fs/6 to which coding bits are allocated, resulting in reduction of quantization processing to one-sixth. The input buffer supervising unit 7010 continues to increase the value of the constant n in the register 2 until the amount of data in the input buffer 7010 becomes less than the buffer full level BF.

On the other hand, when the amount of data held in the input buffer 7010 is less than a buffer empty level BE which is predetermined, the input buffer supervising unit 7011 judges that the coding throughput is not exceeded. Since sampling to audio data and cutting high frequency components tend to be avoided with lower conversion constant and thus high-quality coded data can be obtained, the input buffer supervising unit 7011 reduces the value of the conversion constant n by 1 and thereafter, in the repetition of the flow of FIG. 17, the value of the conversion constant n stored in the register 702 is reduced by 1 until the amount of data in the input buffer 7010 exceeds the buffer empty level BE, as in the above-described case.

Although in the foregoing method the two values of the buffer full level BF and the buffer empty level BE are used to control the value of the conversion constant n, the buffer full level only may be used. In this case, the value of the conversion constant n is increased until the amount of data in the input buffer reaches a predetermined buffer full level BF and when the audio input becomes equal to the coding processing, that is, the amount of data reaches the BF, control is performed to stop the increment of the conversion constant n.

As described above, the audio coding apparatus of the seventh embodiment has the structure of the audio coding apparatus of the fifth embodiment to which the input buffer 7010 and the input buffer supervising unit 7011 are added. Therefore, sampled audio data is temporarily stored in the input buffer 7010 and then read for the following processing. Further, since the input buffer supervising unit 7011 checks the amount of data held in the input buffer 7010 and performs active control to the value of the conversion constant n stored in the register 702 corresponding to surrounding situation using the checked amount as an indicator for the coding throughput of CPU at this point in time, audio coding of highest quality can be realized which can be performed by the CPU at this point in time.

Embodiment 8

The audio coding apparatus according to an eighth embodiment of the present invention can perform coding corresponding to surrounding condition by changing conversion constant in correspondence to an amount of output data.

Figure 18:
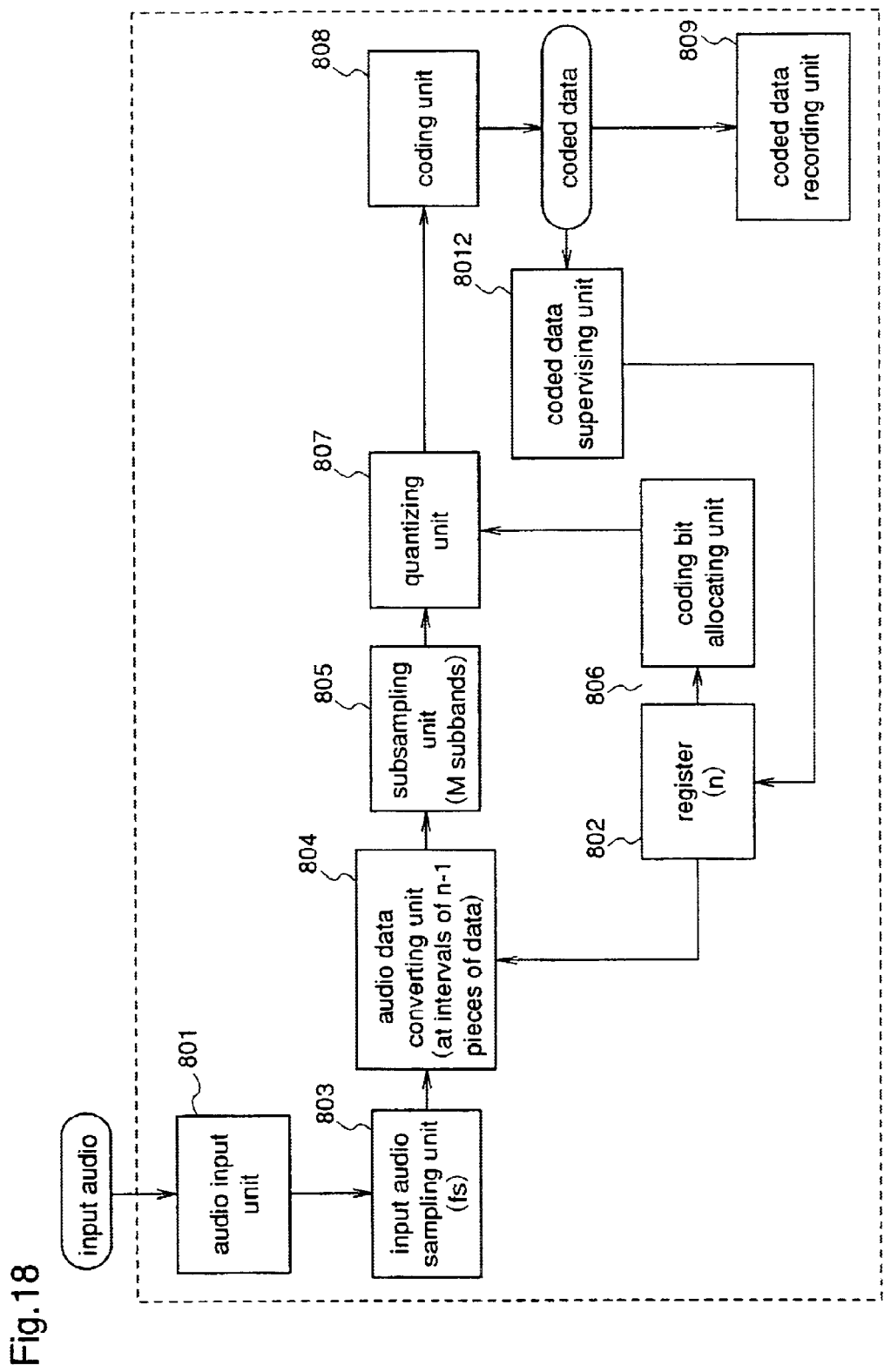
FIG. 18 is a block diagram illustrating a structure of an audio coding apparatus according to an embodiment 8.

FIG. 18 is a block diagram of the structure of the audio coding apparatus according to the eighth embodiment. As shown in the figure, this audio coding apparatus comprises: an audio input unit 801; a register 802; an input audio sampling unit 803; an audio data converting unit 804; a subsampling unit 805; a coding bit allocating unit 806; a quantizing unit 807; a coding unit 808; a coded data recording unit 809; and a coded data supervising unit 8012. This structure is identical to that of the audio coding apparatus according to the fifth embodiment to which the coded data supervising unit 8012 is added. The hardware structure of the coding apparatus of the eighth embodiment is identical to that of the coding apparatus of the fifth embodiment shown in FIG. 11.

The coded data supervising unit 8012 is implemented by a CPU, a main memory or a program and checks an amount of coded data per unit time, which data is output from the coding unit 808, and according to the result, changes a value of the conversion constant n in the register 802. The register 802 is identical to the register 502 of the fifth embodiment except that the value of the conversion constant stored within it is changed by th coded data supervising unit 8012. The audio input unit 801, the input audio sampling unit 803, the audio data converting unit 804, the subsampling unit 805, the coding bit allocating unit 806, the quantizing unit 807, the coding unit 808, and the coded data recording unit 809 are equal to the respective units 501 and 503 to 509 of the fifth embodiment.

Figure 19:
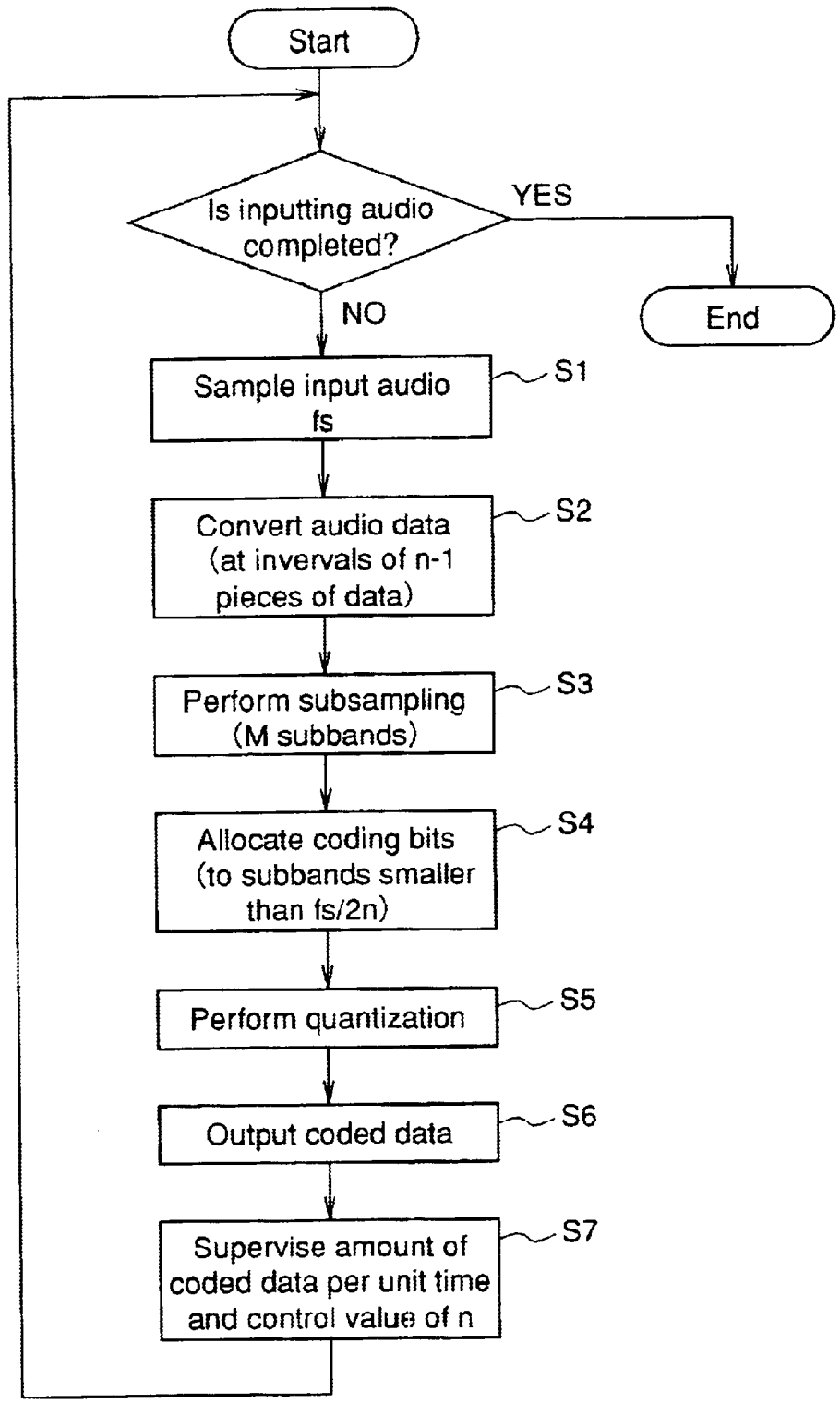
FIG. 19 is a flowchart illustrating a processing procedure of audio coding in the apparatus according to the embodiment 8.

FIG. 19 is a flow chart illustrating the operation of the audio coding performed by the coding apparatus of the eighth embodiment. Hereinafter the coding operation by the audio coding apparatus of the eighth embodiment will be described with reference to FIG. 19, and additional reference to FIG. 18.

As in the case of the fifth embodiment, it is assumed that sampling frequency fs is 48 KHz which is a frequency defined by MPEGAudio. Moreover, it is assumed that conversion constant n takes an initial value "1" predetermined corresponding to the CPU performance and the value is stored in the register 802.

Steps 1 to 6 of the flow of FIG. 19 are performed in the same way as steps 1 to 6 in the fifth embodiment. In step 7, the coded data supervising unit 8012 checks an amount of coded data output from the coding unit 808 in a unit of time to make a comparison between this amount of data and a predetermined value and, according to this result, changes the value of the conversion constant n in the register 802. Various methods may be employed for supervising the amount of coded data to control the value of th conversion constant n and in this case, the following method is selected from those methods.

When the initial setting does not allow necessary coding processing due to increased burden of the CPU, the rate of the coding processing is reduced, resulting in reduction in an amount of output coded data.

In step 7, when the amount of coded data does not reach a lowest coding level CL, the coded data supervising unit 8012 increases the value of the conversion constant n in the register 802 to reduce the burden of the CPU, as in the case of the input buffer supervising unit 7011 of the seventh embodiment. When the coding throughput per unit time is not less than highest coding level CH after completion of the steps shown in FIG. 19, the value of the conversion constant n in the register 802 is reduced for high-quality coding, as in the seventh embodiment. The coded data supervising unit 8012 in the eighth embodiment continues to change the value of the conversion constant n until the amount of coded data is judged as a being suitable. Moreover, as in the seventh embodiment, it is not necessary to use both the lowest coding level CL and the highest coding level CH and control may be performed using the lowest coding level CL only.

Although in the seventh and eighth embodiments, the input audio sampling unit obtains m pieces of sampled audio data by sampling with a sampling frequency fs, and then the audio data converting unit performs sampling to the sampled audio data at intervals of (n−1) pieces of data according to the fifth embodiment, the input audio sampling unit may perform sampling with a sampling frequency fs/n to obtain m/n pieces of sampled audio data and then the audio data converting unit converts this data to obtain m pieces of converted audio data as in the sixth embodiment, which can be executed easily by changing the setting in software. In this case, the same effects explained in the sixth embodiments are available including reduction in capacity of buffer memory and use of sound board which imposes restrict limit on sampling frequency.

In the fifth to eighth embodiments, coding causes deteriorated sound quality because sampling to audio data and elimination of high frequency components are substantially performed. Nevertheless, the coded data subjected to subsampling based on MPEGAudio can be formed in real time in software, with no additional hardware even if low-performance CPU is used, and the resulting data can be used as the data based on MPEG which is widely used as an international standard for coding motion pictures. Further, since sampling rate and proportion of high frequency component to be removed can be controlled according to the coding throughput of the CPU by adjusting a value of conversion constant, Coding can be performed at not only a high-performance CPU but a CPU with insufficient performance, with a sound quality corresponding to the coding throughput of the CPU for use. That is, coding processing can be performed using CPU of any performance level. In regard to the hardware, however, CPU of higher performance can realize high-quality coding, and a sound board of higher capability, and a faster data transmission rate within the apparatus enables high-quality coding of higher quality.

Further, audio coding performed in the fifth to eighth embodiments may be recorded in a recording medium as an audio coding control program and implemented using personal computer, workstation, and other units.

Furthermore, although in the fifth to eighth embodiments coding processing is performed using CPU, this processing may be implemented in software, using DSP in place of CPU.

Embodiment 9

An audio coding apparatus according to an ninth embodiment executes control to sampled data which is segmented in each period so as to decide whether data is processed in each period or not in accordance with a set constant, thereby processing burden can be reduced.

Figure 20:
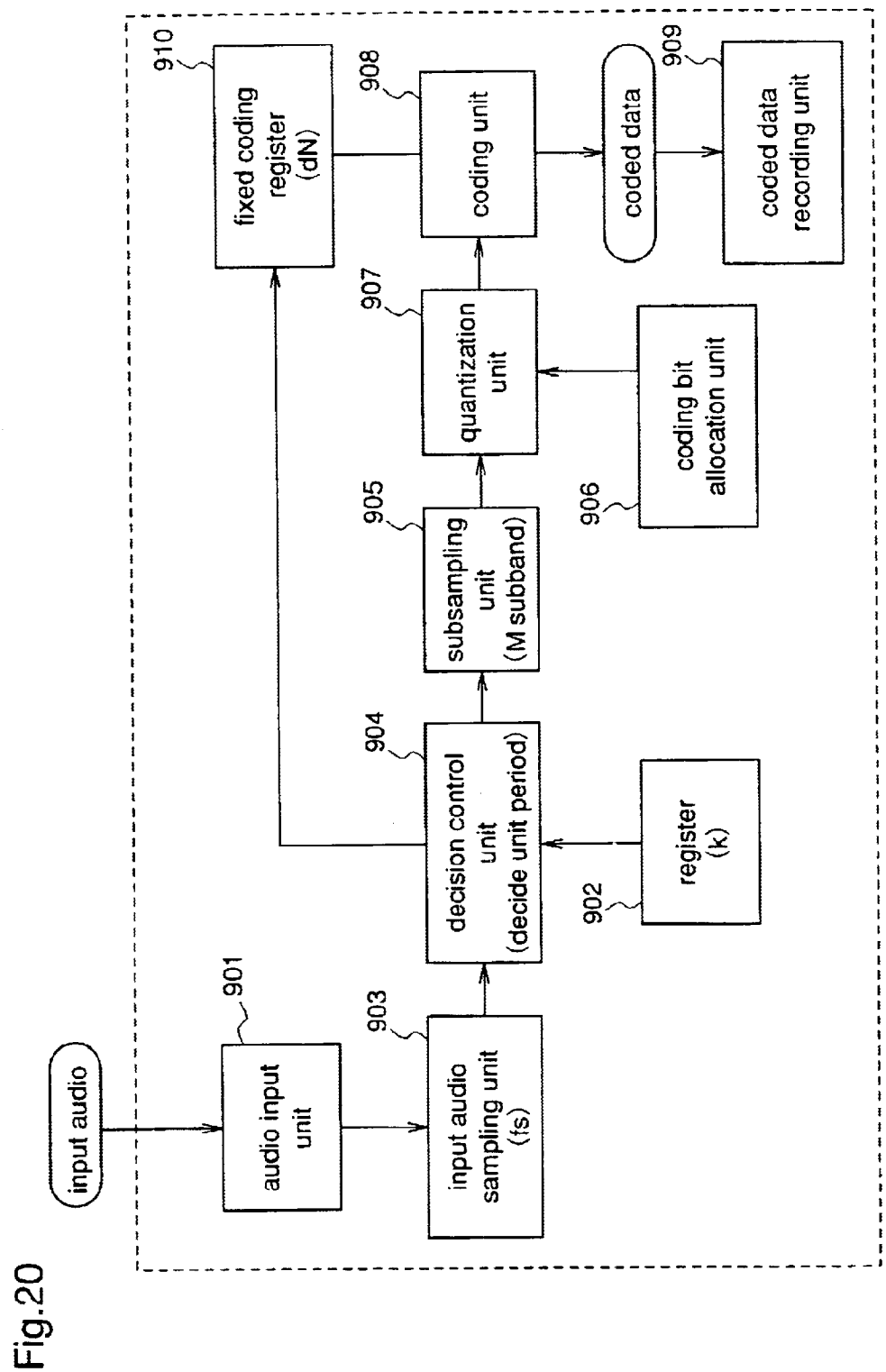
FIG. 20 is a block diagram illustrating a structure of an audio coding apparatus according to an embodiment 9 of the present invention.
Figure 21:
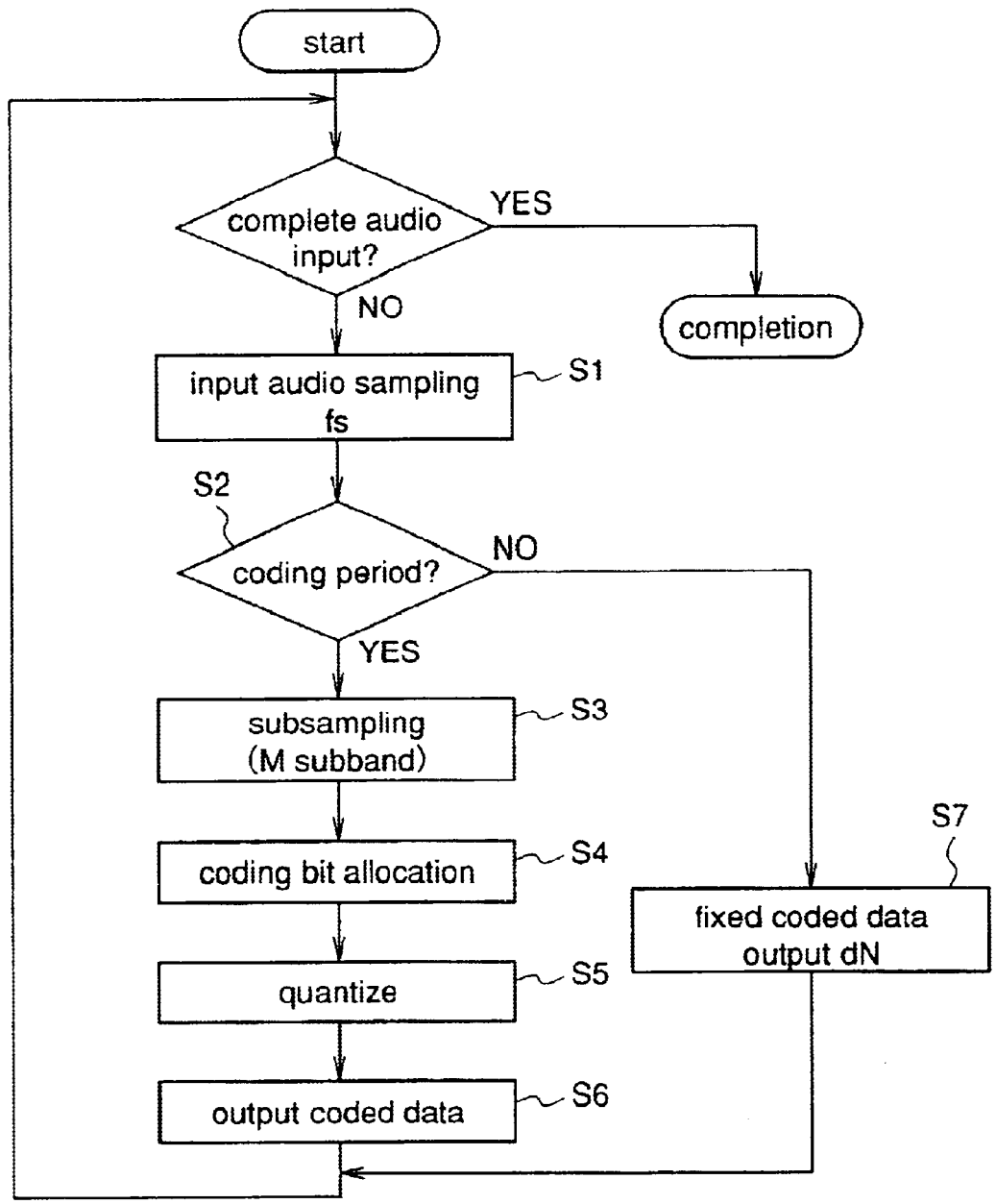
FIG. 21 is a flowchart illustrating a processing procedure of audio coding in the apparatus according to the embodiment 9.
Figure 22:
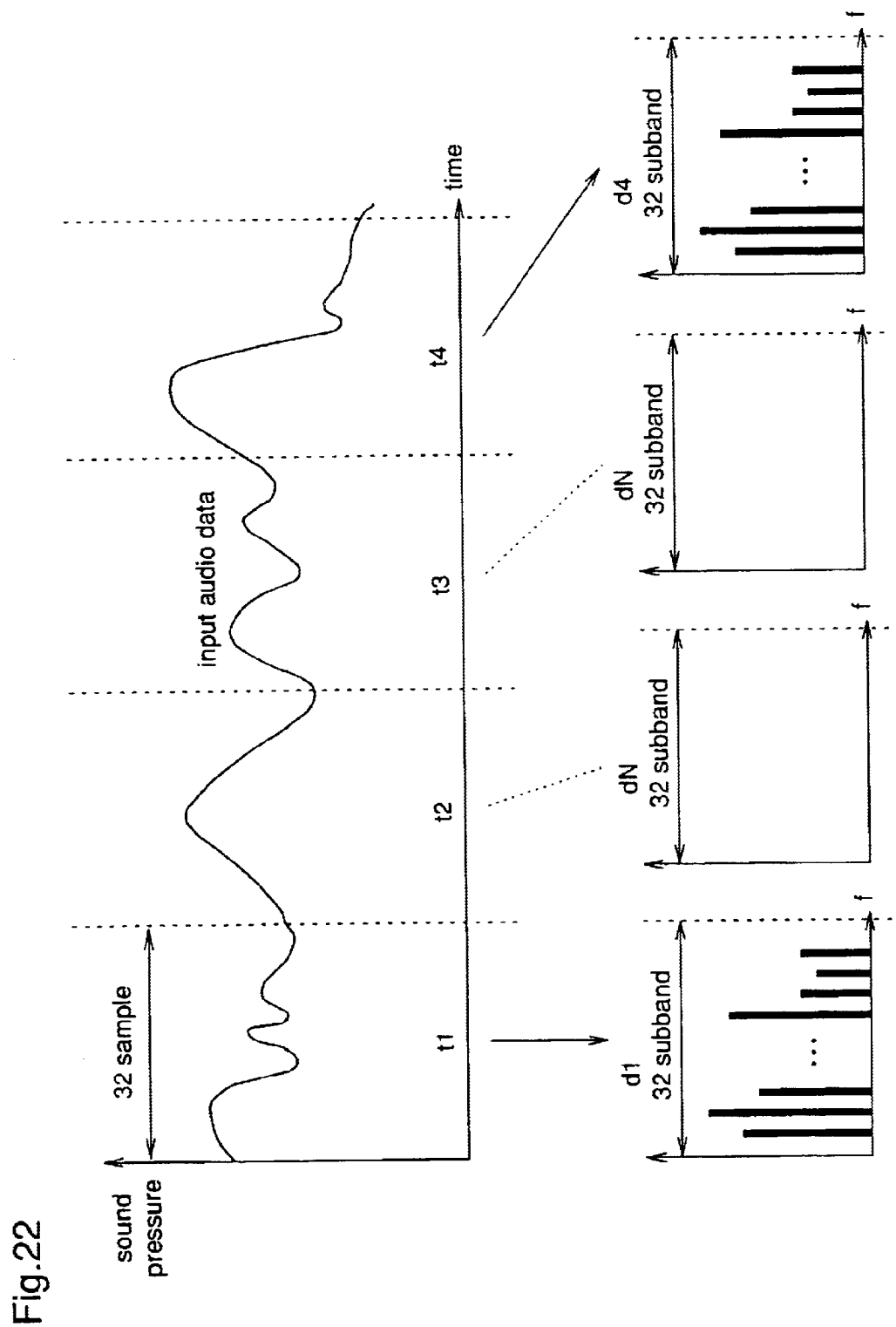
FIG. 22 is a diagram for explaining audio coding according to the embodiment 9.

FIG. 20 is a block diagram illustrating a structure of the audio coding apparatus according to the ninth embodiment. FIG. 21 is a flowchart of audio coding according to the ninth embodiment. FIG. 22 is a conceptual diagram for explaining audio coding according to the ninth embodiment. Hardware of the ninth embodiment is identical to that of the fifth embodiment and is described with reference to FIG. 11.

As shown in FIG. 20, the audio coding unit comprises an audio input unit 901, a register 902, an input audio sampling unit 903, a decision control unit (decide an unit period) 904, a subsampling unit 908, a coding unit 908, a coded data recording unit 909, and a fixed coding register 910.

The audio input unit is used for inputting audio to be coded. Audio may be input from the microphone as shown in FIG. 11 or may be line input. The unit period decision constant register 902 is realized in the main memory in FIG. 11 or in an external storage device and used for storing an unit period decision constant. The input audio sampling unit 903 is realized in the sound board (input) in FIG. 11 and control program and used for sampling the audio input from the audio input unit 901. The decision control means 904 is used for deciding whether the data sampled by the input sampling unit 903 is in a coding period or not using a constsnt stored in the register 902.

The subsampling unit 905 subsamples sampled data only when it is decided that the data is in the coding period by the decision control means 904. The coding bit allocation unit 906 is used for allocating coding bits to subbands divided by the subsampling unit 905. The quantization unit 907 performs quantization according to the number of bits allocated by the coding bit allocation unit 906. The coding means 908 is used for outputting a quantized value output from the quantization unit 907 as coded audio data. In this ninth embodiment, the coding unit 908 is used for outputting coded data dN corresponding to subband output zero stored in the fixed coding register 910 as coded audio data. The units 904 to 908 are all realized in the CPU, the main memory in FIG. 11, and program. The coded data recording unit 909 is realized in the external storage device in FIG. 11 and control program and used for recording coded data. The fixed coding register 910 is realized in the main memory or external storage device in FIG. 11 and used for storing the coded data dN corresponding to the subband output zero.

An operation of coding in the audio coding apparatus according to the ninth embodiment constructed above is described following a flowchart in FIG. 21 and with reference to FIGS. 20 and 22.

In step 1 in FIG. 21, audio signals input from the audio input unit 901 are sampled at a set sampling frequency fs by the input audio sampling unit 903, thereby the data sampled at frequency fs is output to te decision control unit 904. In step 2, the decision control unit 904 decides whether the sampled data is in the coding period or not.

In this decision, assuming that a period corresponding to the number of input audio samples p of one subsampling is an unit period ti, it is decided that each unit period is in the coding period or not. The unit period decision constant k for use in decision is preset to be integer (not smaller than 1) in the system and stored in the register 902. The decision is carried out in such a way that the unit period is in the coding period when i=n×k+1 (ti: unit period, n: arbitrary integer) and that it is not when i=n k+1.

In step 2, when it is decided that the unit period ti is in the coding period, steps 3 to 6 are performed as in the prior art. In step 3, the subsampling unit 905 divides audio data in the unit period ti into M frequency subbands. This step is performed as in the first prior art example which has been described with reference to FIGS. 56 and 57. In step 4, the coding bit allocation unit 906 allocates the number of coding bits to each subband and the allocation is transmitted to the quantization unit 907. In step 5, the quantization unit 907 quantizes audio data in the period ti for each subband divided by the subsampling unit 905 according to the number of allocated coding bits and outputs resulting quantized value. In step 6, the coding unit 908 constructs coded audio data using the quantized value from the quantization unit 907, and the coded audio data is recorded in the coded data recording unit 909.

Meanwhile, in decision step 2, when it is decided that the unit period ti is not in the coding period, subsampling, coding bit allocation, and quantization in steps 3 to 6 are not performed, step 7 is performed.

In step 7, the coding unit 908 obtains the fixed coded data dN from the fixed coding register 910 and outputs the same as coded data. The fixed coded data dN is preset in the fixed coding register 910 assuming output of each subband in subsampling to be zero. The coded audio data is recorded in the coding recording unit 909.

As shown in flow in FIG. 21, the steps are repeated while audio to be coded is being input and, on completion of input of audio, coding is completed.

Assume that the number of input audio samples P=32 and variable constant k=3. This is described with reference to FIG. 22. As shown in Figure, initial unit period t1 is the coding period, since i=1=0×3+1 (n=0). Sampled data in this unit period is divided into 32 subband signals, quantized and coded, resulting in coded data d1. In subsequent unit periods t2 and t3, since there is no n to satisfy i=n×k+1, t2 and t3 are not coding period, so that fixed coded data dN is output without performing the steps. The fixed coded data dN is preset assuming 32 subband signals to be zero. In unit period t4, since it is i=4=1×3+1 (n=1), it is coding period, in which sampled data is subsampled, quantized, and coded as in the t1 data, resulting in coded data d4. Thereafter, the same steps are performed.

In audio coding according to the ninth embodiment, between coded data d1 and d4 on the basis of the input audio, coded data including (K−1) data dN (zero output) is obtained. As shown in the first prior art example, in case of MPEG1Audio layer 1, 512 samples including 32 samples as a target are divided into 32 subbands and each subband audio data is output. Therefore, if the subband output in the period corresponding to 32 samples is coded as output zero and, thereafter it is decoded and reproduced, no discontinuity of sound occurs during the period and it is decoded and reproduced together with coded data of subband output in front and in rear. Therefore, envelope (time variation of audio) of reproduced audio is continuous and no significant degradation of sound quality is felt by human being.

Thus, in accordance with the audio coding apparatus according to the ninth embodiment, the apparatus comprises the register 902 for storing the unit period decision constant k, the decision control means 904 for deciding whether sampled data in the unit period is in the coding period or not on the basis of the unit period decision constant k, and the fixed coding register 910 for storing the fixed coded data as an alternative of coded data which is obtained by processing data in a period except the coding period. Therefore, processing beginning with subsampling is performed to only 1/k sampled data in the coding period and the fixed coded data dN is output as subsampling output zero without performing the processing to remaining sampled data which is not in the coding period. As a consequence, by setting the k, it is possible to reduce amount of processing to 1/k in each step (subsampling, coding bit allocation, quantization, and production of coded data).

A method of deciding the variable constant k may include setting of the constant by assuming fixed CPU for use in the apparatus, selecting the constant by CPU selection of the user among values which have been found in each CPU by performing simulation, or setting the constant on the basis of the result of operation for computing coding processing capability of CPU prior to coding.

As mentioned above, if there is a period of subband output zero, no discontinuity of reproduced sound occurs.

However, the longer the period is, the more significant degradation of sound is. Therefore, it is desirable to set the period of subband output zero to be 32 samples, that is, k=2. If it is necessary to carry out coding accepting the degradation of sound, real-time coding according to capability of the apparatus is possible by setting k to be larger.

Embodiment 10

Figure 23:
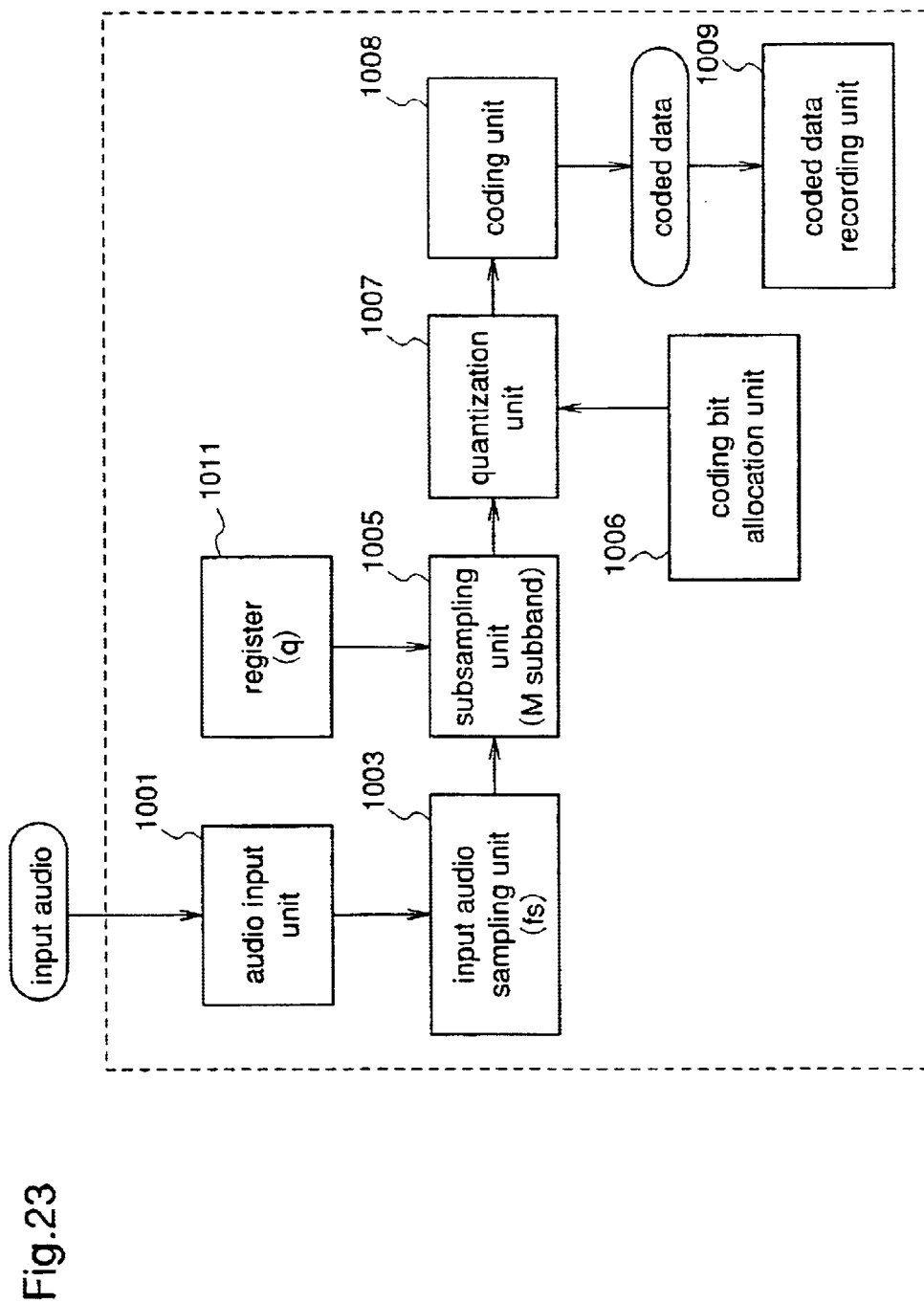
FIG. 23 is a block diagram illustrating a structure of an audio coding apparatus according to an embodiment 10 of the present invention.

An audio coding apparatus according to a tenth embodiment can reduce processing burden by omitting a part of operation in subsampling. FIG. 23 is a block diagram illustrating a structure of the audio coding apparatus according to the tenth embodiment. As shown in Figure, the audio coding apparatus comprises an audio input unit 1001, an input audio sampling unit 1003, a subsampling unit 1005, a coding bit allocation unit 1006, a quantization unit 1007, a coding unit 1008, a coded data recording unit 1009, and a register 1011. As in the ninth embodiment, the apparatus of the tenth embodiment has a hardware structure shown in FIG. 11.

In the Figure, the register 1011 is realized in the main memory or the external storage device and used for storing the operation decision constant for use in operation control in subsampling. The subsampling unit 1005 of the tenth embodiment includes an operation termination unit for obtaining a value of the operation decision constant from the register 1011 and terminating operation in subsampling.

The audio input unit 1001, the input audio sampling unit 1003, the coding bit allocation unit 1006, the quantization unit 1001, the coding unit 1008, and the coded data recording unit 1009 are identical to 901, 903, and 906 to 909 and will not be discussed.

Figure 24:
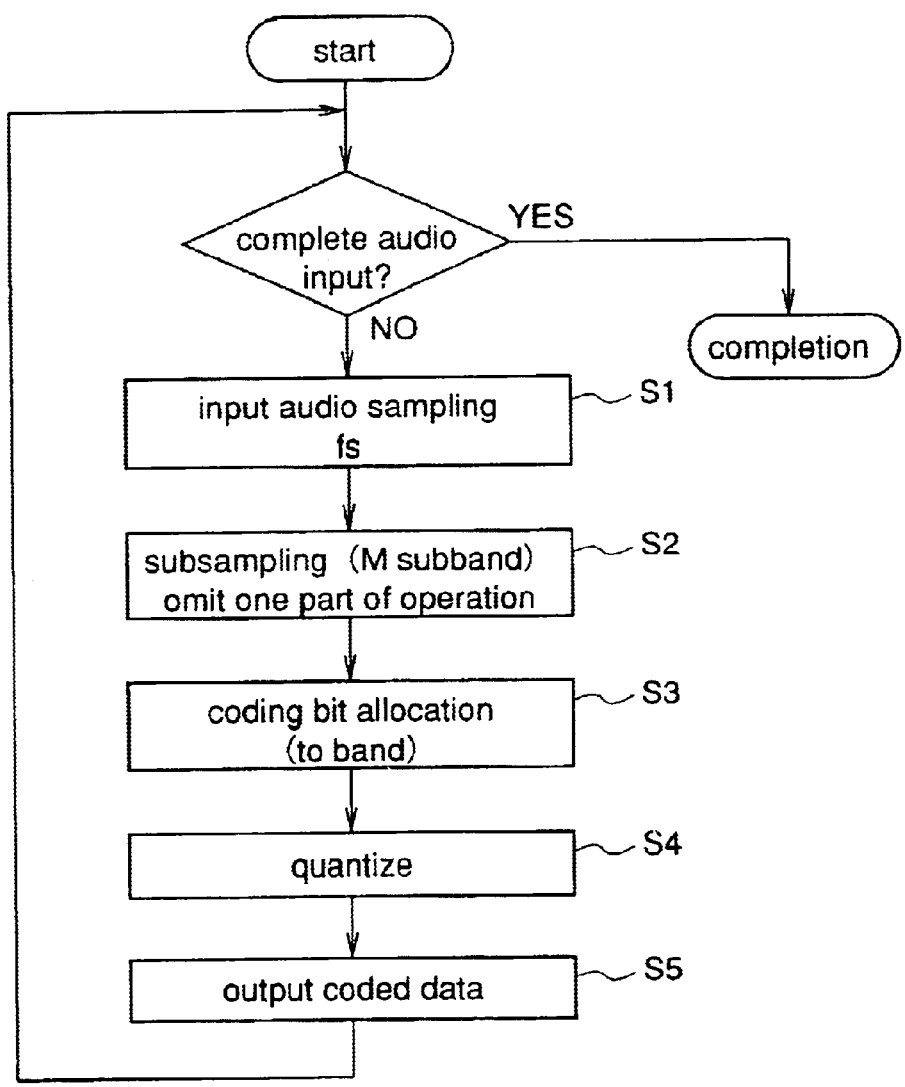
FIG. 24 is a flowchart illustrating a processing procedure of audio coding in the apparatus according to the embodiment 10.
Figure 25:
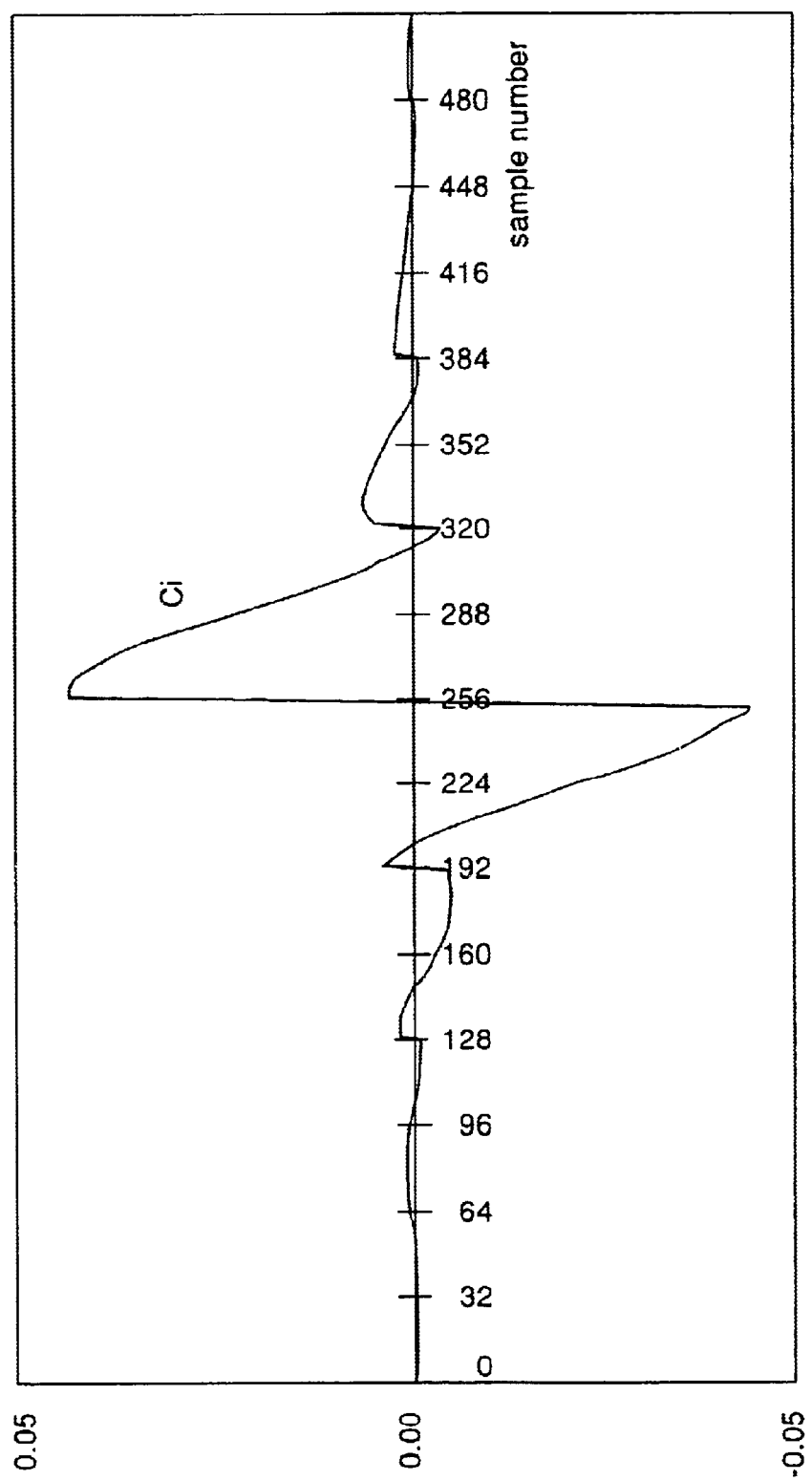
FIG. 25 is a diagram illustrating a coefficient Ci in an operation formula of basic low-pass filter in subsampling according to the embodiment 10.

FIG. 24 is a flowchart of audio coding in the audio coding apparatus according to the tenth embodiment. FIG. 25 is a diagram illustrating a coefficient for use in operation of basic low-pass filtering. An operation of the audio coding apparatus of the tenth embodiment is described following FIG. 24 and with reference to FIGS. 23 and 25.

Step 1 in FIG. 24 is performed as in the embodiment 9. The audio signals input from the audio input unit 1001 is sampled by the input audio sampling unit 1003, resulting in sampled data.

In step 2, sampled data is subsampled by the subsampling unit 1005. As shown in the ninth embodiment, in MPEG1Audio subsampling, 512 samples including 32 samples as a target are divided into 32 subbands and each subband audio data is output. For this processing, the basic low-pass filtering is performed. In this basic low-pass filtering, the following formulas (1), (2), and (3) are performed.

$$Zi = Ci \times Xi \quad (i = 0 \sim 511) \quad (1)$$

$$Yi = \sum_{j=0}^{7} Z64j + i \quad (i = 0 \sim 63) \quad (2)$$

$$Si = \sum_{k=0}^{63} Yk\cos((2i+1)(k-6)\pi 64) \quad (i = 0 \sim 31) \quad (3)$$

In the formula (1), multiplication is performed to 512 (i=0 to 511) input audio data $Xi$ using $Ci$. The coefficient $Ci$ is obtained from a coefficient table showing contrast between sample number and coefficient according to MPEG audio standard. In FIG. 25, a graph indicating this is shown. The graph shows that the $Ci$ is close to 0 at both ends. The formula (1) is multiplication one. Therefore, as the $Ci$ is closer to 0, product $Z1$ is closer to 0. In the formula (2), only addition of $Zi$ obtained in the formula (1) is performed. Therefore, a term whose coefficient $Ci$ is close to 0 is less contributory and for the term, it is not necessary to find $Zi$ for addition.

In the formula (1), for the term whose coefficient $Ci$ is close to 0, that is, i is close to 0 or 511, operation for finding $Zi$ is not performed and $Zi=0$. Also, in the formula (2), if operation of subsampling is performed without performing addition of a term corresponding to $Zi=0$. As a result, amount of operation can be reduced, though precision in subsampling is somewhat degraded.

In this case, as shown in FIG. 25, $Ci$ changes in 32 as a unit. Therefore, it is desirable to decide an interval of termination of the operation in 32. Therefore, an interval during which operation is performed is represented by i=32q to i=32 (8−q)+255. The operation decision constant q is preset according to performance of the apparatus and stored in the register 1011 as integer to satisfy $0 \leq q \leq 7$. By limiting the interval of the operation, it is possible to omit operation processing by q×1/8=q/8. As a result, the larger the operation decision constant q is, processing burden on operation can be reduced.

In step 2 in FIG. 24, after subsampling is performed by omitting a part of operation, resulting subband signals are to be processed. Subsequent steps including step 3 are identical to those of the first prior art and will not be discussed.

Thus, in accordance with the audio coding apparatus according to the tenth embodiment, the apparatus comprises the register 1011 for storing the operation decision constant q and the subsampling unit 1005, the subsampling unit 1005 omitting operation of the basic low-pass filtering of a part of samples in subsampling on the basis of the operation decision constant q. As a consequence, by controlling the operation decision constant q, operation in the susampling unit can be reduced by about q/8. Therefore, when it is difficult or impossible to perform real-coding to input audio due to lack of CPU performance in the prior art, burden is reduced by setting the operation decision constant q, thereby real-time processing is realized.

Decision of the operation decision constant q is similar to that of the unit period decision constant in the ninth embodiment.

Embodiment 11

Figure 26:
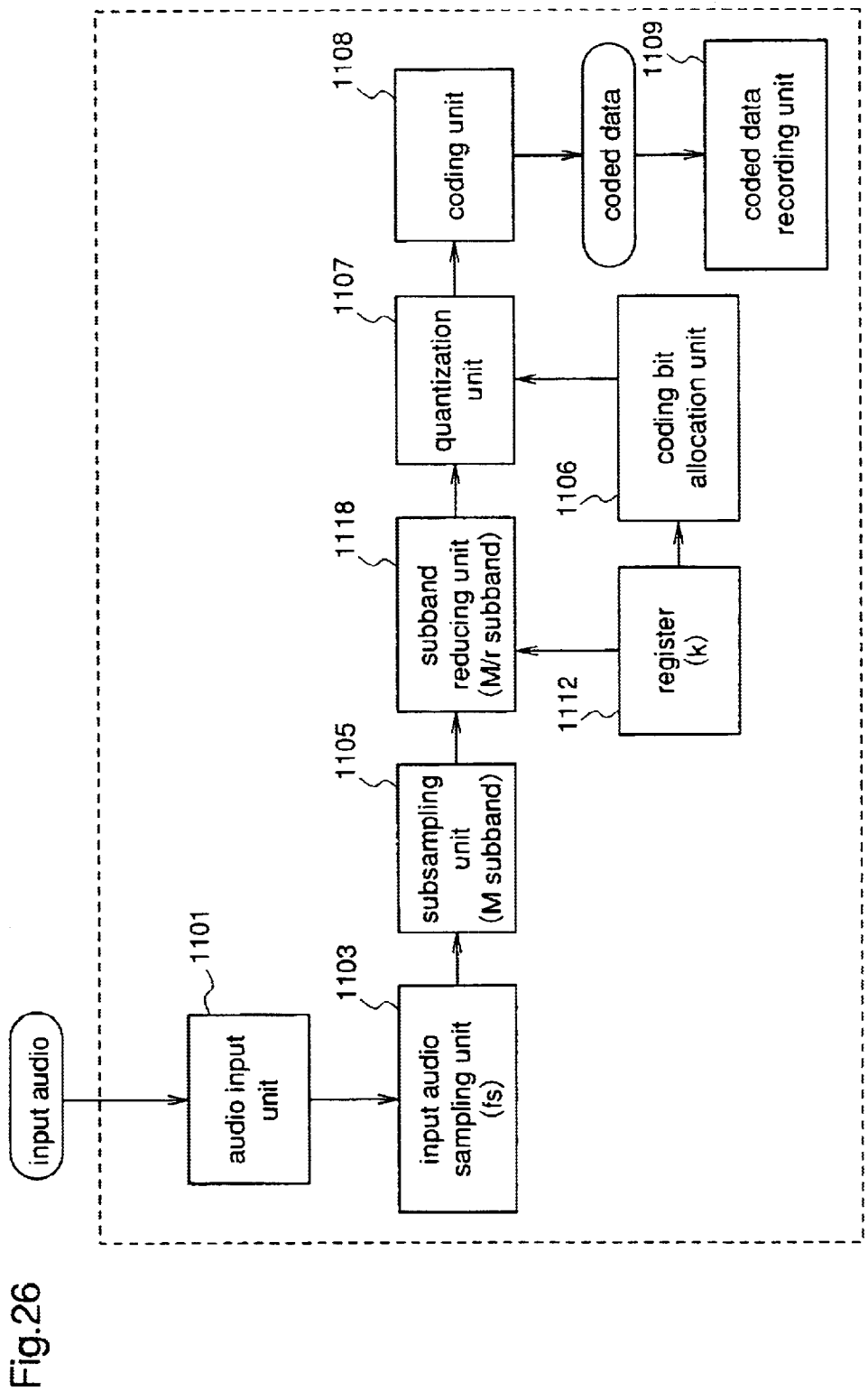
FIG. 26 is a block diagram illustrating a structure of an audio coding apparatus according to the embodiment 11.

An audio coding apparatus according to an eleventh embodiment can reduce processing burden by omitting processing in subsequent steps to one part of subsampled signals. FIG. 26 is a block diagram illustrating a structure of the audio coding apparatus according to the eleventh embodiment. As shown in Figure, the audio coding apparatus comprises an audio input unit 1101, an input audio sampling unit 1103, a subsampling unit 1105, a coding bit allocation unit 1106, a quantization unit 1107, a coding unit 1108, a coded data recording unit 1109, a register 1112, and a subband reducing unit 1118. As in the ninth embodiment, the apparatus of the eleventh embodiment has a hardware structure shown in FIG. 11.

In Figure, the subband selecting constant register 1112 is realized in main memory or external storage device and used for storing a subband selecting constant. The subband reducing unit 1118 is realized in CPU, main memory, and program and used for selectively performing selection from the subband signals divided by the subsampling unit 1105 on the basis of the subband selecting constant stored in the register 1112. The audio input unit 1101, the input audio sampling unit 1103, the subsampling unit 1105, the coding bit allocation unit 1106, the quantization unit 1107, the coding unit 1108, and the coded data recording unit 1109 are identical to 901, 903, and 906 to 909 and will not be discussed.

Figure 27:
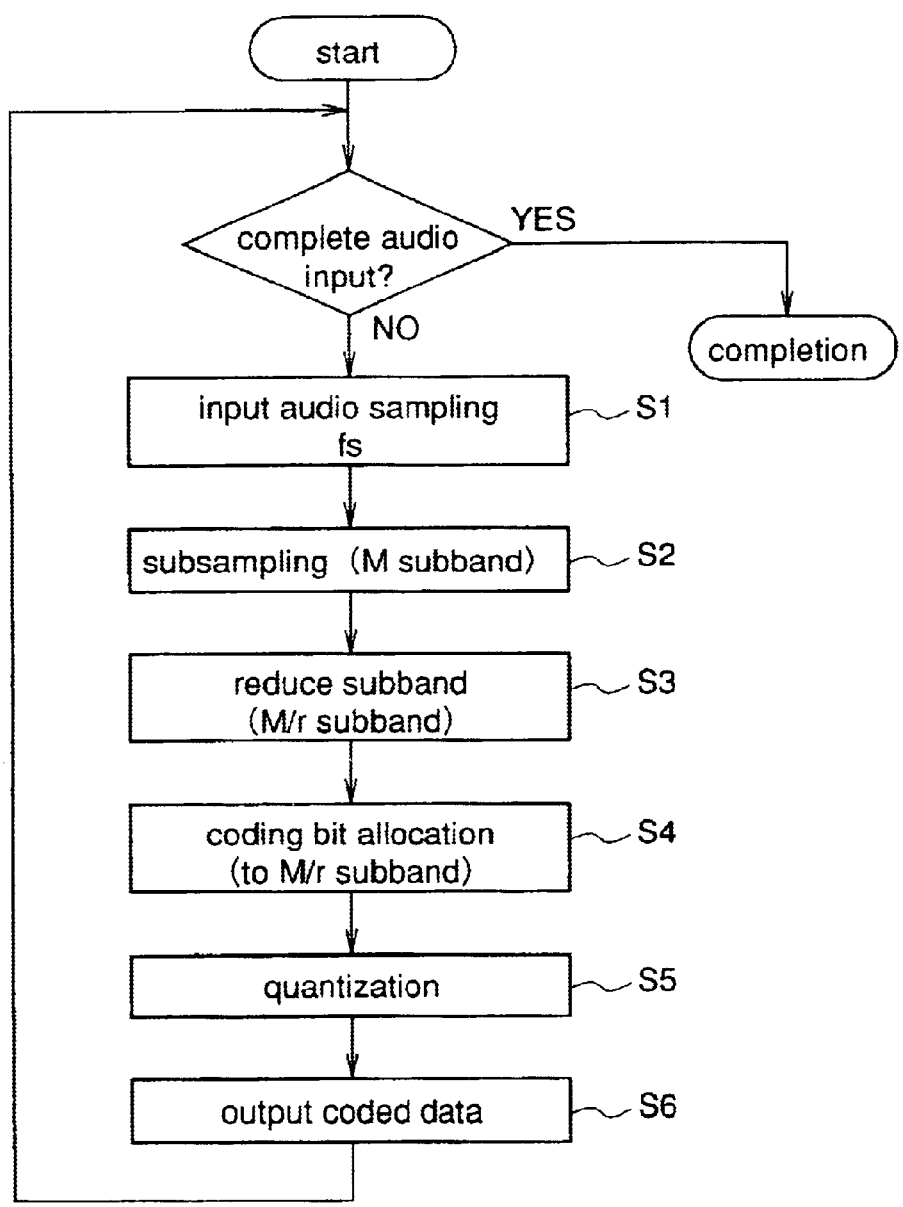
FIG. 27 i a flowchart illustrating a processing procedure of audio coding in the apparatus according to the embodiment 11.
Figure 28:
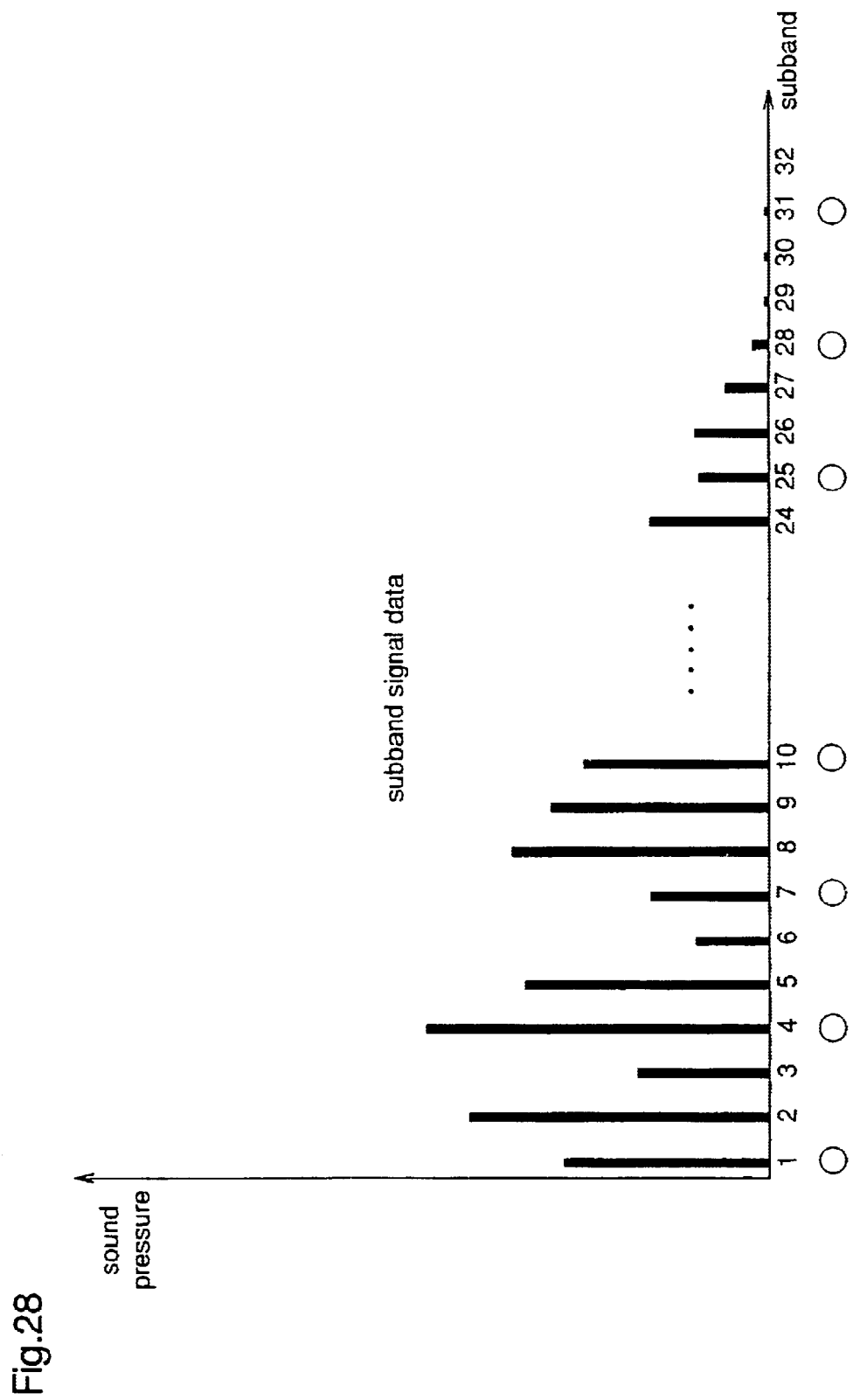
FIG. 28 is a diagram for explaining reduction of subbands in audio coding according to the embodiment 11.

FIG. 27 is a flowchart of audio coding according to the eleventh embodiment. FIG. 28 is conceptual diagram for explaining audio coding according to the eleventh embodiment. An operation of the audio coding apparatus of the eleventh embodiment is described following FIG. 27 and with reference to FIGS. 26 and 28.

Steps 1 to 2 in FIG. 27 is performed as in the ninth embodiment. Audio signals input from the audio input unit 1101 are sampled by the input audio sampling unit 1103 and resulting sampled data is divided into M frequency subbands by the subsampling unit 1105, resulting in M subband signal data.

In step 3, the subband reducing unit 1118 obtains the subband selecting constant r from the register 1112, selectively obtains each r subband signal data among M subband signal data output from the subsampling unit 1105, and extracts M/(r+1) subband signal data in total. The r is preset according to performance of the apparatus and stored in the register 1112. In this case, when r=2, subband signal data with 0, each of which is marked skipping two subband signal data, is extracted as shown in FIG. 28.

The subband reducing unit 1118 outputs the extracted M/(r+1) subband signal data is output to the quantization unit 1107.

In step 4, the coding bit allocation unit 1106 decides the number of coding bits to be allocated only to the subbands extracted in step 3 on the basis of the subband decision constant from the register 1112. The decided number of coding bits allocated to M/(r+1) subbands is sent from the coding bit allocation unit 1106 to the quantization unit 1107. Subsequent steps including step 5 is performed to the M/(r+1) data as in the first prior art example.

Thus, in accordance with the audio coding apparatus according to the eleventh embodiment, the apparatus comprises the register 112 for storing the subband selecting constant r and the subband reducing unit 1118, which extracts M/(r+1) subband signal data from M subband signal data resulting from subsampling and subsequent steps are performed to the extracted data. Therefore, control of the subband selecting constant r can reduce allocation of coding bits and quantization to about 1/r. Note that $r \geq 1$ goes for the case and r=0 never changes processing burden. Therefore, when it is difficult or impossible to perform real-coding to input audio due to lack of CPU performance in the prior art, burden is reduced by setting the subband selecting constant r, thereby real-time processing is realized.

Decision of the subband selecting constant r is similar to that of the unit period decision constant in the ninth embodiment.

Embodiment 12

An audio coding apparatus according to a twelfth embodiment of the present invention supervises amount of input data and changes a control constant according to the amount of data.

Figure 29:
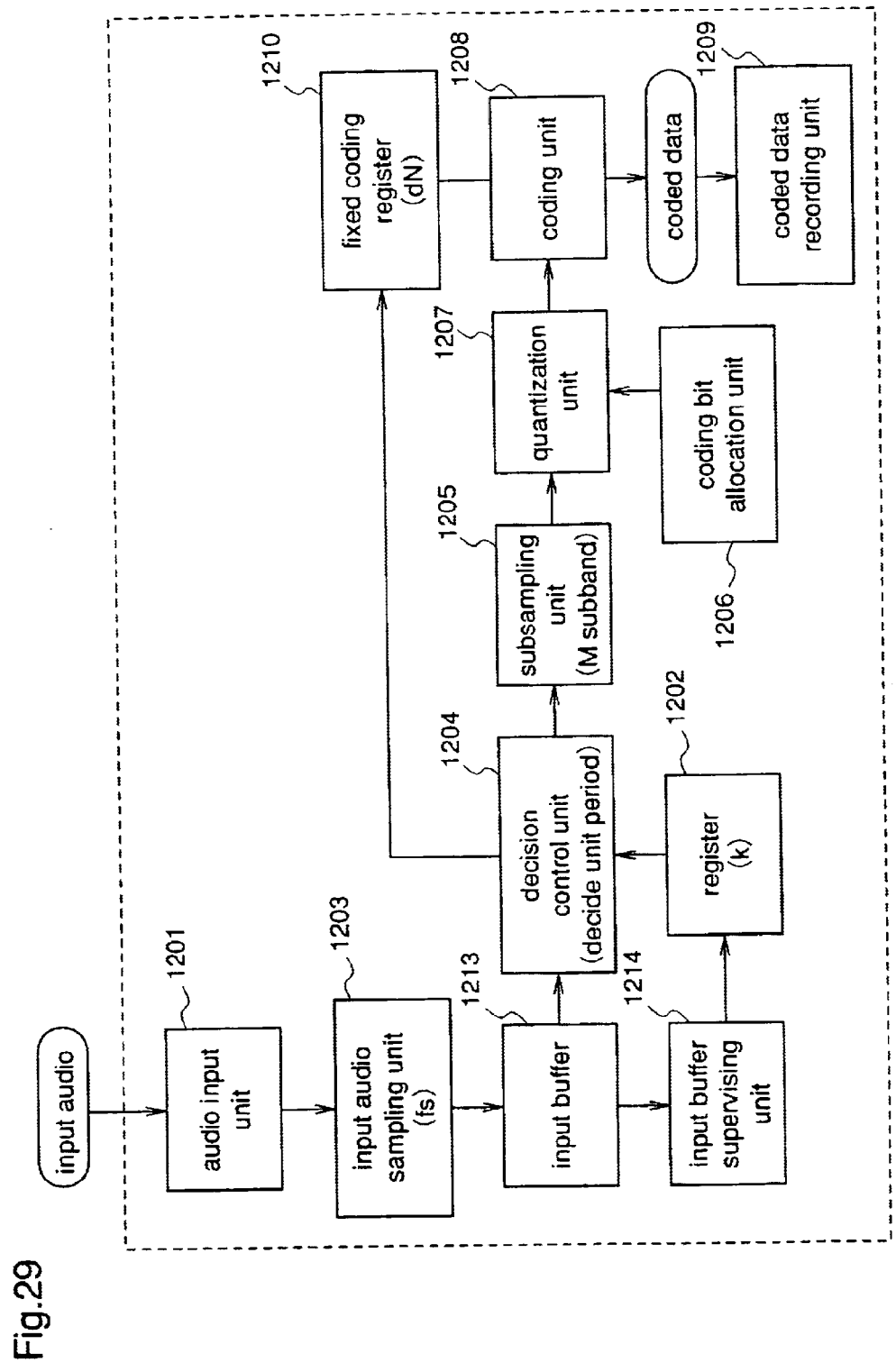
FIG. 29 is a diagram illustrating structure of an audio coding apparatus according to an embodiment 12.

FIG. 29 is a block diagram illustrating a structure of the audio coding apparatus according to the twelfth embodiment. As shown in Figure, the audio coding apparatus comprises an audio input unit 1201, an input audio sampling unit 1203, a decision control unit (unit period decision) 1204, a subsampling unit 1205, a coding bit allocation unit 1206, a quantization unit 1207, a coding unit 1208, a coded data recording unit 1209, a fixed coding register 1210, input buffer 1213, and an input buffer supervising unit 1214. In this embodiment, the input buffer 1213 and the input buffer supervising unit 1214 are added to the structure of the ninth embodiment. As in the ninth embodiment, the apparatus of the twelfth embodiment has a hardware structure shown in FIG. 11.

In FIG. 29, the input buffer 1213 is realized in a memory such as a main memory and used for temporarily storing data. The input buffer supervision unit 1214 is realized in CPU, a main memory and a program and used for checking the amount of data held in the input buffer 1213, comparing the amount of data with a preset value, and changing the value of constant k of the register 1202 on the basis of comparison result. The register 1202 is identical to the register 902 in the ninth embodiment except that the value of constant is changed by the input buffer supervising unit 1214. The input audio sampling unit 1203 is identical to the input audio sampling unit 903 in the ninth embodiment except that sampled audio data is output to the input buffer 1213. The decision control unit (unit period decision) 1204 is identical to the decision control unit 904 in the ninth embodiment except that sampled audio data is fetched from the input buffer 1213. The audio input unit 1201, the subsampling unit 1205, the coding bit allocation unit 1206, the quantization unit 1207, the coding unit 1208, the coded data recording unit 1209, and the fixed coding register 1210 are identical to 901, and 905 to 910 of the ninth embodiment.

Figure 30:
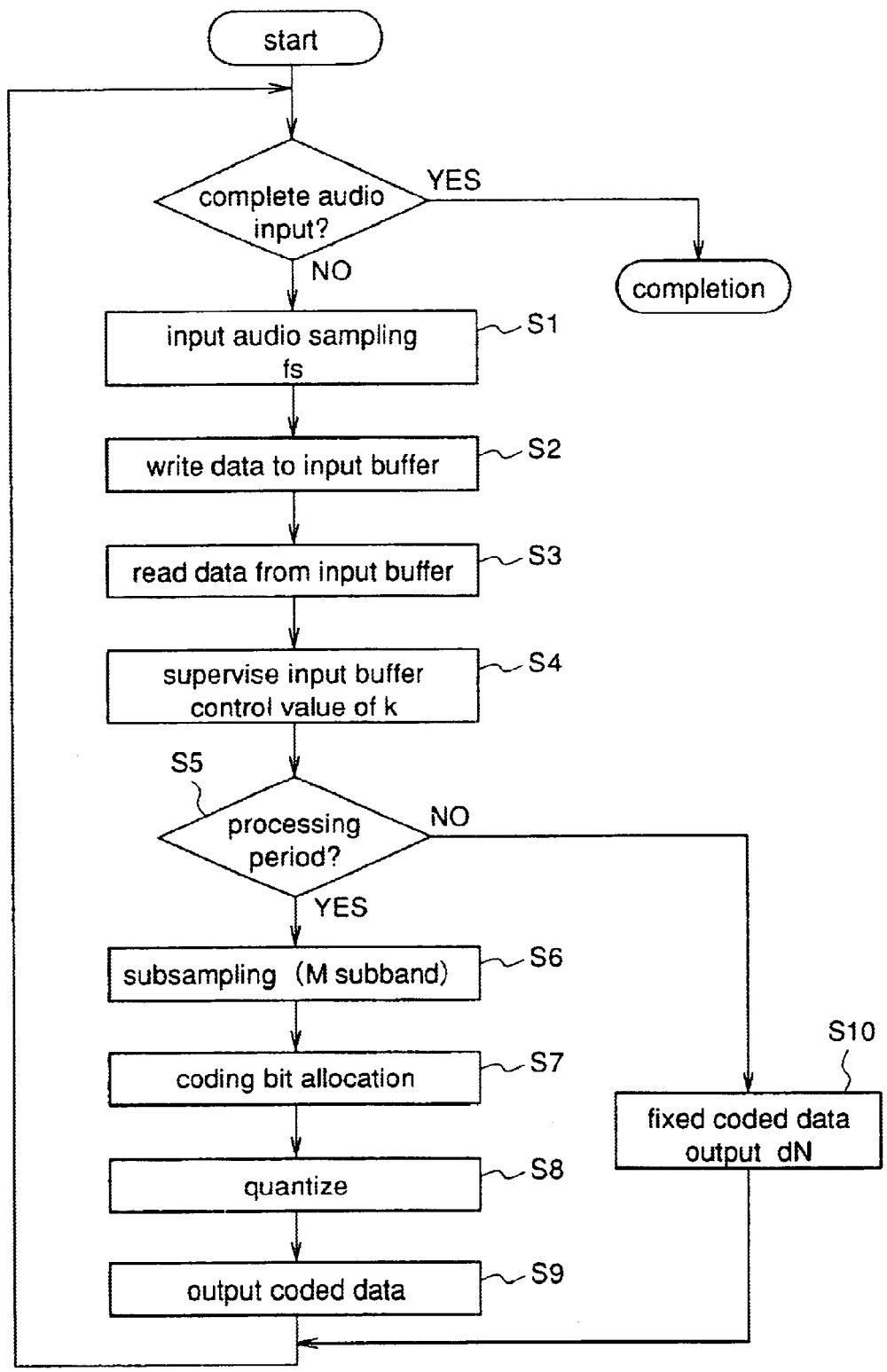
FIG. 30 is a flowchart illustrating a processing procedure of audio coding in the apparatus according to the embodiment 12.

FIG. 30 is a flowchart illustrating audio coding according to the twelfth embodiment. An operation of audio coding according to the twelfth embodiment is described following flowchart in FIG. 30 and with reference to FIG. 29. As the unit period decision inconstant k, "2" that is predetermined on the basis of CPU performance is stored in the register 1202 as initialization.

In step 1, in FIG. 30, audio signals input from the audio input unit 1201 are sampled by the input audio sampling unit 1203 as in the ninth embodiment. In step 2, sampled data is written onto the input buffer 1213, to be temporarily stored therein. In step 3, the decision control unit 1204 reads temporarily stored sampled data from the input buffer 1213.

Subsequent step 4 will be described later. Decision in step 5 is performed to data that has been read by the decision control unit 1204 as in the ninth embodiment. Thereafter, steps 9 and 10 are identical to steps 3 to 6 and step 7 in FIG. 41 in the ninth embodiment and will not be discussed. By executing these steps, subsampling, according to the constant k (in this case k=2), coding bit allocation, and quantization are performed to unit period t1, t3, ... and these processing are not performed to t2, t4 ..., thereby coding is realized with reduced processing burden.

In this twelfth embodiment, in step 4 subsequent to step 3, the input buffer supervising unit 1214 checks amount of data in the input buffer 1213, compares the amount of data with preset value, and changes the value of constant k stored in the register 1202 on the basis of the comparison result. Control of the value of constant k may be performed using various methods. Herein, this is performed as follows.

When it is impossible to perform coding in real time to input audio in initialization, to the input buffer 1213, data is written thereto at the same pace, whereas data is read therefrom at a lower pace with delay in coding. Accordingly, amount of stored data is increased.

The input buffer supervising unit 1214 decides that real-time coding is impossible in initialization when amount of data in the input buffer 1213 is more than buffer level BF as a preset value, and changes the value of constant k stored in the register 1202 into K=3 by increasing it by 1.

In steps 5 to 9, subsampling, coding bit allocation, and quantization are not performed to periods t2 and t3 and preset coded data dN is output as subband output 0. In case of k=2, by omitting subsampling, coding bit allocation, and quantization every two continuous processings, processing burden is reduced to about ½. Furthermore, by setting k=3, and thereby omitting these processings in twice in every three times, the processing burden is further reduced to about ⅓. In this way, the input buffer supervising unit 1214 changes the value of constant k, thereby load on CPU is reduced and it is possible to continue real-time processing with lower quality of sound.

In step 4, when the amount data in input buffer 1213 is still more than BF, the input buffer supervising unit 1214 changes the value of constant k into k=4 by further increasing it by 1. In steps 5 to 9, subsampling, coding bit allocation, and quantization are not performed to periods t2 to t4 and preset coded data dN is output as subband output 0, thereby load on processing is reduced about ¼. Thereafter, until amount of data in the input buffer becomes not more than BF, the input buffer supervising unit 1214 increases the value of K.

On the other hand, when CPU has still reserve capability after real-time coding to input audio with reduced burden on CPU, data read from the input buffer 1213 is increased, so that amount of stored data is reduced and finally, only little amount of data is stored for a short time.

In step 4, when amount of data in the input buffer 1213 is less than buffer empty level BE (preset value), the input buffer supervising unit 1214 decides that CPU has reserve capability. The smaller the constant k is, the more time of subband output 0 is reduced and the higher quality data is obtained. Therefore, the input buffer supervising unit 1214 reduces the value of k by 1 and, until amount of data in the input buffer 1213 becomes not less than BE, the input buffer supervising unit 1214 reduces the value of K by 1 in step 4 in repetition of flow in FIG. 30.

In the above method, buffer level BF and buffer empty level BE are used to control the value of constant k. Alternatively, only buffer level BF may be used. In this case, the constant k is increased until amount of data in the input buffer reaches preset buffer level BF and, when audio input and coding are balanced, that is, amount of data reaches BF, control is executed so as to stop increasing the constant k.

Thus, the audio coding apparatus according to the twelfth embodiment further comprises the input buffer 1213 and the input buffer supervising unit 1214, compared with the audio coding apparatus of the ninth embodiment. The sampled data is temporarily stored in the input buffer 1213 and then read to be processed and the input buffer supervising unit 1214 dynamically controls the value of the unit period decision constant k stored in the register by checking amount of data in the input buffer 1213. Therefore, in addition to real-time coding according to basic performance of CPU, audio coding with the highest quality at that point of time is realized, handling variations of processing capability of CPU.

Therefore, in case which audio coding is performed under multi task using general purpose personal computer as an audio coding apparatus, real-time coding is realized handling variations of CPU capability due to another task.

In this embodiment, the input buffer 1213 and the input buffer supervising unit 1214 are added to the audio coding apparatus of the ninth embodiment. Alternatively, these units may be added to the apparatus of the tenth embodiment and, control of the operation decision constant q increases/reduces amount of operation of the basic low-pass filtering. As a consequence, it is possible to reduce processing burden and improve quality of sound of coded data. Similarly, these units may be added to the apparatus of the eleventh embodiment. Control of the subband selecting constant r increases/reduces subband signal data that is selectively extracted. As a consequence, it is possible to reduce processing burden and improve quality of sound of coded data.

Embodiment 13

An audio coding apparatus according to a thirteenth embodiment of the present invention supervises amount of output data and changes a control constant according to the amount of output data.

Figure 31:
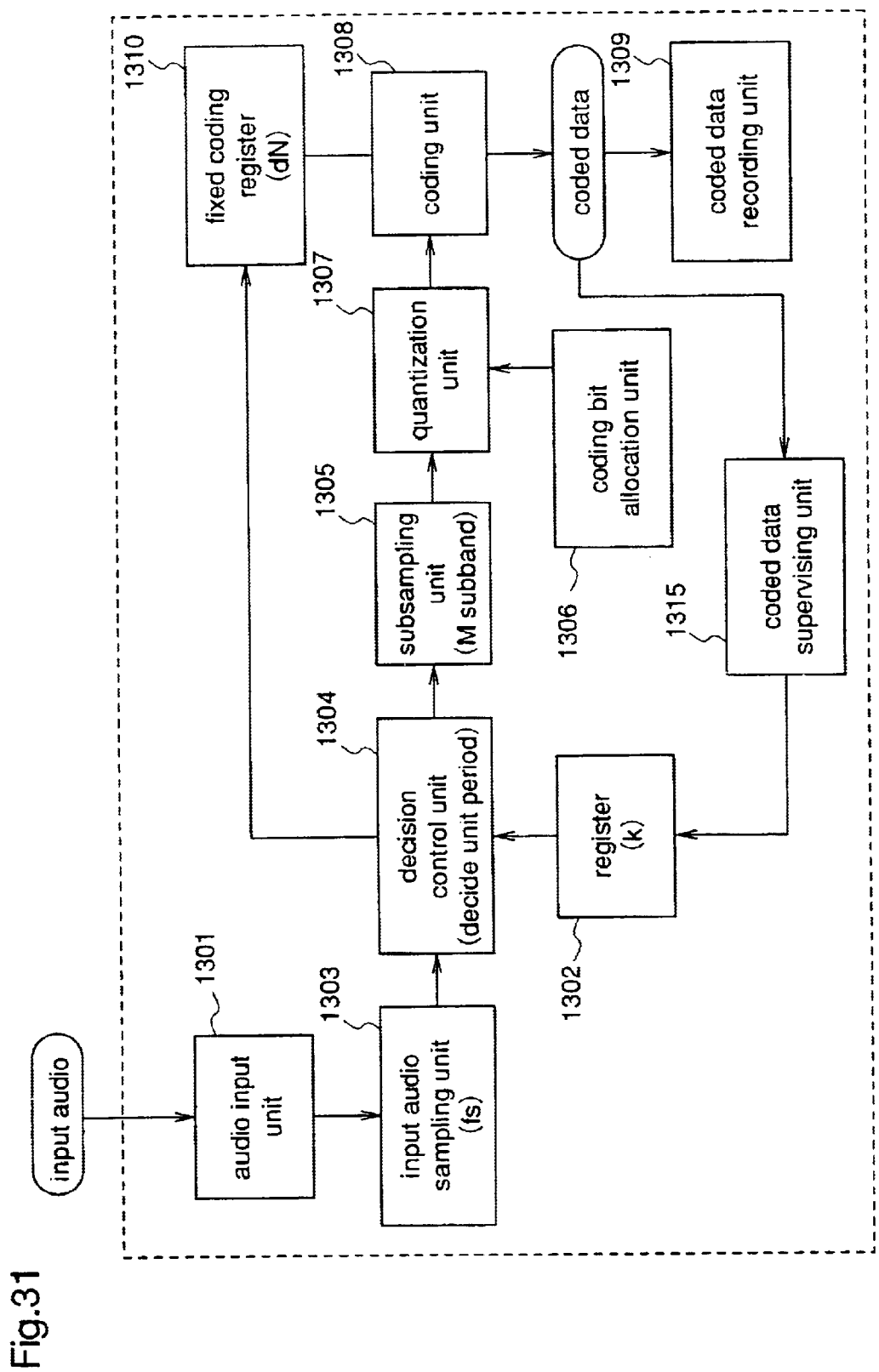
FIG. 31 is a block diagram illustrating a structure of an audio coding apparatus according to an embodiment 13 of the present invention.

FIG. 31 is a block diagram illustrating a structure of the audio coding apparatus according to the thirteenth embodiment. As shown in Figure, the audio coding apparatus comprises an audio input unit 1301, a register 1302, an input audio sampling unit 1303, a decision control unit 1304, a subsampling unit 1305, a coding bit allocation unit 1306, a quantization unit 1307, a coding unit 1308, a coded data recording unit 1309, a fixed coding register 1310, and a coded data supervising unit 1315. In this embodiment, the coded data supervising unit 1315 is added to the structure of the ninth embodiment. As in the ninth embodiment, the apparatus of the thirteenth embodiment has a hardware structure shown in FIG. 11.

The coded data supervising unit 1315 is realized in CPU, main memory, and program and used for checking amount of data per unit time that is output from the coding unit 1308, comparing amount of the data with a preset value, and changing the value of constant k in the register 1302 on the basis of the comparison result. The register 1302 is identical to the register 902 of the ninth embodiment except that the number of constant is changed by the coded data supervising unit 1315. The audio input unit 1301, the input audio sampling unit 1303, the decision control unit 1304, the subsampling unit 1305, the coding bit allocation unit 1306, the quantization unit 1307, the coding unit 1308, the coded data recording unit 1309, and the fixed coding register 1310 are identical to 901, and 903 to 910 of the fifth embodiment. The apparatus of the twelfth embodiment supervises amount of input data, whereas the apparatus of the thirteenth embodiment supervises amount of coded data and controls the value of constant stored in the register.

Figure 32:
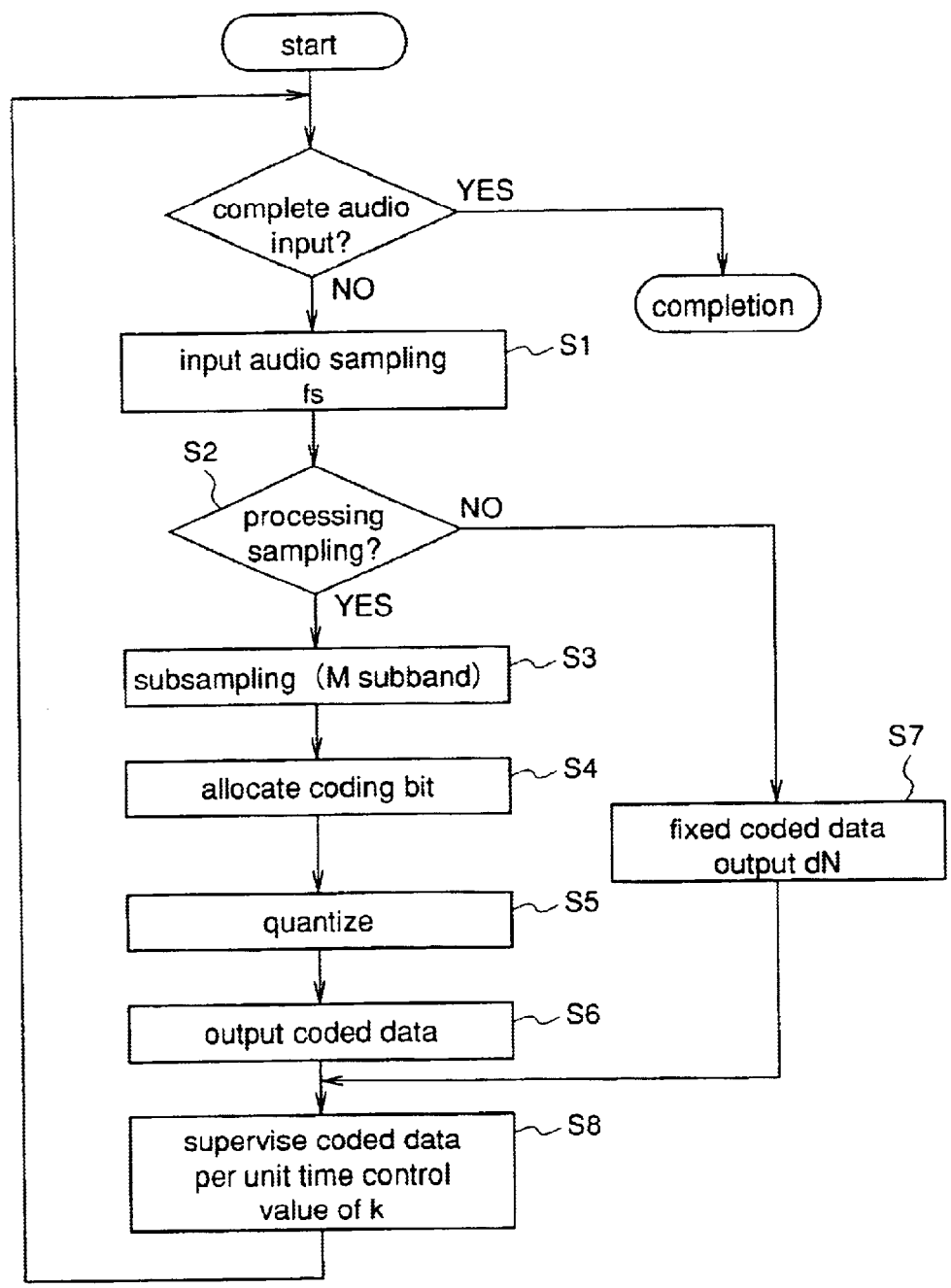
FIG. 32 is a flowchart illustrating a processing procedure of audio coding in the apparatus according to the embodiment 13.

FIG. 32 is a flowchart illustrating audio coding according to the thirteenth embodiment. An operation of audio coding according to the thirteenth embodiment is described following flowchart in FIG. 32 and with reference to FIG. 31. As the unit period decision constant k, "2" that is predetermined on the basis of CPU performance is stored in the register 1202 as initialization.

Steps 1 to 7 in FIG. 32 are performed as in the ninth embodiment and will not be discussed. By executing these steps, according to set value k (in this case k=2), subsampling, coding bit allocation, and quantization are performed to unit period t1, t3, . . . and these processing are not performed to t2, t4 . . . , thereby coding is realized with reduced processing burden.

In this embodiment 13, step 8 is performed prior to returning to step 1. The coded data supervising unit 1315 checks amount of data per unit of time that is output from the coding unit 1308, compares the amount of data with a preset value, and changes the value of constant k stored in the register 1302 on the basis of the comparison result. Supervision of coded data and control of the value of constant k maybe performed using various methods. Herein, this is performed as follows.

When coding is not performed in initialization due to increased CPU burden, coding is performed at a lower space, so that output coded data is reduced. Therefore, in step 8, if amount of coded data does not reach the lowest level CL, the coded data supervising unit 1315 increases the value of constant k stored in the register 2, thereby burden on CPU is reduced.

Similarly, when the CPU has reserve capability with reduced burden, coded data is increased to some extent. In step 8, when amount of coding per unit time is not lower than the highest level CH, the value of constant is reduced to perform coding with high quality.

In repetition of flow in FIG. 32, as in the twelfth embodiment, increase/reduction of the constant k is repeated so that it is set to be an appropriate one. As in the twelfth embodiment, both coding lowest level CL and coding highest level CH may not be used and only coding lowest level CL may be used.

Thus, the audio coding apparatus according to the thirteenth embodiment further comprises the coded data supervising unit 1315, compared with the apparatus of the ninth embodiment. The coded data supervising unit 1315 dynamically controls the value of the constant k stored in the register 1302 by checking amount of output data per unit of time, the constant k indicating processing capability of CPU. Therefore, audio coding with the highest quality at that point of time is realized by CPU. As a result, as in the twelfth embodiment, it is possible to handle variations of processing capability of CPU at that point of time.

Further, also in the thirteenth embodiment, as in the twelfth embodiment, the coded data supervising unit 1315 may be added to the apparatus of tenth or eleventh embodiment and by controlling the value of operation decision constant or subband selecting constant, the same effects are achieved.

Embodiment 14

An audio coding apparatus according to a fourteenth embodiment of the present invention realizes alternative psychoacoustic analysis control according to a coding bit allocation method, thereby improving playback quality of sound of coded data without exceedingly increasing a processing burden.

Figure 33:
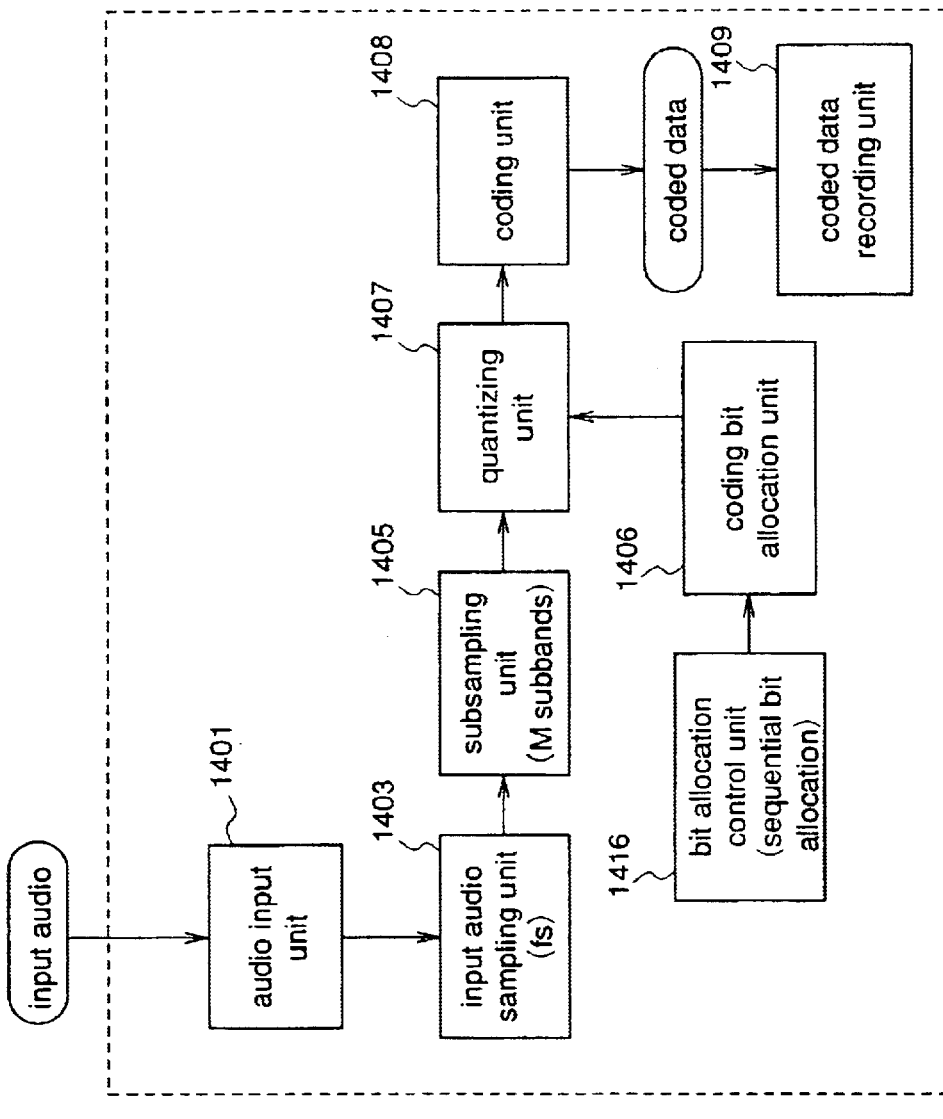
FIG. 33 is a block diagram illustrating a structure of an audio coding apparatus according to an embodiment 14 of the present invention.

FIG. 33 is a block diagram illustrating an audio coding apparatus according to a fourteenth embodiment of the present invention. As shown in the figure, the audio coding apparatus of the fourteenth embodiment comprises an audio input unit 1401, an input audio sampling unit 1403, a subsampling unit 1405, a coding bit allocation unit 1406, a quantizing unit 1407, a coding unit 1408, a coded data recording unit 1409, and a bit allocation (sequential bit allocation) control unit 1416. The construction of the apparatus of the fourteenth embodiment is realized by the hardware shown in FIG. 11, similar to the ninth embodiment.

In FIG. 33, the bit allocation control unit 1416 comprises a CPU, a main memory and a program. M pieces of subband signal data are produced by performing subsampling in the subsampling unit 1405, and the bit allocation control unit 1416 calculates the bit numbers that are allocated to the respective subband signal data by the coding bit allocation unit 1406, according to a specified algorithm. The audio input unit 1401, the input audio sampling unit 1403, the subsampling unit 1405, the coding bit allocation unit 1406, the quantizing unit 1407, the coding unit 1408, and the coded data recording unit 1409 are identical to those which are represented by the numerals 901, 903 and 905 to 909 described for the ninth embodiment, respectively, and no description is given of these units.

Figure 34:
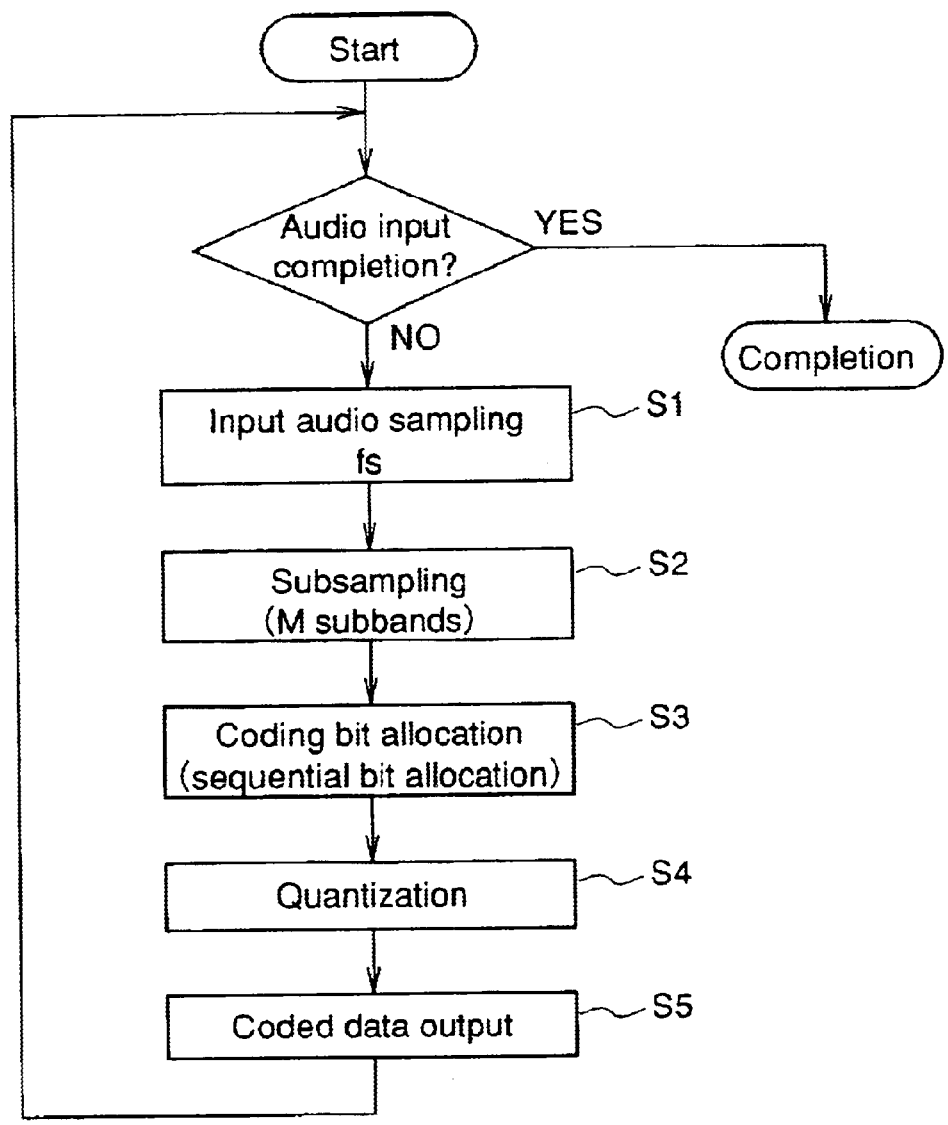
FIG. 34 is a flowchart illustrating a processing procedure of audio coding in the apparatus according to the embodiment 14.
Figure 35:
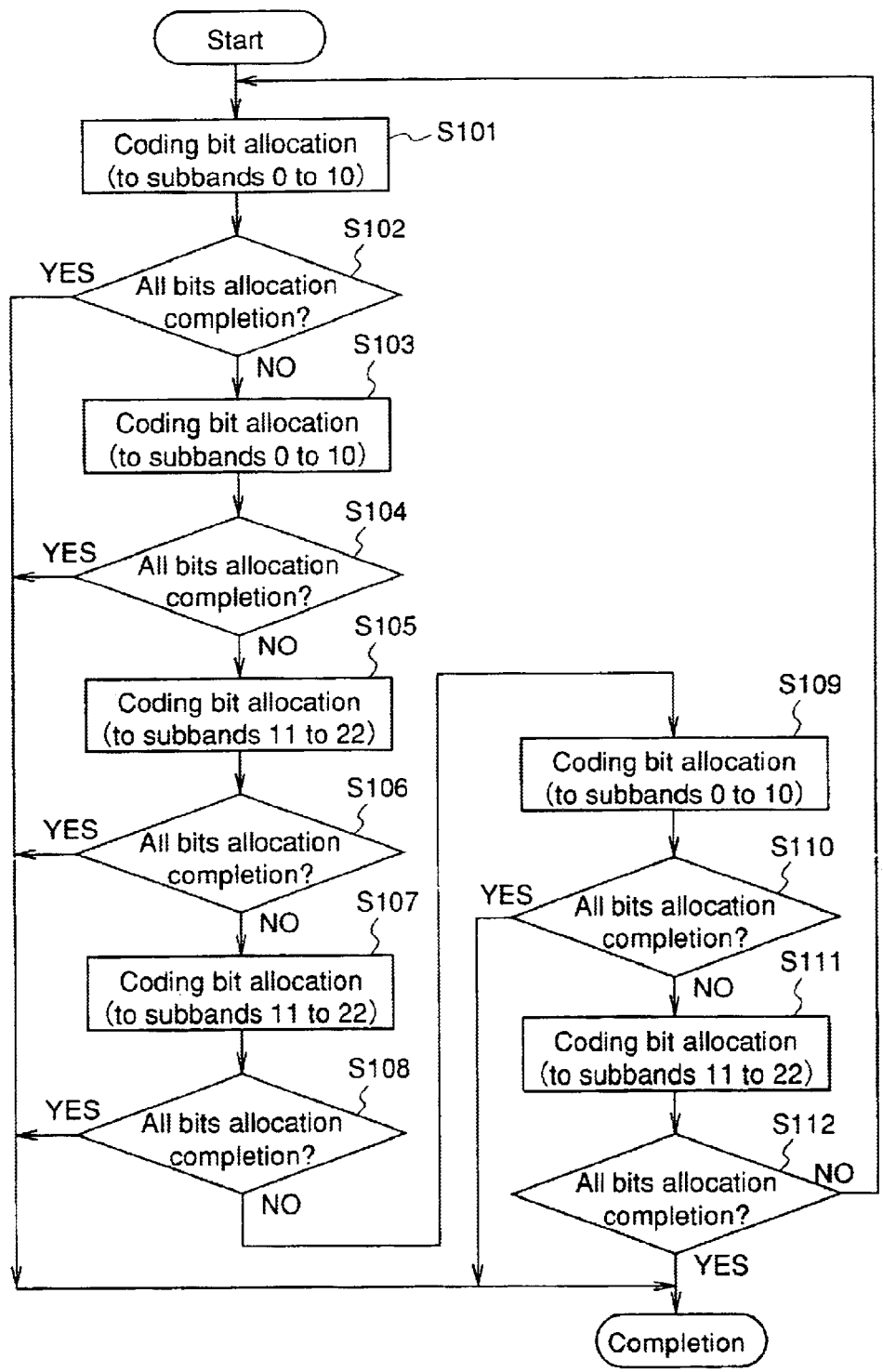
FIG. 35 is a flowchart illustrating a processing procedure of sequential bit allocation in the apparatus according to the embodiment 14.
Figure 36:
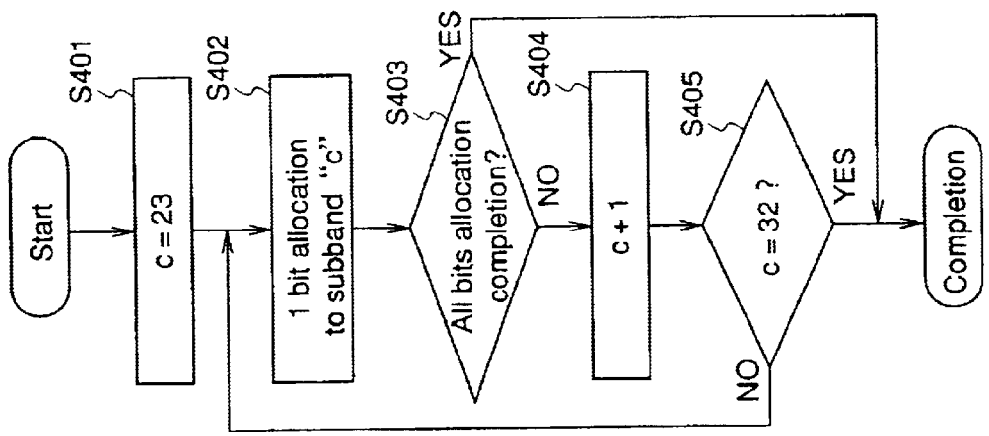
FIGS. 36(a) to (c) are flowcharts illustrating a processing procedure of bit allocation to each subband in the sequential bit allocation according to the embodiment 14.
Figure 36:
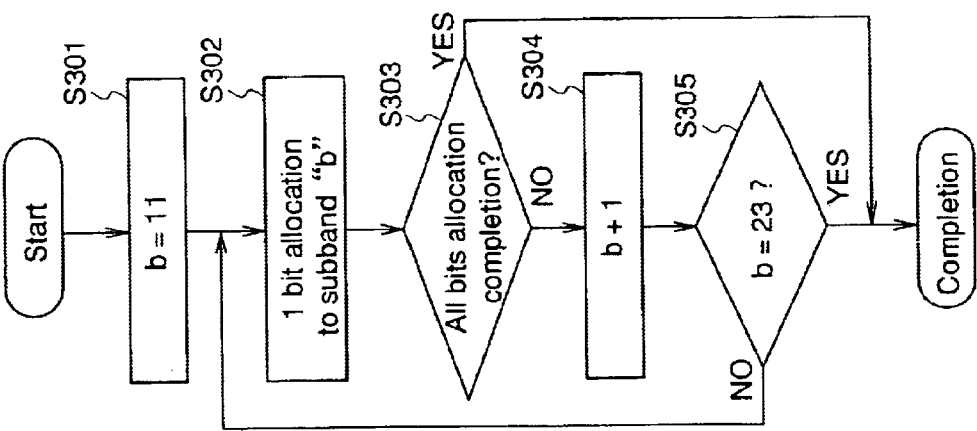
Figure 36:
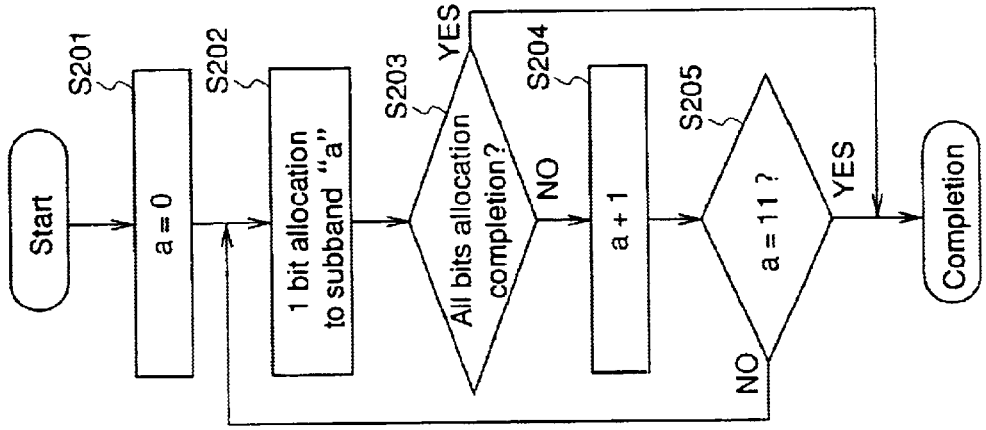

FIGS. 34, 35 and 36(*a*)~36(*c*) are flow charts showing an audio coding operation according to the fourteenth embodiment of the invention. A description is given of the audio coding operation according to the flow charts shown in FIGS. 34 to 36(*c*), with reference to FIG. 33.

Figure 65:
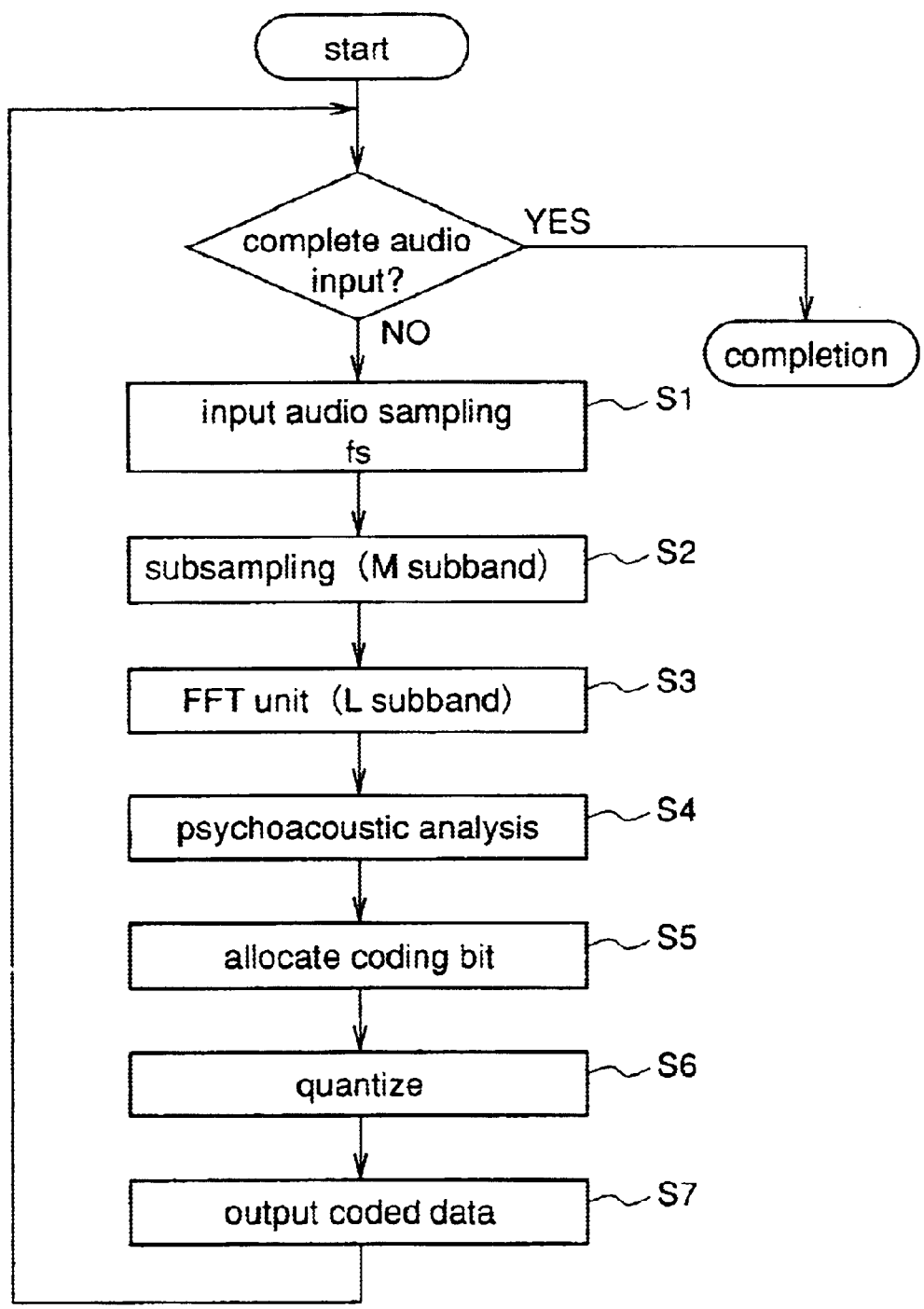
FIG. 65 is a flowchart illustrating the second MPEG1Audio coding.

In the flow shown in FIG. 34, steps S1 and S2 are carried out as in the steps S1 and S2 shown in FIG. 65 in the second prior art, thereby producing subband signal data that are obtained by dividing sampled data into M pieces of frequency bands. According to the MPEG audio standard, M is assumed to be 32 as in the second prior art.

In the second prior art shown in FIG. 65, the sampled data is divided into L (256) pieces of subband signal data, Fast Fourier Transformation (FFT) and psychoacoustic analysis are performed to the subband signal data, and the allocation number of coding bits is determined. In the fourteenth embodiment of the invention, however, in a step S3 of the flow in FIG. 34, the bit allocation control unit 1416 calculates the bit numbers using a sequential bit allocation method as an alternative psychoacoustic analysis control method, and on the basis of the calculated results, the coding bit allocation unit 1406 allocates coding bits to the respective M (32) pieces of subband signal data.

The total bit number to be allocated is obtained from the bit rates that are respectively defined as 256 kbps in a first layer of the MPEG audio and as 192 kbps in a second layer. The obtained total bit number is allocated according to a sequential bit allocation method described as follows.

FIG. 35 is a flow chart showing process steps in a sequential bit allocation method. The bit allocation control unit 1416 allocates bits to subbands 0 to 10 in a step S101 and a step S103 and allocates bits to subbands 11 to 22 in a step S105 and a step S107. That is, the bit allocation control unit 1416 allocates bits to the subbands 0 to 10 and the subbands 11 to 22 twice each. Thereafter, bits are allocated to the subbands 0 to 10 once more in a step S109 and bits are allocated to the subbands 11 to 22 once more in a step S111. Then, in a step S113, bits are allocated to subbands 23 to 31 once. If it is not judged that all the bits have been allocated, in one of judgment steps S102, S104, S106, S108, S110, S112 and S114 after performing the respective steps described above, the allocation is repeated from the step S101. When all the bits are allocated, the flow is completed.

FIGS. 36(*a*)~36(*c*) are flow charts showing process steps for allocating bits to the respective subbands. The process steps shown in FIG. 36(*a*) are carried out in the steps S101, S103 and S109 of the flow in FIG. 35, the process steps shown in FIG. 36(*b*) are carried out in the steps S105, S107 and S111 of the flow in FIG. 35, and the process steps shown in FIG. 36(*c*) are carried out in the step S113 of the flow in FIG. 35.

In the flow shown in FIG. 36(*a*), putting that a variable "a" is 0 (step S201), 1 bit is allocated to the subband 0 (step S202). When all the bits have been not allocated in a step S203, after putting "a"=0+1=1 (step S204) and returning to the step S202 by judgment in a step S205, 1 bit is allocated to the subband 1. When these steps are repeated and it is judged in a step S205 that "a" is 11, i.e., when 1 bit each is allocated to the subbands 0 to 10, or when it is judged in the step S203 that all the bits have been allocated, the flow shown in FIG. 36(*a*) is completed. The flows shown in FIGS. 36(*b*) and 36(*c*) are the same as the flow in FIG. 36(*a*).

After the flows shown in FIGS. 36(*a*)~36(*c*) are completed, when returning to each step of the flow shown in FIG. 35 and completing the allocation of all the bits, the flow in FIG. 35 is completed according to the judgment step just after each step. As a result, the step S3 of the flow shown in FIG. 34 is completed. Then, steps S4 and S5 are carried out as in the second prior art.

Figure 66:
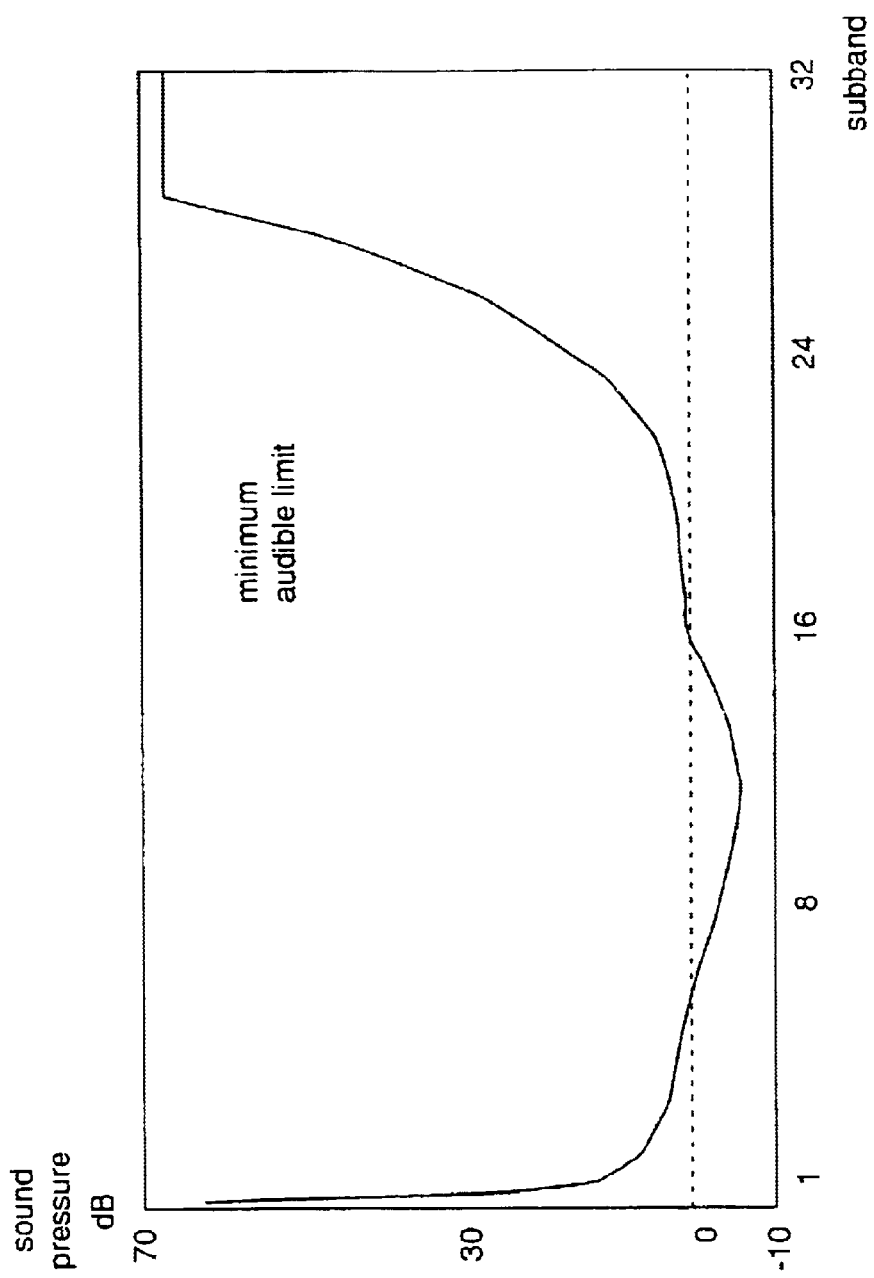
FIG. 66 is a diagram illustrating a minimum audible limit of auditory sense of human being which is applied to psychoacoustic analysis according to a prior art.
Figure 67:
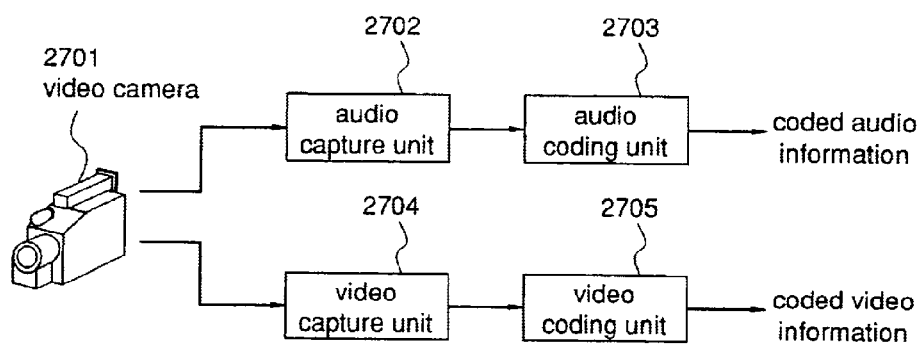
FIG. 67 is a diagram illustrating a schematic structure of a video and audio coding apparatus according to a prior art.

The sequential bit allocation method in the apparatus according to the fourteenth embodiment is a method in which bits are allocated to subbands 0 to 10 and 11 to 22. As shown in FIG. 66 in the second prior art, the minimum audible limit is low at the subbands 0 to 10 and 11 to 22, i.e., it is probable to hear with human hearing at these subbands. In this method, among the frequency bands obtained by dividing the data into 32, the subbands at which it is probable to hear with human hearing are more weighted, and bits are allocated in order of the weight of the subbands Consequently, whether each subband has a large sound pressure or has little sound pressure, i.e., basically independent of an input signal, sequential bits are allocated as described above.

In this way, in the audio coding apparatus according to the fourteenth embodiment, there is provided with the bit allocation control unit 1416, and bits are sequentially allocated to subbands according to a specified algorithm. Therefore, without exceedingly increasing a processing burden, coding bit allocation that makes the most of human hearing characteristics can be performed, thereby obtaining coded data having high playback quality of sound. More specifically, the audio coding apparatus of the fourteenth embodiment has a construction in which the bit allocation control unit 1416 is added to the apparatus according to the first prior art, and the simple coding bit allocation according to the simple algorithms shown in FIGS. 35 and 36(*a*)~36(*c*) is performed to 32 subbands, thereby improving the playback quality of sound. As compared with the apparatus according to the second prior art in which Fast Fourier Transformation and psychoacoustic analysis are performed to 256 subbands, the apparatus of the fourteenth embodiment has a far less processing burden, and both of real-time processing and improvement of sound quality are possible when audio coding is performed in a general personal computer, a work station or the like that is realized by the hardware shown in FIG. 21.

In addition, the algorithms in the sequential bit allocation method shown in FIGS. 35 and 36(*a*)~36(*c*) are one example. Even when the order of the subbands and the bit numbers to be allocated are changed, the same sequential allocation can be performed with the same effects.

Embodiment 15

An audio coding apparatus according to a fifteenth embodiment of the present invention realizes alternative psychoacoustic analysis control according to a coding bit allocation method, considering output levels of respective subbands, thereby further improving playback quality of sound of coded data.

Figure 37:
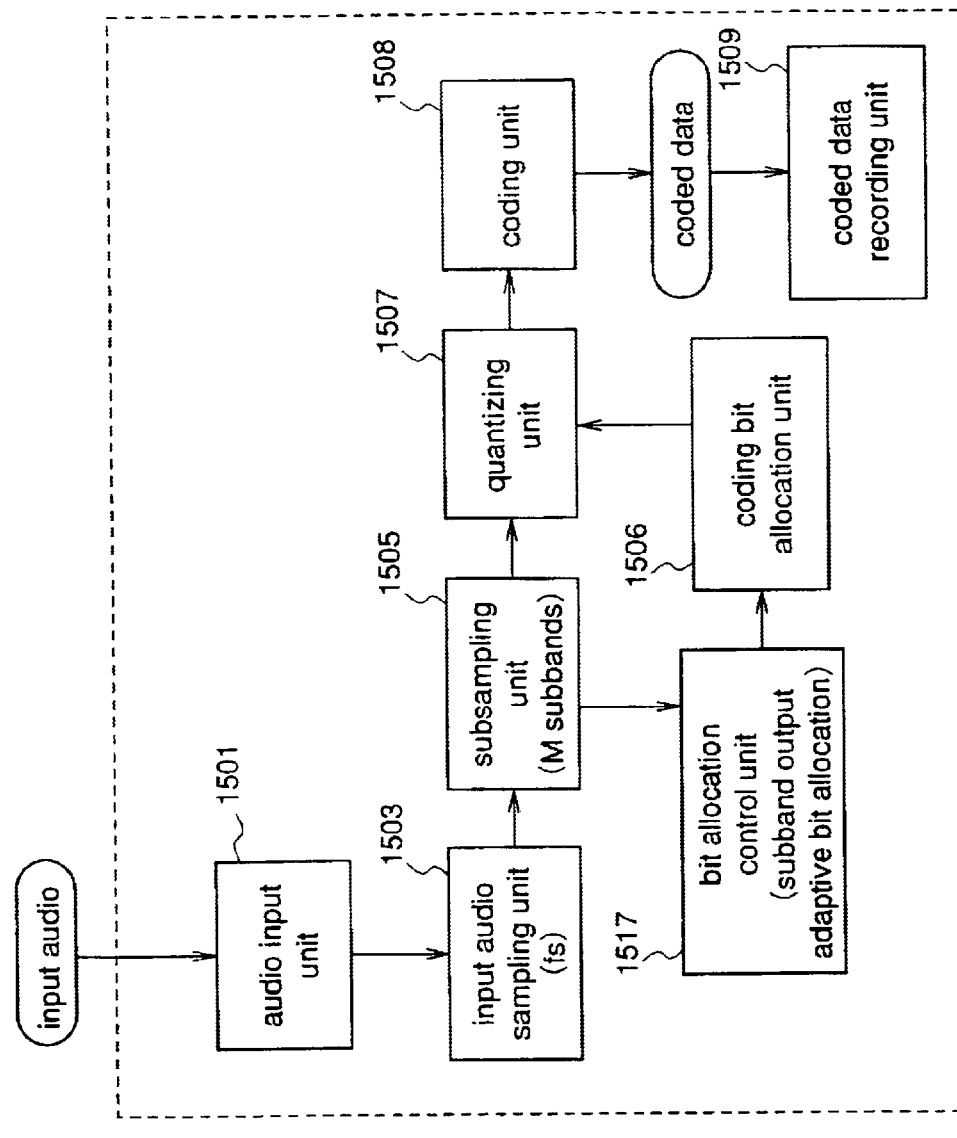
FIG. 37 is a block diagram illustrating a structure of an audio coding apparatus according to an embodiment 15 of the present invention.

FIG. 37 is a block diagram illustrating an audio coding apparatus according to a fifteenth embodiment of the present invention. As shown in the figure, the audio coding apparatus of the fifteenth embodiment comprises an audio input unit 1501, an input audio sampling unit 1503, a subsampling unit 1505, a coding bit allocation unit 1506, a quantizing unit 1507, a coding unit 1508, a coded data recording unit 1509, and a bit allocation (subband output adaptive bit allocation) control unit 1517. This construction is identical to the construction of the apparatus according to the fourteenth embodiment, and is realized by the hardware shown in FIG. 11, similar to the ninth embodiment.

In FIG. 37, the bit allocation control unit 1517 comprises a CPU, a main memory and a program. M pieces of subband signal data are produced by performing subsampling in the subsampling unit 1505, and the bit allocation control unit 1517 calculates the bit numbers that are allocated to the respective subband signal data by the coding bit allocation unit 1506, according to a specified algorithm. The apparatus of the fifteenth embodiment is fundamentally identical to that of the fourteenth embodiment, except for the function of the bit allocation control unit 1517. That is, the audio input unit 1501, the input audio sampling unit 1503, the subsampling unit 1505, the coding bit allocation unit 1506, the quantizing unit 1507, the coding unit 1508, and the coded data recording unit 1509 are identical to those which are represented by the numerals 901, 903 and 905 to 909 described for the ninth embodiment, respectively, and no description is given of these units.

Figure 38:
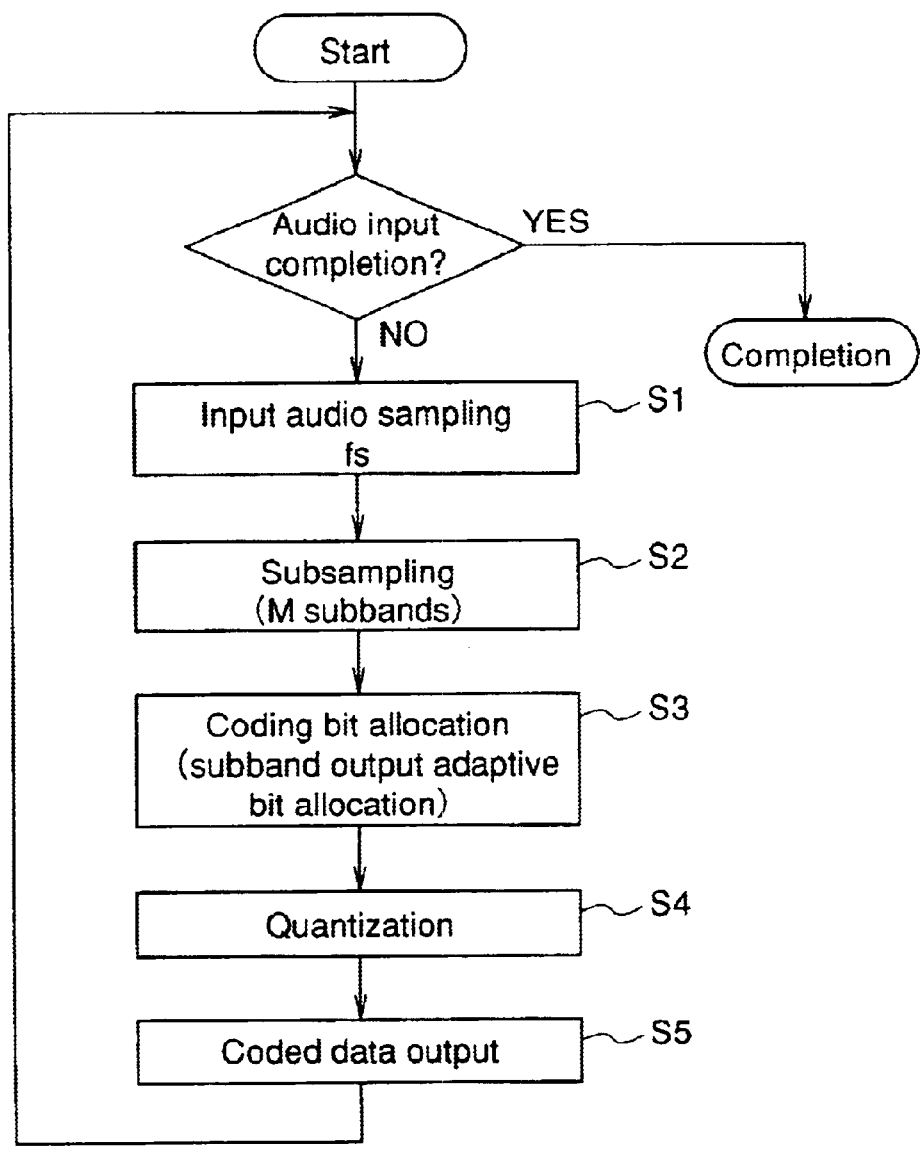
FIG. 38 is a flowchart illustrating a processing procedure of the audio coding in the apparatus according to the embodiment 15.

FIG. 38 is a flow chart showing an audio coding operation according to the fifteenth embodiment of the invention. A description is given of the audio coding operation according to the flow chart shown in FIG. 38, with reference to FIG. 37.

Figure 62:
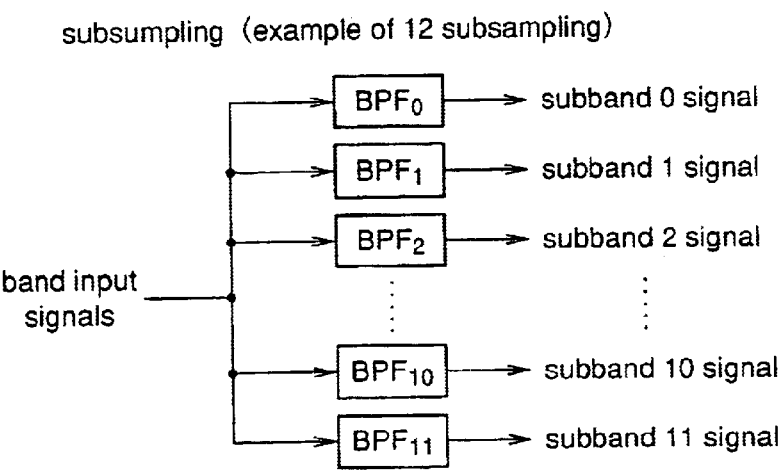
FIG. 62 is a diagram for explaining subsampling in audio coding.

In the flow shown in FIG. 38, steps S1 and S2 are carried out as in the steps S1 and S2 shown in FIG. 62 in the second prior art, thereby producing subband signal data that are obtained by dividing sampled data into M pieces of frequency bands. According to the MPEG audio standard, M is assumed to be 32 as in the second prior art.

In the fourteenth embodiment, in the step S3 of the flow shown in FIG. 34, the bit allocation control unit 1416 calculates the bit numbers using a sequential bit allocation method. In the fifteenth embodiment of the invention, however, the bit allocation control unit 1517 determines the allocation numbers of bits using a subband output adaptive bit allocation method. More specifically, in the fourteenth embodiment, bit allocation is performed to the frequency bands that are obtained by dividing the data into 32, without considering sound pressures of the subbands. Meanwhile, in the fifteenth embodiment, bit allocation information of the respective subbands is produced on the basis of two factors, i.e., whether the respective subbands are ones at which it is probable to hear with human hearing or not, and sound pressures of the respective subbands.

The total bit number to be allocated is obtained from the bit rate of 256 kbps in a first layer as in the fourteenth embodiment of the invention.

The bit allocation control unit 1517 obtains subband and output adaptive weight (3) on the basis of two factors to be considered, i e., weight of subbands at which it is probable to hear with human hearing (1) and subband output level ratio (2), and allocates the obtained total bit number according to the subband output adaptive weight (3).

Initially, the weight of subbands at which it is probable to hear with human hearing (1) is determined on the basis of the minimum audible limit shown in FIG. 63 as follows (sb: subband).

$$sb\ 0\sim 10 \quad sb\ 11\sim 15 \quad sb\ 16\sim 18 \quad sb\ 18\sim 22 \quad sb\ 23\sim \quad (1)$$
$$5 \quad : \quad 3 \quad : \quad 2 \quad : \quad 1 \quad : \text{ no allocation}$$

Next, sound pressures of respective subbands are represented as a ratio to obtain the subband output level ratio (2) as follow.

$$sb\ 9,10 \quad sb\ 11 \quad \text{other } sbs \quad (2)$$
$$3 \quad : \quad 2 \quad : \quad 1$$

Then, the item (1) is multiplied by the item (2), the following result is obtained.

| sb 0~8 | sb 9, 10 | sb 11 | sb 12~15 | sb 16~18 | sb 19~22 | sb 23~31 |
|---|---|---|---|---|---|---|
| 5 : | 15 : | 6 : | 3 : | 2 : | 1 : | 0 |

On the basis of this result, the bit allocation control unit 1517 determines the bit allocation numbers so that bit allocation of the respective subbands approaches the weight (3), and the coding bit allocation unit 1506 performs coding bit allocation. Then, steps S4 and S5 of the flow shown in FIG. 38 are carried out as in the second prior art.

In this way, in the audio coding apparatus according to the fifteenth embodiment, there is provided with the bit allocation control unit 1517, and bits are allocated to the respective subbands on the basis of two factors, i.e., whether the respective subbands are ones at which it is probable to hear with human hearing or not, and sound pressures of the respective subbands. Therefore, without exceedingly increasing a processing burden, coding bit allocation that makes the most of human hearing characteristics can be performed, thereby obtaining coded data having high playback quality of sound.

More specifically, the audio coding apparatus of the fifteenth embodiment has a construction in which the bit allocation control unit 1517 is added to the apparatus according to the first prior art, and the simple coding bit allocation using the relatively simple processing is performed to 32 subbands, thereby improving the playback quality of sound. As compared with the apparatus according to the second prior art in which Fast Fourier Transformation and psychoacoustic analysis are performed to 256 subbands, the apparatus of the fifteenth embodiment has a far less processing burden, and both of real-time processing and improvement of sound quality are possible when audio coding is performed in a general personal computer, a work station or the like that is realized by the hardware shown in FIG. 21. Further, as compared with the apparatus of the fourteenth embodiment, the audio coding apparatus of the fifteenth embodiment has a more processing burden due to processing on the basis of input audio characteristics, but can obtain coded data having higher playback quality of sound.

In addition, the calculating method in the subband output adaptive bit allocation method described for the fifteenth embodiment is one example. Even when the weight of the subbands and the weight of two factors are changed, the same allocation using the simple processing can be performed with the same effects.

Embodiment 16

An audio coding apparatus according to a sixteenth embodiment of the present invention realizes alternative psychoacoustic analysis control according to a coding bit allocation method, considering output levels and the bit allocation numbers of respective subbands, thereby further improving playback quality of sound of coded data.

Figure 39:
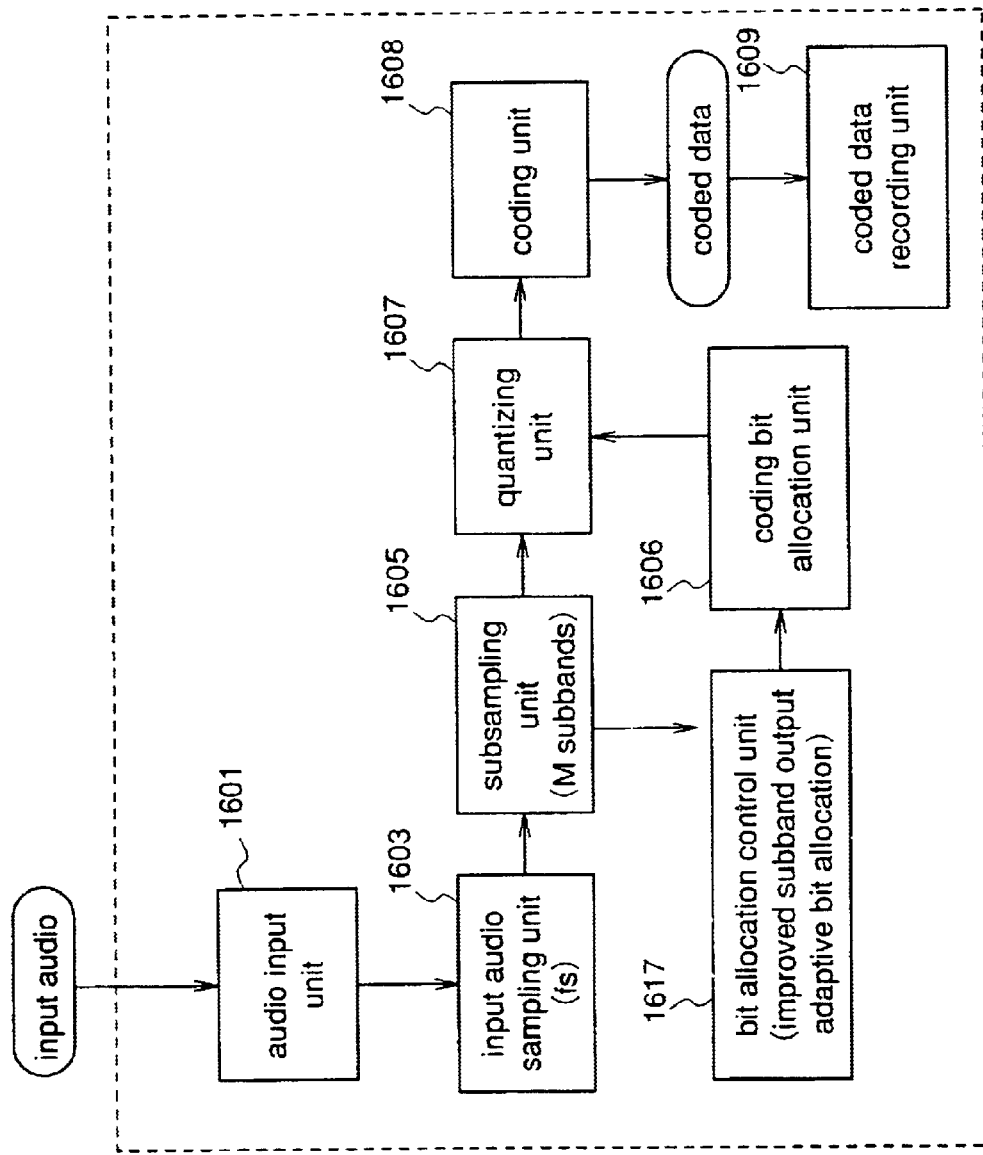
FIG. 39 is a block diagram illustrating a structure of an audio coding apparatus according to an embodiment 16 of the present invention.

FIG. 39 is a block diagram illustrating an audio coding apparatus according to a sixteenth embodiment of the present invention. As shown in the figure, the audio coding apparatus of the sixteenth embodiment comprises an audio input unit 1601, an input audio sampling unit 1603, a subsampling unit 1605, a coding bit allocation unit 1606, a quantizing unit 1607, a coding unit 1608, a coded data recording unit 1609, and a bit allocation (improved subband output adaptive bit allocation) control unit 1617. This construction is identical to the construction of the apparatus according to the fourteenth embodiment, and is realized by the hardware shown in FIG. 11, similar to the ninth embodiment.

In FIG. 39, the bit allocation control unit 1617 comprises a CPU, a main memory and a program. M pieces of subband signal data are produced by performing subsampling in the subsampling unit 1605, and the bit allocation control unit 1617 calculates the bit numbers that are allocated to the respective subband signal data by the coding bit allocation unit 1606, according to a specified algorithm. The apparatus of the sixteenth embodiment is fundamentally identical to those of the fourteenth and fifteenth embodiments, except for the function of the bit allocation control unit 1617. That is, the audio input unit 1601, the input audio sampling unit 1603, the subsampling unit 1605, the coding bit allocation unit 1606, the quantizing unit 1607, the coding unit 1608, and the coded data recording unit 1609 are identical to those which are represented by the numerals 901, 903 and 905 to 909 described for the ninth embodiment, respectively, and no description is given of these units.

Figure 40:
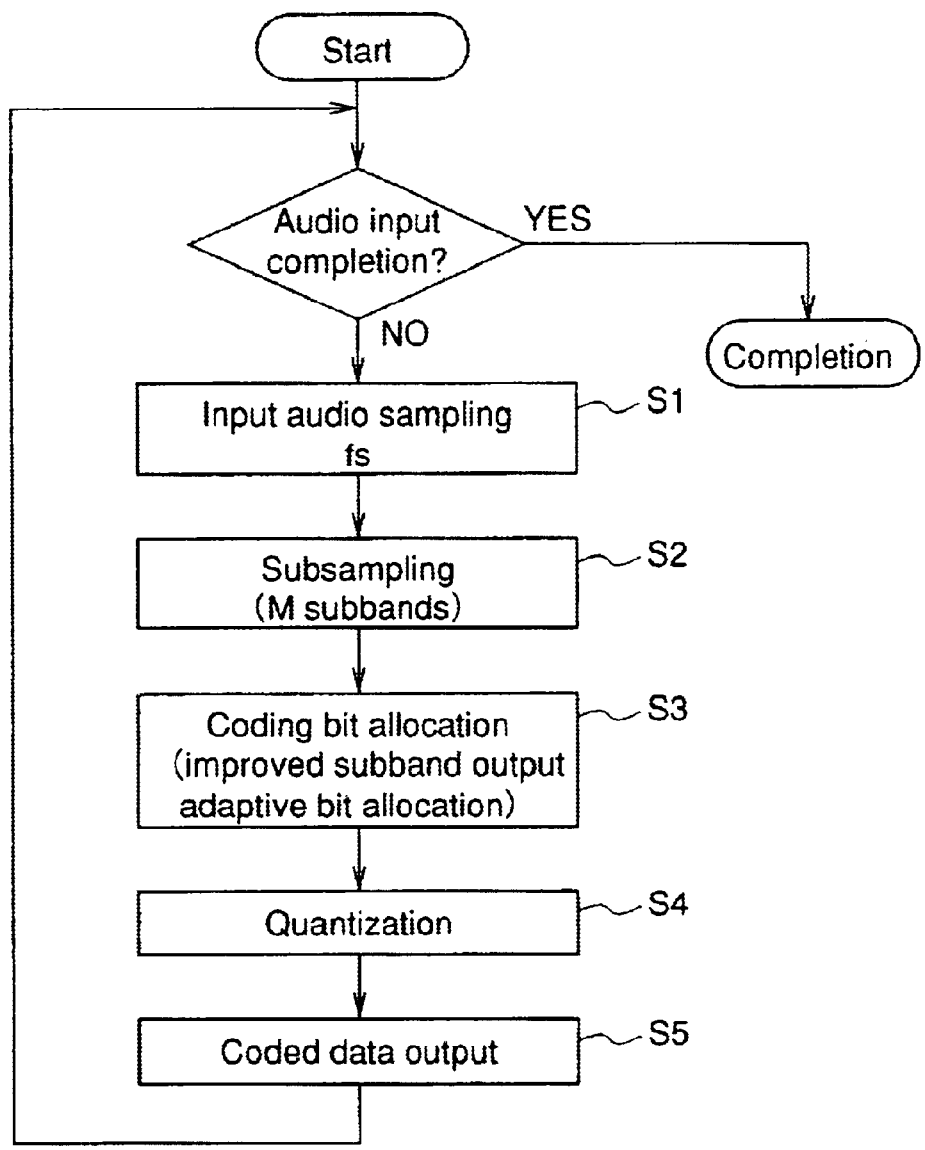
FIG. 40 is a flowchart illustrating a processing procedure of audio coding in the apparatus according to the embodiment 16.
Figure 41:
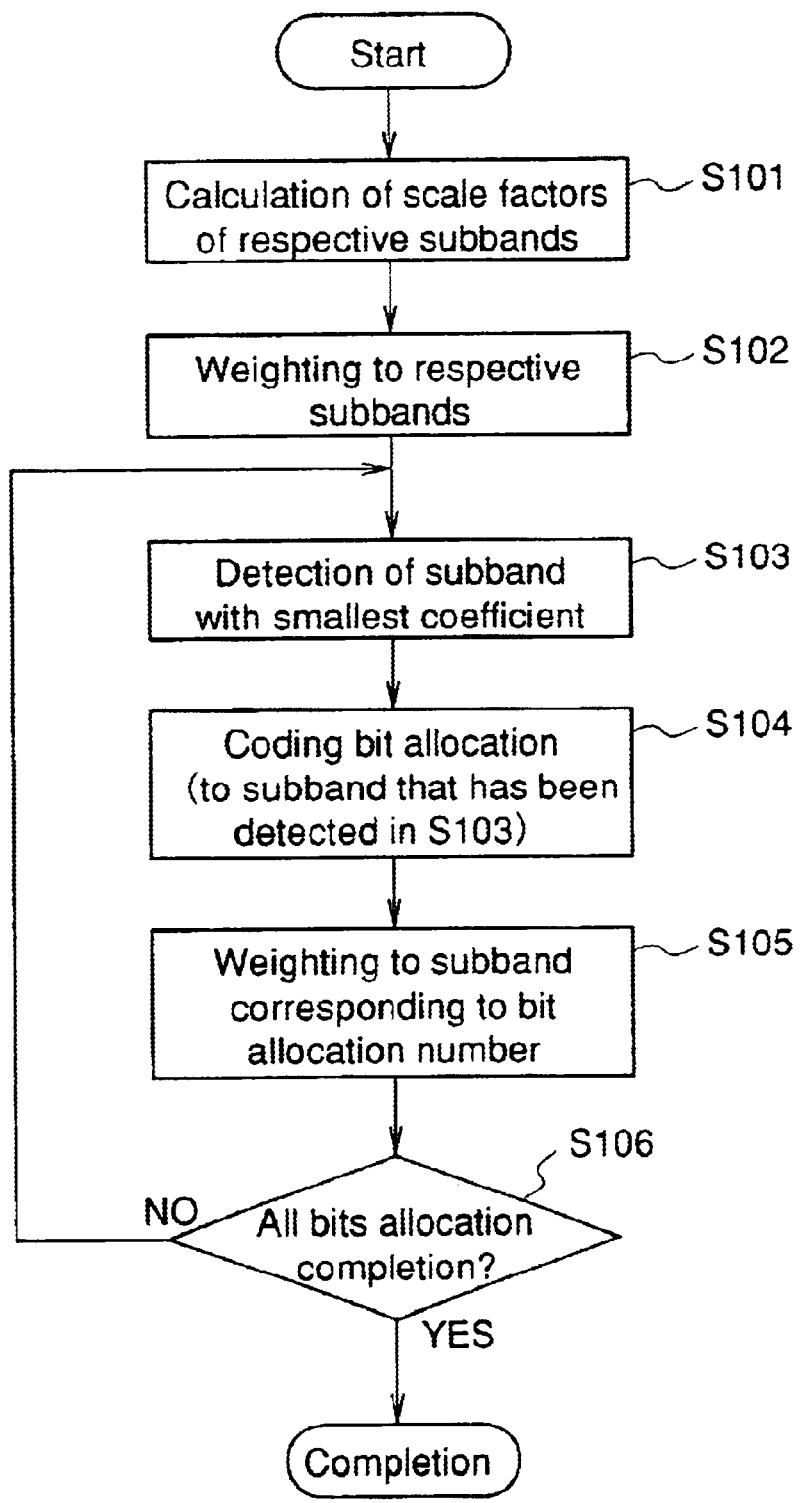
FIG. 41 is a flowchart illustrating a processing procedure of improved subband output adaptive bit allocation in the apparatus according to the embodiment 16.

FIGS. 40 and 41 are flow charts showing an audio coding operation according to the sixteenth embodiment of the invention. A description is given of the audio coding operation according to the flow charts shown in FIGS. 40 and 41, with reference to FIG. 39.

In the flow shown in FIG. 40, steps S1 and S2 are carried out as in the steps S1 and S2 shown in FIG. 62 in the second prior art, thereby producing subband signal data that are obtained by dividing sampled data into M pieces of frequency bands. According to the MPEG audio standard, M is assumed to be 32 as in the second prior art.

In the fifteenth embodiment, in the step S3 of the flow shown in FIG. 38, the bit allocation control unit 1517 calculates the bit numbers using a subband output adaptive bit allocation method. In the sixteenth embodiment of the invention, however, the bit allocation control unit 1617 determines the allocation numbers of bits using an improved subband output adaptive bit allocation method. More specifically, in the fourteenth embodiment, bit allocation is performed to the frequency bands that are obtained by dividing the data into 32, without considering the bit numbers allocated to the respective subbands and with the subbands at which it is probable to hear with human hearing given priority. In the fifteenth embodiment, bit allocation is performed to the respective subbands on the basis of two factors, i.e., whether the respective subbands are ones at which it is probable to hear with human hearing or not, and sound pressures of the respective subbands. Meanwhile, in the sixteenth embodiment, bit allocation information of the respective subbands is produced on the basis of two factors described for the fifteenth embodiment and another factor, i.e., whether the bit numbers allocated to the respective subbands are satisfactory or not.

A description is given of the bit allocation method that is used in the sixteenth embodiment. The total bit number to be allocated is obtained from the bit rate of 256 kbps in a first layer as in the fourteenth and fifteenth embodiments of the invention.

The bit allocation control unit 1617 allocates the obtained total bit number on the basis of three factors to be considered, i.e., subband output levels (1), weight of subbands at which it is probable to hear with human hearing (2), and weight corresponding to the bit allocation numbers of respective subbands (3).

Initially, scale factors that represent the subband output levels (1) are obtained from sound pressures of respective subbands. The scale factors are values among 0 to 62, and the smaller the value is, the larger the sound pressure is. Herein, the scale factors are as follows (sb: subband).

$$sb\ 3, 4 \quad sb\ 5, 6 \quad \text{other } sbs \quad (1)$$

$$3 \quad : \quad 9 \quad : \quad 37$$

Next, the weight of subbands at which it is probable to hear with human hearing (2) is determined on the basis of the minimum audible limit shown in FIG. 63 as follows. Since the subband output levels are represented as the scale factors, the following values have the reverse sense of the values of the weight described for the fourteenth embodiment.

$$sb\ 0 \sim 10 \quad sb\ 11 \sim 15 \quad sb\ 16 \sim 18 \quad sb\ 19 \sim 22 \quad sb\ 23 \sim \quad (2)$$

$$1 \quad : \quad 2 \quad : \quad 3 \quad : \quad 5 \quad : \quad 20$$

Figure 63:
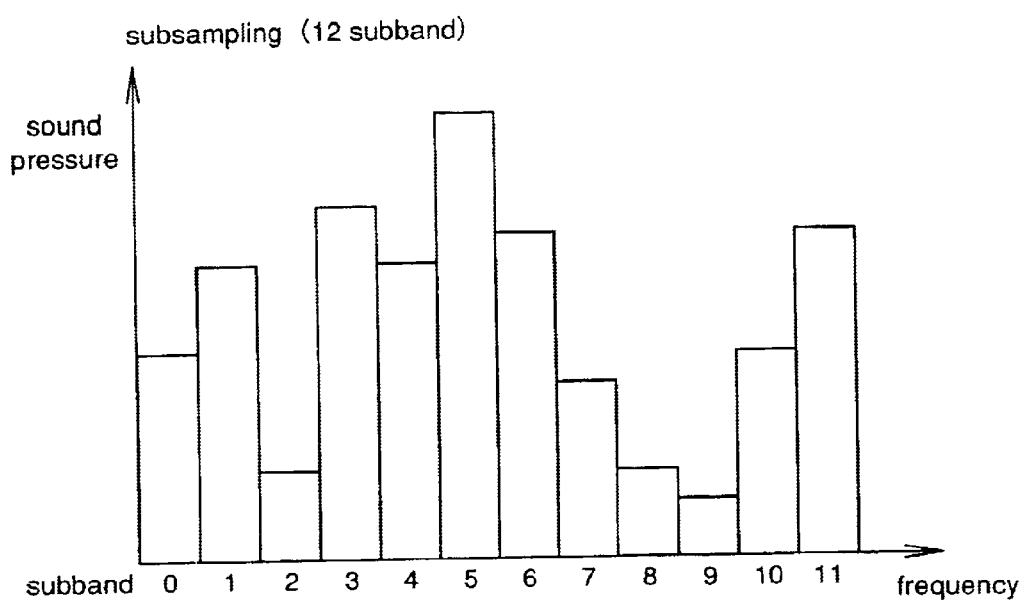
FIG. 63 is a diagram illustrating sub-sampled subband signals.
Figure 64:
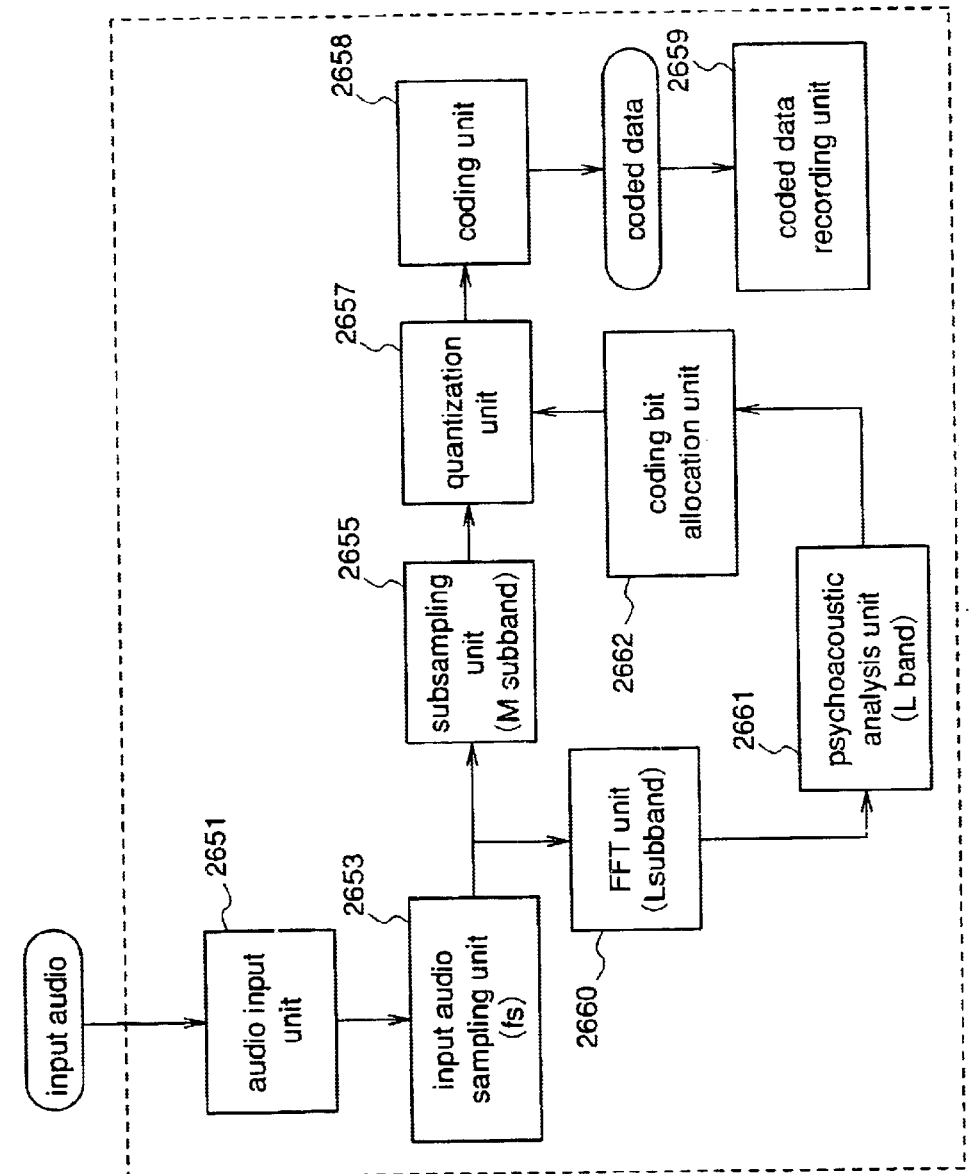
FIG. 64 is a block diagram illustrating a second MPEG1Audio audio coding apparatus according to the prior art.

Then, the weight corresponding to the bit allocation numbers of respective subbands (3) is determined on the basis of the minimum audible limit shown in FIG. 63, and according to the following table 14 which is produced considering that bits more than required are not allocated to the identical subband.

TABLE 14

Bit Allocation Weighting by Subband

| sb | \multicolumn{16}{c|}{bit allocation number} |
|---|---|---|---|---|---|---|---|---|---|---|---|---|---|---|---|---|

| sb | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | 1 | 2 | 3 | 4 | 5 | 5 | 6 | 7 | 8 | 10 | 12 | 20 | 99 | 99 | 99 | 99 |
| 1 | 1 | 2 | 3 | 4 | 5 | 5 | 6 | 7 | 8 | 10 | 12 | 20 | 99 | 99 | 99 | 99 |
| 2 | 1 | 2 | 3 | 4 | 5 | 5 | 6 | 7 | 8 | 10 | 12 | 20 | 99 | 99 | 99 | 99 |
| 3 | 3 | 3 | 3 | 3 | 3 | 4 | 4 | 6 | 6 | 8 | 8 | 8 | 12 | 20 | 99 | 99 |
| 4 | 3 | 3 | 3 | 3 | 3 | 4 | 4 | 6 | 6 | 8 | 8 | 8 | 12 | 20 | 99 | 99 |
| 5 | 3 | 3 | 3 | 3 | 3 | 4 | 4 | 6 | 6 | 8 | 8 | 8 | 12 | 20 | 99 | 99 |
| 6 | 3 | 3 | 3 | 3 | 3 | 4 | 4 | 6 | 6 | 8 | 8 | 8 | 12 | 20 | 99 | 99 |
| 7 | 3 | 3 | 3 | 3 | 3 | 4 | 4 | 6 | 6 | 8 | 8 | 8 | 12 | 20 | 99 | 99 |
| 8 | 3 | 3 | 3 | 3 | 3 | 4 | 4 | 6 | 6 | 8 | 8 | 8 | 12 | 20 | 99 | 99 |
| 9 | 3 | 3 | 3 | 3 | 3 | 4 | 4 | 6 | 6 | 8 | 8 | 8 | 12 | 20 | 99 | 99 |
| 10 | 3 | 3 | 3 | 3 | 3 | 4 | 4 | 6 | 6 | 8 | 8 | 8 | 12 | 20 | 99 | 99 |
| 11 | 3 | 3 | 4 | 4 | 5 | 12 | 99 | 99 | 99 | 99 | 99 | 99 | 99 | 99 | 99 | 99 |
| 12 | 3 | 3 | 4 | 4 | 5 | 12 | 99 | 99 | 99 | 99 | 99 | 99 | 99 | 99 | 99 | 99 |
| 13 | 3 | 3 | 4 | 4 | 5 | 12 | 99 | 99 | 99 | 99 | 99 | 99 | 99 | 99 | 99 | 99 |
| 14 | 3 | 3 | 4 | 4 | 5 | 12 | 99 | 99 | 99 | 99 | 99 | 99 | 99 | 99 | 99 | 99 |
| 15 | 3 | 3 | 4 | 4 | 5 | 12 | 99 | 99 | 99 | 99 | 99 | 99 | 99 | 99 | 99 | 99 |
| 16 | 3 | 3 | 4 | 4 | 5 | 12 | 99 | 99 | 99 | 99 | 99 | 99 | 99 | 99 | 99 | 99 |
| 17 | 3 | 3 | 4 | 4 | 5 | 12 | 99 | 99 | 99 | 99 | 99 | 99 | 99 | 99 | 99 | 99 |
| 18 | 3 | 3 | 4 | 4 | 5 | 12 | 99 | 99 | 99 | 99 | 99 | 99 | 99 | 99 | 99 | 99 |
| 19 | 3 | 3 | 4 | 4 | 5 | 12 | 99 | 99 | 99 | 99 | 99 | 99 | 99 | 99 | 99 | 99 |
| 20 | 3 | 3 | 4 | 4 | 5 | 12 | 99 | 99 | 99 | 99 | 99 | 99 | 99 | 99 | 99 | 99 |
| 21 | 3 | 3 | 4 | 4 | 5 | 12 | 99 | 99 | 99 | 99 | 99 | 99 | 99 | 99 | 99 | 99 |
| 22 | 3 | 3 | 4 | 4 | 5 | 12 | 99 | 99 | 99 | 99 | 99 | 99 | 99 | 99 | 99 | 99 |
| 23 | 3 | 3 | 4 | 99 | 99 | 99 | 99 | 99 | 99 | 99 | 99 | 99 | 99 | 99 | 99 | 99 |
| 24 | 3 | 3 | 4 | 99 | 99 | 99 | 99 | 99 | 99 | 99 | 99 | 99 | 99 | 99 | 99 | 99 |
| 25 | 3 | 3 | 4 | 99 | 99 | 99 | 99 | 99 | 99 | 99 | 99 | 99 | 99 | 99 | 99 | 99 |
| 26 | 3 | 3 | 4 | 99 | 99 | 99 | 99 | 99 | 99 | 99 | 99 | 99 | 99 | 99 | 99 | 99 |
| 27 | 3 | 3 | 4 | 99 | 99 | 99 | 99 | 99 | 99 | 99 | 99 | 99 | 99 | 99 | 99 | 99 |
| 28 | 3 | 3 | 4 | 99 | 99 | 99 | 99 | 99 | 99 | 99 | 99 | 99 | 99 | 99 | 99 | 99 |
| 29 | 3 | 3 | 4 | 99 | 99 | 99 | 99 | 99 | 99 | 99 | 99 | 99 | 99 | 99 | 99 | 99 |
| 30 | 99 | 99 | 99 | 99 | 99 | 99 | 99 | 99 | 99 | 99 | 99 | 99 | 99 | 99 | 99 | 99 |
| 31 | 99 | 99 | 99 | 99 | 99 | 99 | 99 | 99 | 99 | 99 | 99 | 99 | 99 | 99 | 99 | 99 |

Premising that three factors described above are present, the item (1) is initially added to the item (2), thereby obtaining the following bit allocation information coefficients.

$$sb\ 0 \sim 2 \quad sb\ 3, 4 \quad sb\ 5, 6 \quad sb\ 7 \sim 10 \quad sb\ 11 \sim 15 \quad sb\ 16 \sim 18 \quad sb\ 19 \sim 22 \quad sb\ 23 \sim$$

$$1 \quad : \quad 4 \quad : \quad 10 \quad : \quad 37 \quad : \quad 39 \quad : \quad 40 \quad : \quad 42 \quad : \quad 57$$

The bit allocation control unit 1617 detects a subband having the smallest value from the obtained results, and the coding bit allocation unit 1606 performs coding bit allocation of 1 bit to the subband. When a plurality of subbands have the smallest value, the lowest subband is given priority. Thereafter, the bit allocation control unit 1617 performs weighting corresponding to the bit number to the subband to which the bit has been allocated, thereby obtaining the following result.

$$sb\,0 \quad sb\,1,2 \quad sb\,3,4 \quad sb\,5,6 \quad sb\,7\sim10 \quad sb\,11\sim15 \quad sb\,16\sim18 \quad sb\,19\sim22 \quad sb\,23\sim \qquad (3)$$
$$2 \;:\; 1 \;:\; 4 \;:\; 10 \;:\; 37 \;:\; 39 \;:\; 40 \;:\; 42 \;:\; 57$$

These operations performed by the bit allocation control unit 1617 are repeated until the total bit number to be allocated runs short, completing coding bit allocation. A description is given of the operations of the bit allocation control unit 1617 that performs bit allocation as described above, at a step S3 of the flow shown in FIG. 40, with reference to FIG. 41.

FIG. 41 is a flow chart showing process steps in an improved subband output adaptive bit allocation method. In a step S101, the bit allocation control unit 1617 calculates the scale factors of the respective subbands. This processing corresponds to the item (1). In a step S102, the bit allocation information coefficients of the respective subbands are calculated by the weighting processing on the basis of the minimum audible limit. This processing corresponds to the item (2).

The item (1) is added to the item (2). Then, a subband having the smallest bit allocation information coefficient is detected (step 3103), and 1 coding bit is allocated to the subband (step S104).

In a step S105, weighting that corresponds to the item (3) is performed. That is, to the subband to which the bit has been allocated in the step S104, there is added a weighting coefficient corresponding to the bit allocation number of the subband, which coefficient is obtained from the table 14. The operations in the steps S103 to S105 are repeated until it is judged in a step S106 that allocation of the total bit number has been completed. When the allocation is completed, the flow shown in FIG. 41 is completed. As a result, the step S3 of the flow shown in FIG. 40 is completed, followed by steps S4 and S5 as in the second prior art.

In this way, in the audio coding apparatus according to the sixteenth embodiment, there is provided with the bit allocation control unit 1617, and bits are allocated to the respective subbands on the basis of three factors, i.e., whether the respective subbands are ones at which it is probable to hear with human hearing or not, sound pressures of the respective subbands, and avoidance of allocation of bits more than required to the identical subband. Therefore, without exceedingly increasing a processing burden, coding bit allocation that makes the most of human hearing characteristics can be performed, thereby obtaining coded data having high playback quality of sound.

More specifically, the audio coding apparatus of the sixteenth embodiment has a construction in which the bit allocation control unit 1617 is added to the apparatus according to the first prior art, and the simple coding bit allocation using the relatively simple processing is performed to 32 subbands, thereby improving the playback quality of sound. As compared with the apparatus according to the second prior art in which Fast Fourier Transformation and psychoacoustic analysis are performed to 256 subbands, the apparatus of the fifteenth embodiment has a far less processing burden, and both of real-time processing and improvement of sound quality are possible when audio coding is performed in a general personal computer, a work station or the like that is realized by the hardware shown in FIG. 21. Further, as compared with the apparatus of the fifteenth embodiment, the audio coding apparatus of the sixteenth embodiment has a more processing burden duo to processing considering weighting for watching bit allocation conditions of the respective subbands, but can obtain coded data having higher playback quality of sound.

In addition, the calculating method in the improved subband output adaptive bit allocation method described for the sixteenth embodiment is one example. Even when the weight of the subbands and the weight corresponding to the bit allocation numbers of the subbands are changed, and even using not scale factor values but a subband output level ratio, the same allocation using the simple processing can be performed with the same effects.

Embodiment 17

An audio coding apparatus according to a seventeenth embodiment of the present invention realizes alternative psychoacoustic analysis control according to a coding bit allocation method considering the minimum audible limit, thereby improving playback quality of sound of coded data.

Figure 42:
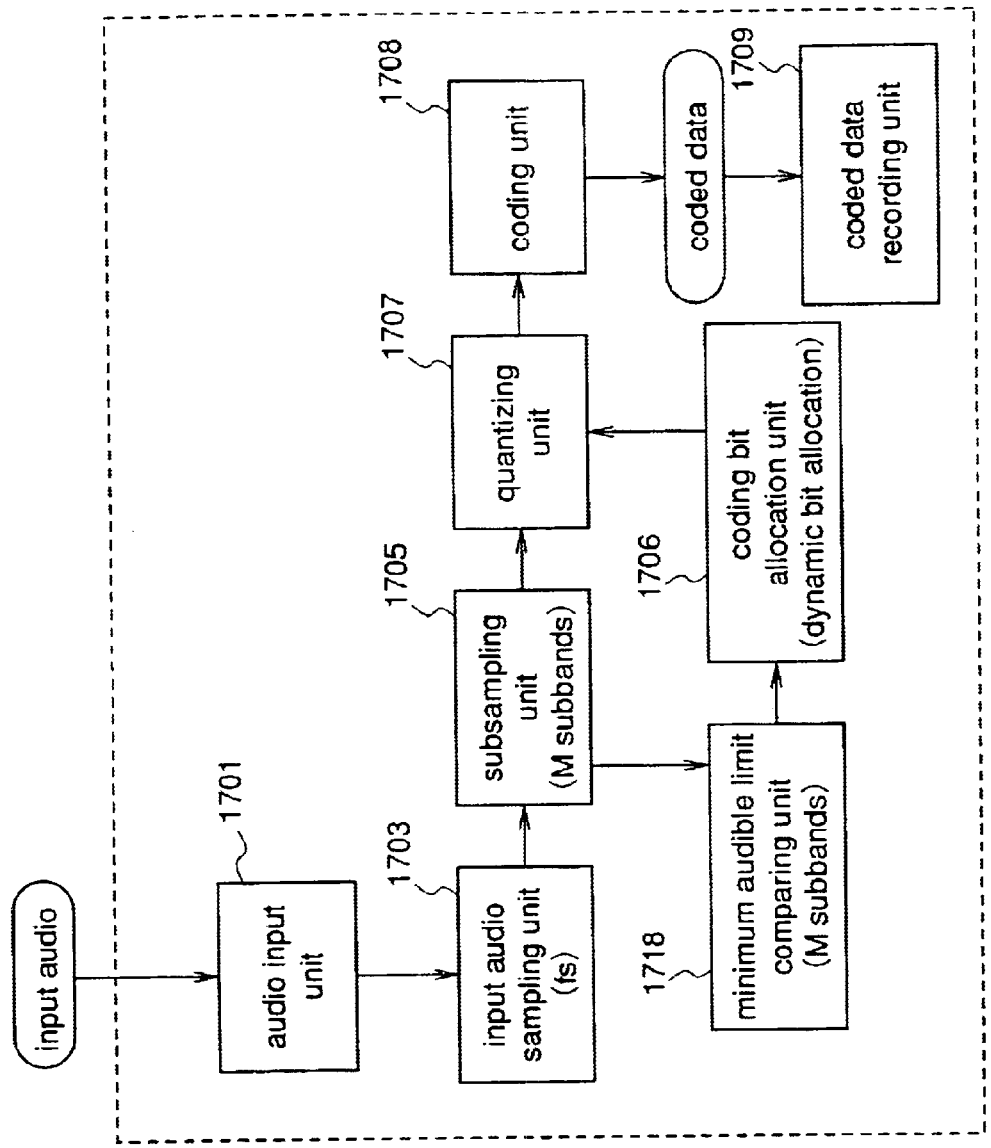
FIG. 42 is a block diagram illustrating a structure of an audio coding apparatus according to an embodiment 17 of the present invention.

FIG. 42 is a block diagram illustrating an audio coding apparatus according to a seventeenth embodiment of the present invention. As shown in the figure, the audio coding apparatus of the seventeenth embodiment comprises an audio input unit 1701, an input audio sampling unit 1703, a subsampling unit 1705, a coding bit allocation (dynamic bit allocation) unit 1706, a quantizing unit 1707, a coding unit 1708, a coded data recording unit 1709, and a minimum audible limit comparing unit 1718. This construction is identical to the construction of the apparatus according to the fourteenth embodiment, and is realized by the hardware shown in FIG. 11, similar to the ninth embodiment.

In FIG. 42, the minimum audible limit comparing unit 1718 comprises a CPU, a main memory and a program. M pieces of subband signal data are produced by performing subsampling in the subsampling unit 1705, and the minimum audible limit comparing unit 1718 compares the subband signal data with the minimum audible limit, and detects subbands not reaching the minimum audible limit. The coding bit allocation unit 1706 does not perform coding bit allocation to the subbands that have been detected by the minimum audible limit comparing unit 1718. The apparatus of the seventeenth embodiment is fundamentally identical to that of the fourteenth embodiment, except for the function of the minimum audible limit comparing unit 1718. That is, the audio input unit 1701, the input audio sampling unit 1703, the subsampling unit 1705, the coding bit allocation unit 1706, the quantizing unit 1707, the coding unit 1708, and the coded data recording unit 1709 are identical to those which are represented by the numerals 901, 903 and 905 to 909 described for the ninth embodiment, respectively, and no description is given of these units.

Figure 43:
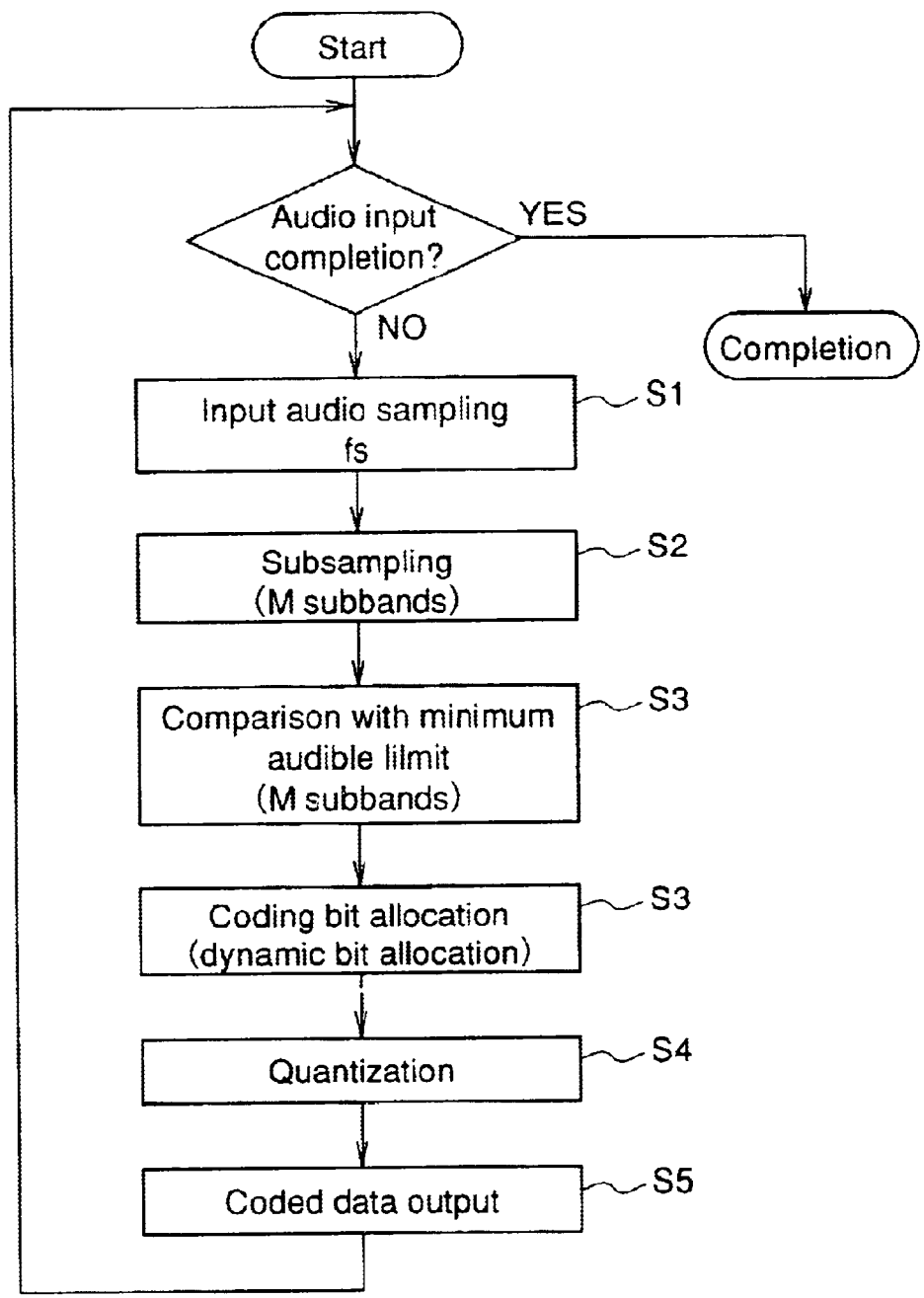
FIG. 43 is a flowchart illustrating a processing procedure of audio coding in the apparatus according to the embodiment 17.

FIG. 43 is a flow chart showing an audio coding operation according to the seventeenth embodiment of the invention. A description is given of the audio coding operation according to the flow chart shown in FIG. 43, with reference to FIG. 42.

In the apparatus of the seventeenth embodiment of the invention, previous to performing audio coding, the minimum audible limit comparing unit 1718 stores the minimum audible limit to M (32) pieces of subbands as a table, using a memory or the like as an internal memory means. This table is stored by reading data from a graph shown in FIG. 66 or numeric representation of this graph.

In the flow shown in FIG. 43, steps S1 and S2 are carried out as in the steps S1 and S2 shown in FIG. 62 in the second prior art, thereby producing subband signal data that are obtained by dividing sampled data into M pieces of frequency bands. According to the MPEG audio standard, M is assumed to be 32 as in the second prior art.

In the second prior art shown in FIG. 62, the sampled data is divided into L (256) pieces of subband signal data, Fast Fourier Transformation and psychoacoustic analysis including comparison with the minimum audible limit are performed to the subband signal data, and the allocation number of coding bits is determined. In the seventeenth embodiment of the invention, in a step S3 of the flow shown in FIG. 43, the minimum audible limit comparing unit 1718 compares M (32) pieces of subbands with the minimum audible limit, and on the basis of the comparison results, the coding bit allocation unit 1706 allocates coding bits to the M pieces of subband signal data.

In the step S3, the minimum audible limit comparing unit 1718 compares M (32) pieces of subband signal data that are obtained by the division of the subsampling unit 1705, with the minimum audible limit of the subbands corresponding to the table that has been previously stored, and detects subbands not reaching the minimum audible limit to output the same to the coding bit allocation unit 1706.

In a step S4, using the comparison results, the coding bit allocation unit 1706 does not allocate bits to the subbands not reaching the minimum audible limit, and allocates more bits to the other subbands exceeding the minimum audible limit. Then, steps S5 and S6 shown in FIG. 43 are carried out as in the second prior art.

In this way, in the audio coding apparatus according to the seventeenth embodiment, there is provided with the minimum audible limit comparing unit 1718. The minimum audible limit comparing unit 1718 compares the M pieces of subbands that are obtained by the division of the subsampling unit 1705, with the minimum audible limit that has been previously stored, and detects subbands not reaching the minimum audible limit, and the coding bit allocation unit 1706 does not allocate codify bits to the detected subbands. Therefore, without exceedingly increasing a processing burden, coding bit allocation that makes the most of human hearing characteristics can be performed, thereby obtaining coded data having high playback quality of sound.

More specifically, the audio coding apparatus of the seventeenth embodiment has a construction in which the minimum audible limit comparing unit 1718 is added to the apparatus according to the first prior art, and the M pieces of subbands that are obtained by the division are compared with the minimum audible limit. Therefore, in the seventeenth embodiment of the invention, as compared with the apparatus according to the second prior art, no Fast Fourier Trans formation to 256 subbands is required, and the operation and comparison of the subband signals are reduced to $32/256$, i.e., $1/8$, thereby exceedingly reducing a processing burden. Accordingly, both of real-time processing and improvement of sound quality are possible when audio coding is performed in a general personal computer, a work station or the like that is realized by the hardware shown in FIG. 21.

In addition, when the minimum audible limit table is stored previous to audio coding, the graph shown in FIG. 66 or numeric representation of this graph is read. However, according to the table D.1 in the standard (IS0/IEC11172–3), the minimum audible limit of the respective subbands may be obtained to store the same. Since this table contrasts INDEX with the minimum audible limit, the minimum audible limit is obtained from the table using the values of INDEX close to the respective center frequencies of M (32) subbands.

The above description is given of the ninth to seventeenth embodiments according to the present invention. In the audio coding of the ninth to thirteenth embodiments, the reduction of audio data at the subband signal data Level and the reduction in filter characteristics are substantially carried out, thereby deteriorating the sound quality. However, even in such a case and even in a low-performance CPU, it is possible to produce coded data of such as MPEG Audio at real time by a software without adding a hardware, and to utilize the data as MPEG data that are widely used as the international standard of moving picture coding. By adjusting the value of a variable constant, the reduction condition and the filter characteristics are controlled according to the coding processing performance of a CPU. Therefore, in not only a high-performance CPU but a poor-performance CPU, the coding at the sound quality according to its coding processing performance is possible, resulting in coding processing of a CPU of wide performance.

In the audio coding of the fourteenth to seventeenth embodiments, the sound quality is not more improved than when psychoacoustic analysis is performed in the second prior art. However, the sound equality is improved more than in the audio coding of the first prior art in which no psychoacoustic analysis is performed. Also in a general personal computer, a work station or the like, real-time coding with audio capture is realized by a software without adding a hardware, as well as the improvement of playback quality of sound is possible.

In addition, in any of the ninth to seventeenth embodiments, concerning the hardware, as a CPU is of higher performance, and the function of a sound board and the data transmission speed in the apparatus are higher, coding at higher quality is possible.

Further, in any of the ninth to seventeenth embodiments, it is possible to record the audio coding as an audio coding control program in a storage medium and perform the coding in a personal computer, a work station or other devices.

Furthermore, in any of the ninth to seventeenth embodiments, the coded data are stored in the memory. However, the data may be transmitted to other apparatus through a network or the like to store or utilize the data therein.

Furthermore, although in any of the ninth to seventeenth embodiments, the apparatus is realized by soft ware processing according to CPU control, it may be realized by soft ware processing according to DSP control in place of the CPU control.

Embodiment 18

A video and audio coding apparatus of a 18th embodiment performs pausing in a coding process in order to prevent coded audio information from being discontinuously output, using the stack amount of sound data as a indicator, in the case that a general purpose computer and the like performs this video and audio coding processes by software, even when its load is heavy.

Figure 44:
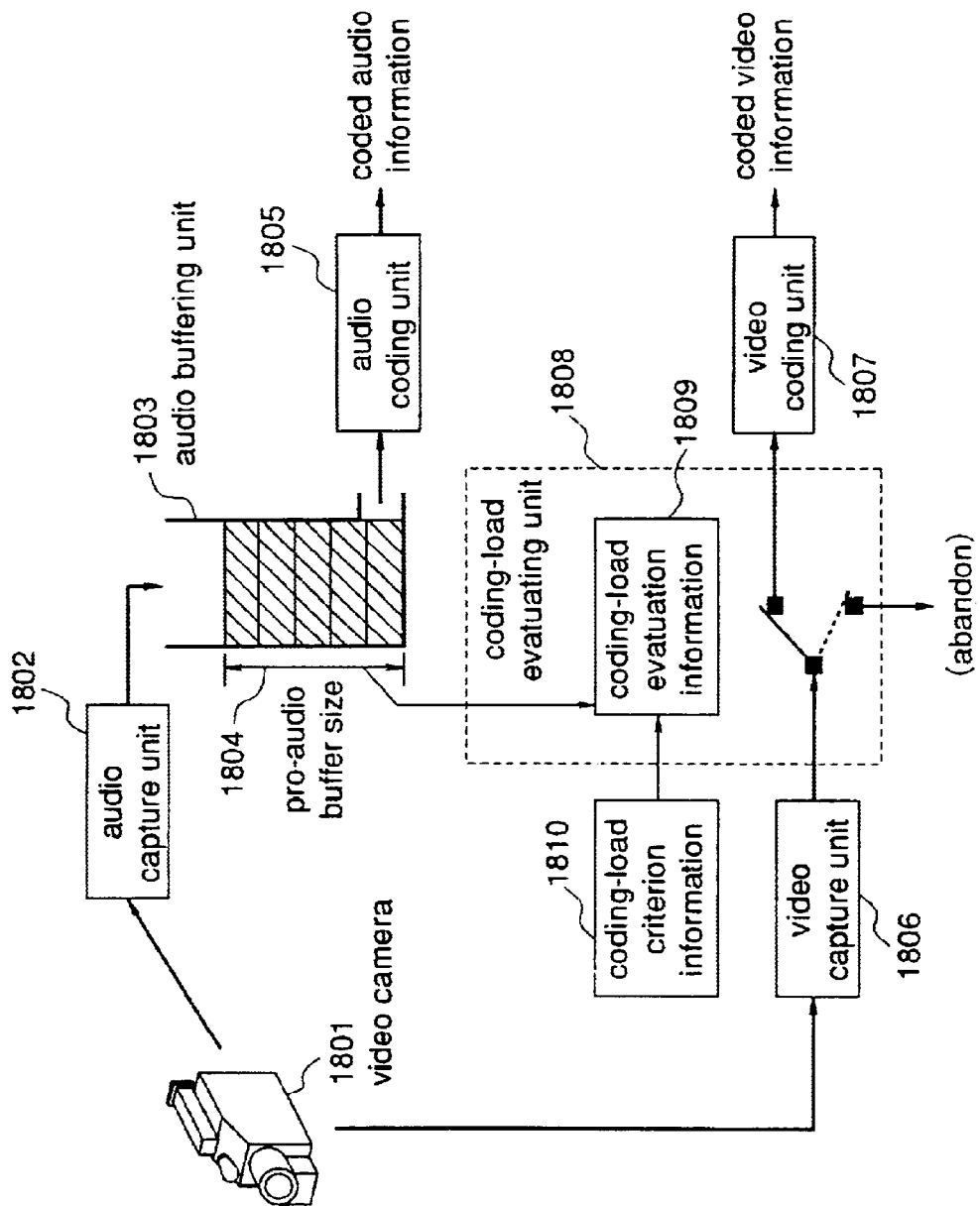
FIG. 44 is a schematic structure of a video and audio coding apparatus according to an embodiment 18 of the present invention.

FIG. 44 shows an outline of the constitution of the video and audio coding apparatus. As shown in the figure, the apparatus comprises a video camera 1801, an audio capture unit 1802, an audio buffering unit 1803, an audio coding unit 1805, a video capture unit 1806, a video coding unit 1807, and a coding-load evaluating unit 1808. The video and audio coding apparatus outputs coded audio and coded video information which will be transmitted or recorded afterward according to user's demands.

The video camera 1801 captures video and audio information, and outputs separately analog video and audio signals. The audio capture unit 1802 is input the analog audio signals from the video camera 1801, and then outputs digital pro-audio signals which are discrete digital data. The digital pro-audio signals output by the audio capture unit 1802 are temporarily stacked in the audio buffering unit 1803. The total size of the digital pro-audio signals stacked in the audio buffering unit 1803 is designated as a pro-audio buffer size 1804 which is information with which the video and audio coding apparatus is controlled The audio coding unit 1805 takes the pro-audio signals stacked in the audio buffering unit 1803, compressive-codes it, and outputs them as coded audio information. When the audio coding unit 1805 takes the temporarily-stacked pro-audio signals, the unit gets the pro-audio signals stacked in the most past and deletes them from the audio buffering unit 1803. Accordingly, the audio buffering unit 1803 should have a Fist-In-First-Out (FIFO) structure, which is realized in the actual use by a ring-buffer algorithm etc.

The video capture unit 1806 is input the analog video signals from the video camera 1801 and outputs digital pro-video signals which are discrete digital data of plural pieces of still pictures captured per a unit time. In this case, the pro-video signals have a given resolution. The above-described video capture unit 1806 and the audio capture unit 1802 are realized by a general video capture board usually equipped by a personal computer for multimedia. The video coding unit 1807 is input the pro-video signals from the video capture unit 1806, compressive-codes it, and outputs them as coded video information. The coding-load evaluating unit 1808 evaluates the load of a coding task of the video and audio coding apparatus and controls the video coding unit 1807 to process the pro-video signals from the video capture unit 1806 according to the evaluated value. The coding-load evaluating unit 1908 produces the coding-load evaluation information 1809 using a coding-load criterion information 1810, and decided whether the pro-video signals are input into the video coding unit 1807 or are abandoned, according to the value of the coding-load evaluation information 1809. When the pro-video signals are abandoned, the video coding unit 1807 has a pause in its coding process and thereby a computer resource (CPU time) is given to the audio coding unit 1805.

In order to obtain the coding-load evaluation information 1809, the coding-load evaluating unit 1808 produces an evaluation information by calculating the value of the audio buffer size 1804, and multiplies it by the coding-load criterion information 1810. In the 18th embodiment, when producing the evaluation information, if the audio buffer size 1804 is larger than half of the maximum stack size, the evaluation information is rendered 0%; if the audio buffer size 1804 is smaller than half of the maximum stack size, the evaluation information is rendered 100%.

The coding-load criterion information 1810 is information which indicates a criterion of how much size of the pro-video signals are coded in the video coding process. In other words, for example, it specifies a size indicating how much pro-video signals to be processed when the audio buffer is empty. In this 18th embodiment, the size is always determined as "1"; namely, the evaluation information multiplied by the coding-load criterion information 1810 produces the evaluation information itself which becomes the coding-load evaluation information 1809. Therefore, the coding-load evaluation information has a value as 0% or 100%. In the case of 100%, the coding-load evaluating unit 1808 renders 100% of the pro-video signals input into the video coding unit 1807. In the case of 0%, all the pro-video signals are abandoned, and the process of the video coding unit 1807 is paused and thereby the computer resources (CPU time) are given to the audio coding unit 1805.

An outline of the operation of the video and audio coding apparatus of the 18th embodiment constructed as described above is explained as follows. The audio capture unit 1802 is input analog audio signals from the video camera 1801 and then outputs digital pro-audio signals which are discrete digital data. The pro-audio signals output by the audio capture unit 1802 are temporarily stacked in the audio buffering unit 1803. Thereafter, the audio coding unit 1805 takes some pro-audio signals stacked in the most past and deletes them from the audio buffering unit 1803, and compressive-codes them and outputs them as coded audio information. The audio coding unit 1805 rewrites the audio buffer size 1804 which specifies the total size of the pro-audio signals stacked in the audio buffering unit 1803. The pro-audio buffer size is memorized as information for coding processes of the video and audio coding apparatus.

When the video capture unit 1806 is input analog video signals from the video camera 1801, it outputs digital pro-video signals which are discrete digital data of plural still pictures' information captured in a given resolution per a unit time. Thereafter, the video coding unit 1807 is input the pro-video signals from the video capture unit 1806, and then compressive-codes them and outputs them as coded video information. The coding-load evaluating unit 1808 calculates the coding-load evaluation information 1809 and decides whether to input the pro-video signals into the video coding unit 1807, or to abandon the pro-video signals and pause the process of the video coding unit 1807 and give the computer resources (CPU time) to the audio coding unit 1805. When input the pro-video signals, the video coding unit 1807 compressive-codes them and outputs the coded video information.

Figure 45:
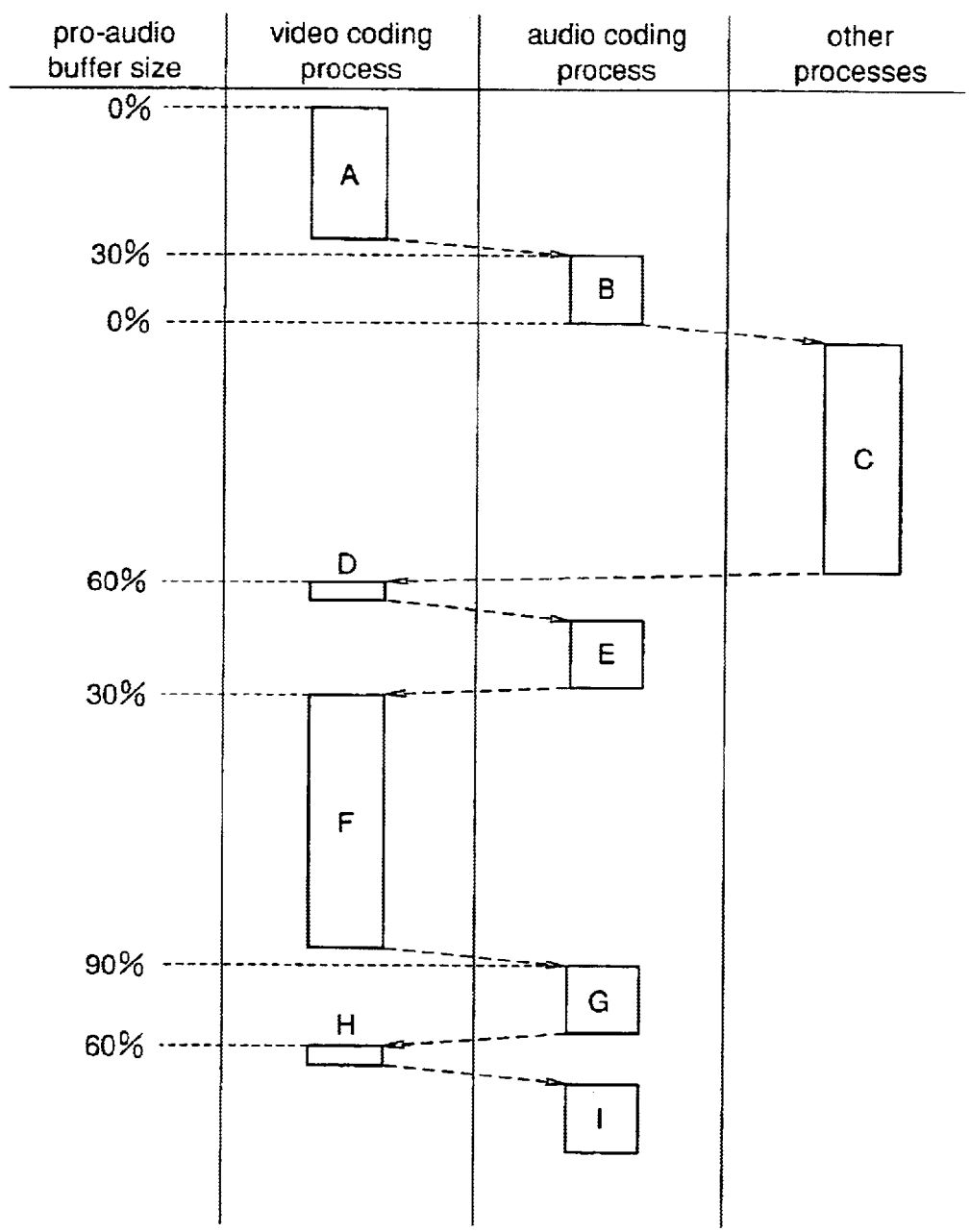
FIG. 45 is a diagram illustrating an operation of the video and audio coding apparatus according to the embodiment 18.

FIG. 45 illustrates it by a diagram how the video and audio coding apparatus of the 18th embodiment captures video and audio information and transforms it into codes. This apparatus is able to be implemented in a general purpose computer such as a personal computer and the like. The general purpose computer works on a multitask operating system and thereby is able to process multitasks independently. In the video and audio coding processes, a multitask operating system assign a task to the video coding process and another task to the audio coding process. The tasks of the video and audio coding processes are assigned a computer resource, i.e. CPU time, by the operating system. Each process is executed during its assigned time by the CPU. When a task is completed and then the computer resource (CPU time) is released, the operating system is supposed to assign the computer resource to another task.

In the figure, the process time proceeds toward the bottom of the figure. Squares in the figure shows that a computer resource (CPU time) is consumed by each process (task) on an operating system. A dotted line with an arrow connecting between squares represents that a process switches to another one. The dotted line with an arrow is drawn at a slant. The angle of the slant represents some time which it takes to switch processes, namely the overhead time during which the operating system switches tasks. In the following description, this overhead time is ignored because it is relatively small as compared with the time consumed by the tasks.

In the figure, a column named "video coding process" shows time consumed by processes for coding video signals, i.e. the processes of the coding-load evaluating unit 1808 and the video coding unit 1807 according to the above-described constitution. Further, a column named "audio coding process" shows time consumed by a process for coding audio signals, i.e. the process of the audio coding unit 1805 according to the above-described constitution. Furthermore, a column named "other processes" shows time consumed by all processes except "video coding process" and "audio coding process". Further, a column named "pro-audio buffer size" shows the ratio of the pro-audio buffer size at each time against the maximum buffer size.

It should be noted that, in the constitution of the video and audio coding apparatus, the video camera 1801 is connected to a general purpose computer which the main body of the apparatus is implemented on, and is a peripheral which works relatively independently. The video camera 1801 is assigned CPU time as described above and operates almost parallel to processes which are executed by CPU control. A video capture board which realizes the audio capture unit 1802 and the video capture unit 1806 also works relatively independently as well as the video camera 1801. Therefore, the audio capture unit 1802 and the video capture unit 1806 operate almost parallel to the above-mentioned processes.

Namely, even when a video and audio coding processes and other processes are executed, almost simultaneously capturing video and audio information, producing the digital pro-video and pro-audio signals, and stacking the pro-audio signals in the audio buffering unit 1803 are performed.

The operation of this example of video and audio coding apparatus of the 18th embodiment is described as follows, referring to FIGS. 44 and 45. At first, the video camera 1801 captures video and audio information, and outputs separately analog video and analog audio signals. The analog video signals are input into the video capture unit 1806 in which analog/digital conversion process produces digital pro-video signals composed of plural still pictures' information and which outputs the digital pro-video signals. These processes consist mainly of the operation of the video camera 1801 and the process of the video capture unit 1806, i.e. a video capture board, and thereby proceed parallel to each CPU-time-consuming process which is executed by the operating system.

The coding-load evaluating unit 1808 is input the output pro-video signals and checks the current pro-audio buffer size 1804. At this time, there is no audio signals input in the audio buffering unit 1803, so the pro-audio buffer size 1804 is 0%. Thus the size is lower than a given criterion 50%. As described above, in this embodiment the coding-load criterion information 1810 has a value "1" so that it is not taken into account in multiplication and thereby the coding-load evaluation information 1809 becomes 100%. Therefore, the coding-load evaluating unit 1808 outputs 100% of the input pro-video signals into the video coding unit 1807. The video coding unit 1807 performs a video coding process to the pro-video signals. When the performance is completed, the CPU time is released. The above-described processes of the coding-load evaluating unit 1808 and the video coding unit 1807 correspond to the part A in the column of video coding process in FIG. 45.

Meanwhile, the audio capture unit 1802 is input analog audio signals from the video camera 1801, converts the signals into digital pro-audio signals by analog/digital conversion, and outputs the digital signals. The pro-audio signals are input and temporarily stacked into the audio buffering unit 1803 which rewrites the pro-audio buffer size 1804 memorized in the video and audio coding apparatus. These processes consist mainly of the operation of the video camera 1801 and the process of the audio capture unit 1802, i.e. a video capture board, and thereby proceed parallel to each process which is executed by the operating system as shown in FIG. 45. In this case, it is assumed that the process is executed parallel to the video coding process A and thereby the pro-audio buffer size reaches 30%.

The audio coding unit 1805 reads out a given amount of the pro-audio signals stacked in the past from the audio buffering unit 1803 and deletes the read-out pro-audio signals from the audio buffering unit 1803, and rewrites the audio buffer size 1804. Moreover, the audio coding unit 1805 digitizes the pro-audio signals. In this 18th embodiment, the size of the above-described read-out pro-audio signals are defined 30% of the maximum buffer size. Therefore, since the audio buffering unit 1803 has itself 30% stacked as described above, the audio coding unit 1805 reads out all of the stacked information and releases CPU time after completing their coding. This process of the audio coding unit 1805 corresponds to the part B of the audio coding process column in the FIG. 45. At the time, as shown in FIG. 45, another application is started to be executed by chance and demands for CPU time, and the application consumes CPU time. The application has a relatively heavy load, and therefore occupies CPU time for a while before releasing CPU time. This process in the other task corresponds to the part C of the other processes column in FIG. 45. The processes by the video camera 1801, the audio capture unit 1802 and the video capture unit 1806 are executed parallel to the process of the part C. Therefore, the pro-audio signals is temporarily stacked in the audio buffering unit 1803, so the pro-audio buffer size reaches 60% as shown in FIG. 45.

Next, the coding-load evaluating unit 1808 takes its turn to be assigned CPU time. At this moment, the pro-audio buffer size 1804 is 60% which is beyond the criterion 50%. Therefore, the coding-load evaluating unit 1808 obtains the evaluation information which is 0%. The coding-load evaluation information 1809 becomes 0% even after multiplied by the coding-load criterion information 1810 "1". As a result, the coding-load evaluating unit 1808 abandons the current pro-video signals, so the video coding unit 1807 does not execute any coding process and CPU time is released. This process of the coding-load evaluating unit 1808 corresponds to the part D in FIG. 45.

Thereafter, the audio coding unit 1805 takes its turn to be assigned CPU time, and reads out 30% of the pro-audio signals from the audio buffering unit 1803, deletes them from the audio buffering unit 1803 and rewrites the pro-audio buffer size 1804. The pro-audio buffer size 1804 changes from 60% to 30%. Subsequently, the audio coding unit 1805 codes the pro-audio signals and releases CPU time at the time when completing its coding. This process of the audio coding unit 1805 corresponds to the part E in FIG. 45.

The coding-load evaluating unit 1808 takes its turn again to be assigned CPU time. At this time, the pro-audio buffer size 1804 is 30% which is less than the criterion 50%, so as well as the case of the part A in FIG. 45 the coding-load evaluation information 1809 becomes 100% and the video coding unit 1807 begins to code the pro-video signals. As compared with the case of the part A in FIG. 45, it takes longer time for the coding process than the case of the part A. The video coding unit 1807 consumes relatively large CPU time before CPU time is released. The above-described processes of the coding-load evaluating unit 1808 and the video coding unit 1807 correspond to the part F of the video coding process column in FIG. 45. The pro-audio signals is stacked in the audio buffering unit 1803 parallel to this process F, resulting in the 90% of pro-audio buffer size.

The audio coding unit 1005 takes its turn again to be assigned CPU time, so it reads out 30% of the pro-audio signals and deletes them and rewrites the pro-audio buffer size 1804. The pro-audio buffer size 1804 changes from 90% to 60%. Further, the audio coding unit 1805 codes the pro-audio signals and releases CPU time at the time when completing its coding. This process of the audio coding unit 1805 corresponds to the part G in FIG. 45.

The coding-load evaluating unit 1808 takes its turn again to be assigned CPU time. At this time, the pro-audio buffer size 1804 is 90% which is more than the criterion 50%, so as well as the case of the part D in FIG. 45 the coding-load evaluation information 1809 becomes 0% and the video coding unit 1807 does not begin to code the pro-video signals. At the moment CPU time is released. The processes of the coding-load evaluating unit 1808 corresponds to the part H in FIG. 45. The audio coding unit 1805 takes its turn again to be assigned CPU time, so it reads out 30% of the pro-audio signals and deletes them and rewrites the pro-audio buffer size 1804. Further, the audio coding unit 1805 codes the pro-audio signals and releases CPU time at the time when completing its coding. This process of the audio coding unit 1805 corresponds to the part I in FIG. 45.

While the video camera 1801 is capturing video and audio information in FIG. 44, coding video and audio signals is executed by the above-described video and audio coding processes. The coding processes are completed after finishing capturing video and audio information.

Figure 46:
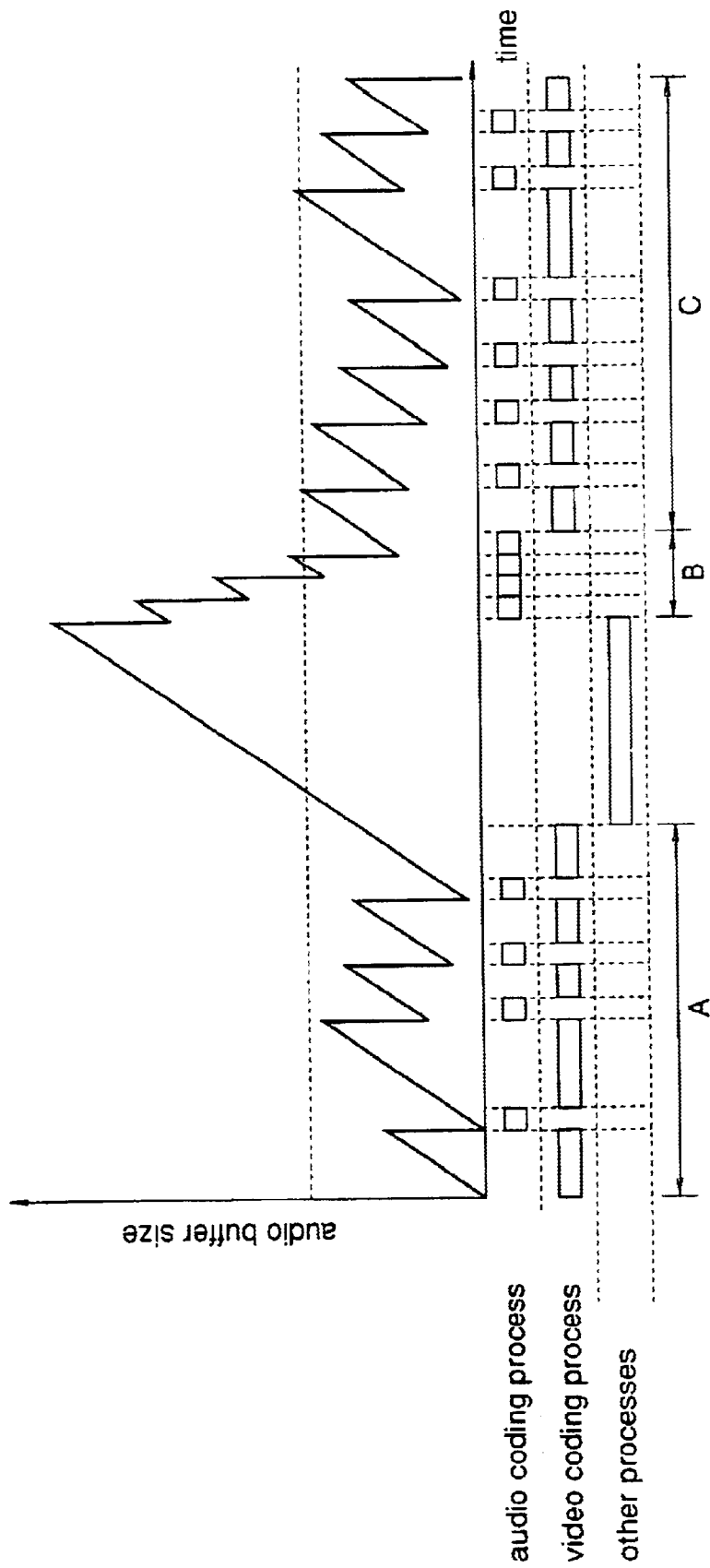
FIG. 46 is a diagram for explaining an operation over a long period in the video and audio coding apparatus according to the embodiment 18.

FIG. 46 is a diagram which describes the operation of the coding process in a long-time span. In the figure, during the interval A the video and audio coding processes are performed very balanced so that the audio buffer size is kept less than the criterion size. Thereafter, as shown in the figure, the other process occupies CPU time, so the pro-audio signals are too much stacked in the audio buffering unit 1803 simultaneously. As a result, during the next interval B the audio coding process takes priority so as to process the stacked pro-audio signals. When the pro-audio signals reduces and becomes less than the criterion, the normal processes are executed during the interval C in the figure.

As described above, the video and audio coding apparatus of the 18th embodiment includes the audio buffering unit 1803 and the coding-load evaluating unit 1808. The coding-load evaluating unit 1808 checks the pro-audio buffer size 1804 which is not-yet-processed pro-audio signals stacked in the audio buffering unit 1803 before the coding process by the coding-load criterion information 1810, so that, if the not-yet-processed pro-audio signals is stacked less than a given size, the video coding process is executed; and if the not-yet-processed pro-audio signals more than a given size, the current video signals are abandoned, the video coding process is not executed and CPU time is given to the audio coding unit 1805. As a result, when there is a lack of a computer resource because other applications or the video coding unit itself consume the computer resource, there arises no more than the frame omission which hardly causes a recognizable problem, whereby avoiding an adverse discontinuous output of audio information due to the video coding process.

Further, in the video and audio coding apparatus of the 18th embodiment, the video coding unit 1807 performs coding video signals when input them by the coding-load evaluating unit 1808. Something that only performs coding input video signals is possible to be used as the video coding unit 1807 of the 18th embodiment. Namely, an image compression subroutine or tile like, i.e. an existing video coding unit can be applied, without any modification, to a video coding unit 1807. Therefore, if a general purpose computer has an operational environment for video and audio information which enables a module of compression subroutine to be included as an add-on, the compression subroutine, as it is, is applied to the video and audio coding processes, resulting in an great efficiency in a software development.

In the 18th embodiment, processes in the multitask operation are switched by that each process itself releases the computer resource (CPU time). This invention is not limited to such an situation. It is possible to realize the invention in other situations. For example, it is a possible situation that an operating system assign a given CPU time to each process, and each process is unconditionally switched to another one when using up its CPU time. In this case, if the video coding process supervises the progress of the audio coding process before using up the CPU time and, if necessary, instantaneously release CPU time, the assignment of the computer resource (CPU time) is more efficiently performed, resulting in a superior coding.

Further, in the 18th embodiment, image signals (still picture information) to be coded are abandoned in order to release the CPU time for the video coding process. Namely, when still picture information is input in such a manner as that "a still picture at 0 second, a still picture at 1 second, a still picture at 2 second", the information is, if necessary, coded into "a still picture at 0 second, a still picture at 2 second". Of course, it is not necessary that the finally-output coded information has less frames. This is because the finally-output coded information could have pretendedly no frame omission if each still video information has a time code which indicates what time it is taken, and the video coding unit checks the time codes to decide whether any frame omission happened or not, and, in the case that there exists a frame omission, outputs its substitute frame(the same still picture as a previous one, or a code representing that) This method is easily applied to the cases when a given number of frames of video information (e.g. 30 frames per a second) must be output, such as the Moving Picture Experts Group(MPEG) standard.

Embodiment 19

A video and audio coding apparatus of a 19th embodiment performs controlling a prediction process for coding in order to prevent coded audio information from being discontinuously output by using the stack amount of sound data as a indicator, even in the case when there exist an increase in the load of software process in a general purpose computer and the like.

Figure 47:
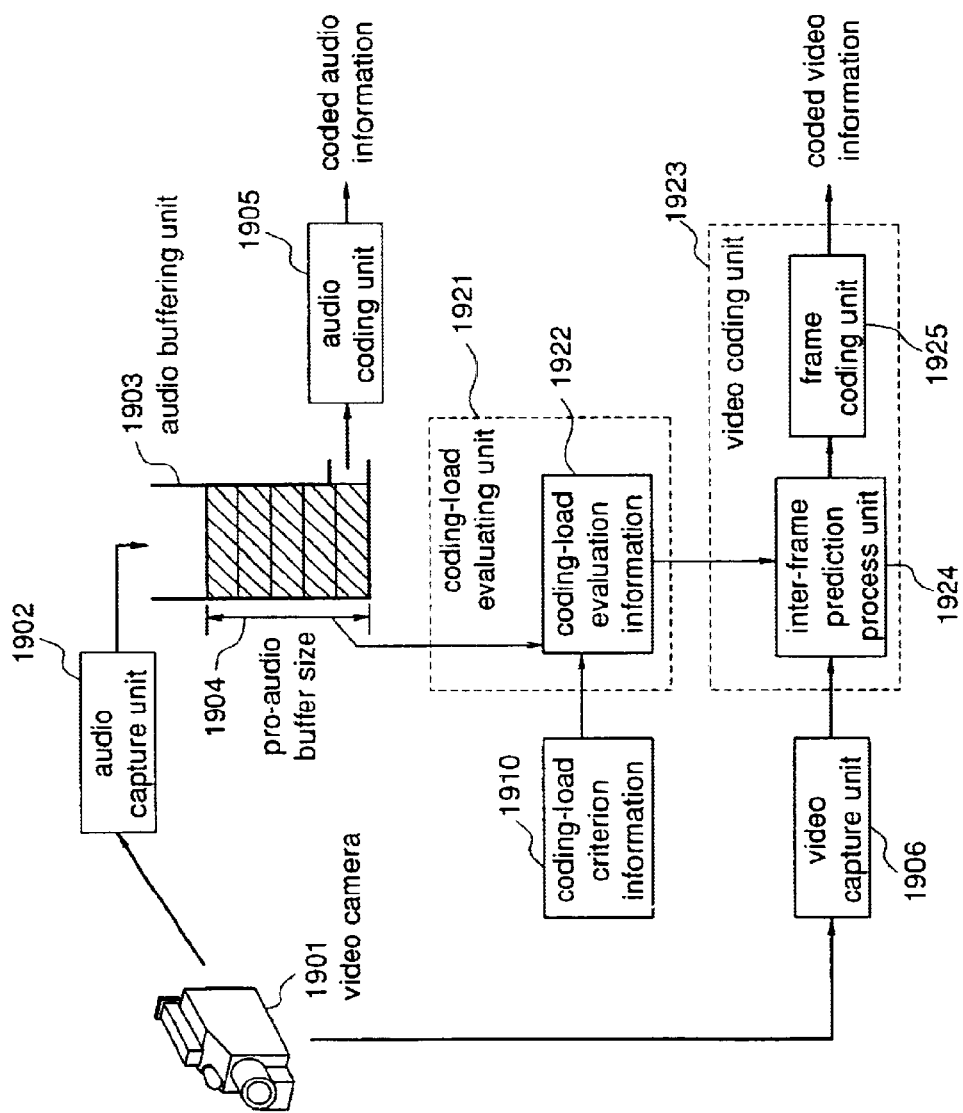
FIG. 47 is a schematic structure of a video and audio coding apparatus according to an embodiment 19 of the present invention.

FIG. 47 shows an outline of the constitution of the video and audio coding apparatus. As shown in the figure, the apparatus comprises a video camera 1901, an audio capture unit 1902, an audio buffering unit 1903, an audio coding unit 1905, a video capture unit 1906, a video coding unit 1923, and a coding-load evaluating unit 1921. The video coding unit 1923 includes an inter-frame prediction process unit 1924 and a frame coding unit 1925. The video and audio coding apparatus outputs coded video and audio information as well as that of the 18th embodiment.

In the figure, the coding-load evaluating unit 1921 calculates the coding-load evaluation information 1922, based on the audio buffer size 1904 and the coding-load criterion information 1910. The inter-frame prediction process unit 1924 included in the video coding unit 1923 calculates and outputs motion vectors for a compressive coding which reduces temporal redundancy of video signals, and for a predictive coding with motion compensation. The frame coding unit 1925 included in the video coding unit 1923 codes video signals, using the motion vectors output from the inter-frame prediction process unit 1924, and outputs them as coded video information.

The descriptions about the video camera 1901, the audio capture unit 1902, the audio buffering unit 1903, the audio coding unit 1905 and the video capture unit 1906 are omitted because those are the same as 1801 to 1803, 1805 and 1806, respectively.

In order to obtain the coding-load evaluation information 1922, the coding-load evaluating unit 1921 produces an evaluation information by calculating the value of the audio buffer size 1904 of the audio buffering unit 1903, and multiplies it by the coding-load criterion information 1910. In the 19th embodiment as well as the 18th embodiment, the coding-load criterion information 1910 has a constant value "1". Therefore, it is not taken into account in multiplication and thereby the coding-load evaluation information 1922 becomes the ratio of how much empty the buffer of the audio buffering unit 1903 is. It is 100% when the buffer is empty, while it is 0% when the buffer is full.

In general, compressive coding has two different coding methods: an intra-frame coding which performs compression based on spatial correlation within one frame(one picture) of still video pictures and an inter-frame coding which performs compression based on temporal correlation between temporally close frames, say, continuous frames of still video pictures. The intra-frame coding is basically performed. However, the combination of the two makes it possible to obtain a high compression rate of coded data. In order to perform the inter-frame coding, motions in every frame are detected as motion vectors, predictive pictures are generated with motion compensation using the motion vectors, and differential data between the predictive picture and a picture to be coded are compressed.

The inter-frame prediction process unit 1924 produces motion vectors of still video pictures. The motion vectors are used for a predictive picture generating process which compressive-codes video information with reduction of its temporal redundancy. In this 19th embodiment, the inter-frame prediction process unit 1924 performs a prediction process for a specified ratio. Namely, the maximum size of video signals used for the prediction process is initially defined, the coding-load evaluation information 1922 is input just before the prediction process begins, video information is inter-frame-prediction-processed according to the ratio of the coding-load evaluation information 1922 to the maximum size. When the coding-load evaluation information 1922 is 100%, a maximum size of video signals are inter-frame-prediction-processed and the obtained optimal motion vectors are output. On the other hand, when the coding-load evaluation information 1922 is 50%, 50% of a maximum size of video signals are inter-frame-prediction-processed and the obtained current optimal motion vectors are output. In both cases, the frame coding unit 1925 performs the coding process, using the motion vectors output from the inter-frame prediction process unit 1924. In the process which obtains motion vectors, the larger is the processed size of video signals, the more optimal motion vectors are obtained and thereby the less is a difference between a predictive picture and a picture to be coded which makes it possible that the more efficient compression is performed. Meanwhile, when the processed size of video signals is reduced, optimal vectors are not obtained and the compression rate decreases. At the cost of the quality of picture it would be possible to hold the high compression rate without any increase in the processed size Of video signals.

An outline of the operation of the video and audio coding apparatus of the 19th embodiment as constructed above is described as follows. In the video and audio coding apparatus, pro-audio signals are stacked in the audio buffering unit 1903. The audio buffer size 1904 is rewritten according to the current stack size. The coding-load evaluating unit 1921 outputs the coding-load evaluation information 1922 according to the audio buffer size 1904 and the coding-load criterion information 1910. The video coding unit 1923 codes pro-video signals from the video capture unit 1906 and outputs them. The inter-frame prediction process unit 1924 produces motion vectors of still video pictures. The motion vectors are used for a predictive picture generating process which compressive-codes video signals with reduction of its redundancy. The frame coding unit 1925 codes video signals, using motion vectors output by the inter-frame prediction process unit 1924, and outputs the coded video information. Read-out and coding of pro-audio signals are performed in the same way as the 18th embodiment.

An example of how a video and audio coding apparatus of the 19th embodiment processes a certain video and audio information, is described as follows. As well as the 18th embodiment, a video and audio coding process consists of a video coding process(the processes of the coding-load evaluating unit 1921 and video coding unit 1923) and an audio coding process (the process of the 1905) which are regarded as tasks controlled by an operating system of a general purpose computer. The operating system is supposed to assign CPU time to one task when another task which has been previously assigned CPU time is executed and then releases the computer resource (CPU time).

As well as the 18th embodiment, at first, the video camera 1901 captures video and audio information, and outputs separately analog video and analog audio signals. Thereafter, the audio capture unit 1902 is input analog audio signals from the video camera 1901 and outputs digital pro-audio signals. The pro-audio signals are stacked in the audio buffering unit 1903 and rewrites the audio buffer size 1904 according to the current stack size. On the other hand, the video capture unit 1906 is input analog video signals from the video camera 1901 and outputs digital pro-video signals.

The coding-load evaluating unit 1921 checks the current audio buffer size 1904. In this example, it is assumed that the stacked pro-audio signals shares 30% of the buffer size and thereby the coding-load evaluation information 1922 is 70%. The inter-frame prediction process unit 1924 obtains the 1922. Since the 1922 is 70%, the inter-frame prediction process unit 1924 processes 70% of the input pro-video signals. The inter-frame prediction process unit 1924 obtains optimal motion vectors by utilizing the 70% of the pro-video signals and outputs them into the frame coding unit 1925. Using the motion vectors, the frame coding unit 1925 codes video signals, output the coded video information, and releases the CPU time assigned for the video coding process. The audio coding unit 1905 reads out a given size of the pro-audio signals stacked in the most past from the audio buffering unit 1903 (one read-out size of pro-audio signals), deletes them from the audio buffering unit 1903, and rewrites the audio buffer size 1904. Moreover, the audio coding unit 1905 codes the pro-audio signals.

In the 19th embodiment, the above-mentioned read-out size of pro-audio signals is defined 30%. As described above, the audio buffering unit 1903 has currently 30%-buffer-size of pro-audio signals, so the audio coding unit 1905 reads out all of the pro-signals and releases CPU time after completing the coding.

The coding-load evaluating unit 1921 is assigned CPU time and checks the current audio buffer size 1904. Since it is just after the audio coding process, the pro-audio signals stacked in the audio buffering unit 1903 is 0%, so the coding-load evaluation information 1922 becomes 100%. The inter-frame prediction process unit 1924 processes the maximum size of initially-input pro-video signals, obtains optimal motion vectors. The frame coding unit 1925 codes the pro-video signals, using the motion vectors, and outputs coded video information and release CPU time after the coding.

While the video camera 1901 is capturing video and audio information in FIG. 47, coding video and audio signals is executed by the above-described video and audio coding processes. The coding processes are completed after finishing capturing video and audio information.

As described above, the video and audio coding apparatus of the 19th embodiment includes the audio buffering unit 1903, the coding-load evaluating unit 1921, and the video coding unit 1923 which comprises the inter-frame prediction process unit 1924 and the frame coding unit 1925. The coding-load evaluating unit 1921 checks the pro-audio buffer size 1904 which is the size of not-yet-processed pro-audio signals stacked in the audio buffering unit 1903 before the coding process by the video coding unit 1923. According to the size, how much signals are processed by the inter-frame prediction process unit 1924 is determined, which controls CPU time which is consumed by the video coding process. As a result, when there is a lack of computer resource because other applications or the video coding unit itself consume the computer resource, there arises no more than the temporary reductions of compression rate and quality of pictures which hardly cause a recognizable problem, whereby avoiding an adverse discontinuous output of audio information due to the video coding.

The video coding unit 1923 is dependent of the coding-load evaluation information 1922 output by the coding-load evaluating unit 1921, so the video coding unit 1923 must take input from the coding-load evaluating unit 1921 and execute processes based on the coding-load evaluation information 1922. Thus, the video coding unit 1923 is not realized by the application of a module of a conventional subroutine program. This case is different from the 18th embodiment. Nevertheless, in order to reduce the load of a video coding process, it is the size of the video coding process that is reduced and it is different from the 18th embodiment in which the video signals are abandoned. This realizes that the coded video information has smooth movements in its pictures as compared with the 18th embodiment.

The emphasis has been placed on that the size of the inter-frame prediction process which calculates optimal motion vectors is adjusted in order to control the amount of CPU time needed for the video coding process in the 19th embodiment. However, some methods that simplify the video coding process such as omitting partially color coding and the like are also within the scope of the invention.

Further, in the 19th embodiment the emphasis has been placed on that the emptiness ratio of pro-video signals in the audio buffer size itself is rendered to be the coding-load evaluation information. However, another method for evaluating the coding-load is also within the scope of the invention, in which the coding-load evaluation information remains 100% until the audio buffer size becomes beyond a given level; but once beyond the level, the coding-load evaluation information is reduced to 50% or 30% like a step function.

Embodiment 20

A video and audio coding apparatus of a 20th embodiment performs changing picture resolutions in coding, using the stack size of audio data as a indicator, so it prevents coded audio information from being discontinuously output, as well as the 18th embodiment, even when the load of software process is increased in a general purpose computer and the like in which the apparatus is implemented.

Figure 48:
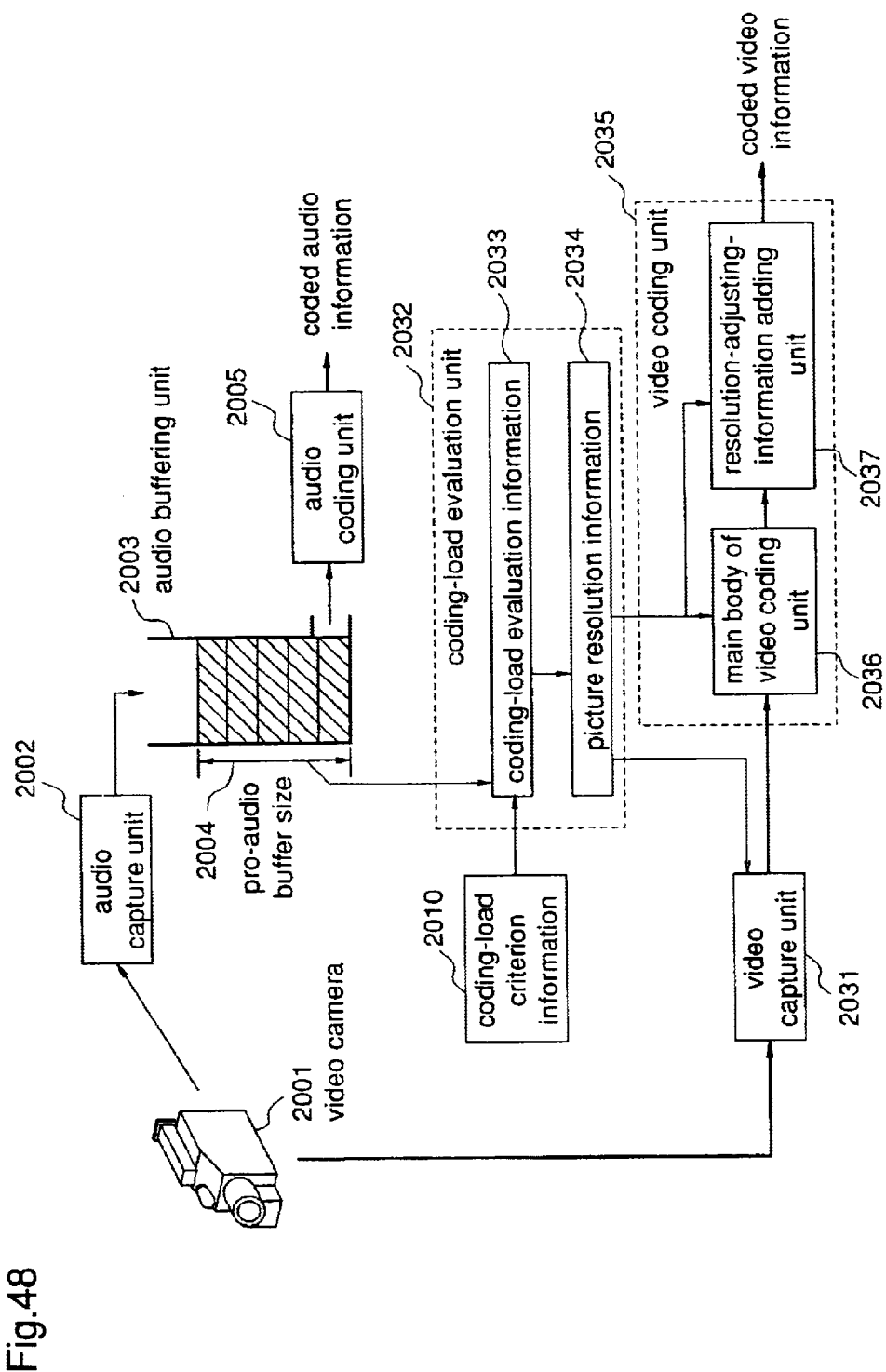
FIG. 48 is a schematic structure of a video and audio coding apparatus according to an embodiment 20 of the present invention.

FIG. 48 shows schematically an outline of the constitution of a video and audio coding apparatus of the 20th embodiment. As shown in the figure, the video and audio coding apparatus comprises a video camera 2001, an audio capture unit 2002, an audio buffering unit 2003, an audio coding unit 2005, a video capture unit 2031, and a video coding unit 2035. The video coding unit 2035 contains a main body of video coding unit 2036 and a resolution-adjusting-information adding unit 2037. The apparatus outputs coded video and audio signals as well as the 18th embodiment.

In the figure, as well as the 18th and 19th embodiments, the video capture unit 2031 produces digital pro-video signals which consist of plural still pictures from analog video signals. Moreover, in the 20th embodiment, the still pictures are to have a certain picture resolution which corresponds to a picture resolution information 2034 described below which is input into the video capture unit 2031. The video capture unit 2031 is realized by a video capture board as well as in the 18th embodiment. In this case, the video capture board is supposed to be able to be specified a picture resolution. The coding-load evaluating unit 2032 calculates the coding-load evaluation information 2033 and outputs the picture resolution information 2034 according to the coding-load evaluation information 2033. The video coding unit 2035 contains the main body of video coding unit 2036 and the resolution-adjusting-information adding unit 2037, and codes pro-video signals from the video capture unit 2031 and outputs the coded video information. The main body of video coding unit 2036 is included in the video coding unit 2035 and executes an actual video coding process. The resolution-adjusting-information adding unit 2037 is included in the video coding unit 2035 and adds the resolution information to internal coded video signals and produces the coded video information which are regarded as the output of the video and audio coding apparatus.

The video camera 2001, audio capture unit 2002, audio buffering unit 2003, and audio coding unit 2005 are the same as the 1801 to 1803, and 1805, respectively, so explanation about them is omitted.

The coding-load evaluating unit 2032 calculates the coding-load evaluation information 2033 by multiplying an evaluation information calculated based on the coding-load criterion information 2010 by a coding-load criterion information 2010. The evaluation information is calculated in the 20th embodiment as follows; the evaluation information becomes 0% if the pro-audio buffer size 2004 is beyond half of the maximum buffer size of the audio buffering unit 2003 and becomes 100% if the pro-audio buffer size 2004 is below half of the maximum buffer size of the audio buffering unit 2003. Further, the coding-load criterion information 2010 is also fixed to "1" as well as in the 18th embodiment. Therefore, the evaluation information, as it is, becomes the coding-load evaluation information 2033, and thereby the coding-load evaluation information 2033 is either 0% or 100%. The coding-load evaluating unit 2032 produces the picture resolution information 2034 using the coding-load evaluation information 2033, and outputs it into the video coding unit 2035. In this case, the 2034 is specified "320 pixels(width)~240 pixels(height)" when the coding-load evaluation information 2033 is 100%, and "160 pixels~120 pixels" when the coding-load evaluation information 2033 is 0%.

In the 20th embodiment, an initial value of the picture resolution information 2034 is set to "320 pixels~240 pixels", but the picture resolution information 2034 will change to "160 pixels~120 pixels" by the calculation of the coding-load evaluating unit 2032 when the pro-audio buffer size 2004 is more than 50% of the maximum buffer size.

The outline of how the video and audio coding apparatus as so constructed in the 20th embodiment is described as follows.

The video capture unit 2031 is input the picture resolution information 2034 and transforms input analog video signals into digital pro-video signals which consist of still pictures information which has a resolution of the picture resolution information 2034. The coding-load evaluating unit 2032 calculates the coding-load evaluation information 2033 and outputs the picture resolution information 2034 according to the coding-load evaluation information 2033. The video coding unit 2035 codes the pro-video signals from the 2031 and outputs coded video information. The main body of video coding unit 2036 executes an actual video coding process. The resolution-adjusting-information adding unit 2037 adds a resolution information to the coded video information output by the main body of video coding unit 2036. The processes of audio signals are the same as those in the 18th embodiment.

An example of operation of the video and audio coding apparatus of the 20th embodiment in processing a certain video and audio is described as follows. A video and audio coding process consists of a video coding process (processes of the coding-load evaluating unit 2032 and video coding unit 2035) and an audio coding process (process of the audio coding unit 2005), both of which are tasks controlled by an operating system of a general purpose computer. The operating system assigns CPU time to one task when a previous task is completed and releases a computer resource (the CPU time).

Initially, as well as in the 18th embodiment, the video camera 2001 captures video and audio information, and outputs separately analog video and analog audio signals. Thereafter, the audio capture unit 2002 is input the analog audio signals from the video camera 2001, and outputs digital pro-video signals. The pro-video signals are stacked in the audio buffering unit 2003 which rewrites the pro-audio buffer size 2004 based on the current audio buffer size.

The coding-load evaluating unit 2032 checks the current pro-audio buffer size 2004. It is assumed that the pro-video signals is stacked at 30% ratio of buffer size. It is below a given criterion 50%, so an evaluation information becomes 100%.

As described above, the coding-load criterion information 2010 "1" does not affect the multiplication, so the coding-load evaluation information 2033 becomes 100%. Subsequently, the picture resolution information 2034 becomes "320 pixels~240 pixels". The coding-load evaluating unit 2032 outputs the picture resolution information 2034 to the video capture unit 2031 and the video coding unit 2035.

On the other hand, the video capture unit 2031 is input analog video signals from the video camera 2001 and outputs digital pro-video signals. At this time, the video capture unit 2031 has not taken the picture resolution information 2034 from the video coding unit 2035, so using the initial value of the picture resolution information 2034 "320 pixels~240 pixels" the video capture unit 2031 outputs digital pro-video signals which consist of still pictures which have a resolution "320 pixels~240 pixels".

The pro-video signals are input into the video coding unit 2035. The main body of video coding unit 2036 codes the pro-video signals into internal coded video signals. The 2037 adds the information which indicates a resolution "320 pixels~240 pixels" onto the coded video signals, which produces the output of the video and audio coding apparatus.

At this time, as well as in the description of the 18th embodiment, it is assumed that on the operating system of the general purpose computer a task except video and audio coding processes is executed, so the other task is now assigned CPU time and the CPU time is consumed by the control of "other processes". Capturing video and audio information by the video camera 2001, processes of the video camera 2001 and video capture unit 2031 are executed almost independently, resulting in that 90% of the audio buffering unit 2003 is to be stacked with pro-audio signals. Afterward the audio coding unit 2005 reads out a given amount of pro-audio signals stacked in the past in the audio buffering unit 2003, deletes them from the audio buffering unit 2003, and rewrites the pro-audio buffer size 2004 when the audio coding process takes its turn to be executed. Further, the audio coding unit 2005 codes the pro-audio signals. In the 20th embodiment, both amounts of one read-out and one deletion are defined 30%, so the audio coding unit 2005 reads out 30% of 90% stacked pro-audio signals and releases the CPU time after completing the coding.

When video coding process takes its turn to be executed, the coding-load evaluating unit 2032 checks the current pro-audio buffer size 2004. The 60% of pro-audio signals are still stacked in the audio buffering unit 2003 because it is just after reading out the 30%. Therefore it is more than the criterion 50%, so the evaluation information becomes 0% and the coding-load evaluation information 2033 also becomes 0% even though it is multiplied by the coding-load criterion information 2010 "1". Therefore, the picture resolution information 2034 becomes "160 pixels~120 pixels". The picture resolution information 2034 is output into the video capture unit 2031 and video coding unit 2035 as well as described above.

The video capture unit 2031 is input analog video signals and outputs the digital pro-video signals. In this case, the picture resolution information 2034 is "160 pixels~120 pixels", so the video capture unit 2031 outputs digital pro-video signals which consist of "160 pixels~120 pixels" still pictures.

The pro-video signals are input into the video coding unit 2035 in which at first the signals are coded by the main body of video coding unit 2036 and are output as internal coded video signals. In this case, the resolution of pictures is "160 pixels~120 pixels", so the amount of information represented by the total number of pixels is one fourth as compared with one of the previous process in which the resolution was "320 pixels~240 pixels".

Accordingly, it takes one fourth of process time of the previous process to complete the coding process. The resolution-adjusting-information adding unit 2037 puts the additional information indicating "160 pixels~120 pixels" on the internal coded video signals output by the main body of video coding unit 2036, and outputs coded video information which are the outputs of the video and audio coding apparatus.

In FIG. 48, while the video camera 2001 is taking video and audio information, coding the taken video and audio information is performed by the above-described video and audio coding processes. When the video camera 2001 finishes taking video and audio information, the coding comes to end.

Thus, the video and audio coding apparatus of the 20th embodiment includes the audio buffering unit 2003, the video capture unit 2031, the coding-load evaluating unit 2032, and the video coding unit 2035 which comprises the main body of video coding unit 2036 and the resolution-adjusting-information adding unit 2037.

Specifically, the coding-load evaluating unit 2032 checks the buffer size of unprocessed audio signals stacked in the audio buffering unit 2003, and, according to the size, outputs the picture resolution information 2034 with which the resolution of video signals is controlled so as to rule the amount of information of video signals. As a result, controlling the CPU time which is consumed by the video coding process makes it possible to avoid the adverse situation that a video and audio coding apparatus outputs coded audio information discontinuously.

The emphasis has been placed on that the picture resolution information changes on condition that the audio buffer size becomes beyond a given value. However, the other evaluation method in which the resolution is determined according to the buffer size as a result of multiplying pro-audio buffer size by a certain coefficient, is also within the scope of the invention.

Embodiment 21

A video and audio coding apparatus of a 21st embodiment performs pausing coding process, using the stack size of audio data as a indicator, so it prevents coded audio information from being discontinuously output, as well as the 18th embodiment, even when the load is increased during software process of a general purpose computer and the like in which the apparatus is implemented.

Figure 49:
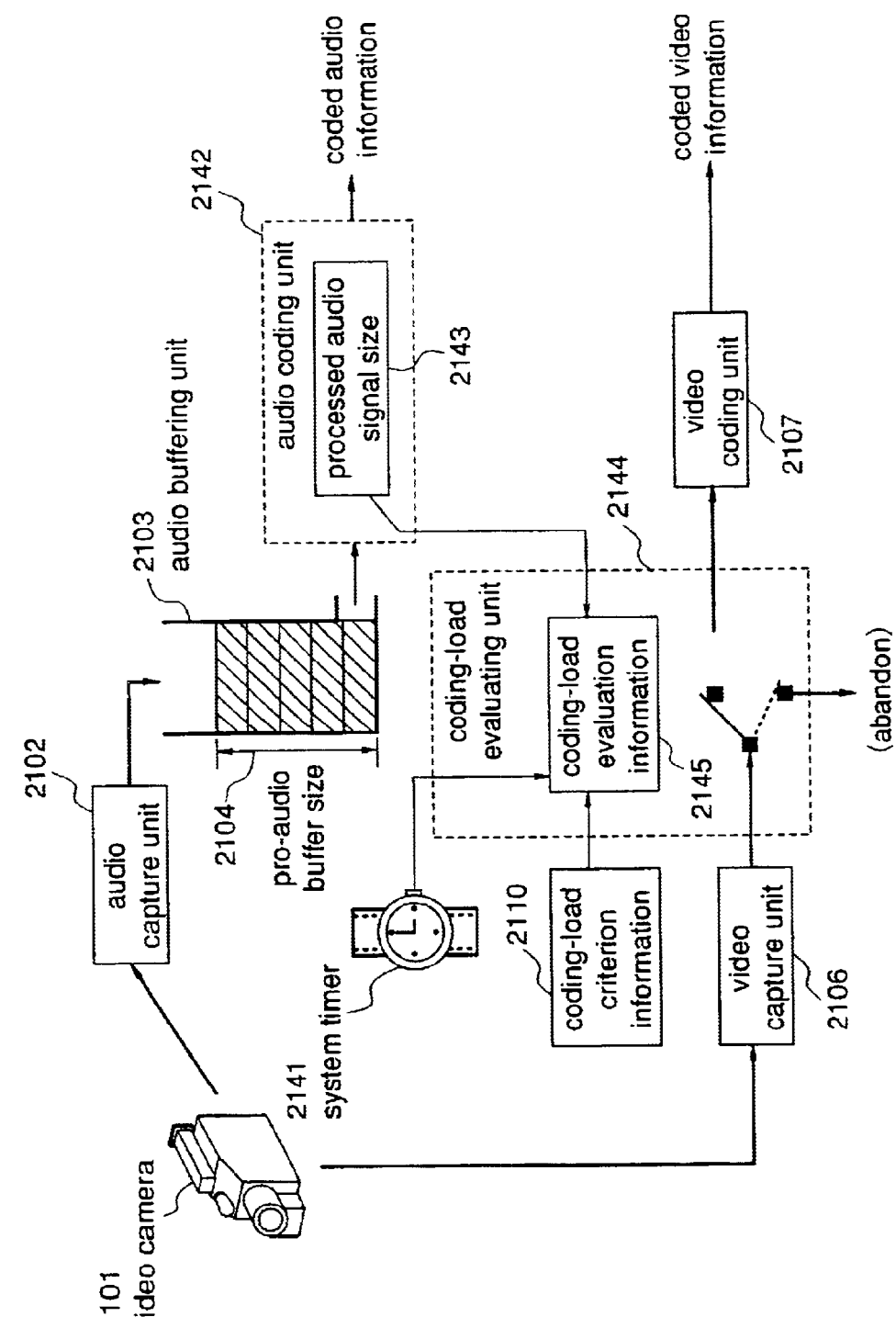
FIG. 49 is a diagram illustrating a schematic structure of a video and audio coding apparatus according to an embodiment 21 of the present invention.

FIG. 49 shows schematically an outline of the constitution of a video and audio coding apparatus of the 21st embodiment. As shown in the figure, the video and audio coding apparatus comprises a video camera 2101, an audio capture unit 2102, an audio buffering unit 2103, an 2242, a video capture unit 2106, a video coding unit 2107, a coding-load evaluating unit 2144 and a system timer 2141. The apparatus outputs coded video and audio signals as well as the 18th embodiment.

In the figure, the audio coding unit 2142 reads out pro-audio signals stacked in the past in the audio buffering unit 2103, deletes them from the audio buffering unit 2103, and compressive-codes the pro-audio signals and outputs the coded audio information. Moreover, the audio coding unit 2142 holds and rewrites the total size of pro-audio signals which have been processed, a processed audio signal size 2143. A coding-load evaluating unit 2144 calculates a coding-load evaluation information 2145 for controlling a video coding process and decides whether to execute coding pro-video signals or not, in such a way as described below. A system timer 2141 measures time consumed by coding.

The video camera 2101, the audio capture unit 2102, the video capture unit 2106, and the video coding unit 2107 are the same as the 1801 to 1803, and 1806 and 1807, respectively, so explanation about them is omitted.

In order for the coding-load evaluating unit 2144 to calculate the coding-load evaluation information 2145, a pro-audio input size is calculated with coding-consumed time measured by the system timer 2141 and a given unit time of pro-audio signals. Thereafter, a predicted audio buffer size will be obtained as a difference between the pro-audio input size obtained from calculation and the processed audio signal size 2143 held by the audio coding unit 2142.

Next, using the predicted audio buffer size as an evaluation information, the coding-load evaluation information 2145 is obtained by multiplied by the coding-load criterion information 2110 as well as in the 18th embodiment. In the 21st embodiment, the coding-load criterion information 2110 is also fixed to "1", so the predicted audio buffer size is equal to the coding-load criterion information 2110. Judging from the coding-load evaluation information 2145, the coding-load evaluating unit 2144 outputs pro-video signals into the video coding unit 2107 in which its coding process will begin, if the coding-load evaluation information 2145 is not beyond a given size; and the coding-load evaluating unit 2144 abandons pro-video signals and the coding will not begin, if the coding-load evaluation information 2145 is beyond the given size. Accordingly, in the 21st embodiment, the coding-load evaluating unit 2144 compares the predicted audio buffer size with a given size, and the given size is specified 50% of the maximum buffer size of the audio buffering unit 2003. The unit-time size of input pro-audio signals is specified the size at the rate of which it takes 10 seconds to fill the audio buffering unit 2103 with pro-audio signals.

An outline of how the so-constructed video and audio coding apparatus of the 21st embodiment as constructed works above is explained as follows. The audio coding unit 2142 reads out pro-audio signals stacked in the most past, and deletes them from the audio buffering unit 2103, and rewrites the processed audio signal size 2143 which specifies the total size of pro-audio signals which has been so far read out, and compressive-codes the pro-audio signals and outputs the coded audio information. The coding-load evaluating unit 2144 calculates a pro-audio input size based on the coding-consumed time from the system timer 2141 and a given unit time size of pro-audio signals, and obtains a predicted audio buffer size which is a difference between the calculated pro-audio input size and the processed audio signal size 2143, and obtains the coding-load evaluation information 2145 using the predicted audio buffer size. Subsequently, the video coding process is controlled according to the coding-load evaluation information 2145. The process for audio signals is the same as that in the 18th embodiment.

An example of operation of the video and audio coding apparatus of the 21st embodiment in processing a certain video and audio information is described as follows. A video and audio coding process consists of a video coding process (processes of the coding-load evaluating unit 2144 and the video coding unit 2107) and an audio coding process (process of the audio coding unit 2142), both of which are tasks controlled by an operating system of a general purpose computer. The operating system assigns CPU time to one task when a previous task is completed and computer resources (the CPU time) are released.

Initially, as well as in the 18th embodiment, the video camera 2101 captures video and audio information, and outputs separately analog video and analog audio signals. Thereafter, the audio capture unit 2202 is input the analog audio signals from the video camera 2101, and outputs digital pro-video signals. The pro-video signals are stacked in the audio buffering unit 2103 which rewrites the pro-audio buffer size 2104 based on the current audio buffer size. On the other hand, the video capture unit 2106 is input the analog video signals from the video camera 2201 and outputs digital pro-video signals.

The coding-load evaluating unit 2144 takes input output by the video capture unit 2106 and checks the current predictive buffer size. At this time, the 2241 indicates the elapsed time "1" and the processed audio signal size 2143 is still "0", so the predicted audio buffer size is 10% and it is still below the criterion 50%. The coding-load criterion information 2110 has a value "1" which is not necessary at all to be taken into account, so the coding-load evaluation information 2145 becomes 100%. Therefore, the coding-load evaluating unit 2144 inputs pro-video signals into the video coding unit 2107, and the video coding unit 2107 video-coding-processes the pro-video signals and releases CPU time after the coding.

At this time, as well as in the case of the 18th, it is assumed that there are some tasks except the video and audio coding processes on the operating system of the general purpose computer, so the other tasks are assigned CPU time and the control of the operating system is transferred to the column "Other processes" by which the CPU time is consumed. The video and audio information capturing of the video camera 2101 and the processes of the audio capture unit 2102 and the video capture unit 2106 are carried out almost independently of "Other processes".

Meanwhile, audio signals are stacked up to 90% of the audio buffering unit 2103. Thereafter, when the audio coding process is started to be executed, the audio coding unit 2142 reads out a given amount of pro-audio signals stacked in the past from the audio buffering unit 2103 and deletes them from the audio buffering unit 2103 and rewrites the pro-audio buffer size 2104.

Moreover, the audio coding unit 2142 codes the pro-audio signals.

In the 21st embodiment, the given amount which is read out and deleted is defined 30%. The audio coding unit 2142 reads out 30% of the pro-audio signals out of the above-described 90% and codes them. At the time when the coding is completed, the audio coding unit 2142 adds the 30% to the processed audio signal size 2143 which the audio coding unit 2142 holds and the CPU time is released.

The video coding process takes its turn again when the coding-load evaluating unit 2144 checks the current elapsed time referring to the system timer 2141. As "Other processes" have been processed, the elapse time is 9 seconds. At this moment, the processed audio signal size 2143 indicates 30%. Thus the predicted audio buffer size becomes 60% which is more than the criterion 50%, so the evaluation information is 0% and the coding-load evaluation information 2145 which is multiplied by the coding-load criterion information 2110 "1" becomes 0%. Accordingly, the coding-load evaluating unit 2144 abandons the current pro-video signals, and soon releases CPU time and thereby makes the audio coding process carried out.

While the video camera video camera 2101 is capturing video and audio information in FIG. 49, coding video and audio signals is executed by the above-described video and audio coding processes. The coding processes are completed after finishing capturing video and audio information.

As described above, the video and audio coding apparatus of the 21st embodiment includes the system timer 2141, the audio coding unit 2142 holding the processed audio signal size 2143 and the coding-load evaluating unit 2144. The coding-load evaluating unit 2144 calculates the predicted audio buffer size, using the elapsed time obtained referring to the system timer 2141 and the processed audio signal size 2143 obtained referring to the audio coding unit 2142. The video coding process is controlled by the predicted audio buffer size in place of the pro-audio buffer size 2104. As a result, it is possible to avoid an adverse discontinuous output of audio information due to a lack of computer resource because of that other applications or the video coding unit itself consume the computer resource.

Further, the video and audio coding apparatus of the 21st embodiment can obtain the audio buffer size by predicting it by referring to the amount of information which the audio coding unit 2142 has processed, even when an existing application in which an audio buffer unit is a black box is used in the apparatus.

Embodiment 22

A video and audio coding apparatus of a 22nd embodiment performs pausing a video coding process, using the stack size of audio data as a indicator, so it prevent coded audio information from being discontinuously output, as well as the 18th embodiment, even when the load is increased during software process of a general purpose computer and the like in which the apparatus is implemented.

Figure 50:
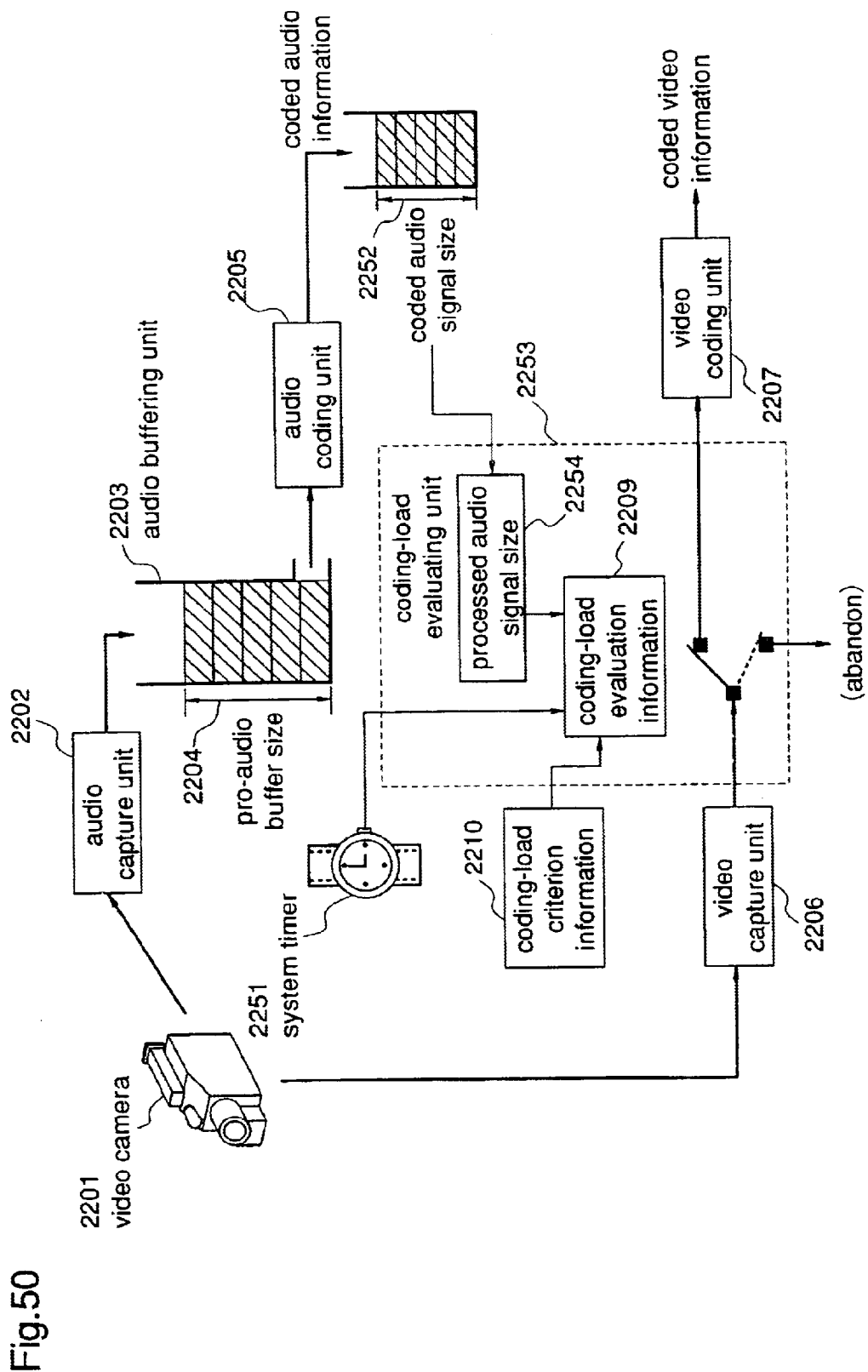
FIG. 50 is a diagram illustrating a schematic structure of a video and audio coding apparatus according tan embodiment 22 of the present invention.

FIG. 50 shows schematically an outline of the constitution of a video and audio coding apparatus of the 22nd embodiment. As shown in the figure, the video and audio coding apparatus comprises a video camera 2201, an audio capture unit 2202, an audio buffering unit 2203, an audio coding unit 2205, a video capture unit 2206, a video coding unit 2207, a coding-load evaluating unit 2253 and a system timer 2251. The apparatus outputs coded video and audio signals as well as the 18th embodiment.

In the figure, a coding-load evaluating unit 2253 calculates a predicted audio buffer size and according to the predictive audio buffer obtains a coding-load evaluation information as well as the 21st embodiment. However, the method for obtaining the predicted audio buffer size of the 22nd embodiment is different from that of the 21st embodiment. In the 22nd embodiment, the coding-load evaluating unit 2253 detects a coded audio information size 2252 output by the audio coding unit 2205. A processed audio signal size 2254 is obtained from the coded audio information size 2252, which is used in place of the processed audio signal size 2143 in the 21st embodiment. As described above, the coded audio information is the output of the video and audio coding apparatus, which is transmitted and recorded and the like, and the amount of which is easily measured. The coding-load evaluating unit 2253 of the 22nd embodiment has the same following respects as that of the 21st embodiment; obtaining an elapsed time from the system timer 2251, obtaining an audio buffer size from the elapsed time and a unit time of pro-audio input signals, and using a coding-load criterion information 2210 fixed to "1".

The video and audio coding apparatus of the 22nd embodiment is the same as that of the 21st embodiment except that the coding-load evaluating unit 2253 has a different function and the audio coding unit 2205 does not hold a processed audio signal size. The descriptions about the video camera 2201, the audio capture unit 2202, the audio buffering unit 2203, and the video coding unit 1905 are omitted because those are the same as 1801 to 1803, 1806 and 1807, respectively.

In the 22nd embodiment, as well as in the 21st embodiment, a given amount which is compared with a predicted audio buffer size is defined 50% of the maximum buffer size, and the unit time size of input pro-audio signals is specified the size at the rate of which it takes 10 seconds to fill the audio buffering unit 2203 with pro-audio signals. Moreover, the compression rate of the audio coding unit 2205 is one tenth.

An outline of how the video and audio coding apparatus of the 22nd embodiment as constructed above works is explained as follows.

The coding-load evaluating unit 2253 calculates a pro-audio input size using a coding elapsed time obtained from the system timer 2251 and a given unit time size of input pro-audio signals, and obtains the processed audio signal size 2254 form the audio capture unit 2202 which is the total size of the pro-audio signals output by the audio coding unit 2205, and further obtains a predicted audio buffer size which is a difference between the pro-audio input size and the processed audio signal size 2254 and obtains the coding-load evaluation information 2209 using the predicted audio buffer size. The coding-load evaluating unit 2253 inputs pro-video signals into the video coding unit 2207 if the predicted audio buffer size is less than a given amount, while the coding-load evaluating unit 2253 abandons the pro-video signals and put a pause in the process of the video coding unit 2207 and releases a computer resource (CPU time) which is given to the audio coding unit 2205.

An example of operation of the video and audio coding apparatus of the 22nd embodiment in processing a certain video and audio information is described as follows. A video and audio coding process consists of a video coding process (processes of the coding-load evaluating unit 2253 and video coding unit 2207) and an audio coding process (process of the audio coding unit 2205), both of which are tasks controlled by an operating system of a general purpose computer. The operating system assigns CPU time to one task when a previous task is completed and the computer resource (CPU time) is released.

Initially, as well as in the 18th embodiment, the video camera 2201 captures video and audio information, and outputs separately analog video and analog audio signals. Thereafter, the audio capture unit 2202 is input the analog audio signals from the video camera 2201, and outputs digital pro-video signals. The pro-video signals are stacked in the audio buffering unit 2203 which rewrites the pro-audio buffer size 2204 based on the current audio buffer size. On the other hand, the video capture unit 2206 is input the analog video signals from the video camera 2201 and outputs digital pro-video signals.

The coding-load evaluating unit 2244 takes input output by the video capture unit 2206 and checks the current predictive buffer size. At this time, the 2251 indicates the elapsed time "1" and the coded audio information size 2252 is still "0", so the predicted audio buffer size is 10% and it is still below the criterion 50%. The coding-load criterion information 2110 has a value "1" which is not necessary at all to be taken into account, so the coding-load evaluation information 2245 becomes 100%. Therefore, the coding-load evaluating unit 2253 inputs pro-video signals into the video coding unit 2207, and the video coding unit 2207 video-coding-processes the pro-video signals and releases CPU time after the coding.

At this time, as well as in the case of the 18th, it is assumed that there are some tasks except the video and audio coding processes on the operating system of the general purpose computer, so the other tasks are assigned CPU time and the control of the operating system is transferred to the column "Other processes" by which the CPU time is consumed. The video and audio information capturing of the video camera 2201 and the processes of the audio capture unit 2202 and the video capture unit 2206 are carried out almost independently of "Other processes".

Meanwhile, audio signals are stacked up to 90% of the audio buffering unit 2203. Thereafter, when the audio coding process is started to be executed, the audio coding unit 2205 reads out a given amount of pro-audio signals stacked in the past from the audio buffering unit 2203 and deletes them from the audio buffering unit 2203 and rewrites the pro-audio buffer size 2204. Moreover, the audio coding unit 2205 codes the pro-audio signals. In the 22nd embodiment, the given amount which is read out and deleted is defined 30%. The audio coding unit 2205 reads 30% of the pro-audio signals out of the above-described 90% and codes them. When the coding is completed, the audio coding unit 2205 releases CPU time.

The video coding process takes its turn again when the coding-load evaluating unit 2244 checks the current elapsed time referring to the system timer 2241. As "Other processes" have been processed, the elapse time is 9 seconds. At this time, the processed audio signal size 2254 is obtained as 30%, because the coded audio information size output from the audio coding unit 2205 is 3% of the current buffer size of the pro-audio buffer size and the compression rate is one tenth.

Thus the predicted audio buffer size becomes 60% which is more than the criterion 50%, so the evaluation information is 0% and the coding-load evaluation information 2209 which is multiplied by the coding-load criterion information 2210 "1" becomes 0%. Accordingly, the coding-load evaluating unit 2253 abandons the current pro-video signals, and soon releases CPU time and thereby makes the audio coding process carried out.

While the video camera video camera 2201 is capturing video and audio information in FIG. 50, coding video and audio signals is executed by the above-described video and audio coding processes. The coding processes are completed after finishing capturing video and audio information.

As described above, the video and audio coding apparatus of the 22nd embodiment includes the system timer 2251, the coding-load evaluating unit 2253 which obtains the processed audio signal size 2254 from the coded audio information size 2252. The coding-load evaluating unit 2253 calculates the predicted audio buffer size, using the elapsed time obtained referring to the system timer 2251 and the processed audio signal size 2254 obtained referring to the coded audio information size 2252. The video coding process is controlled by the predicted audio buffer size in place of the pro-audio buffer size 2204. As a result, it is possible to avoid an adverse discontinuous output of audio information due to a lack of computer resource because of that other applications or the video coding unit itself consume the computer resource.

Further, the video and audio coding apparatus of the 22nd embodiment can predict the audio buffer size 2204 by referring to the amount of information which the audio coding unit 2205 has processed, no matter whether knowing the pro-audio buffer size and the amount of pro-audio signals processed by the coding-load evaluating unit 2253 or not, even when an existing application in which an audio buffer unit is a black box is used in the apparatus.

In the 22nd embodiment, the video and audio coding apparatus of the 18th embodiment in which the video coding process is paused according to situations, controls the video coding process using the predictive buffer size based on the coded audio information size as a indicator. This method using the predictive buffer size as a indicator is also applied to the video and audio coding apparatuses of the 19th embodiment in which the amount of the inter-frame predictive coding process is controlled and the 20th embodiment in which the resolution is adjusted.

In the 18th to 22nd embodiments as described above, all of the video and audio coding apparatuses have a proposition which they can normally perform coding processes, and prevents discontinuous output of audio information when the computer resource temporarily decreases due to an instantaneous or short period of an increase in the load of the computer. Software programs are able to realize the video and audio coding apparatuses of those embodiments even on computers whose performances are basically poor. In this case, it is not always that any subjects for coding under any conditions are suitable to the apparatuses.

Figure 51:
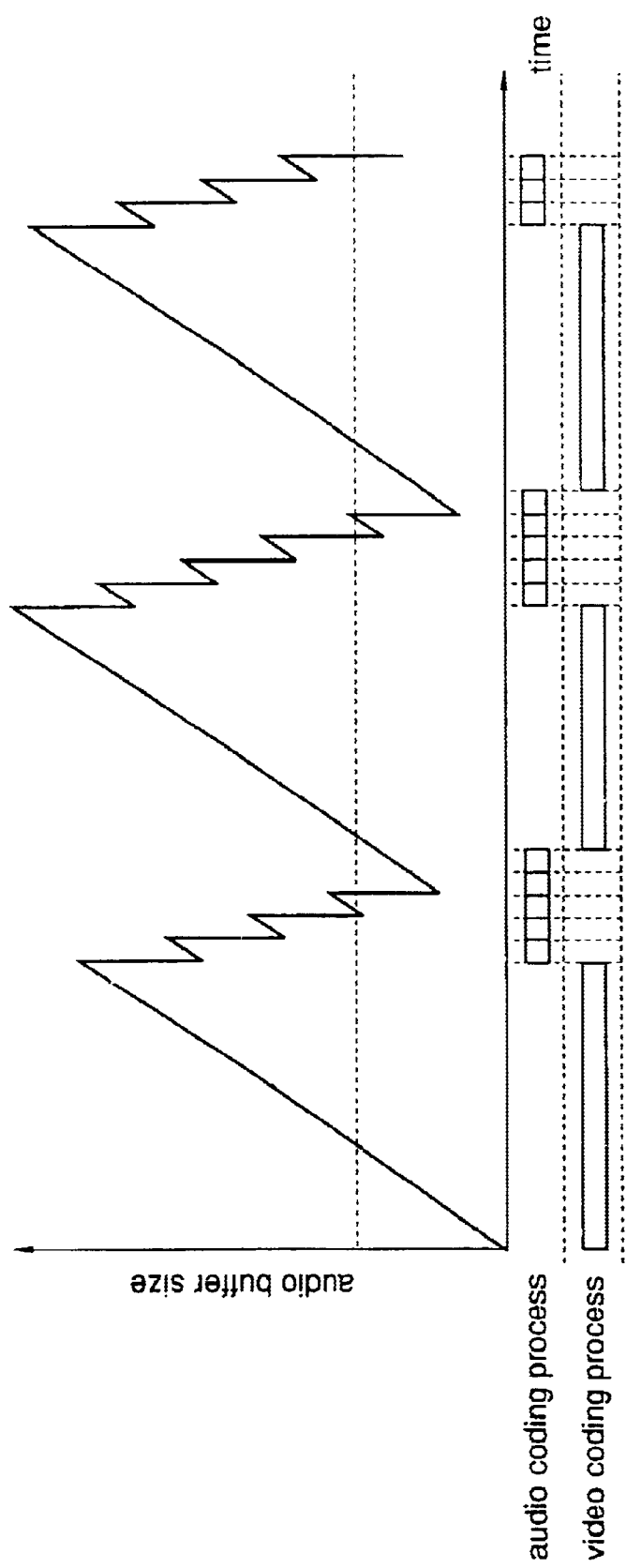
FIG. 51 is a diagram for explaining a phenomenon in the video and audio coding according to the embodiments 18 to 22.

FIG. 51 shows a transition of audio buffer size when a video and audio coding apparatus of the 18th to 22nd embodiments is implemented in a computer system which has a poor basic computation ability. As shown in the figure, the load of video coding process is so heavy on the whole span of time that the amount of unprocessed audio signals are adversely increased during the video coding process. As a result, when the video coding process is switched off, the audio coding process takes its turn and has a priority to be largely executed, during which the video coding process is paused. When the amount of unprocessed audio signal becomes small and a video coding process takes its turn to execute again, the amount of unprocessed audio signal begins to increase again. If such a thing is repeated, coded video information repeatedly change its property suddenly from high quality to low one and then restores high quality. As a result, pictures are not tolerable to watch when utilizing them in regeneration.

In order to solve the problem arising in the cases of the video coding processes of the 18th to 22nd embodiment, video and audio coding apparatuses of 23rd and 24th embodiments as described below are provided, all of which are implemented on computers which have poor computation ability, but prevent big changes of picture quality such as described above although discontinuous output of audio information is also prevented.

Embodiment 23

A video and audio coding apparatus of a 23rd embodiment has a video coding process applicable to a software program on general purpose computers and the like which have poor ability. This is realized by introducing a coding-load criterion information.

Figure 52:
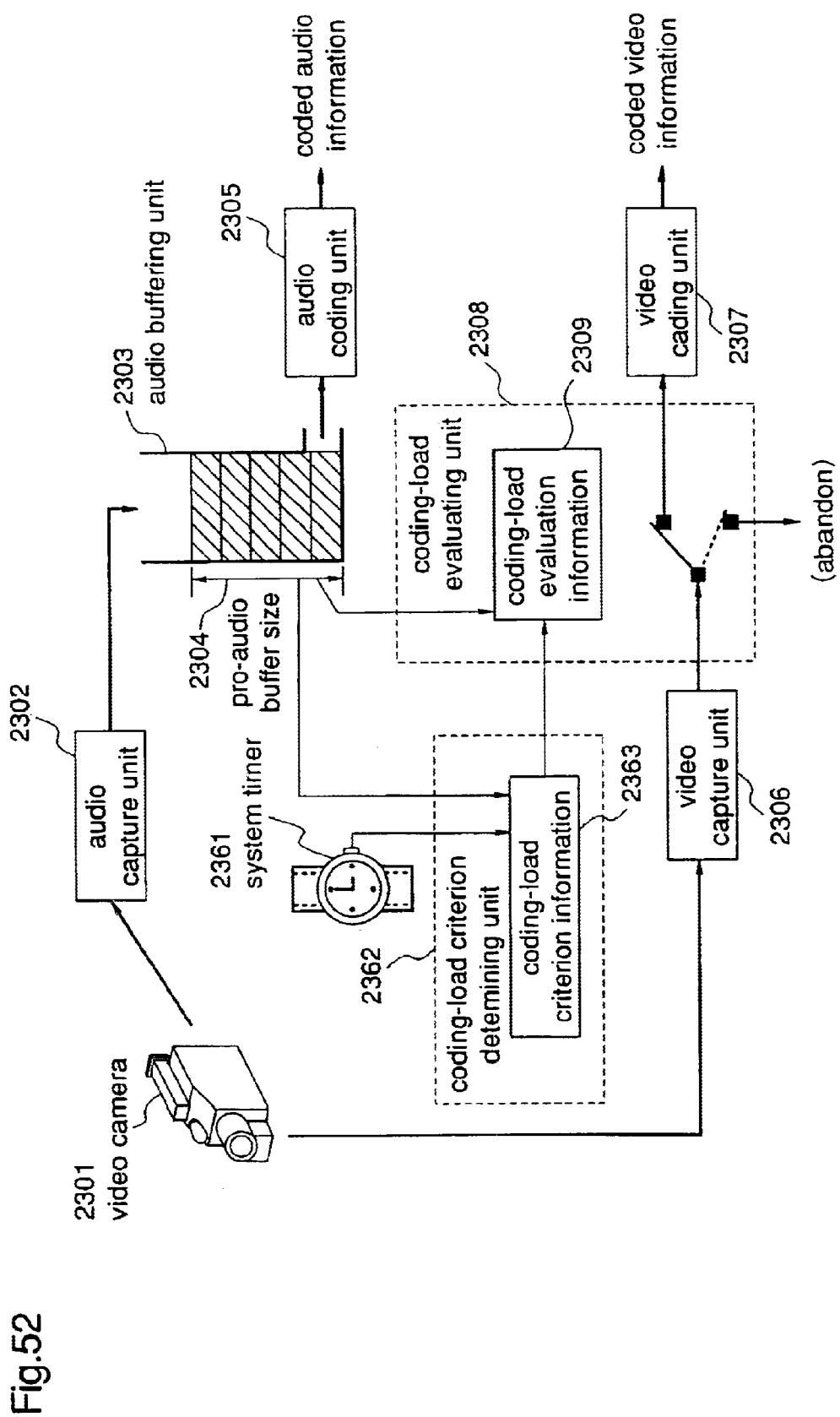
FIG. 52 is a diagram illustrating a schematic structure of a video and audio coding apparatus according to an embodiment 23 of the present invention.

FIG. 52 shows schematically an outline of the constitution of a video and audio coding apparatus of the 23rd embodiment. As shown in the figure, the video and audio coding apparatus comprises a video camera 2301, an audio capture unit 2302, an audio buffering unit 2303, an audio coding unit 2305, a video capture unit 2306, a video coding unit 2307, a coding-load evaluating unit 2308, a system timer 2361, and a coding-load criterion determining unit 2362. The apparatus outputs coded video and audio signals as well as the 18th embodiment.

In the figure, the system timer 2361 measures the elapsed time. The coding-load criterion determining unit 2362 checks a change of pro-audio buffer size 2304 in a unit time and determines the coding-load criterion information 2363 according to the degree of the change. The coding-load evaluating unit 2308 calculates a coding-load evaluation information 2309 using the coding-load criterion information which is determined by the coding-load criterion determining unit 2362 and is not a fixed value. The video and audio coding apparatus of the 3rd embodiment is one of the 18th embodiment which is added the system timer 2361 and the coding-load criterion determining unit 2362. The descriptions about the video camera 2301, the audio capture unit 2302, the audio buffering unit 2303, the audio coding unit 2305, the video capture unit 2306 and the video coding unit 2307 are omitted because the are the same as 1801 to 1807, respectively.

The coding-load criterion determining unit 2362 counts one when the pro-audio buffering unit 2304 becomes beyond or below a given value, and rewrites the coding-load criterion information 2363 when the number of counts is beyond three in a unit time.

The coding-load criterion information 2363 is information which suggests how much size of video signal are processed when the audio buffer unit 2303 is empty. For example, when the audio buffer unit 2303 is empty, 100% video signals are processed if the coding-load criterion information 2363 is "1", and meanwhile 50% video signals are processed if the coding-load criterion information 2363 is "0.5".

In the 23rd embodiment, although the coding-load criterion information 2363 has an initial value "1", the coding-load criterion information 2363 changes a value and becomes "0.5" when the coding-load criterion determining unit 2362 counts more than three due to the change of the pro-audio buffering unit 2304.

The coding-load evaluating unit 2308 obtains the coding-load evaluation information 2309 using the coding-load criterion information 2363, so the coding-load evaluation information 2309 becomes either 0 or 100% when the coding-load criterion information 2363 is "1" as well as in the 18th embodiment, and becomes either 0 or 50% when the coding-load criterion information 2363 is "0.5" . When the coding-load evaluation information 2309 is 50%, the coding-load evaluating unit 2308 outputs 50%, not 100%, of the current input pro-video signals into the video coding unit 2307. Accordingly to this case, all of so-called full-frames (30 fps) are not processed, but 15 fps are processed.

An outline of how the video and audio coding apparatus as so constructed in the 23rd embodiment is described as follows. The coding-load criterion determining unit 2362 checks the changed amount of the pro-audio buffering unit 2304 in a unit time based on the output measured by the system timer 2361, and determines the 2263 according to the degree of the change. The coding-load evaluating unit 2308 calculates the coding-load evaluation information 2309 using the coding-load criterion information 2363, and according to the coding-load evaluation information 2309 decides whether to output pro-video signals into the video coding unit 2307, or to abandon the pro-video signals and pause the process of the video coding unit 2307 and release the computer resource (CPU time) which is given to the audio coding unit 2305. Thus all of the pro-video signals are not processed, but the ratio corresponding to the state of audio information are processed when the coding process of pro-video signals is executed by the video coding unit 2307.

An example of operation of the video and audio coding apparatus of the 23rd embodiment in processing a certain video and audio information is described as follows. A video and audio coding process consists of a video coding process (processes of the coding-load evaluating unit 2308 and video coding unit 2307) and an audio coding process(process of the audio coding unit 2305), both of which are tasks controlled by an operating system of a general purpose computer. The operating system assigns CPU time to one task when a previous task is completed and releases computer resources (the CPU time). Further, the basic ability of the general purpose computer in which the video and audio coding apparatus is implemented is poorer than that of the 18th embodiment.

Initially, as well as in the 18th embodiment, the video camera 2301 captures video and audio information, and outputs separately analog video signals and analog audio signals.

Thereafter, the audio capture unit 2302 is input the analog audio signals from the video camera 2301, and outputs digital pro-video signals. The pro-audio signals are stacked in the audio buffering unit 2303 which rewrites the pro-audio buffering unit 2304 based on the current audio buffer size. On the other hand, the video capture unit 2306 is input analog video signals from the video camera 2301 and outputs digital pro-video signals.

The coding-load evaluating unit 2308 is input the pro-video signals from the video capture unit 2306, and checks the current pro-audio buffer size 2004 and coding-load criterion information 2363. It is assumed that the pro-video signals is stacked at 10% ratio of buffer size. It is below a given criterion 50%, so an evaluated value becomes 100%. Moreover the coding-load criterion information 2363 is an initial value "1", so the coding-load evaluation information 2309 becomes 100%. Thus the coding-load evaluating unit 2308 outputs all of frames of the pro-video signals into the video coding unit 2307, and the video coding unit 2307 executes the video coding process and releases CPU time after completing the video coding process.

As described above, the coding-load criterion information 2010 "1" does not affect the multiplication, so the coding-load evaluation information 2033 becomes 100%. Subsequently, the picture resolution information 2034 becomes "320 pixels~240 pixels". The coding-load evaluating unit 2032 outputs the picture resolution information 2034 to the video capture unit 2031 and the video coding unit 2035.

The operations of the video camera 2301, the audio capture unit 2302 and the video capture unit 2306 are executed almost independently of the tasks controlled by the CPU, and 90% of the audio buffering unit 2303 is stacked with pro-audio signals as the video coding process has consumed a lot of CPU time.

The audio coding unit 2305 reads out a given amount of pro-audio signals stacked in the past from the audio buffering unit 2303 and deletes them from the audio buffering unit 2303 and rewrites the pro-audio buffer size 2304. Moreover, the audio coding unit 2305 codes the pro-audio signals. In the 23rd embodiment, the given amount which is read out and deleted is defined 30%. The audio coding unit 2305 reads out 30% of the pro-audio signals out of the above-described 90%, and rewrites the pro-audio buffering unit 2304 60% and codes the pro-audio signals. When the coding is completed, the audio coding unit 2305 releases CPU time.

Further, the coding-load criterion determining unit 2362 which supervises the pro-audio buffering unit 2304 recognizes that the pro-audio buffering unit 2304 indicating 60% is beyond the given criterion 50%.

The video coding process takes its turn again when the coding-load evaluating unit 2308 checks the current pro-audio buffering unit 2304 and coding-load criterion information 2363. The current pro-audio buffering unit 2304 is 60% and is beyond the given criterion 50%, so the evaluated value becomes 0% which produces the coding-load evaluation information 2309 0% even after being multiplied by the coding-load criterion information 2363 "1". At this time, the coding-load evaluating unit 2308 abandons all frames of pro-video signals and then releases CPU time soon. Accordingly, the pro-audio buffering unit 2304 does not change in this video coding process.

The audio coding unit 2305 reads out a given amount of pro-audio signals stacked in the past from the audio buffering unit 2303 and deletes them from the audio buffering unit 2303 and rewrites the pro-audio buffer size 2304. Moreover, the audio coding unit 2305 codes the pro-audio signals. The given amount which is read out is defined 30%. The audio coding unit 2305 reads out 30% of the pro-audio signals out of the 60% which is currently stacked in the audio buffering unit 2303, and rewrites the audio buffering unit 2303 60% and codes the pro-audio signals. When the coding is completed, the audio coding unit 2305 releases CPU time.

Further, the coding-load criterion determining unit 2362 which supervises the pro-audio buffering unit 2304 recognizes that the pro-audio buffering unit 2304 indicating 30% is below the given criterion 50% and the amount of the change of the pro-audio buffering unit 2304 is worth to one count, namely the coding-load criterion determining unit 2362 counts one.

By repeating the above-described processes the changes of the pro-audio buffering unit 2304 makes the coding-load criterion determining unit 2362 count three, so the coding-load criterion determining unit 2362 changes the coding-load criterion information 2363 from the initial value "1" to the "0.5" which specifies "15 fps".

The video coding process takes its turn to execute again, the coding-load evaluating unit 2308 checks the pro-audio buffering unit 2304 and the coding-load criterion information 2363. The current pro-audio buffering unit 2304 is 30%, so the evaluated value becomes 100%. However, as the coding-load criterion information 2363 is "0.5", the coding-load evaluation information 2309 becomes 50% after multiplying the evaluated value and the coding-load criterion information 2363. Thus one half of all frames of the pro-video signals is abandoned at intervals, the other half of them is input into the video coding unit 2307 in which they are treated in the video coding process and the CPU time is released after the coding process. The audio coding unit 2305 reads out a given amount(30% in the 23rd embodiment) of the pro-audio signals stacked in the past from the audio buffering unit 2303 and deletes them from the audio buffering unit 2303, and rewrites the audio buffer size 2304.

Moreover, the audio coding unit 2305 codes the pro-audio signals. Before this process the audio buffering unit 2303 has 60% of pro-audio signals, because it took half as much time to execute the video coding process as when the 2363 had a previous value. Thus the current pro-audio buffering unit 2304 becomes 30% after reading out30%, and the CPU time is released after completing the coding process.

The video coding process has its turn to execute when the coding-load evaluating unit 2308 checks the current pro-audio buffering unit 2304 and the coding-load criterion information 2363. The current pro-audio buffering unit 2304 is 30%, so it is below the criterion. However the coding-load criterion information 2363 is 15 fps, so one half of all frames of the pro-video signals are abandoned and the other half is input into the video coding unit 2307 which executes the video coding process. The CPU time is released when the video coding process is completed.

While the video camera video camera 2301 is capturing video and audio information in FIG. 52, coding video and audio signals is executed by the above-described video and audio coding processes. The coding processes are completed after finishing capturing video and audio information.

Figure 53:
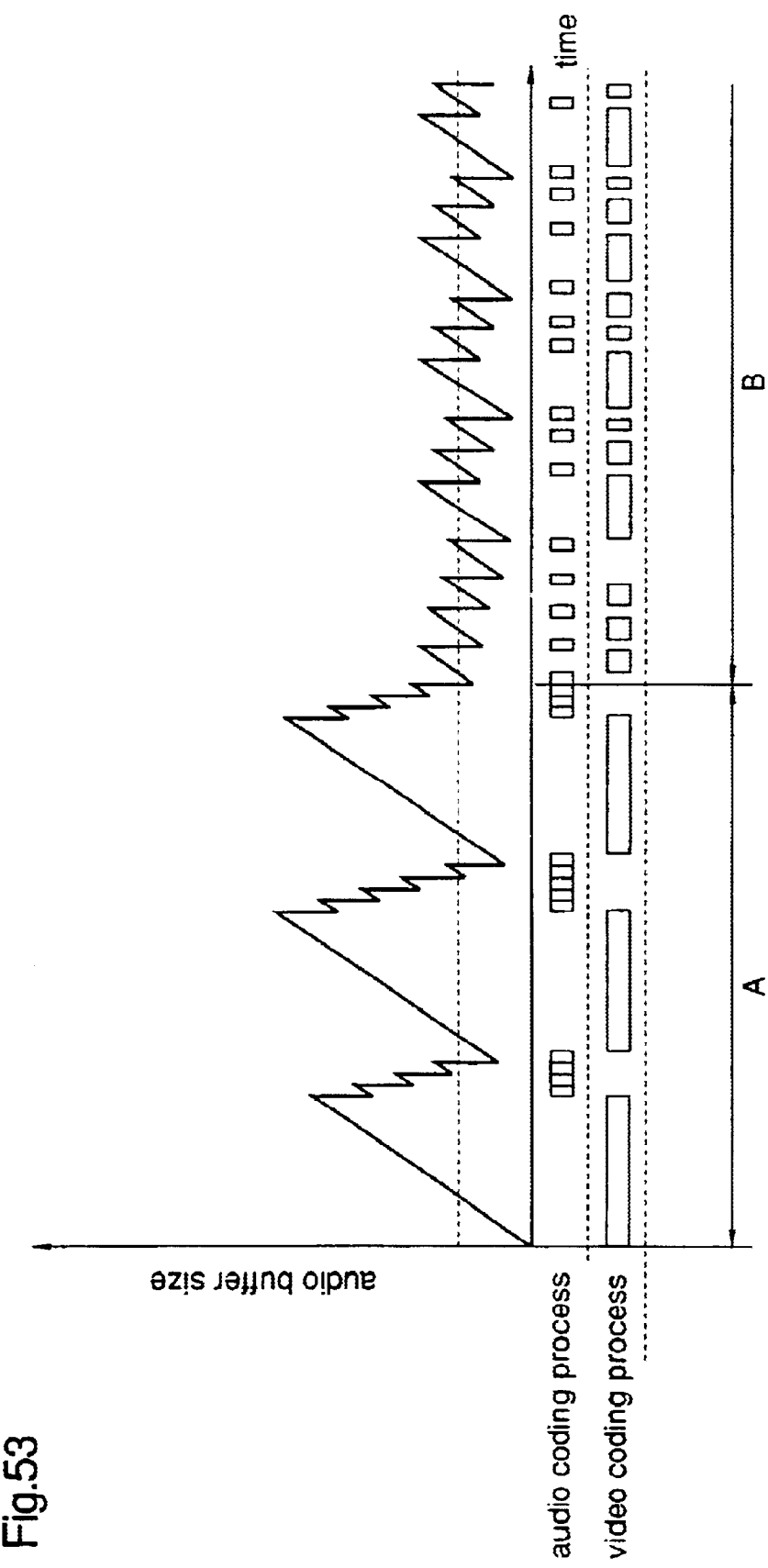
FIG. 53 is a diagram for explaining video coding according to the embodiment 23.

FIG. 53 is a diagram which describes the operation of the coding process in a long-time span. In the figure, during the interval A there are big changes of the audio buffer size such as those shown in FIG. 51, and the video coding process and the audio coding process which has a priority are alternatively repeated such as the case in which the apparatuses of the 18th to 22nd embodiment is implemented in a general purpose computer with poor performance.

As described above, the coding-load criterion information 2363 is changed to have a half of the previous value during the interval A, so the coding process performs well balanced afterward.

Thus the video and audio coding apparatus of the 23rd embodiment is a video and audio coding apparatus of the 18th embodiment which is added the system timer 2361 and the coding-load criterion determining unit 2362. The coding-load criterion determining unit 2362 changes the coding-load criterion information 2363 according to changes of the pro-audio buffering unit 2304. The video capture unit 2306 obtains the coding-load evaluation information 2309 using the coding-load criterion information 2363 and changes the rate of coding pro-video signals according to the state of the coding load. Therefore, the discontinuous output of audio information due to changes of coding load is prevented from happening, and when the video and audio coding process is carried out by a software program on a computer system having its poor basic computation ability, it is also possible to avoid an adverse situation in which high-quality and low-quality pictures alternates by means of automatically determining an optimal load size of video coding process for the computer system.

It should be noted that in the 23rd embodiment the video and audio coding apparatus of the 18th embodiment controls the video coding process by changing the coding-load evaluation information based on the changes of the pro-audio buffer size in place of introducing pauses in the video coding process according to the state of coding processes of the video and audio coding apparatus in the 18th embodiment. However, it is still possible to apply this method for changing the coding-load evaluation information to the 19th embodiment in which the amount of the inter-frame predictive coding process is controlled and to the 20th embodiment in which resolutions are changeable, which is within the scope of the invention.

When applied to the 19th embodiment, for example, the coding-load evaluation information is determined in order to indicate how much pro-video signals should be coded for calculating motion vectors when the audio buffer size "0". It is possible that only 50% of pro-video signals are coded for calculating motion vectors even when the audio buffer size is "0" if the amount of pro-audio signals changes largely. It is also possible, in the 19th embodiment, to avoid an adverse situation in which high-quality and low-quality pictures alternates, by means of this application.

In the 23rd embodiment, the video coding process is started with an initial value of the coding-load evaluation information, and afterward a suitable coding-load evaluation information is determined by considering the changes of the pro-audio buffer size. If once-determined coding-load evaluation information can be memorized in a storage apparatus like a hard disk, the video coding process is executed with a suitable coding-load evaluation information from the beginning in the next time. Specifically, an initial period like the interval A shown in FIG. 53 is a period in which no suitable coding process is executed, but from the next time well-balanced coding process such as the interval B can be carried out.

Embodiment 24

A video and audio coding apparatus of a 24th embodiment has a video coding process applicable to a software program on general purpose computers and the like which have poor abilities. This is realized by utilizing a coding-load criterion information which is presented to users.

Figure 54:
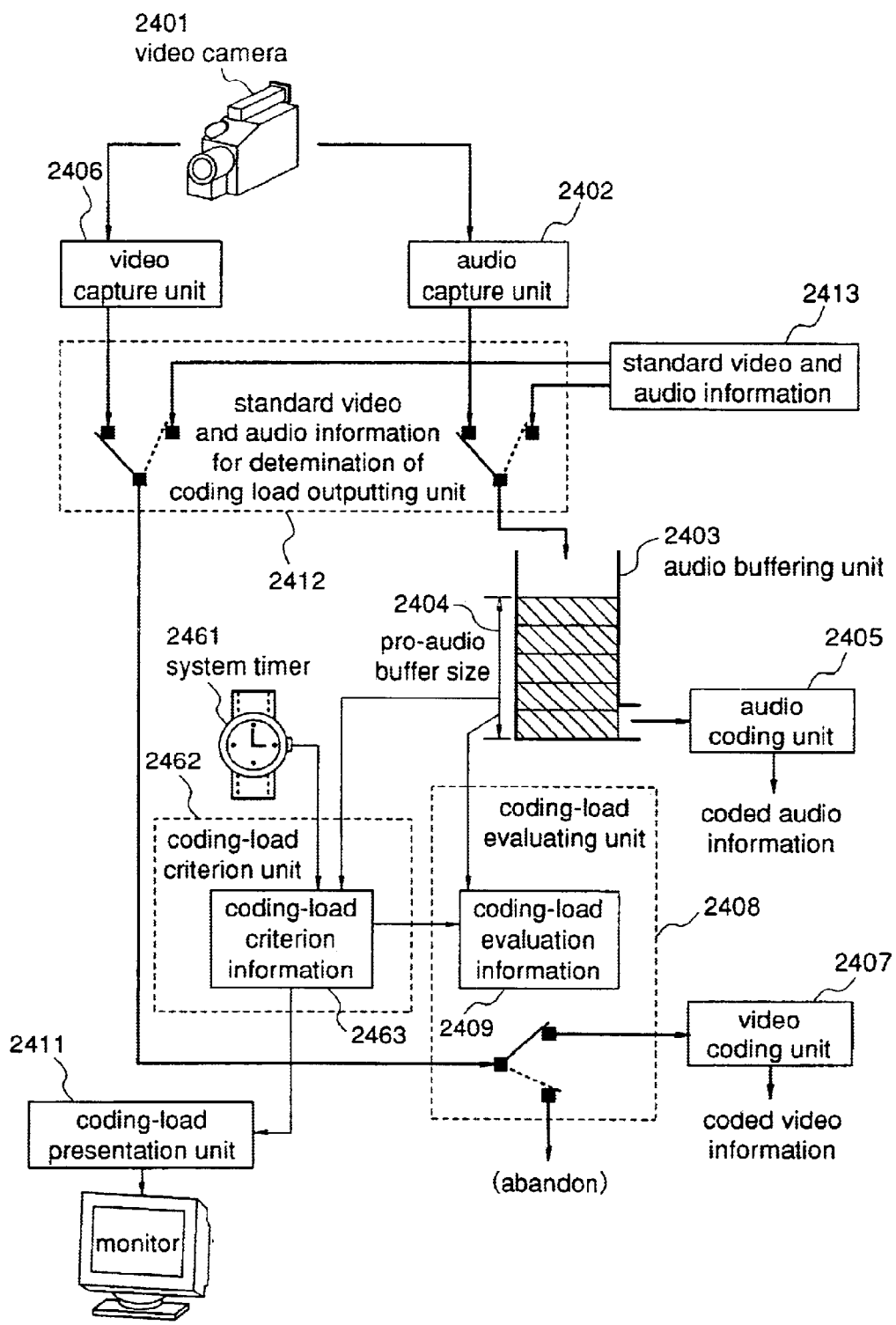
FIG. 54 is a diagram illustrating a schematic structure of a video and audio coding apparatus according to an embodiment 24 of the present invention.

FIG. 54 shows schematically an outline of the constitution of a video and audio coding apparatus of the 24th embodiment. As shown in the figure, the video and audio coding apparatus comprises a video camera 2401, an audio capture unit 2402, an audio buffering unit 2403, an audio coding unit 2405, a video capture unit 2406, a video coding unit 2407, a coding-load evaluating unit 2408, a system timer 2461, a coding-load criterion information 2463, a coding-load presentation unit 2411 and a standard video and audio output for determination of coding load unit 2412. The apparatus outputs coded video and audio signals as well as the 18th embodiment. The coding-load presentation unit 2411 has an output to a monitor.

In the figure, the coding-load presentation unit 2411 presents the determined value of the coding-load criterion information 2463 to the users of the video and audio coding apparatus. The standard video and audio output for determination of coding load unit 2412 outputs standard video and audio signals as a result of determining the load size of a video coding process which is suitable to the computation performance of the computer system. The video and audio coding apparatus is a video and audio coding apparatus of the 23rd embodiment which is added the coding-load presentation unit 2411 and the standard video and audio information for determination of coding load outputting unit 2412. The descriptions about the video camera 2401, the audio capture unit 2402, the audio buffering unit 2403, the audio coding unit 2405, the video capture unit 2406 and the video coding unit 2407 are omitted because those are the same as 1801 to 1807, respectively. The descriptions about the system timer 2461 and the coding-load criterion determining unit 2462 are omitted because those are the same as those of the 23rd embodiment.

An outline of the operation of the video and audio coding apparatus of the 24th embodiment as so constructed is described as follows. The coding-load criterion determining unit 2462 checks the change of the pro-audio buffer size 2404 every a unit time based on the measured output of the system timer 2461, and determines the coding-load criterion information 2463 according to the amount of the change. The coding-load evaluating unit 2408 calculates the coding-load evaluation information 2409 using the determined coding-load criterion information 2463, and, according to the coding-load evaluation information 2409, decides whether to output pro-video signals to the video coding unit 2407 or to abandon the pro-video signals and pause the process of the video coding unit 2407 and give a computer resource (CPU time) to the audio coding unit 2405.

Thus, when pro-video signals are coded by the video coding unit 2407, all of them are not processed, but a ratio of them suitable for the state of coding process of the video and audio coding apparatus are processed.

Further, the standard video and audio information for determination of coding load outputting unit 2412 outputs standard video and audio signals as a result of determining, based on the standard video and audio information 2413, the load size of a video coding process which is suitable to the computation performance of the computer system. The coding-load presentation unit 2411 presents the determined value of the coding-load criterion information 2463 to users of the video and audio coding apparatus.

An example of the operation of the video and audio coding apparatus of the 24th embodiment in processing a certain video and audio information is described as follows.

A video and audio coding process consists of a video coding process (processes of the coding-load evaluating unit 2408 and video coding unit 2407) and an audio coding process (process of the audio coding unit 2405), both of which are tasks controlled by the operating system. The operating system assigns CPU time to one task when a previous task is completed and releases the computer resource (CPU time).

A general purpose computer in which the video and audio coding apparatus is implemented has lower grade of basic performance than that in the 18th embodiment.

Initially, the standard video and audio information for determination of coding load outputting unit 2412 outputs the standard video and audio information 2413 before starting to code real video and audio information. In the video and audio coding apparatus of the 24th embodiment, the standard video and audio information 2413 is coded as well as video and audio information captured in the 23rd embodiment and the coding-load criterion determining unit 2462 determines the coding-load criterion information 2463. The coding-load presentation unit 2411 presents the content of the coding-load criterion information 2463 on a monitor to users who is asked to agree on the content.

In the 24th embodiment, emphasis has been placed on that a given standard video and audio information are used in order to determine the coding-load criterion information.

However, it is also within the scope of the invention that users prepare an arbitrary video and audio information suitable for image which users want to code.

Further, it is also within the scope of the invention that the standard video and audio information has absence-of-sound data as its audio information when the audio coding process of the video and audio coding apparatus is normally performed no matter what the content of audio information is (e.g. whether there exists audio information or not, and the like).

Thus, the video and audio coding apparatus of the 24th embodiment is a video and audio coding apparatus of the 23rd embodiment which is added the standard video and audio information for determination of coding load outputting unit 2412 and the coding-load presentation unit 2411. Before starting to code real video and audio information, the video and audio coding apparatus codes the standard video and audio information, and a coding-load criterion information is determined from the coded standard information, and the coding-load criterion information is presented to a user who can expect the reduction of the quality of image which will be coded afterward. The video and audio coding apparatus of the 24th embodiment which is implemented in a software program is able to be executed on a variety of computer systems whose performances range from high level to low one.

As described above, although it is one of objects that an audio information coding is carried out, independently of the ability of computers, without discontinuous output of audio information at the cost of picture quality, how much the picture quality is deteriorated can be presented to a user. Accordingly, the user attributes the deterioration of the picture quality to a lack of computer ability, and in order to cope with it the user may improve the operating frequency of the computer and expand the main memory thereof.

In the 24th embodiment, to make a user know the situation under which a computer system works is within the scope of the invention.

In the 24th embodiment as described above, emphasis has been placed on that the audio coding unit 2405 reads out pro-audio signals stacked in the audio buffering unit 2403 and deletes them from the audio buffering unit 2403, and then outputs the pro-audio signals into an audio coding process which outputs coded audio information. However, it is also within the scope of the invention that the audio coding unit 2405 reads out pro-audio signals stacked in the audio buffering unit 2403 and outputs the pro-audio signals into a coding process which outputs coded audio information, and deletes the pro-audio signals from the audio buffering unit 2403.

Further, it is also within the scope of the invention that a deleting unit is separately created which detects that the audio coding unit 2405 has read out pro-audio signals stacked in the audio buffering unit 2403 and then deletes them from the audio buffering unit 2403.

Furthermore, it is possible to change and modify variously the design of the video and audio coding apparatus within the scope of the invention.

It should be noted that the video and audio coding methods described in the 18th to 24th embodiments are realized by means of that personal computers and work stations and the like execute the software programs in which the methods are implemented and which are recorded in storage media.

In each of the 1st to 24th embodiments, a medium in which the software program is recorded is such that it can record the program and can be read by personal computers and the like which can execute the program, such as like a floppy disk, a CD-ROM, a magneto-optical disc, a phase change optical disc and so on. It is possible that when the program is record in a remote storage apparatus which is controlled by another computer which is connected to a network, a computer reads the program via the network and executes it.

Embodiment 25

In a video coding method according to a 25th embodiment of the present invention, as in the first embodiment, a coding parameter is decided according to setting among plural coding parameters and the other parameters are decided based on a resolution of the input picture data and the set parameter.

In the embodiments 1 to 4, the frame rate is specified. In this embodiment, coding is performed using a frame rate as high as possible without specifying the frame rate, thereby coded data of high playback quality is obtained.

Figure 55:
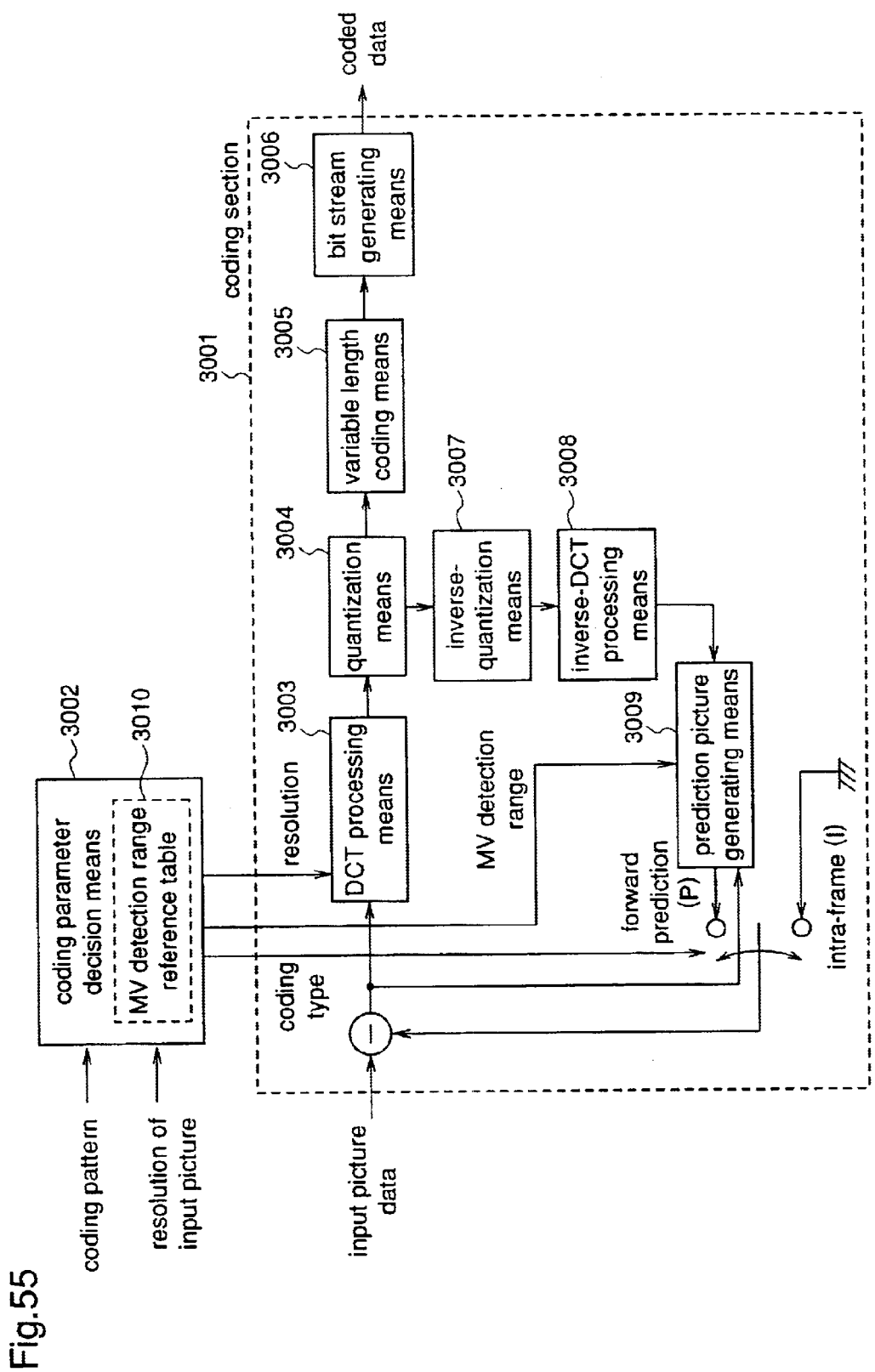
FIG. 55 is a block diagram illustrating a structure of video coding apparatus according to a 25th embodiment of the present invention.

FIG. 55 is a block diagram illustrating a structure of a video coding apparatus according to a 25th embodiment of the present invention. As shown in FIG. 55, the video coding apparatus according to the 25th embodiment comprises a coding section 3001 and a coding parameter decision means 3002. The coding section 3001 includes a DCT processing means 3003, a quantization means 3004, a variable length coding means 3005, a bit stream generating means 3006, an inverse-quantization means 3007, an inverse DCT processing means 3008, and a predictive video generation means 3009. The coding parameter decision means 3002 includes a motion vector (MV) detection range reference table 3010.

The coding section 3001 is used for inputting video data in which video is digitized and which comprises a series of still pictures as input picture data and for performing coding according to the set coding parameters to output coded data. Individual still picture data constituting input picture data is referred to as a frame picture. The coding parameters are given by the coding parameter decision unit 3002 mentioned later and comprises a parameter indicating a coding type and a parameter indicating a detection range of motion vector. The parameter indicating a coding type indicates an intra frame coding or forward predictive coding. The coding section 3001 is used for performing the intra frame coding or forward predictive coding according to the parameters. The motion vector used in forward predictive coding is detected in a range indicated by a parameter indicating the detection range of motion vector.

The DCT means 3003, the quantization means 3004, the variable length coding means 3005, the bit stream generating means 3006, the inverse-quantization means 3007 and the inverse-DCT means 3008 are identical to 103 to 108 and will not be discussed.

The prediction picture generating means 3009 is used for inputting the inverse-DCT data output from the inverse DCT means 3008, detecting motion vector between the inverse DCT data and the input picture data, and then generating prediction picture and outputting the same as prediction picture data. Detection of motion vector is performed in a range indicated by a parameter indicating detection range of motion vector. When inter-frame coding using prediction picture is performed, difference data between the prediction picture data and input picture data is input to the DCT processing means 3003 and forward predictive coding is performed in the coding section 3001.

In the video coding apparatus according to the 25th embodiment, the coding parameter decision means 3002 is used for deciding MV detection range using a MV detection range reference table 3010 included therein on the basis of a resolution of the input picture data and specified coding pattern and for outputting the coding parameters including the parameter indicating the decided MV detection range to the coding section 3001.

The video coding apparatus according to the 25th embodiment is realized by executing a video coding program under control of a central processing unit (CPU) in a personal computer (PC) and in execution of coding, the following two conditions occur in addition to the five conditions in the first embodiment.

(6) In forward coding, when the detection range of motion vector is "small", processing time thereof requires 6 times as much time as intra-frame coding.

(7) In forward coding, when the detection range of motion vector is "large", processing time thereof requires 4 times as much time as a case in which the detection range is "small".

Suppose that the operating frequency of the CPU is 100 MHz, the frame rate specified at the beginning of coding is 24 frame/sec, and a coding pattern as combination of coding types comprises a pattern 2 "IP" repeating "I", and "P" every 2 frames. (Intra-frame coding and forward predictive coding are represented by "I" and "P", respectively).

Figure 56:
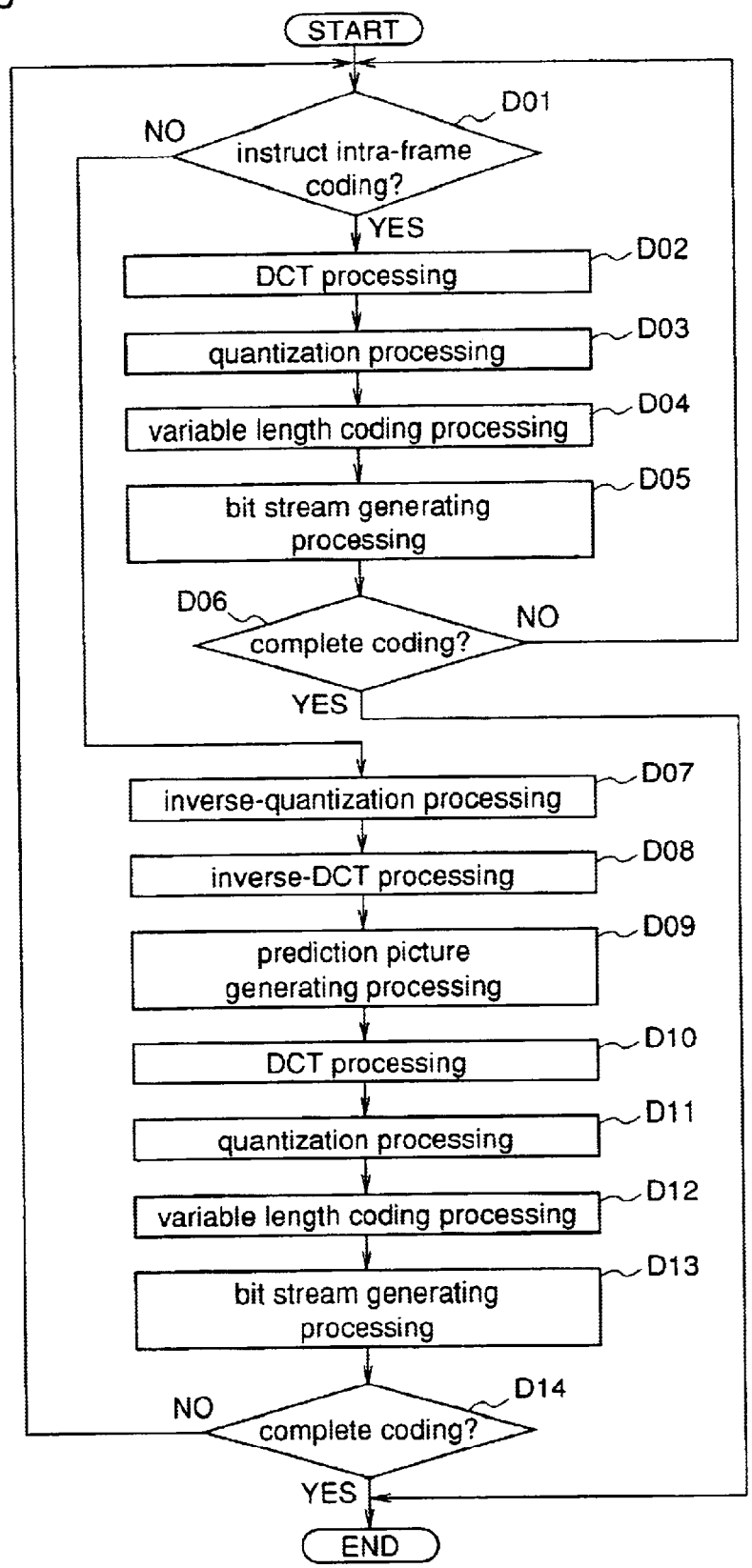
FIG. 56 is a flowchart illustrating a processing procedure in the coding section of the video coding apparatus of the 25th embodiment.

An operation of the video coding apparatus according to the 25th embodiment constructed above is described hereinafter. Video to be coded is digitized and input to the coding section 3001 of the coding apparatus as a series of frame pictures. FIG. 56 is a flowchart illustrating an operation of the coding section 3001. An operation of the coding section 101 is described with reference FIG. 56.

Assume that the coding parameter decision means 3002 instructs the coding section 3001 to perform intra-frame coding to an initial frame picture at the beginning of coding.

In step D01, decision on a coding parameter that is input from the coding parameter decision means 3002 is performed. When it is decided that intra-frame coding is instructed, (A) processing in subsequent steps including step D02 is carried out and, when forward predictive coding is instructed, (B) processing in subsequent steps including step D07 is carried out.

When (a) is performed, steps D02 to D05 are performed as in the first embodiment. In step D06, it is decided whether coding is completed or not. When it is decided that coding is completed, processing terminates and, when it is decided that it is not, processing is returned to the step D01 and the same processing is repeated.

A case (B) is described. In step A07, the inverse-quantization means 3007 inversely quantizes the quantized data that has been output to a previous frame picture and outputs inversely-quantized data. In step D08, the inverse DCT processing means 3008 performs two-dimensional inverse DCT processing to the inversely-quantized data for each block (8×8 pixels) divided by the DCT processing means 103 and outputs resulting inverse DCT data. In step D09, the prediction picture generating means 3009 generates prediction picture (no compensation) on the basis of the inverse DCT data, detects motion vector in a range indicated by the coding parameter to the generated prediction picture and the input picture data, and generates prediction picture with motion compensation using the motion vector and outputs the same.

In step D10, the DCT processing means 3003 divides the input frame picture and the prediction picture that is output from the prediction picture generating means 3009 into (8×8 pixels) blocks, respectively, on the basis of respective resolution, and subtracts the prediction picture data from the input frame picture data to obtain difference data for each divided block. The DCT processing means 3003 performs two-dimensional DCT processing to the difference data in each divided block and outputs resulting DCT data.

Figure 57:
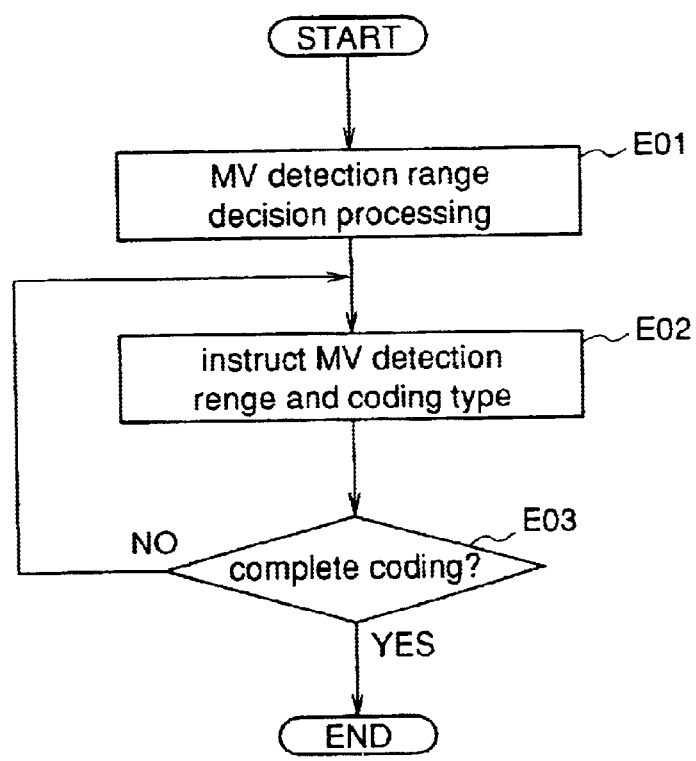
FIG. 57 is a flowchart illustrating a processing procedure in the coding parameter decision means of the video coding apparatus of the 25th embodiment.
Figure 58:
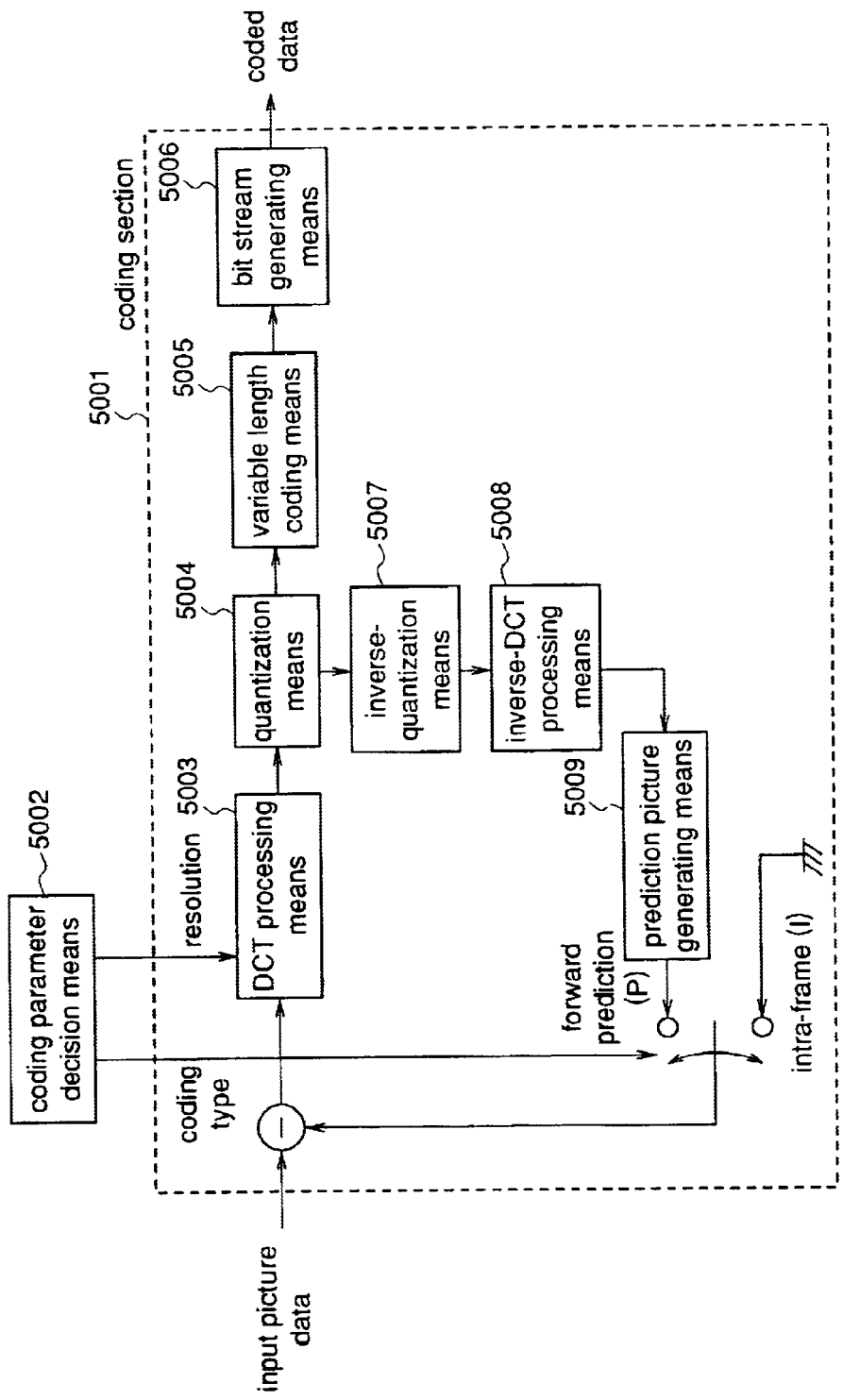
FIG. 58 is a block diagram illustrating a structure of a video coding apparatus which performs real-time processing and comprises a special hardware according to a prior art.
Figure 59:
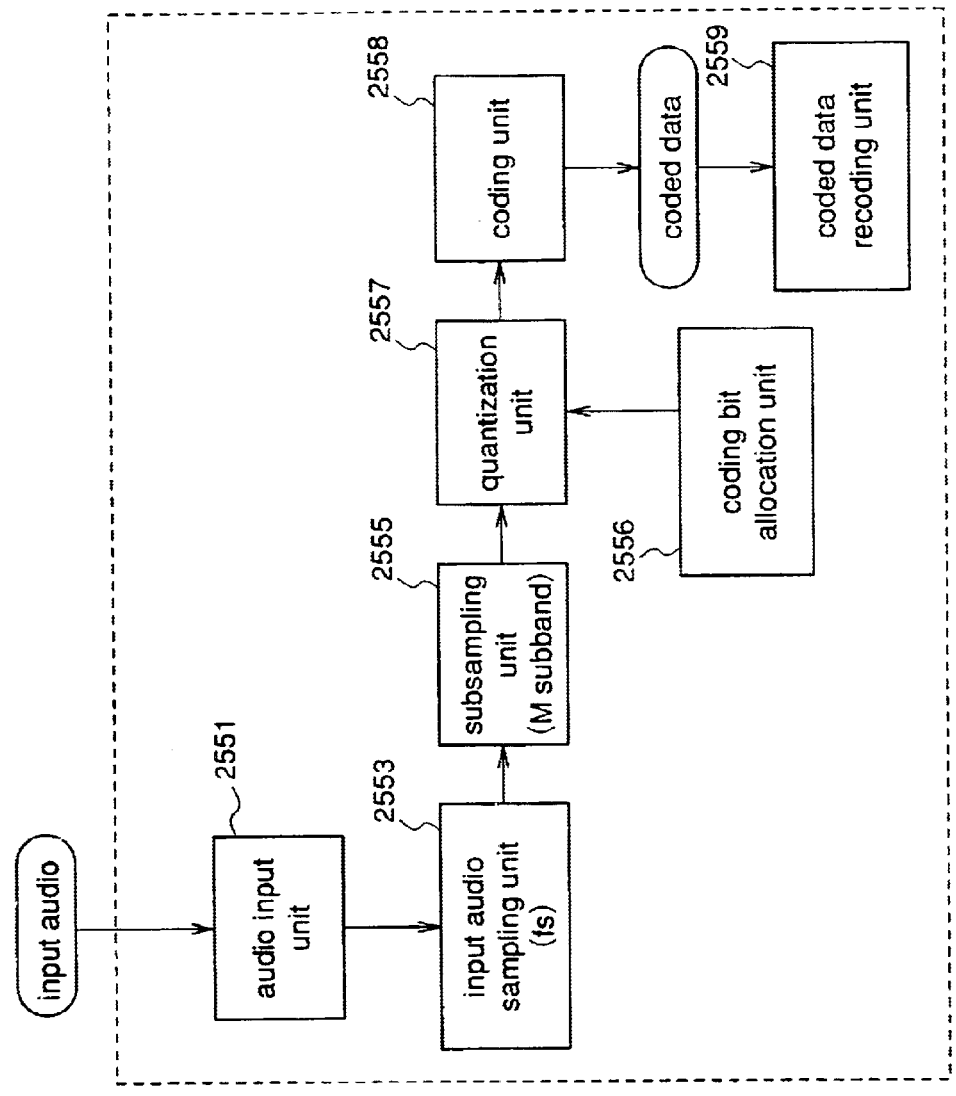
FIG. 59 is a block diagram illustrating a structure of a first audio coding apparatus according to a prior art.
Figure 60:
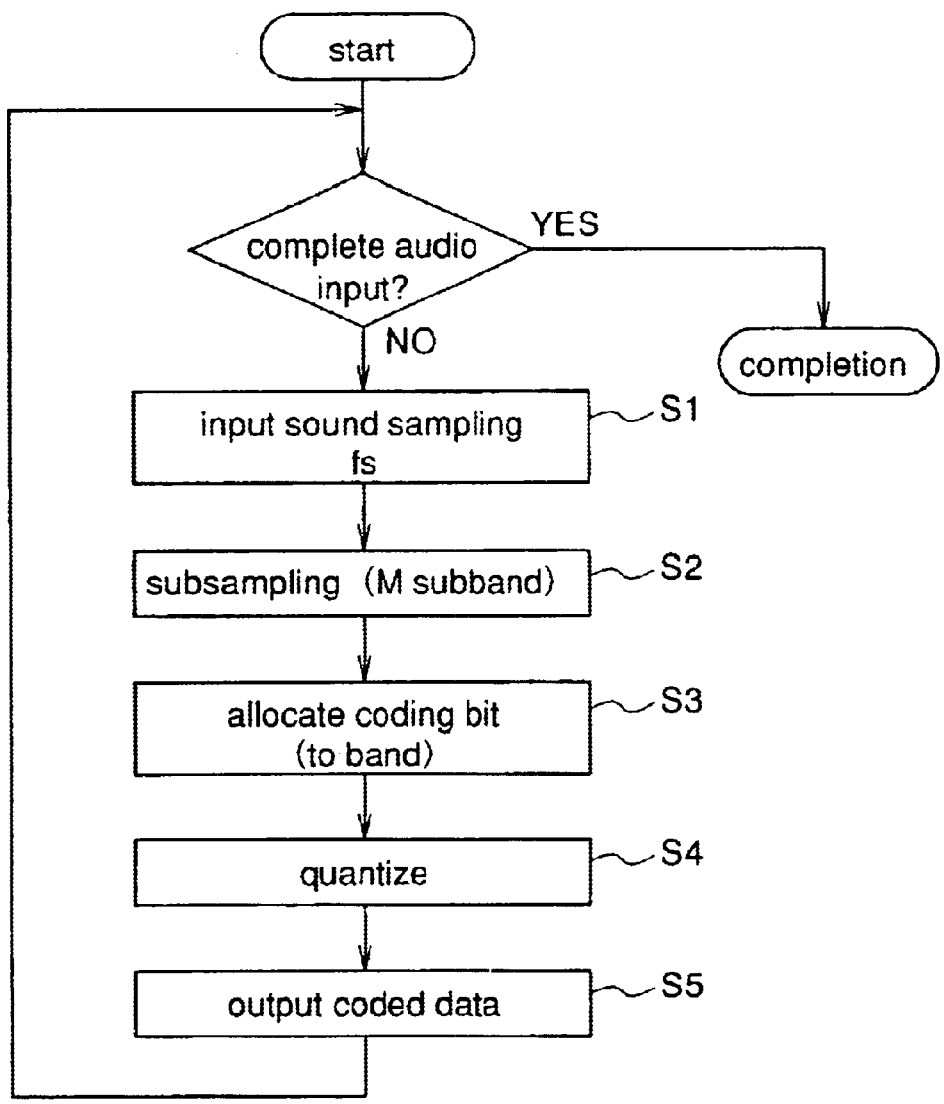
FIG. 60 is a flowchart illustrating a processing procedure of the first audio coding apparatus.
Figure 61:
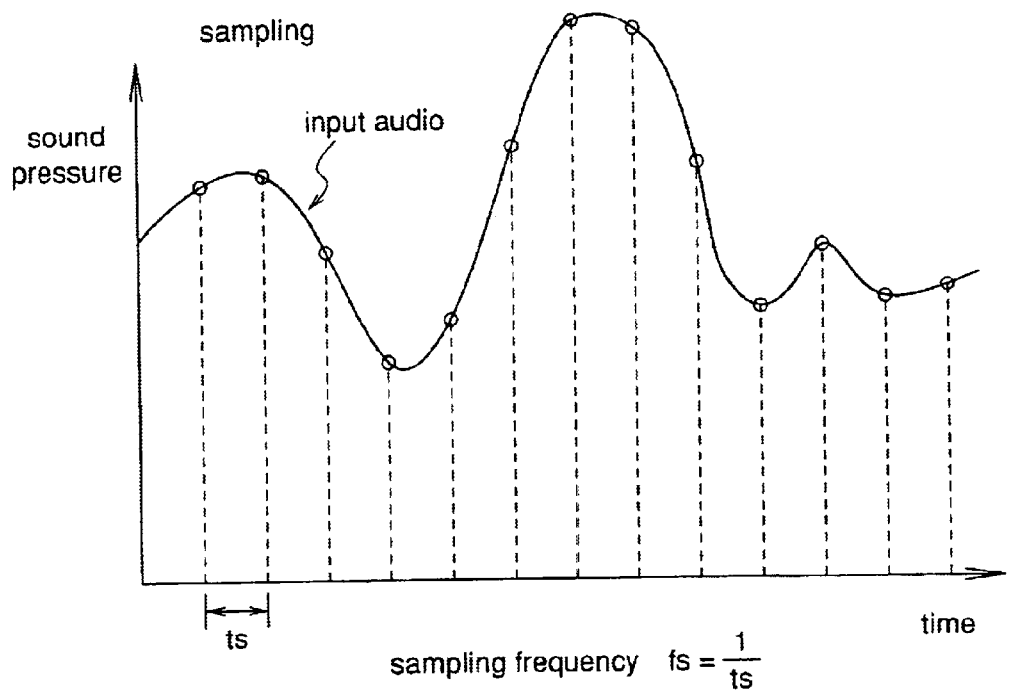
FIG. 61 is a diagram for explaining sampling in the audio coding.

Subsequent steps D11 to D14 are identical to steps D03 to D06. Thus, in the coding section 3001, it is decided in decision step D01 that steps D02 to D06 or steps D07 to D14 is performed to each input frame picture. In steps D02 to D06, intra-frame coding is performed. In steps D07 to D14, forward predictive coding is performed on the basis of the prediction picture using the coded result of the previous frame picture. Switching between them is performed according to input coding parameters in the decision step D01. (TABLE 15) shows the MV detection range reference table 3110 included in the coding parameter decision means 3002. FIG. 57 is a flowchart illustrating an operation of the coding parameter decision means 3002. An operation of the coding parameter decision means 3002 which decides coding parameters and outputs the same to the coding section 3001 is described with reference to TABLE 15 and following a flow in FIG. 3.

TABLE 15

| input | | output motion vector |
|---|---|---|
| resolution | coding pattern | detection range |
| 160 × 120 | IP | small |
| 80 × 64 | IP | large |

The resolution reference table 3010 in TABLE 15 is created prior to coding. The table is created on the basis of empirical knowledge or using a result of experimental coding or simulation, allowing for conditions mentioned later. In TABLE 1, "input" is represented by resolution of the input picture data and specified parameters and "output" is represented by parameters decided in response to input. As shown in the TABLE 15, in this embodiment, MV detection range is decided in accordance with the resolution and the coding patterns. The coding pattern is fixedly set "IP", which indicates that intra-frame coding (I) and forward predictive coding (P) are repeated every two frames. The resolution includes one of "160×120" and "180×64".

The reference table is created allowing for the following conditions. First, the larger the detection range of motion vector is, the more amount of processing is. The higher the resolution is, the more amount of processing is.

The MV detection range reference table 3010 is created so that the motion vector is detected in a larger range and coded data with a higher compression ratio is obtained according to the specified resolution allowing for these conditions.

In step E01 in FIG. 57, the coding parameter decision means 3002 decides detection range of motion vector in predictive coding referring the MV detection range reference table 3010 from the specified resolution and the coding pattern (IP).

In step E02, the coding parameter decision means 3002 outputs the MV detection range and the coding type (I or P) for the frame picture to be processed, which are decided in step E01 to the coding section 101 so that the specified coding pattern is realized.

Thereafter, in step E03, it is decided that coding is completed or not. When it is decided that coding is completed, processing terminates, while it is decided that it is not, processing is returned to step E02 and the coding parameter is output to the coding section 3001 again.

In this way, coding is carried out by the coding section 3001 and the coding parameter decision means 3002. TABLE 16 shows a result coded in the video coding apparatus according to the 25th embodiment.

TABLE 16

| input | | output motion vector | coded result |
|---|---|---|---|
| resolution | coding pattern | detection range | frame rate |
| 160 × 120 | IP | small | 27.4 |
| 80 × 64 | IP | large | 27.4 |

TABLE 16 shows MV detection range (decided parameter) decided by the coding apparatus according to the 25th embodiment and a frame rate (coded result) obtained using the parameter. As a value of coded result in TABLE 16, based on the fact that processing is performed in 27.4 frames/sec when resolution is "160×120" and the coding pattern is "IP", another frame rate is computed. The frame rate in resolution 80×64 in the coding pattern IP in a "large" detection range is computed to be about 27.4 frames/sec, since processing in a large detection range requires 4 times as much time as processing in a small detection range and in ¼ resolution, processing is performed in ¼ time.

For comparison, an operation of coding using the prior art video coding apparatus in terms of (TABLE 17).

TABLE 17

| input | | output motion vector | coded result |
|---|---|---|---|
| resolution | coding pattern | detection range | frame rate |
| 160 × 120 | IP | large | 6.9 |
| 160 × 120 | IP | small | 27.4 |
| 80 × 64 | IP | large | 27.4 |
| 80 × 64 | IP | small | 109.7 |

In TABLE 17, computation is per formed as in TABLE 16. Based on the fact that processing is performed in 27.4 frames/sec in resolution 160×120, in the coding pattern "IP", and in a small detection range, another frame rate is computed.

In the prior art video coding apparatus, the motion vector detection range has been decided, without allowing for the frame rate as the coded result. Therefore, in some cases, it is difficult to set the frame rate to be sufficiently high. On the other hand, in the video coding apparatus according to the 25th embodiment, the motion vector detection range is decided in accordance with the specified coding type (pattern) and resolution of input frame picture allowing for the frame rate as the coded result, thereby as shown in contrast between TABLE 16 and TABLE 17, the frame rate which is as high as possible is realized and simultaneously coding is carried out setting the motion vector detection range so as to obtain coded data with a higher compression ratio.

As should be appreciated from the forgoing description, in accordance with the video coding apparatus according to the 25th embodiment, the apparatus comprises the coding section 3001 and the coding parameter decision means 3002 including the motion vector detection range reference table 3010. The coding parameter decision means 3002 decides the motion vector detection range according to the specified resolution and coding type and outputs the coding parameters to the coding section 3001, which performs coding according to the coding parameters. As a result, it is possible to obtain coded data with a higher compression ratio, realizing requirements.

In the video coding apparatus according to the 25th embodiment, the motion vector detection range is decided according to the specified coding pattern and resolution of the input picture. Alternatively, the same reference table may be used to decide necessity of filtering according to the resolution of the input picture. Coded result with a higher compression ratio can be achieved under the set conditions.

The video coding method of the 25th embodiment is realized by using a recording medium for recording a video and audio coding program which may execute the method and by executing the program in a personal computer or a work station as in the first embodiment.

Furthermore, as a recording medium for recording the coding program in the first to 25th embodiments, provided that it can record the coding program, such as a floppy disk, CD-ROM, an optical magnetic disc, an optical disk and the like and it may be used in a general purpose computer such as a personal computer. In addition, the program recorded in a storage device which is managed by another computer may be read through a network and executed in the computer concerned.

What is claimed is:

1. A method of coding video comprising:
   a video coding step for coding one or a plurality of pieces of still picture information of pro-video information in which video is digitized according to coding parameters, the pro-video information consisting of the plurality of still picture information;

a processing capability decision step for deciding processing capability of coding apparatus which performs the video coding step, and outputting a decision result; and a coding parameter resolution step for deciding one or more coding parameters based on one or more of resolution of the pro-video information, frame rate required for reproducing coded data resulting from coding, processing capability of the coding apparatus, and one or a plurality of coding parameters that affect an amount of processing of coding in the video coding step;

wherein the processing capability decision step includes:
a video buffering step in which a buffering processing temporarily storing the input pro-video information in a buffer of the coding apparatus is performed with a series of still picture information constituting the pro-video information sequentially being preserved while the still picture information read and coded in the coding step sequentially abandoned, and a frame rate control step in which control is executed so that the series of still picture information is preserved in the video buffering step at a prescribed frame rate decided on the basis of the given frame rate, and the decision of processing capability is performed on the basis of an amount of the pro-video information temporarily stored in the video buffering step.

2. A video and audio coding method for performing a coding processing for coding video and audio information using a general-purpose computer resource, the method comprising:

a capturing step for processing the input analog video information to capture digital pro-video signals composed of plural still picture information representing still picture taken per a unit time and digital pro-audio signals representing audio information;

an audio buffering step for temporarily storing the digital pro-audio signals when video and audio information is input;

an audio coding step for coding the stored digital pro-audio signals;

a coding load evaluating step for estimating the extent of load relating to coding of the digital pro-video signal, on the basis of a total size of digital pro-audio signals stored in the audio buffering step, to generate coding-load criterion information, obtaining video resolution for coding of video information according to the coding-load criterion information, and generating the video resolution information representing the video resolution; and a video coding step for coding the captured digital pro-video signals on the basis of the video resolution information;

wherein the capturing step includes:
converting the analog video information included in the analog video and audio information to the digital pro-video signals with resolution according to the video resolution information, and outputting the digital pro-video signals so as to be processed in the video coding step.

3. A video and audio coding method for performing a coding processing for coding video and audio information by using a general-purpose computer resource, the video and audio information including pro-video signals composed of plural still picture information representing still picture taken per a unit time and pro-audio signals representing audio information, the method comprising:

an audio buffering step for temporarily storing the pro-audio signals constituting the video and audio information when video and audio information is input;

an audio coding step for coding the stored pro-audio information;

a coding load evaluating step for generating coding-load criterion information representing the extent of load relating to coding of the pro-video signals on the basis of a coding situation of the pro-audio signals; and a video coding step for coding the pro-video signals on the basis of the coding-load criterion information;

said audio coding step including:
reading out the pro-audio signals stored in the audio buffering step,
calculating the total size of the pro-audio signals that is read out, and
obtaining the processed audio signal size from the calculation result, and said coding load evaluating step including:
obtaining a pro-audio signal input size based on an elapsed time of the coding processing and the size of the pro-audio signals input per a unit time,
obtaining a predictive audio signal buffer size that is a difference between the pro-audio signal input size and the processed audio signal size, and
obtaining the coding-load evaluation information using the predictive audio signal buffer size.

4. A video and audio coding method for performing a coding processing for coding video and audio information by using a general-purpose computer resource, the video and audio information including pro-video signals composed of plural still picture information representing still picture taken per a unit time and pro-audio signals representing audio information, the method comprising:

an audio buffering step for temporarily storing the pro-audio signals constituting the video and audio information when video and audio information is input;

an audio coding step for coding the stored pro-audio information to output the coding information;

a coding load evaluating step for generating coding-load criterion information representing the extent of load relating to coding of the pro-video signals on the basis of a coding condition of the pro-audio signals; and a video coding step for coding the pro-video signals on the basis of the coding-load criterion information;

said coding load evaluating step including:
obtaining a pro-audio signal input size based on an elapsed time of the coding processsing and the size of the pro-audio signals input per a unit time when video and audio information is input,
obtaining the processed audio signal size based on the total size of coded audio information that is output in the audio signal coding step,
obtaining a predictive audio signal buffer size that is a difference between the pro-audio signal input size and the processed audio signal size, and
obtaining said coding-load evaluation information using said predictive audio signal buffer size.

* * * * *

UNITED STATES PATENT AND TRADEMARK OFFICE
CERTIFICATE OF CORRECTION

PATENT NO. : 6,678,468 B2
DATED : January 13, 2004
INVENTOR(S) : Hidenori Tatsumi et al.

It is certified that error appears in the above-identified patent and that said Letters Patent is hereby corrected as shown below:

Title page,
Item [56], References Cited, U.S. PATENT DOCUMENTS, change
"5,511,054 A * 4/1996 Oishi et al." to
-- 5,511,054 A * 4/1996 Oishi et al. …..369.59.27 --.
FOREIGN PATENT DOCUMENTS, change "WO WO 92/007359 4/1992" to
-- WO WO 92/07359 4/1992 --.

Column 100,
Line 44, after "the coding" insert -- audio --.

Signed and Sealed this

Fifteenth Day of June, 2004

JON W. DUDAS
*Acting Director of the United States Patent and Trademark Office*